US012797696B2

(12) United States Patent
Willett et al.

(10) Patent No.: US 12,797,696 B2
(45) Date of Patent: *Nov. 17, 2026

(54) AERODYNAMIC GOLF CLUB HEAD

(71) Applicant: Taylor Made Golf Company, Inc., Carlsbad, CA (US)

(72) Inventors: Kraig Alan Willett, Fallbrook, CA (US); Jeffrey J. Albertsen, Plano, TX (US); Michael Scott Burnett, McKinney, TX (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 18/814,646

(22) Filed: Aug. 26, 2024

(65) Prior Publication Data

US 2024/0424360 A1 Dec. 26, 2024

Related U.S. Application Data

(63) Continuation of application No. 18/137,472, filed on Apr. 21, 2023, now Pat. No. 12,070,663, which is a continuation of application No. 17/360,179, filed on Jun. 28, 2021, now Pat. No. 11,633,651, which is a continuation of application No. 16/524,854, filed on Jul. 29, 2019, now Pat. No. 11,045,694, which is a (Continued)

(51) Int. Cl.
*A63B 53/04* (2015.01)
*F15D 1/10* (2006.01)

(52) U.S. Cl.
CPC ............ *A63B 53/0466* (2013.01); *F15D 1/10* (2013.01); *A63B 53/0408* (2020.08); *A63B 53/0412* (2020.08); *A63B 53/042* (2020.08); *A63B 53/0437* (2020.08); *A63B 2225/01* (2013.01)

(58) Field of Classification Search
CPC ............ A63B 53/0466; A63B 53/0408; A63B 53/0412; A63B 53/0437; A63B 2225/01; F15D 1/10
See application file for complete search history.

(56) References Cited

U.S. PATENT DOCUMENTS 1,526,438 A 2/1925 Scott
1,541,126 A 6/1925 Dunn
(Continued)

FOREIGN PATENT DOCUMENTS

EP 0446935 9/1991
JP H06190088 7/1994
(Continued)

OTHER PUBLICATIONS

International Searching Authority (USPTO), International Search Report and Written Opinion for International Application No. PCT/US 09/49742, mailed Aug. 27, 2009, 11 pages.

(Continued)

*Primary Examiner* — Michael D Dennis
(74) *Attorney, Agent, or Firm* — Dawsey Co., LPA; David J. Dawsey

(57) ABSTRACT

An aerodynamic golf club head producing reduced aerodynamic drag forces. The club head has crown section attributes and material attributes that impart beneficial aerodynamic properties and performance.

20 Claims, 73 Drawing Sheets

Related U.S. Application Data continuation of application No. 15/959,467, filed on Apr. 23, 2018, now Pat. No. 10,363,463, which is a continuation of application No. 15/456,630, filed on Mar. 13, 2017, now Pat. No. 9,950,224, which is a continuation of application No. 15/002,471, filed on Jan. 21, 2016, now Pat. No. 9,623,295, which is a continuation of application No. 14/488,354, filed on Sep. 17, 2014, now Pat. No. 9,259,628, which is a continuation of application No. 13/718,107, filed on Dec. 18, 2012, now Pat. No. 8,858,359, which is a continuation-in-part of application No. 13/683,299, filed on Nov. 21, 2012, now Pat. No. 8,540,586, which is a continuation of application No. 13/305, 978, filed on Nov. 29, 2011, now abandoned, which is a continuation of application No. 12/409,998, filed on Mar. 24, 2009, now Pat. No. 8,088,021, which is a continuation-in-part of application No. 12/367,839, filed on Feb. 9, 2009, now Pat. No. 8,083,609.

(60) Provisional application No. 61/101,919, filed on Oct. 1, 2008, provisional application No. 61/080,892, filed on Jul. 15, 2008.

(56) References Cited

U.S. PATENT DOCUMENTS

| | | | |
|---|---|---|---|
| 2,083,189 A | 6/1937 | Crooker | |
| 2,460,435 A | 2/1949 | Schaffer | |
| 3,085,804 A | 4/1963 | Pieper | |
| 3,166,320 A | 1/1965 | Onions | |
| 3,266,805 A | 8/1966 | Bulla | |
| 3,468,544 A | 9/1969 | Antonious | |
| 3,637,218 A | 1/1972 | Carlino | |
| 3,893,672 A | 7/1975 | Schonher | |
| 3,941,390 A | 3/1976 | Hussey | |
| 3,985,363 A * | 10/1976 | Jepson ............... | A63B 53/0466 473/309 |
| 3,997,170 A | 12/1976 | Goldberg | |
| 4,043,563 A | 8/1977 | Churchward | |
| 4,065,133 A | 12/1977 | Gordos | |
| 4,077,633 A | 3/1978 | Studen | |
| 4,139,196 A | 2/1979 | Riley | |
| 4,147,349 A | 4/1979 | Jeghers | |
| 4,165,076 A | 8/1979 | Cella | |
| 4,193,601 A | 3/1980 | Reid, Jr. et al. | |
| D256,709 S | 9/1980 | Reid, Jr. et al. | |
| 4,247,105 A | 1/1981 | Jeghers | |
| D265,112 S | 6/1982 | Lyons | |
| 4,431,192 A | 2/1984 | Stuff, Jr. | |
| 4,432,549 A | 2/1984 | Zebelean | |
| 4,471,961 A | 9/1984 | Masghati et al. | |
| 4,527,799 A | 7/1985 | Solheim | |
| 4,592,552 A | 6/1986 | Garber | |
| 4,754,974 A | 7/1988 | Kobayashi | |
| 4,787,636 A | 11/1988 | Honma | |
| 4,811,950 A | 3/1989 | Kobayashi | |
| 4,881,739 A | 11/1989 | Garcia | |
| 4,895,367 A | 1/1990 | Kajita et al. | |
| 4,919,428 A | 4/1990 | Perkins | |
| 5,000,454 A | 3/1991 | Soda | |
| 5,054,784 A | 10/1991 | Collins | |
| 5,092,599 A | 3/1992 | Okumoto et al. | |
| 5,116,054 A | 5/1992 | Johnson | |
| 5,120,061 A | 6/1992 | Tsuchida et al. | |
| 5,190,289 A | 3/1993 | Nagai et al. | |
| 5,193,810 A | 3/1993 | Antonious | |
| 5,193,811 A | 3/1993 | Okumoto et al. | |
| 5,219,408 A | 6/1993 | Sun | |
| 5,221,086 A | 6/1993 | Antonious | |
| 5,255,919 A | 10/1993 | Johnson | |
| 5,301,944 A | 4/1994 | Koehler | |
| 5,318,297 A | 6/1994 | Davis et al. | |
| D349,543 S | 8/1994 | MacDougall | |
| 5,340,106 A | 8/1994 | Ravaris | |
| 5,435,558 A | 7/1995 | Iriarte | |
| 5,482,280 A | 1/1996 | Yamawaki | |
| 5,499,814 A | 3/1996 | Lu | |
| 5,501,459 A | 3/1996 | Endo | |
| 5,511,786 A | 4/1996 | Antonious | |
| 5,518,243 A | 5/1996 | Redman | |
| 5,547,427 A | 8/1996 | Rigal et al. | |
| 5,558,332 A | 9/1996 | Cook | |
| D375,130 S | 10/1996 | Hlinka et al. | |
| D378,770 S | 4/1997 | Hlinka et al. | |
| 5,632,695 A | 5/1997 | Hlinka et al. | |
| 5,676,606 A | 10/1997 | Schaeffer et al. | |
| 5,695,412 A | 12/1997 | Cook | |
| 5,700,208 A | 12/1997 | Nelms | |
| 5,720,674 A | 2/1998 | Galy | |
| 5,759,114 A | 6/1998 | Bluto et al. | |
| 5,785,608 A | 7/1998 | Collins | |
| 5,785,609 A | 7/1998 | Sheets | |
| 5,797,807 A | 8/1998 | Moore | |
| D397,750 S | 9/1998 | Frazetta | |
| RE35,931 E | 10/1998 | Schroder et al. | |
| D401,650 S | 11/1998 | Burrows | |
| 5,851,160 A | 12/1998 | Rugge et al. | |
| 5,876,293 A | 3/1999 | Musty | |
| 5,885,166 A | 3/1999 | Shiraishi | |
| 5,890,971 A | 4/1999 | Shiraishi | |
| 5,935,020 A | 8/1999 | Stites et al. | |
| 5,954,595 A | 9/1999 | Antonious | |
| 5,967,905 A | 10/1999 | Nakahara et al. | |
| 6,001,029 A | 12/1999 | Kobayashi | |
| 6,033,319 A | 3/2000 | Farrar | |
| 6,074,308 A | 6/2000 | Domas | |
| 6,083,115 A | 7/2000 | King | |
| 6,093,113 A | 7/2000 | Mertens | |
| 6,123,627 A | 9/2000 | Antonious | |
| 6,139,445 A | 10/2000 | Werner et al. | |
| 6,162,132 A | 12/2000 | Yoneyama | |
| 6,168,537 B1 | 1/2001 | Ezawa | |
| 6,248,025 B1 | 6/2001 | Murphy et al. | |
| 6,332,848 B1 | 12/2001 | Long et al. | |
| 6,344,002 B1 | 2/2002 | Kajita | |
| 6,402,639 B1 | 6/2002 | Iwata et al. | |
| 6,458,042 B1 | 10/2002 | Chen | |
| 6,464,598 B1 | 10/2002 | Miller | |
| 6,471,604 B2 | 10/2002 | Hocknell et al. | |
| 6,491,592 B2 | 12/2002 | Cackett et al. | |
| 6,530,847 B1 | 3/2003 | Antonious | |
| 6,565,452 B2 | 5/2003 | Helmstetter et al. | |
| 6,575,845 B2 | 6/2003 | Galloway et al. | |
| 6,582,323 B2 | 6/2003 | Soracco et al. | |
| 6,592,466 B2 | 7/2003 | Helmstetter et al. | |
| 6,607,452 B2 | 8/2003 | Helmstetter et al. | |
| D482,420 S | 11/2003 | Burrows | |
| 6,645,086 B1 | 11/2003 | Chen | |
| 6,648,773 B1 | 11/2003 | Evans | |
| 6,663,504 B2 | 12/2003 | Hocknell et al. | |
| 6,669,578 B1 | 12/2003 | Evans | |
| 6,676,536 B1 | 1/2004 | Jacobson | |
| 6,723,002 B1 | 4/2004 | Barlow | |
| 6,739,982 B2 | 5/2004 | Murphy et al. | |
| 6,739,983 B2 | 5/2004 | Helmstetter et al. | |
| 6,758,763 B2 | 7/2004 | Murphy et al. | |
| 6,773,359 B1 | 8/2004 | Lee | |
| 6,776,723 B2 | 8/2004 | Bliss et al. | |
| D501,903 S | 2/2005 | Tanaka | |
| 6,855,068 B2 | 2/2005 | Antonious | |
| 6,860,818 B2 | 3/2005 | Mahaffey et al. | |
| 6,860,824 B2 | 3/2005 | Evans | |
| 6,875,129 B2 | 4/2005 | Erickson et al. | |
| 6,881,159 B2 | 4/2005 | Galloway et al. | |
| 6,890,267 B2 | 5/2005 | Mahaffey et al. | |
| 6,926,619 B2 | 8/2005 | Helmstetter et al. | |
| 6,929,565 B2 | 8/2005 | Nakahara et al. | |
| 6,939,247 B1 | 9/2005 | Schweigert et al. | |
| 6,955,612 B2 | 10/2005 | Lu | |
| 6,988,960 B2 | 1/2006 | Mahaffey et al. | |
| 6,991,558 B2 | 1/2006 | Beach et al. | |

(56) References Cited

U.S. PATENT DOCUMENTS

| | | | |
|---|---|---|---|
| D515,643 | S | 2/2006 | Oritz |
| 6,994,636 | B2 | 2/2006 | Hocknell et al. |
| 6,994,637 | B2 | 2/2006 | Murphy et al. |
| 7,004,849 | B2 | 2/2006 | Cameron |
| 7,025,692 | B2 | 4/2006 | Erickson et al. |
| 7,025,695 | B2 | 4/2006 | Mitsuba |
| D522,601 | S | 6/2006 | Schweigert |
| 7,066,835 | B2 | 6/2006 | Evans et al. |
| 7,070,517 | B2 | 7/2006 | Cackett et al. |
| 7,086,962 | B2 | 8/2006 | Galloway et al. |
| 7,097,573 | B2 | 8/2006 | Erickson et al. |
| 7,118,493 | B2 | 10/2006 | Galloway |
| 7,121,957 | B2 | 10/2006 | Hocknell et al. |
| 7,125,344 | B2 | 10/2006 | Hocknell et al. |
| 7,128,661 | B2 | 10/2006 | Soracco et al. |
| 7,128,664 | B2 | 10/2006 | Onoda et al. |
| 7,144,333 | B2 | 12/2006 | Murphy et al. |
| 7,163,470 | B2 | 1/2007 | Galloway et al. |
| 7,166,038 | B2 | 1/2007 | Williams et al. |
| 7,169,058 | B1 | 1/2007 | Fagan |
| D537,495 | S | 2/2007 | Schweigert |
| 7,175,541 | B2 | 2/2007 | Lo |
| 7,189,165 | B2 | 3/2007 | Yamamoto |
| D543,600 | S | 5/2007 | Oldknow |
| D544,939 | S | 6/2007 | Radcliffe et al. |
| 7,229,362 | B2 | 6/2007 | Tavares |
| D549,792 | S | 8/2007 | Parise |
| 7,252,599 | B2 | 8/2007 | Hasegawa |
| 7,258,625 | B2 | 8/2007 | Kawaguchi et al. |
| 7,258,630 | B2 | 8/2007 | Erickson et al. |
| 7,258,631 | B2 | 8/2007 | Galloway et al. |
| 7,273,419 | B2 | 9/2007 | Evans et al. |
| D552,198 | S | 10/2007 | Schweigert |
| D554,720 | S | 11/2007 | Barez et al. |
| 7,291,074 | B2 | 11/2007 | Kouno et al. |
| 7,291,075 | B2 | 11/2007 | Williams et al. |
| 7,294,064 | B2 | 11/2007 | Tsurumaki et al. |
| 7,306,527 | B2 | 12/2007 | Williams et al. |
| 7,311,614 | B2 | 12/2007 | Kumamoto |
| D564,611 | S | 3/2008 | Llewellyn |
| 7,338,390 | B2 | 3/2008 | Lindsay |
| 7,344,452 | B2 | 3/2008 | Imamoto et al. |
| 7,371,191 | B2 | 5/2008 | Sugimoto |
| 7,377,860 | B2 | 5/2008 | Breier et al. |
| 7,390,266 | B2 | 6/2008 | Gwon |
| 7,402,113 | B2 | 7/2008 | Mori et al. |
| 7,413,520 | B1 | 8/2008 | Hocknell et al. |
| 7,416,496 | B2 | 8/2008 | Galloway et al. |
| 7,431,667 | B2 | 10/2008 | Vincent et al. |
| 7,435,190 | B2 | 10/2008 | Sugimoto |
| 7,452,286 | B2 | 11/2008 | Lin et al. |
| 7,462,109 | B2 | 12/2008 | Erickson et al. |
| 7,470,201 | B2 | 12/2008 | Nakahara et al. |
| 7,476,161 | B2 | 1/2009 | Williams et al. |
| 7,481,720 | B2 | 1/2009 | Tavares |
| D589,103 | S | 3/2009 | Kohno |
| 7,497,789 | B2 | 3/2009 | Burnett et al. |
| 7,503,854 | B2 | 3/2009 | Galloway et al. |
| 7,524,249 | B2 | 4/2009 | Breier et al. |
| 7,549,935 | B2 | 6/2009 | Foster et al. |
| 7,607,991 | B2 | 10/2009 | Sorenson |
| 7,628,713 | B2 | 12/2009 | Tavares |
| 7,632,193 | B2 | 12/2009 | Thielen |
| 7,637,822 | B2 | 12/2009 | Foster et al. |
| 7,658,686 | B2 | 2/2010 | Soracco |
| 7,674,187 | B2 | 3/2010 | Cackett et al. |
| 7,674,189 | B2 | 3/2010 | Beach et al. |
| 7,674,190 | B2 | 3/2010 | Galloway et al. |
| 7,691,008 | B2 | 4/2010 | Oyama |
| 7,731,603 | B2 | 6/2010 | Beach et al. |
| 7,749,097 | B2 | 7/2010 | Foster et al. |
| 7,758,454 | B2 | 7/2010 | Burnett et al. |
| D622,338 | S | 8/2010 | Kohno |
| D622,795 | S | 8/2010 | Furutate |
| 7,766,765 | B2 | 8/2010 | Oyama |
| 7,771,291 | B1 | 8/2010 | Willett et al. |
| 7,785,212 | B2 | 8/2010 | Lukasiewicz, Jr. et al. |
| 7,803,065 | B2 | 9/2010 | Breier et al. |
| 7,811,178 | B2 | 10/2010 | Davis |
| 7,846,038 | B2 | 12/2010 | Foster et al. |
| 7,927,229 | B2 | 4/2011 | Jertson et al. |
| 7,931,546 | B2 | 4/2011 | Bennett et al. |
| 7,934,998 | B2 | 5/2011 | Yokota |
| 7,938,740 | B2 * | 5/2011 | Breier ................ A63B 53/0466 473/335 |
| 7,980,964 | B2 | 7/2011 | Soracco |
| 7,993,216 | B2 | 8/2011 | Lee |
| 8,007,371 | B2 | 8/2011 | Breier et al. |
| 8,012,038 | B1 | 9/2011 | Beach et al. |
| 8,012,039 | B2 | 9/2011 | Greaney et al. |
| 8,038,545 | B2 | 10/2011 | Soracco |
| 8,043,167 | B2 | 10/2011 | Boyd et al. |
| 8,062,151 | B2 | 11/2011 | Boyd et al. |
| 8,083,609 | B2 | 12/2011 | Burnett et al. |
| 8,088,021 | B2 | 1/2012 | Albertsen et al. |
| 8,100,781 | B2 | 1/2012 | Burnett et al. |
| 8,133,135 | B2 | 3/2012 | Stites et al. |
| 8,147,354 | B2 | 4/2012 | Hartwell et al. |
| 8,167,739 | B2 | 5/2012 | Lukasiewicz, Jr. et al. |
| 8,187,115 | B2 | 5/2012 | Bennett et al. |
| 8,187,119 | B2 | 5/2012 | Rae et al. |
| 8,216,087 | B2 | 7/2012 | Breier et al. |
| 8,221,260 | B2 | 7/2012 | Stites et al. |
| 8,226,499 | B2 | 7/2012 | Soracco |
| 8,235,844 | B2 | 8/2012 | Albertsen et al. |
| 8,303,433 | B2 | 11/2012 | Roach et al. |
| 8,337,326 | B2 | 12/2012 | Lukasiewicz, Jr. et al. |
| 8,353,786 | B2 | 1/2013 | Beach et al. |
| 8,409,032 | B2 | 4/2013 | Myrhum et al. |
| 8,419,569 | B2 | 4/2013 | Bennett et al. |
| 8,425,827 | B2 | 4/2013 | Lee |
| 8,435,134 | B2 | 5/2013 | Tang et al. |
| 8,460,592 | B2 | 6/2013 | Breier et al. |
| D686,679 | S | 7/2013 | Greensmith et al. |
| 8,475,292 | B2 | 7/2013 | Rahrig et al. |
| 8,496,544 | B2 | 7/2013 | Curtis et al. |
| 8,506,421 | B2 | 8/2013 | Stites et al. |
| 8,523,705 | B2 | 9/2013 | Breier et al. |
| 8,529,368 | B2 | 9/2013 | Rice et al. |
| D692,077 | S | 10/2013 | Greensmith et al. |
| 8,550,935 | B2 | 10/2013 | Stites et al. |
| D696,366 | S | 12/2013 | Milo et al. |
| D696,367 | S | 12/2013 | Taylor et al. |
| D697,152 | S | 1/2014 | Harbert et al. |
| 8,622,847 | B2 | 1/2014 | Beach et al. |
| 8,663,029 | B2 | 3/2014 | Beach et al. |
| 8,678,946 | B2 | 3/2014 | Boyd et al. |
| 8,715,109 | B2 | 5/2014 | Bennett et al. |
| 8,747,252 | B2 | 6/2014 | Lukasiewicz, Jr. et al. |
| 8,784,232 | B2 | 7/2014 | Jertson et al. |
| 8,834,289 | B2 | 9/2014 | de la Cruz et al. |
| 8,834,290 | B2 | 9/2014 | Bezilla et al. |
| 8,834,294 | B1 | 9/2014 | Seluga et al. |
| 8,894,508 | B2 | 11/2014 | Myrhum et al. |
| 8,938,871 | B2 | 1/2015 | Roach et al. |
| 8,986,133 | B2 | 3/2015 | Bennett et al. |
| 9,044,653 | B2 | 6/2015 | Wahl et al. |
| 9,205,311 | B2 | 12/2015 | Stokke |
| 9,308,423 | B1 | 4/2016 | Tang et al. |
| 9,320,949 | B2 | 4/2016 | Golden et al. |
| 9,393,471 | B2 | 7/2016 | Beno et al. |
| 9,421,438 | B2 | 8/2016 | Beno et al. |
| 9,440,123 | B2 | 9/2016 | Beno et al. |
| 9,457,245 | B2 | 10/2016 | Lee |
| 9,474,946 | B2 | 10/2016 | Bennett et al. |
| 9,498,688 | B2 | 11/2016 | Galvan et al. |
| 9,504,889 | B2 | 11/2016 | Mitzel et al. |
| 9,616,301 | B2 | 4/2017 | Clausen et al. |
| 9,636,559 | B2 | 5/2017 | de la Cruz et al. |
| 9,682,299 | B2 | 6/2017 | Tang et al. |
| 9,776,053 | B2 | 10/2017 | Burnett et al. |
| 9,821,198 | B2 | 11/2017 | Stokke |
| 9,839,819 | B2 | 12/2017 | Mizutani et al. |
| 9,855,474 | B2 | 1/2018 | Beno et al. |

(56) References Cited

U.S. PATENT DOCUMENTS

| | | | |
|---|---|---|---|
| 9,901,794 | B2 | 2/2018 | Beno et al. |
| 9,908,013 | B2 | 3/2018 | Hettinger et al. |
| 10,004,958 | B2 | 6/2018 | Tang et al. |
| 10,076,689 | B2 | 9/2018 | de la Cruz et al. |
| 10,076,694 | B2 | 9/2018 | Galvan et al. |
| 10,130,855 | B2 | 11/2018 | Stokke |
| 10,155,144 | B2 | 12/2018 | Lee |
| 10,213,663 | B2 | 2/2019 | Goudarzi et al. |
| 10,245,481 | B1 | 4/2019 | Cleghorn |
| 10,286,265 | B2 | 5/2019 | Tsunashima et al. |
| 2002/0183130 | A1 | 12/2002 | Pacinella |
| 2002/0183134 | A1 | 12/2002 | Allen et al. |
| 2003/0083151 | A1 | 5/2003 | Nakahara et al. |
| 2003/0114239 | A1 | 6/2003 | Mase |
| 2003/0220154 | A1 | 11/2003 | Anelli |
| 2004/0097299 | A1 | 5/2004 | Soracco |
| 2004/0138002 | A1 | 7/2004 | Murray |
| 2004/0157678 | A1 | 8/2004 | Kohno |
| 2004/0162156 | A1 | 8/2004 | Kohno |
| 2004/0192463 | A1 | 9/2004 | Tsurumaki et al. |
| 2005/0009622 | A1 | 1/2005 | Antonious |
| 2005/0059508 | A1 | 3/2005 | Burnett et al. |
| 2006/0009305 | A1 | 1/2006 | Lindsay |
| 2006/0094535 | A1 | 5/2006 | Cameron |
| 2006/0100028 | A1 | 5/2006 | Kuo |
| 2006/0116218 | A1 | 6/2006 | Burnett et al. |
| 2006/0258481 | A1 | 11/2006 | Oyama |
| 2006/0281581 | A1 | 12/2006 | Yamamoto |
| 2007/0054751 | A1 | 3/2007 | Breier |
| 2007/0105657 | A1 | 5/2007 | Hirano |
| 2007/0275792 | A1 | 11/2007 | Horacek et al. |
| 2008/0039234 | A1 | 2/2008 | Williams et al. |
| 2008/0132356 | A1 | 6/2008 | Chao et al. |
| 2008/0146374 | A1 | 6/2008 | Beach et al. |
| 2008/0171610 | A1 | 7/2008 | Shin |
| 2008/0188320 | A1 | 8/2008 | Kamatari |
| 2009/0069114 | A1 | 3/2009 | Foster et al. |
| 2009/0088271 | A1 | 4/2009 | Beach |
| 2009/0124411 | A1 | 5/2009 | Rae et al. |
| 2009/0137338 | A1 | 5/2009 | Kajita |
| 2009/0149275 | A1 | 6/2009 | Rae et al. |
| 2009/0149276 | A1 | 6/2009 | Golden |
| 2009/0170632 | A1 | 7/2009 | Beach et al. |
| 2009/0191980 | A1 | 7/2009 | Greaney et al. |
| 2009/0286611 | A1 | 11/2009 | Beach et al. |
| 2010/0016095 | A1 | 1/2010 | Burnett et al. |
| 2010/0016097 | A1 | 1/2010 | Albertsen |
| 2011/0014992 | A1 | 1/2011 | Morrissey |
| 2012/0071267 | A1 | 3/2012 | Burnett et al. |
| 2012/0071268 | A1 | 3/2012 | Albertsen et al. |
| 2012/0172146 | A1 | 7/2012 | Greaney et al. |
| 2012/0316007 | A1 | 12/2012 | Burnett et al. |
| 2013/0079172 | A1 | 3/2013 | Roger et al. |
| 2013/0123040 | A1 | 5/2013 | Willett et al. |
| 2014/0155193 | A1 | 6/2014 | Takechi |
| 2014/0256461 | A1 | 9/2014 | Beach et al. |
| 2017/0312591 | A1 | 11/2017 | Saso |
| 2017/0319917 | A1 | 11/2017 | Henrikson et al. |
| 2018/0361216 | A1 | 12/2018 | Galvan et al. |
| 2019/0070469 | A1 | 3/2019 | Lee |

FOREIGN PATENT DOCUMENTS

| | | | |
|---|---|---|---|
| JP | 07112041 | | 5/1995 |
| JP | H10225538 | | 8/1998 |
| JP | H10263118 | | 10/1998 |
| JP | H11114102 | | 4/1999 |
| JP | H11155982 | | 6/1999 |
| JP | 4703085 | | 5/2000 |
| JP | 2000202075 | A | 7/2000 |
| JP | 3070587 | U | 8/2000 |
| JP | 2000245876 | A | 9/2000 |
| JP | 2001212272 | A | 8/2001 |
| JP | 2002119627 | A | 8/2001 |
| JP | 2002-052099 | | 2/2002 |
| JP | 2002136625 | | 5/2002 |
| JP | 2003135632 | | 5/2003 |
| JP | 2003199848 | | 7/2003 |
| JP | 2003210621 | | 7/2003 |
| JP | 2003524487 | | 8/2003 |
| JP | 2003320061 | | 11/2003 |
| JP | 2004174224 | | 6/2004 |
| JP | 2004232397 | | 8/2004 |
| JP | 2004261451 | | 9/2004 |
| JP | 2004265992 | | 9/2004 |
| JP | 2004271516 | | 9/2004 |
| JP | 2004313762 | | 11/2004 |
| JP | 2004351054 | | 12/2004 |
| JP | 2004351173 | | 12/2004 |
| JP | 2005073736 | | 3/2005 |
| JP | 2005111172 | | 4/2005 |
| JP | 2005137494 | | 6/2005 |
| JP | 2005137788 | | 6/2005 |
| JP | 2005137940 | | 6/2005 |
| JP | 4138378 | | 7/2005 |
| JP | 3719924 | | 11/2005 |
| JP | 2006006975 | | 1/2006 |
| JP | 3744814 | | 2/2006 |
| JP | 3762906 | | 4/2006 |
| JP | 3762906 | B2 | 4/2006 |
| JP | 4500296 | | 10/2006 |
| JP | 3895571 | | 3/2007 |
| JP | 2007136068 | A | 6/2007 |
| JP | 3953299 | | 8/2007 |
| JP | 3963999 | B2 | 8/2007 |
| JP | 2007229002 | A | 9/2007 |
| JP | 2007275552 | A | 10/2007 |
| JP | 4033035 | B2 | 1/2008 |
| JP | 4047682 | B2 | 2/2008 |
| JP | 4052113 | | 2/2008 |
| JP | 4054316 | | 2/2008 |
| JP | 4097666 | | 6/2008 |
| JP | 4212616 | | 1/2009 |
| JP | 2009000292 | A | 1/2009 |
| JP | 4222118 | B2 | 2/2009 |
| JP | 4222119 | B2 | 2/2009 |
| JP | 4241779 | | 3/2009 |
| JP | 4287769 | | 7/2009 |
| JP | 4291834 | | 7/2009 |
| JP | 4299844 | | 7/2009 |
| JP | 4355245 | | 8/2009 |
| JP | 4326559 | | 9/2009 |
| JP | 4326562 | | 9/2009 |
| JP | 4365676 | | 11/2009 |
| JP | 4365871 | | 11/2009 |
| JP | 4398880 | | 1/2010 |
| JP | 4403084 | | 1/2010 |
| JP | 4410594 | | 1/2010 |
| JP | 4410606 | | 2/2010 |
| JP | 4441462 | | 3/2010 |
| JP | 4451797 | | 4/2010 |
| JP | 4528281 | | 8/2010 |
| JP | 4563062 | | 10/2010 |
| JP | 5467717 | | 12/2010 |
| JP | 3165282 | | 1/2011 |
| JP | 4632342 | | 2/2011 |
| JP | 4634828 | | 2/2011 |
| JP | 5223844 | | 5/2011 |
| JP | 4741388 | | 8/2011 |
| JP | 4758177 | | 8/2011 |
| JP | 4758178 | | 8/2011 |
| JP | 4783579 | | 9/2011 |
| JP | 4786889 | | 10/2011 |
| JP | 5542147 | | 4/2012 |
| JP | 4944830 | | 6/2012 |
| JP | 5601669 | | 6/2012 |
| JP | 4993471 | | 8/2012 |
| JP | 4993481 | | 8/2012 |
| JP | 5007332 | | 8/2012 |
| JP | 5037445 | | 9/2012 |
| JP | 5037446 | | 9/2012 |
| JP | 5075143 | | 11/2012 |
| JP | 5086884 | | 11/2012 |
| JP | 5102084 | | 12/2012 |

(56) References Cited

FOREIGN PATENT DOCUMENTS

| | | |
|---|---|---|
| JP | 5106503 | 12/2012 |
| JP | 5107404 | 12/2012 |
| JP | 5583717 | 2/2013 |
| JP | 5174129 | 4/2013 |
| JP | 5181052 | 4/2013 |
| JP | 5185992 | 4/2013 |
| JP | 5238628 | 7/2013 |
| JP | 5249257 | 7/2013 |
| JP | 5264899 | 8/2013 |
| JP | 5280914 | 9/2013 |
| JP | 5280975 | 9/2013 |
| JP | 5324992 | 10/2013 |
| JP | 5341993 | 11/2013 |
| JP | 5342393 | 11/2013 |
| JP | 5349006 | 11/2013 |
| JP | 5359782 | 12/2013 |
| JP | 5374108 | 12/2013 |
| JP | 5377299 | 12/2013 |
| JP | 5952655 | 1/2014 |
| JP | 5152431 | 2/2014 |
| JP | 5421147 | 2/2014 |
| JP | 5427598 | 2/2014 |
| JP | 5451187 | 3/2014 |
| JP | 5601726 | 10/2014 |
| JP | 5637864 | 12/2014 |
| JP | 5671507 | 2/2015 |
| JP | 5690766 | 3/2015 |
| JP | 5785893 | 9/2015 |
| JP | 5785895 | 9/2015 |
| JP | 5795919 | 10/2015 |
| JP | 5823121 | 11/2015 |
| JP | 5823122 | 11/2015 |
| JP | 5886595 | 3/2016 |
| JP | 5886652 | 3/2016 |
| JP | 5996573 | 9/2016 |
| JP | 6002713 | 10/2016 |
| JP | 6011044 | 10/2016 |
| JP | 6074924 | 2/2017 |
| JP | 6082366 | 2/2017 |
| JP | 6476226 | 2/2019 |
| WO | 2005009543 | 2/2005 |

OTHER PUBLICATIONS

Excerpts from Golf Digest; magazine; Feb. 2004; Article entitled: “The Hot List”, cover page from magazine and article on pp. 82-88.
Excerpts from Golf Digest; magazine; Feb. 2005; Article entitled: “The Hot List”, cover page from magazine and article on pp. 119-130. (Part 1).
Excerpts from Golf Digest; magazine; Feb. 2005; Article entitled: “The Hot List”, article on pp. 131-143. (Part 2).
Excerpts from Golf Digest; magazine; Feb. 2006; Article entitled: “The Hot List”, cover page from magazine and article on pp. 122-132. (Part 1).
Excerpts from Golf Digest; magazine; Feb. 2006; Article entitled: “The Hot List”, article on pp. 133-143. (Part 2).
Excerpts from Golf Digest; magazine; Feb. 2007; Article entitled: “The Hot List”, cover page from magazine and article on pp. 130-151.
Excerpts from Golf Digest; magazine; Feb. 2008; Article entitled: “The Hot List”, cover page from magazine and article on pp. 114-139.
Excerpts from Golf Digest; magazine; Feb. 2009; Article entitled: “The Hot List”, cover page from magazine and article on pp. 101-127.
International Searching Authority (USPTO), International Search Report and Written Opinion for International Application No. PCT/US2009/049418, mailed Aug. 26, 2009, 10 pages.
Declaration, 2012, Willett, pp. 1-6.
“Cleveland HiBore Driver Review,” http://thesandtrip.com , 7 pages, May 19, 2006.
“Invalidity Search Report for Japanese Registered Patent No. 4128970,” 4pg. (Nov. 29, 2013.).

* cited by examiner

AERODYNAMIC GOLF CLUB HEAD

CROSS-REFERENCE TO RELATED APPLICATIONS

This application is a continuation of U.S. patent application Ser. No. 18/137,472, filed Apr. 21, 2023, which is a continuation of U.S. patent application Ser. No. 17/360,179, filed on Jun. 28, 2021, which is a continuation of U.S. patent application Ser. No. 16/524,854, filed on Jul. 29, 2019, which is a continuation of U.S. patent application Ser. No. 15/959,467, filed on Apr. 23, 2018, (now U.S. Pat. No. 10,363,463), which is a continuation of U.S. patent application Ser. No. 15/456,630, filed on Mar. 13, 2017 (now U.S. Pat. No. 9,950,224), which is a continuation of U.S. patent application Ser. No. 15/002,471, filed on Jan. 21, 2016 (now U.S. Pat. No. 9,623,295), which is a continuation of U.S. patent application Ser. No. 14/488,354, filed on Sep. 17, 2014 (now U.S. Pat. No. 9,259,628), which is a continuation of U.S. patent application Ser. No. 13/718,107, filed on Dec. 18, 2012 (now U.S. Pat. No. 8,858,359), which is a continuation-in-part of U.S. patent application Ser. No. 13/683,299, filed on Nov. 21, 2012 (now U.S. Pat. No. 8,540,586), which is a continuation application of U.S. patent application Ser. No. 13/305,978, filed on Nov. 29, 2011 (now Abandoned), which is a continuation application of U.S. patent application Ser. No. 12/409,998, filed on Mar. 24, 2009 (now U.S. Pat. No. 8,088,021), which is a continuation-in-part of U.S. patent application Ser. No. 12/367,839, filed on Feb. 9, 2009 (now U.S. Pat. No. 8,083,609), which claims the benefit of U.S. provisional patent application Ser. No. 61/080,892, filed on Jul. 15, 2008, and U.S. provisional patent application Ser. No. 61/101,919, filed on Oct. 1, 2008, all of which are incorporated by reference as if completely written herein.

STATEMENT REGARDING FEDERALLY SPONSORED RESEARCH OR DEVELOPMENT

This invention was not made as part of a federally sponsored research or development project.

TECHNICAL FIELD

The present invention relates to sports equipment; particularly, to a high volume aerodynamic golf club head.

BACKGROUND OF THE INVENTION

Modern high volume golf club heads, namely drivers, are being designed with little, if any, attention paid to the aerodynamics of the golf club head. This stems in large part from the fact that in the past the aerodynamics of golf club heads were studied and it was found that the aerodynamics of the club head had only minimal impact on the performance of the golf club.

The drivers of today have club head volumes that are often double the volume of the most advanced club heads from just a decade ago. In fact, virtually all modern drivers have club head volumes of at least 400 cc, with a majority having volumes right at the present USGA mandated limit of 460 cc. Still, golf club designers pay little attention to the aerodynamics of these large golf clubs; often instead focusing solely on increasing the club head's resistance to twisting during off-center shots.

The modern race to design golf club heads that greatly resist twisting, meaning that the club heads have large moments of inertia, has led to club heads having very long front-to-back dimensions. The front-to-back dimension of a golf club head, often annotated the FB dimension, is measured from the leading edge of the club face to the furthest back portion of the club head. Currently, in addition to the USGA limit on the club head volume, the USGA limits the front-to-back dimension (FB) to 5 inches and the moment of inertia about a vertical axis passing through the club head's center of gravity (CG), referred to as MOIy, to 5900 g*cm$^2$. One of skill in the art will know the meaning of "center of gravity,"

referred to herein as CG, from an entry level course on mechanics. With respect to wood-type golf clubs, which are generally hollow and/or having non-uniform density, the CG is often thought of as the intersection of all the balance points of the club head. In other words, if you balance the head on the face and then on the sole, the intersection of the two imaginary lines passing straight through the balance points would define the point referred to as the CG.

Until just recently the majority of drivers had what is commonly referred to as a "traditional shape" and a 460 cc club head volume. These large volume traditional shape drivers had front-to-back dimensions (FB) of approximately 4.0 inches to 4.3 inches, generally achieving an MOIy in the range of 4000-4600 g*cm$^2$. As golf club designers strove to increase MOIy as much as possible, the FB dimension of drivers started entering the range of 4.3 inches to 5.0 inches. The graph of FIG. 1 shows the FB dimension and MOIy of 83 different club head designs and nicely illustrates that high MOIy values come with large FB dimensions.

While increasing the FB dimension to achieve higher MOIy values is logical, significant adverse effects have been observed in these large FB dimension clubs. One significant adverse effect is a dramatic reduction in club head speed, which appears to have gone unnoticed by many in the industry. The graph of FIG. 2 illustrates player test data with drivers having an FB dimension greater than 3.6 inches. The graph illustrates considerably lower club head speeds for large FB dimension drivers when compared to the club head speeds of drivers having FB dimensions less than 4.4 inches. In fact, a club head speed of 104.6 mph was achieved when swinging a driver having a FB dimension of less than 3.8 inches, while the swing speed dropped over 3% to 101.5 mph when swinging a driver with a FB dimension of slightly less than 4.8 inches.

This significant decrease in club head speed is the result of the increase in aerodynamic drag forces associated with large FB dimension golf club heads. Data obtained during extensive wind tunnel testing shows a strong correlation between club head FB dimension and the aerodynamic drag measured at several critical orientations. First, orientation one is identified in FIG. 11 with a flow arrow labeled as "Air Flow—90°" and is referred to in the graphs of the figures as "lie 90 degree orientation." This orientation can be thought of as the club head resting on the ground plane (GP) with the shaft axis (SA) at the club head's design lie angle, as seen in FIG. 8. Then a 100 mph wind is directed parallel to the ground plane (GP) directly at the club face (200), as illustrated by the flow arrow labeled "Air Flow—90°" in FIG. 11.

Secondly, orientation two is identified in FIG. 11 with a flow arrow labeled as "Air Flow—60°" and is referred to in the graphs of the figures as "lie 60 degree orientation." This orientation can be thought of as the club head resting on the ground plane (GP) with the shaft axis (SA) at the club head's design lie angle, as seen in FIG. 8. Then a 100 mph wind is wind is oriented thirty degrees from a vertical plane normal to the face (200) with the wind originating from the heel (116) side of the club head, as illustrated by the flow arrow labeled "Air Flow—60°" in FIG. 11.

Thirdly, orientation three is identified in FIG. 12 with a flow arrow labeled as "Air Flow—Vert.—0°" and is referred to in the graphs of the figures as "vertical 0 degree orientation." This orientation can be thought of as the club head being oriented upside down with the shaft axis (SA) vertical while being exposed to a horizontal 100 mph wind directed at the heel (116), as illustrated by the flow arrow labeled "Air Flow—Vert.—0°" in FIG. 12. Thus, the air flow is parallel to the vertical plane created by the shaft axis (SA) seen in FIG. 11, blowing from the heel (116) to the toe (118) but with the club head oriented as seen in FIG. 12.

Now referring back to orientation one, namely the orientation identified in FIG. 11 with a flow arrow labeled as "Air Flow—90°." Normalized aerodynamic drag data has been gathered for six different club heads and is illustrated in the graph of FIG. 5. At this point it is important to understand that all of the aerodynamic drag forces mentioned herein, unless otherwise stated, are aerodynamic drag forces normalized to a 120 mph airstream velocity. Thus, the illustrated aerodynamic drag force values are the actual measured drag force at the indicated airstream velocity multiplied by the square of the reference velocity, which is 120 mph, then divided by the square of the actual airstream velocity. Therefore, the normalized aerodynamic drag force plotted in FIG. 5 is the actual measured drag force when subjected to a 100 mph wind at the specified orientation, multiplied by the square of the 120 mph reference velocity, and then divided by the square of the 100 mph actual airstream velocity.

Still referencing FIG. 5, the normalized aerodynamic drag force increases non-linearly from a low of 1.2 lbf with a short 3.8 inch FB dimension club head to a high of 2.65 lbf for a club head having a FB dimension of almost 4.8 inches. The increase in normalized aerodynamic drag force is in excess of 120% as the FB dimension increases slightly less than one inch, contributing to the significant decrease in club head speed previously discussed.

The results are much the same in orientation two, namely the orientation identified in FIG. 11 with a flow arrow labeled as "Air Flow—60°." Again, normalized aerodynamic drag data has been gathered for six different club heads and is illustrated in the graph of FIG. 4. The normalized aerodynamic drag force increases non-linearly from a low of approximately 1.1 lbf with a short 3.8 inch FB dimension club head to a high of approximately 1.9 lbf for a club head having a FB dimension of almost 4.8 inches. The increase in normalized aerodynamic drag force is almost 73% as the FB dimension increases slightly less than one inch, also contributing to the significant decrease in club head speed previously discussed.

Again, the results are much the same in orientation three, namely the orientation identified in FIG. 12 with a flow arrow labeled as "Air Flow—Vert.—0°." Again, normalized aerodynamic drag data has been gathered for several different club heads and is illustrated in the graph of FIG. 3. The normalized aerodynamic drag force increases non-linearly from a low of approximately 1.15 lbf with a short 3.8 inch FB dimension club head to a high of approximately 2.05 lbf for a club head having a FB dimension of almost 4.8 inches. The increase in normalized aerodynamic drag force is in excess of 78% as the FB dimension increases slightly less than one inch, also contributing to the significant decrease in club head speed previously discussed.

Further, the graph of FIG. 6 correlates the player test club head speed data of FIG. 2 with the maximum normalized aerodynamic drag force for each club head from FIG. 3, 4, or 5. Thus, FIG. 6 shows that the club head speed drops from 104.6 mph, when the maximum normalized aerodynamic drag force is only 1.2 lbf, down to 101.5 mph, when the maximum normalized aerodynamic drag force is 2.65 lbf.

The drop in club head speed just described has a significant impact on the speed at which the golf ball leaves the club face after impact and thus the distance that the golf ball travels. In fact, for a club head speed of approximately 100 mph, each 1 mph reduction in club head speed results in approximately a 1% loss in distance. The present golf club head has identified these relationships, the reason for the drop in club head speed associated with long FB dimension clubs, and several ways to reduce the aerodynamic drag force of golf club heads.

SUMMARY OF THE INVENTION

The claimed aerodynamic golf club head having a large projected area of the face portion ($A_f$) and large drop contour area (CA) has recognized that the poor aerodynamic performance of large FB dimension drivers is not due solely to the large FB dimension; rather, in an effort to create large FB dimension drivers with a high MOIy value and low center of gravity (CG) dimension, golf club designers have generally created clubs that have very poor aerodynamic shaping. Several problems are the lack of proper shaping to account for airflow reattachment in the crown area trailing the face, the lack of proper shaping to promote airflow attachment after is passes the highest point on the crown, and the lack of proper trailing edge design. In addition, current driver designs have failed to obtain improved aerodynamic performance for golf club head designs that include a large projected area of the face portion ($A_f$).

The present aerodynamic golf club head having a large projected area of the face portion ($A_f$) and large drop contour area (CA) solves these issues and results in a high volume aerodynamic golf club head having a relatively large FB dimension with beneficial moment of inertia values, while also obtaining superior aerodynamic properties unseen by other large volume, large FB dimension, high MOI golf club heads. The golf club head obtains superior aerodynamic performance through the use of unique club head shapes and the incorporation of crown section having a drop contour area (CA) that is sufficiently large in relation to the projected area of the face portion ($A_f$) of the golf club head.

The club head has a large projected area of the face portion ($A_f$) and a crown having a large drop contour area (CA). The drop contour area (CA) is an area defined by the intersection of the crown with a plane that is offset toward the ground plane from the crown apex. In several embodiments, the relationship between the projected area of the face portion ($A_f$) and the drop contour area (CA) is defined in part by linear boundary equation. The relatively large drop contour area (CA) for a given relatively large projected area of the face portion ($A_f$) aids in keeping airflow attached to the club head once it flows past the crown apex thereby resulting in reduced aerodynamic drag forces and producing higher club head speeds.

BRIEF DESCRIPTION OF THE DRAWINGS

Without limiting the scope of the present aerodynamic golf club head as claimed below and referring now to the drawings and figures:

FIG. 110 is a front elevation view of the golf club head of FIG. 109;

FIG. 111 is a bottom perspective view of the golf club head of FIG. 109;

FIG. 112 is a front elevation view of the golf club head of FIG. 109 showing a golf club head origin coordinate system;

FIG. 113 is a side elevation view of the golf club head of FIG. 109 showing a center of gravity coordinate system;

FIG. 114 is a top plan view of the golf club head of FIG. 109; and

FIG. 115 is a bottom perspective view of a golf club head.

Figure 1:
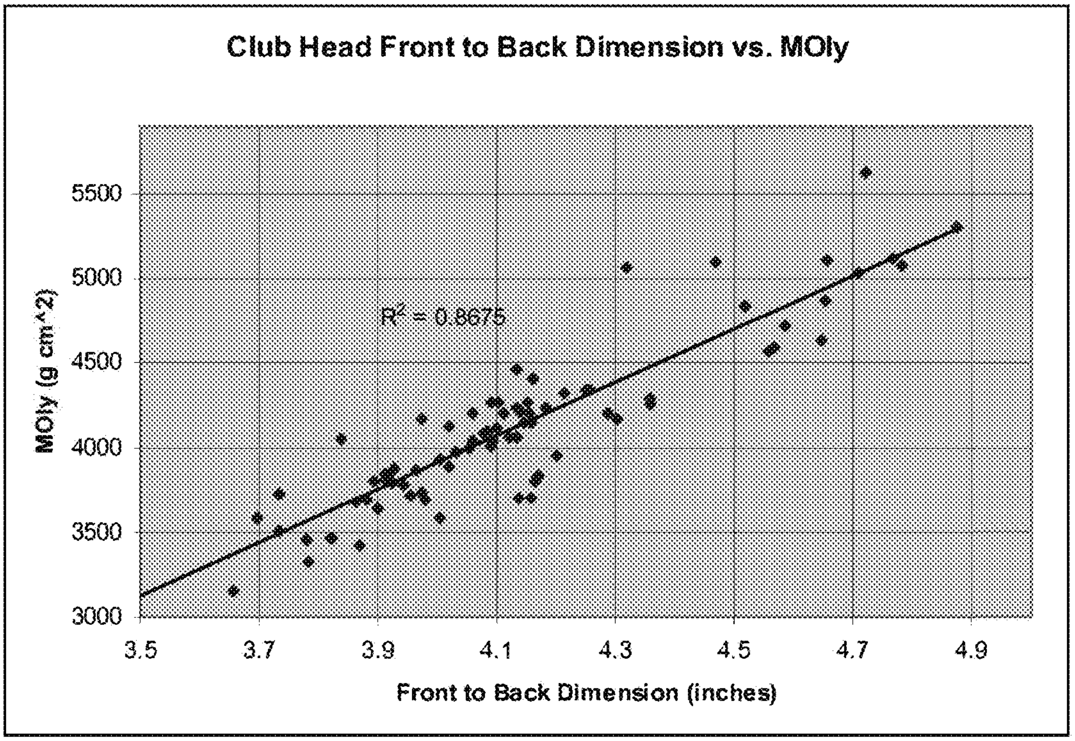
FIG. 1 shows a graph of FB dimensions versus MOIy.
Figure 2:
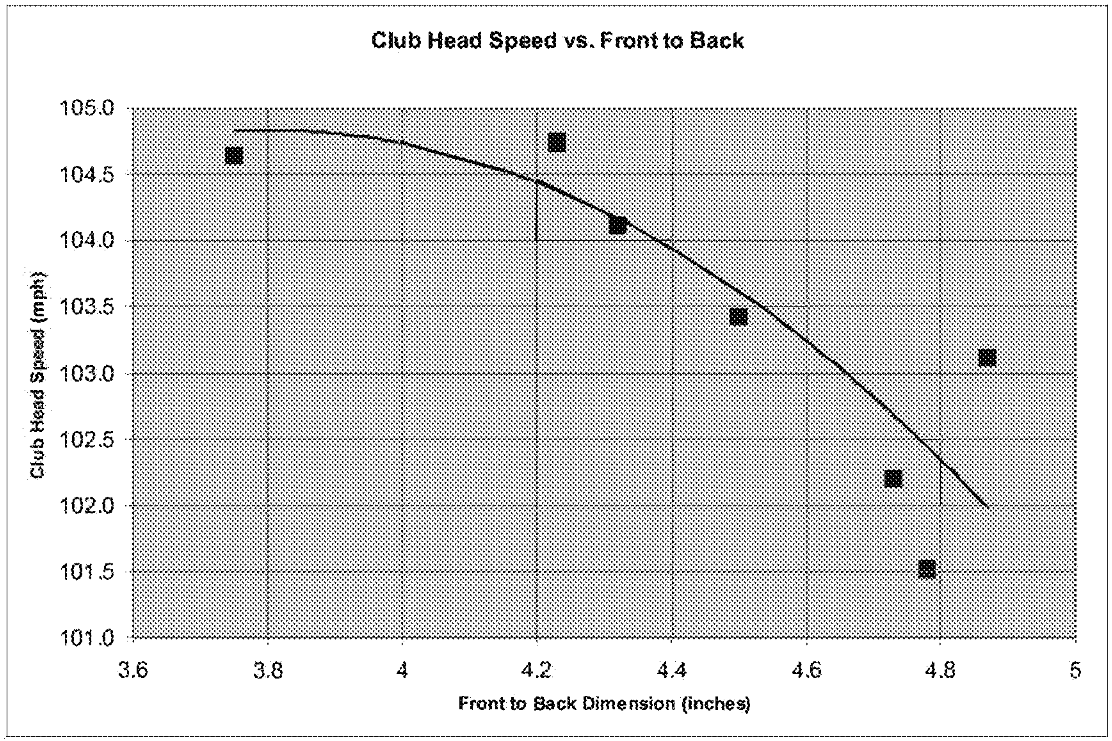
FIG. 2 shows a graph of FB dimensions versus club head speed.
Figure 3:
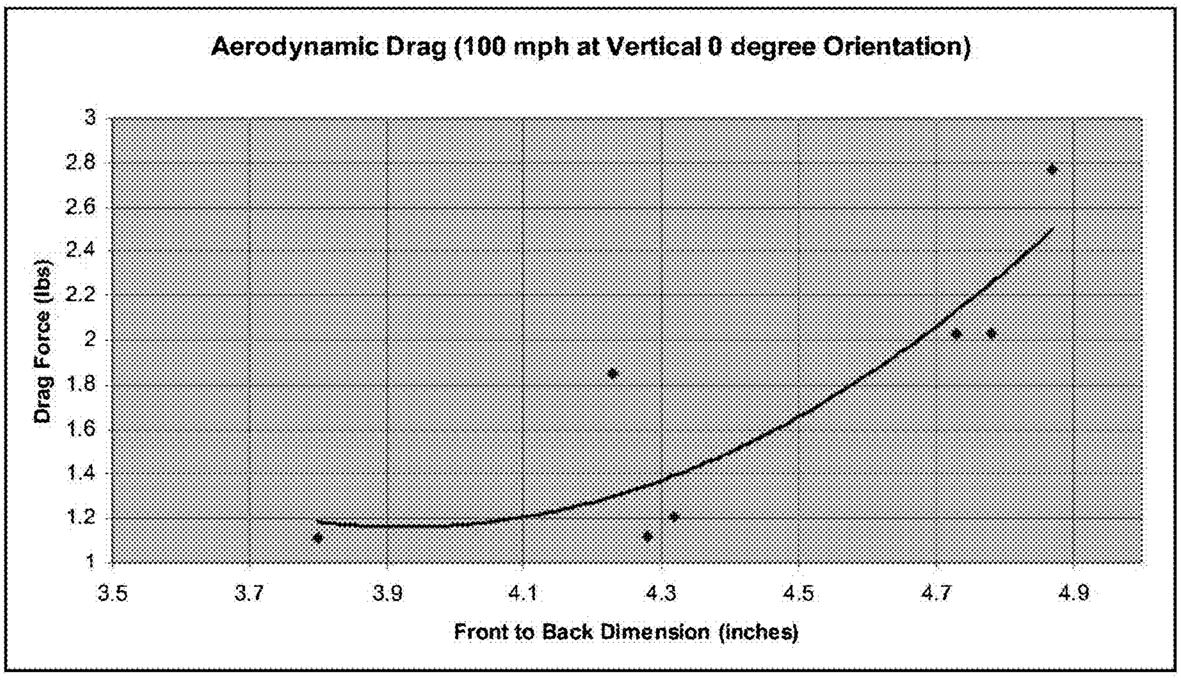
FIG. 3 shows a graph of FB dimensions versus club head normalized aerodynamic drag force.
Figure 4:
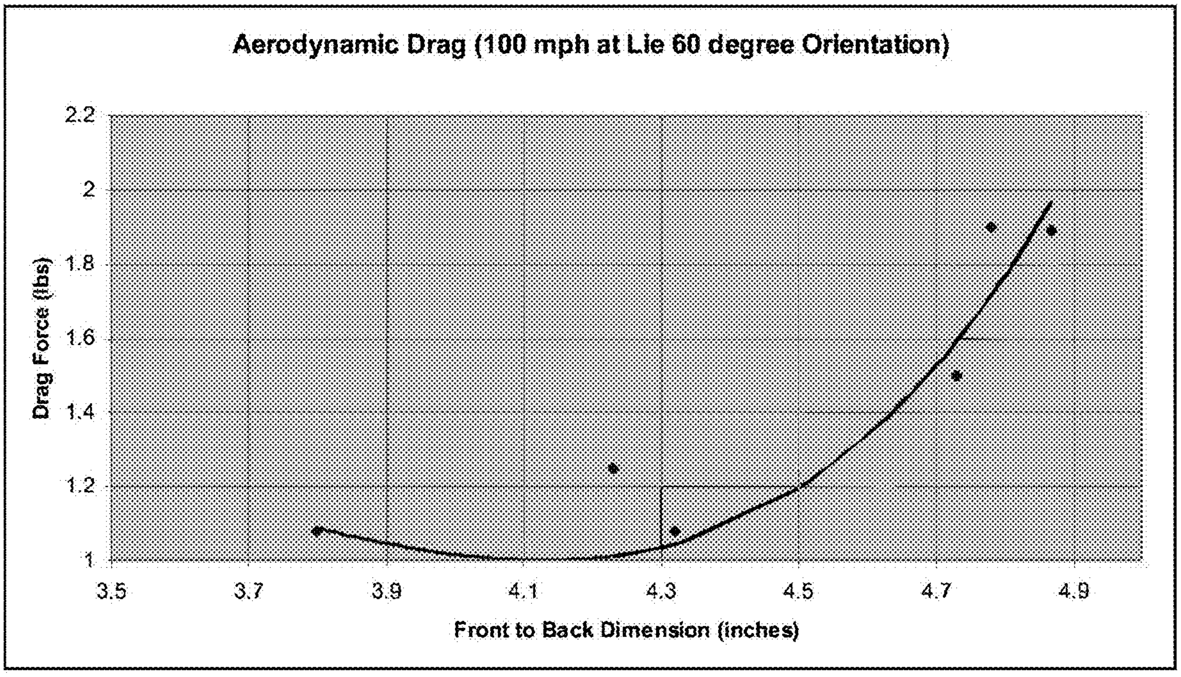
FIG. 4 shows a graph of FB dimensions versus club head normalized aerodynamic drag force.
Figure 5:
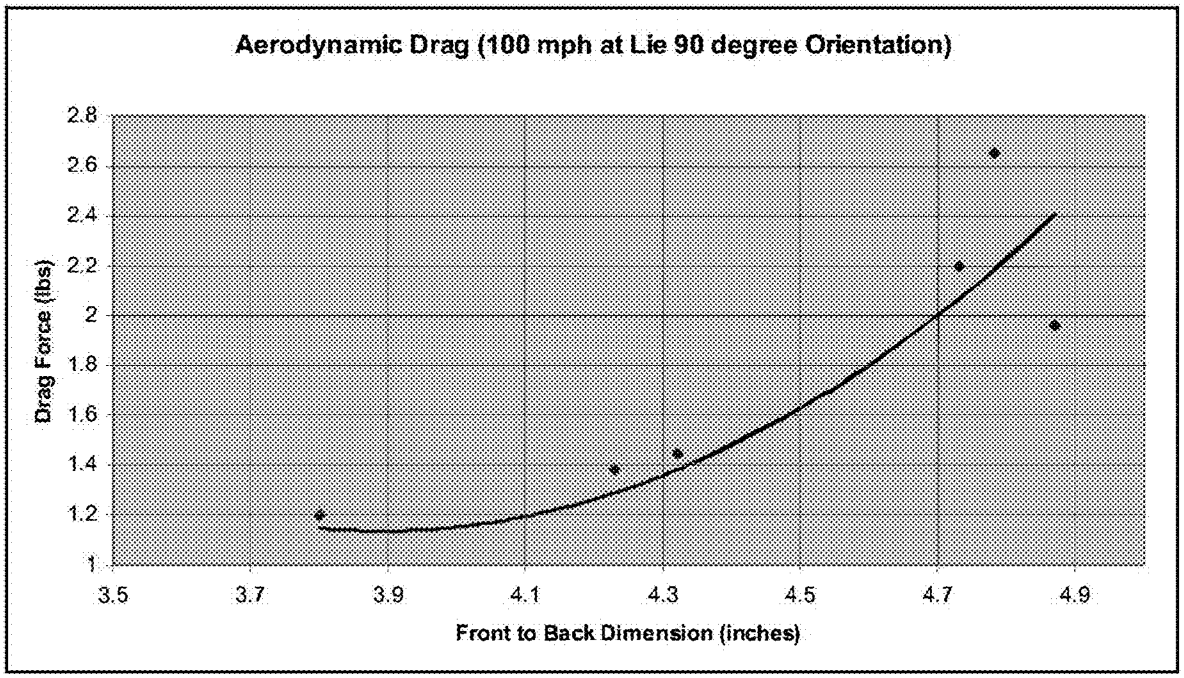
FIG. 5 shows a graph of FB dimensions versus club head normalized aerodynamic drag force.
Figure 6:
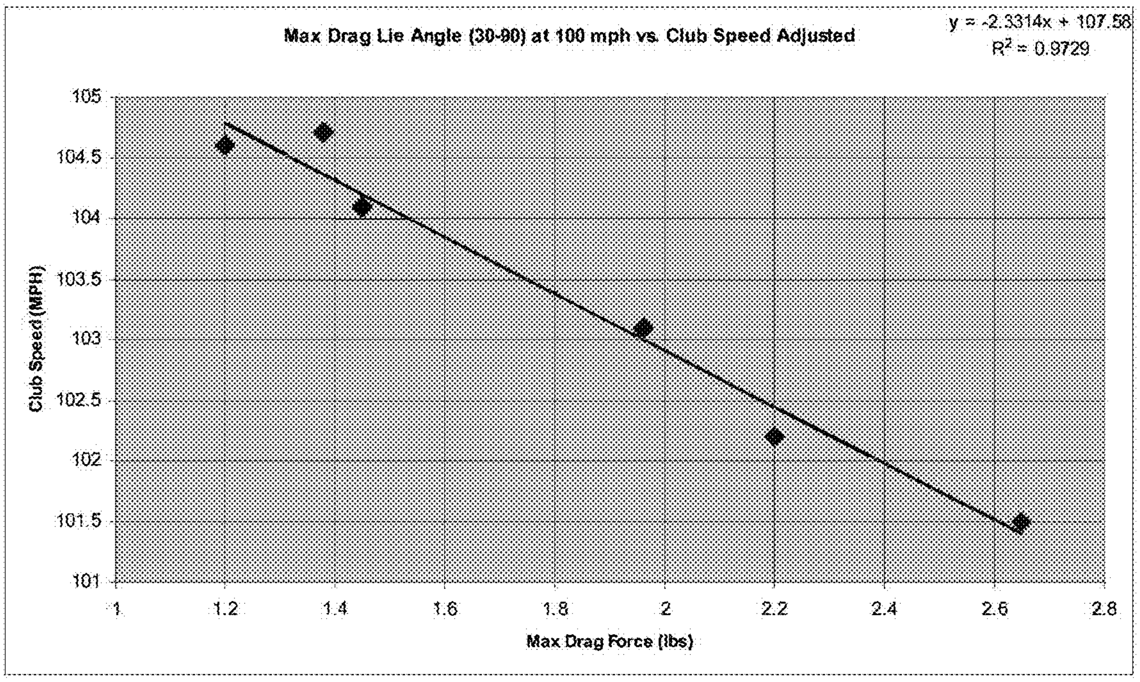
FIG. 6 shows a graph of club head normalized aerodynamic drag force versus club head speed.

These drawings are provided to assist in the understanding of the exemplary embodiments of the high volume aerodynamic golf club head as described in more detail below and should not be construed as unduly limiting the present golf club head. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The claimed high volume aerodynamic golf club head (100) enables a significant advance in the state of the art. The preferred embodiments of the club head (100) accomplish this by new and novel arrangements of elements and methods that are configured in unique and novel ways and which demonstrate previously unavailable but preferred and desirable capabilities. The description set forth below in connection with the drawings is intended merely as a description of the presently preferred embodiments of the club head (100), and is not intended to represent the only form in which the club head (100) may be constructed or utilized. The description sets forth the designs, functions, means, and methods of implementing the club head (100) in connection with the illustrated embodiments. It is to be understood, however, that the same or equivalent functions and features may be accomplished by different embodiments that are also intended to be encompassed within the spirit and scope of the club head (100).

The present high volume aerodynamic golf club head (100) has recognized that the poor aerodynamic performance of large FB dimension drivers is not due solely to the large FB dimension; rather, in an effort to create large FB dimension drivers with a high MOIy value and low center of gravity (CG) dimension, golf club designers have generally created clubs that have very poor aerodynamic shaping. The main problems are the significantly flat surfaces on the body, the lack of proper shaping to account for airflow reattachment in the crown area trailing the face, and the lack of proper trailing edge design. In addition, current large FB dimension driver designs have ignored, or even tried to maximize in some cases, the frontal cross sectional area of the golf club head which increases the aerodynamic drag force. The present aerodynamic golf club head (100) solves these issues and results in a high volume aerodynamic golf club head (100) having a large FB dimension and a high MOIy.

The present high volume aerodynamic golf club head (100) has a volume of at least 400 cc. It is characterized by a face-on normalized aerodynamic drag force of less than 1.5 lbf when exposed to a 100 mph wind parallel to the ground plane (GP) when the high volume aerodynamic golf club head (100) is positioned in a design orientation and the wind is oriented at the front (112) of the high volume aerodynamic golf club head (100), as previously described with respect to FIG. 11 and the flow arrow labeled "air flow—90°." As explained in the "Background" section, but worthy of repeating in this section, all of the aerodynamic drag forces mentioned herein, unless otherwise stated, are aerodynamic drag forces normalized to a 120 mph airstream velocity. Thus, the above mentioned normalized aerodynamic drag force of less than 1.5 lbf when exposed to a 100 mph wind is the actual measured drag force at the indicated 100 mph airstream velocity multiplied by the square of the reference velocity, which is 120 mph, then divided by the square of the actual airstream velocity, which is 100 mph.

Figure 7:
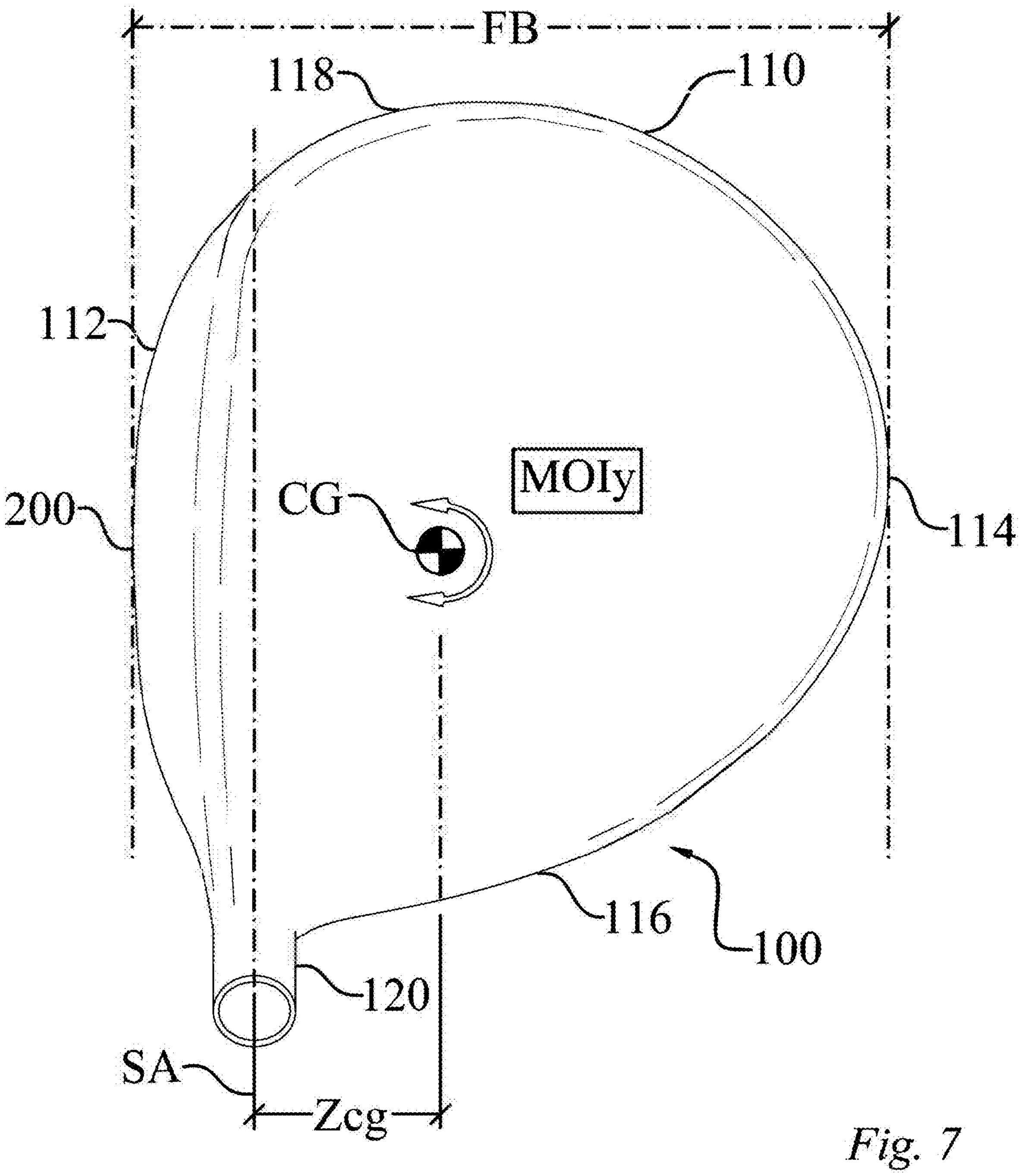
FIG. 7 shows a top plan view of a high volume aerodynamic golf club head, not to scale.
Figure 8:
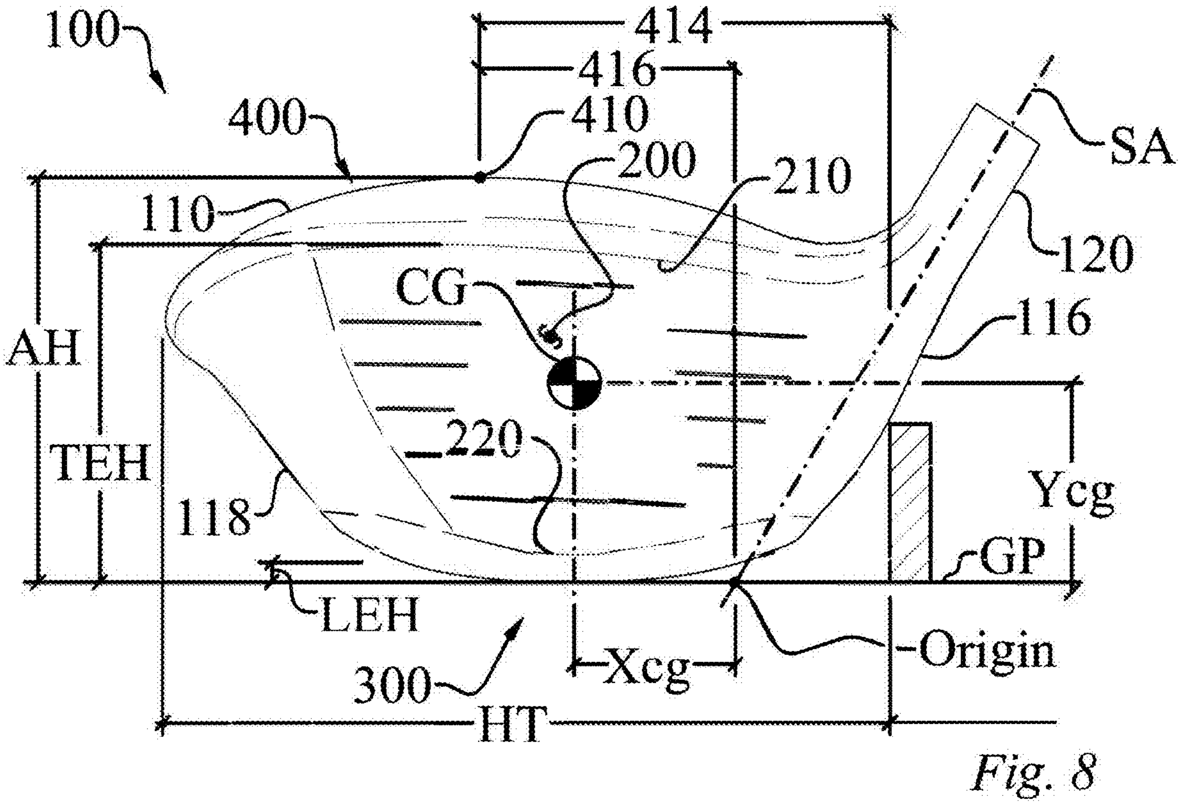
FIG. 8 shows a front elevation view of a high volume aerodynamic golf club head, not to scale.
Figure 9:
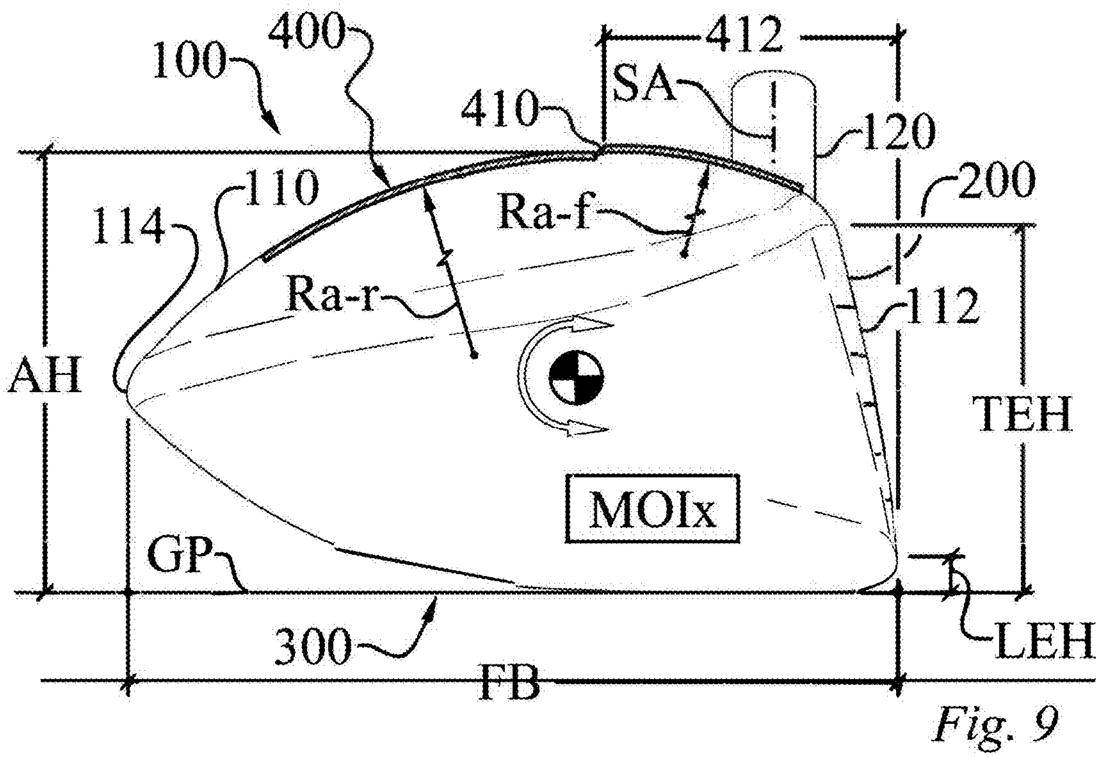
FIG. 9 shows a toe side elevation view of a high volume aerodynamic golf club head, not to scale.

With general reference to FIGS. 7-9, the high volume aerodynamic golf club head (100) includes a hollow body (110) having a face (200), a sole section (300), and a crown section (400). The hollow body (110) may be further defined as having a front (112), a back (114), a heel (116), and a toe (118). Further, the hollow body (110) has a front-to-back dimension (FB) of at least 4.4 inches, as previously defined and illustrated in FIG. 7.

The relatively large FB dimension of the present high volume aerodynamic golf club head (100) aids in obtaining beneficial moment of inertia values while also obtaining superior aerodynamic properties unseen by other large volume, large FB dimension, high MOI golf club heads. Specifically, an embodiment of the high volume aerodynamic golf club head (100) obtains a first moment of inertia (MOIy) about a vertical axis through a center of gravity (CG) of the golf club head (100), illustrated in FIG. 7, that is at least 4000 $g*cm^2$. MOIy is the moment of inertia of the golf club head (100) that resists opening and closing moments induced by ball strikes towards the toe side or heel side of the face. Further, this embodiment obtains a second moment of inertia (MOIx) about a horizontal axis through the center of gravity (CG), as seen in FIG. 9, that is at least 2000 $g*cm^2$. MOIx is the moment of inertia of the golf club head (100) that resists lofting and delofting moments induced by ball strikes high or low on the face (200).

Figure 10:
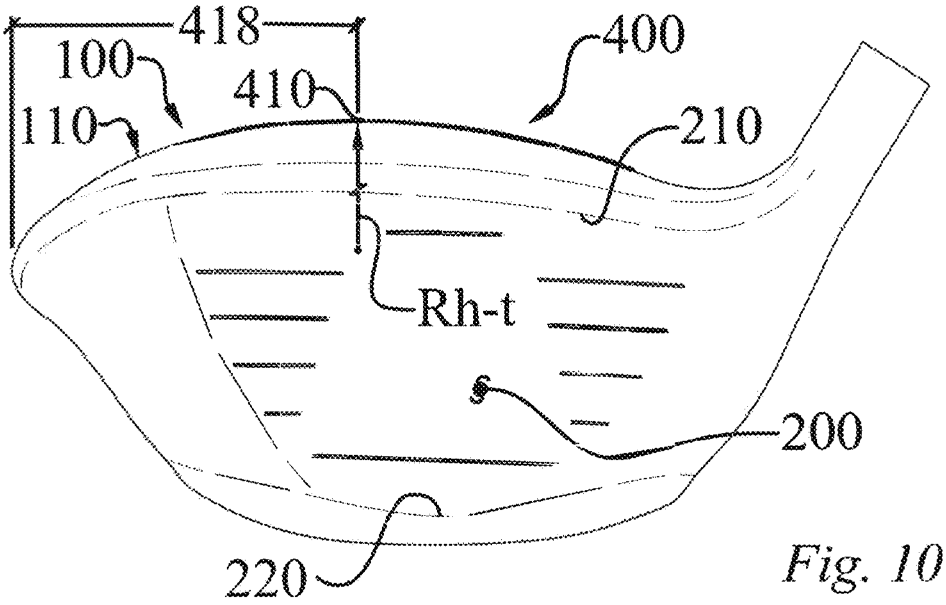
FIG. 10 shows a front elevation view of a high volume aerodynamic golf club head, not to scale.

The golf club head (100) obtains superior aerodynamic performance through the use of unique club head shapes. Referring now to FIG. 8, the crown section (400) has a crown apex (410) located an apex height (AH) above a ground plane (GP). The apex height (AH), as well as the location of the crown apex (410), play important roles in obtaining desirable airflow reattachment as close to the face (200) as possible, as well as improving the airflow attachment to the crown section (400). With reference now to FIGS. 9 and 10, the crown section (400) has three distinct radii that improve the aerodynamic performance of the present club head (100). First, as seen in FIG. 9, a portion of the crown section (400) between the crown apex (410) and the front (112) has an apex-to-front radius of curvature (Ra-f) that is less than 3 inches. The apex-to-front radius of curvature (Ra-f) is measured in a vertical plane that is perpendicular to a vertical plane passing through the shaft axis (SA), and the apex-to-front radius of curvature (Ra-f) is further measured at the point on the crown section (400) between the crown apex (410) and the front (112) that has the smallest the radius of curvature. In one particular embodiment, at least fifty percent of the vertical plane cross sections taken perpendicular to a vertical plane passing through the shaft axis (SA), which intersect a portion of a face top edge (210), are characterized by an apex-to-front radius of curvature (Ra-f) of less than 3 inches. In still a further embodiment, at least ninety percent of the vertical plane cross sections taken perpendicular to a vertical plane passing through the shaft axis (SA), which intersect a portion of the face top edge (210), are characterized by an apex-to-front radius of curvature (Ra-f) of less than 3 inches. In yet another embodiment, at least fifty percent of the vertical plane cross sections taken perpendicular to a vertical plane passing through the shaft axis (SA), which intersect a portion of the face top edge (210) between the center of the face (200) and the toeward most point on the face (200), are characterized by an apex-to-front radius of curvature (Ra-f) of less than 3 inches. Still further, another embodiment has at least fifty percent of the vertical plane cross sections taken perpendicular to a vertical plane passing through the shaft axis (SA), which intersect a portion of the face top edge (210) between the center of the face (200) and the toeward most point on the face (200), are characterized by an apex-to-front radius of curvature (Ra-f) of less than 3 inches.

The center of the face (200) shall be determined in accordance with the USGA "Procedure for Measuring the Flexibility of a Golf Clubhead," Revision 2.0, Mar. 25, 2005, which is incorporated herein by reference. This USGA procedure identifies a process for determining the impact location on the face of a golf club that is to be tested, also referred therein as the face center. The USGA procedure utilizes a template that is placed on the face of the golf club to determine the face center.

Secondly, a portion of the crown section (400) between the crown apex (410) and the back (114) of the hollow body (110) has an apex-to-rear radius of curvature (Ra-r) that is less than 3.75 inches. The apex-to-rear radius of curvature (Ra-r) is also measured in a vertical plane that is perpendicular to a vertical plane passing through the shaft axis (SA), and the apex-to-rear radius of curvature (Ra-r) is further measured at the point on the crown section (400) between the crown apex (410) and the back (114) that has the smallest the radius of curvature. In one particular embodiment, at least fifty percent of the vertical plane cross sections taken perpendicular to a vertical plane passing through the shaft axis (SA), which intersect a portion of the face top edge (210), are characterized by an apex-to-rear radius of curvature (Ra-r) of less than 3.75 inches. In still a further embodiment, at least ninety percent of the vertical plane cross sections taken perpendicular to a vertical plane passing through the shaft axis (SA), which intersect a portion of the face top edge (210), are characterized by an apex-to-rear radius of curvature (Ra-r) of less than 3.75 inches. In yet another embodiment, one hundred percent of the vertical plane cross sections taken perpendicular to a vertical plane passing through the shaft axis (SA), which intersect a portion of the face top edge (210) between the center of the face (200) and the toeward most point on the face (200), are characterized by an apex-to-rear radius of curvature (Ra-r) of less than 3.75 inches.

Lastly, as seen in FIG. 10, a portion of the crown section (400) has a heel-to-toe radius of curvature (Rh-t) at the crown apex (410) in a direction parallel to the vertical plane created by the shaft axis (SA) that is less than 4 inches. In a further embodiment, at least ninety percent of the crown section (400) located between the most heelward point on the face (200) and the most toeward point on the face (200) has a heel-to-toe radius of curvature (Rh-t) at the crown apex (410) in a direction parallel to the vertical plane created by the shaft axis (SA) that is less than 4 inches. A further embodiment has one hundred percent of the crown section (400) located between the most heelward point on the face (200) and the most toeward point on the face (200) exhibiting a heel-to-toe radius of curvature (Rh-t), at the crown apex (410) in a direction parallel to the vertical plane created by the shaft axis (SA), that is less than 4 inches.

Such small radii of curvature exhibited in the embodiments described herein have traditionally been avoided in the design of high volume golf club heads, especially in the design of high volume golf club heads having FB dimensions of 4.4 inches and greater. However, it is these tight radii produce a bulbous crown section (400) that facilitates airflow reattachment as close to the face (200) as possible, thereby resulting in reduced aerodynamic drag forces and facilitating higher club head speeds.

Conventional high volume large MOIy golf club heads having large FB dimensions, such as those seen in U.S. Pat. No. D544939 and U.S. Pat. No. D543600, have relatively flat crown sections that often never extend above the face. While these designs appear as though they should cut through the air, the opposite is often true with such shapes achieving poor airflow reattachment characteristics and increased aerodynamic drag forces. The present club head (100) has recognized the significance of proper club head shaping to account for rapid airflow reattachment in the crown section (400) trailing the face (200), which is quite the opposite of the flat steeply sloped crown sections of many prior art large FB dimension club heads.

With reference now to FIG. 10, the face (200) has a top edge (210) and a lower edge (220). Further, as seen in FIGS. 8 and 9, the top edge (210) has a top edge height (TEH) that is the elevation of the top edge (210) above the ground plane (GP). Similarly, the lower edge (220) has a lower edge height (LEH) that is the elevation of the lower edge (220) above the ground plane (GP). The highest point along the top edge (210) produces a maximum top edge height (TEH) that is at least 2 inches. Similarly, the lowest point along the lower edge (220) is a minimum lower edge height (LEH).

Figure 26A:
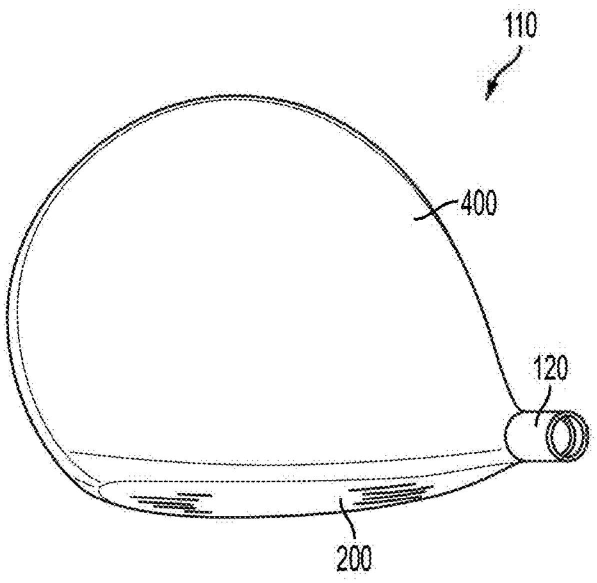
FIGS. 26A-C show respective orthogonal views depicting a high volume aerodynamic golf club head having a face and depicting a manner in which the face transitions into the contour of the body of the club head, not to scale.
Figure 26B:
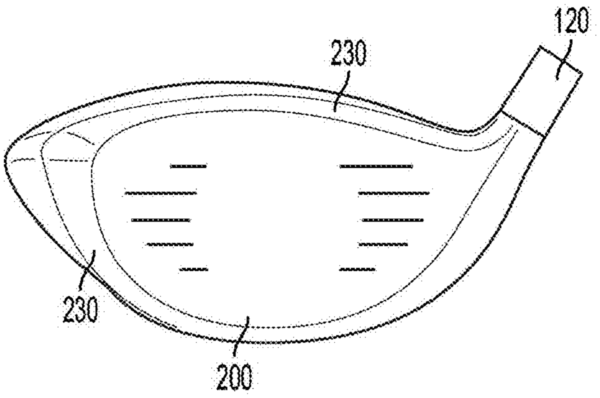
Figure 26C:
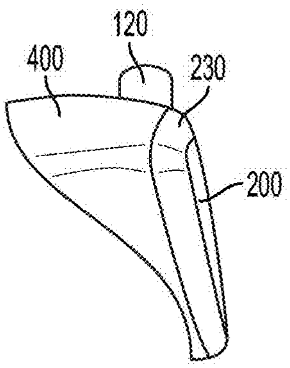

The top edge (210) and lower edge (220) are identifiable as curves that mark a transition from the curvature of the face (200) to adjoining regions of the club head (100), such as the crown section (400), the sole section (300), or a transition region (230) between the face (200) and the crown section (400) or sole section (300) (see, e.g., FIGS. 26B-C). To identify the top edge (210) and lower edge (220) on an actual golf club head, a three-dimensional scanned image of the club head (100) may be analyzed and a best fit approximation of the roll curvature in a plane containing the crown apex (410) may be determined for the face (200) based upon the location of all scanned points that are within 22 mm above and below the face center. Within a given vertical plane that is normal to the face (200), the top edge (210) is then identified in the scanned data as the lowermost point above the face center at which the scanned data deviates by more than a threshold amount (e.g., 0.1 mm) from the best fit roll curvature, and the lower edge (220) is identified as the uppermost point below the face center at which the scanned data deviates by more than the threshold amount from the best fit roll curvature.

One of many significant advances of this embodiment of the present club head (100) is the design of an apex ratio that encourages airflow reattachment on the crown section (400) of the golf club head (100) as close to the face (200) as possible. In other words, the sooner that airflow reattachment is achieved, the better the aerodynamic performance and the smaller the aerodynamic drag force. The apex ratio is the ratio of apex height (AH) to the maximum top edge height (TEH). As previously explained, in many large FB dimension golf club heads the apex height (AH) is no more than the top edge height (TEH). In this embodiment, the apex ratio is at least 1.13, thereby encouraging airflow reattachment as soon as possible.

Figure 13:
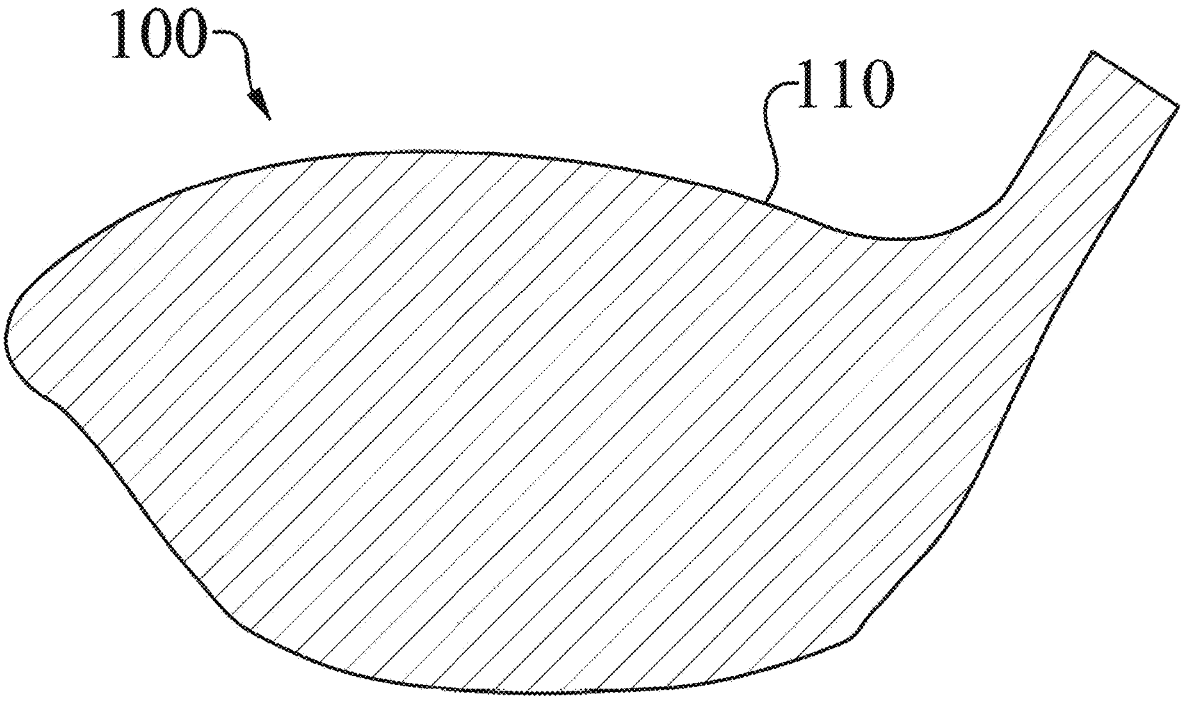
FIG. 13 shows a front elevation view of a high volume aerodynamic golf club head, not to scale.

Still further, this embodiment of the club head (100) has a frontal cross sectional area that is less than 11 square inches. The frontal cross sectional area is the single plane area measured in a vertical plane bounded by the outline of the golf club head (100) when it is resting on the ground plane (GP) at the design lie angle and viewed from directly in front of the face (200). The frontal cross sectional area is illustrated by the cross-hatched area of FIG. 13. It will be apparent to those skilled in the art that the "frontal cross sectional area" described here and illustrated in FIG. 13 is a different parameter from the "projected area of the face portion" ($A_f$) described and defined below in reference to FIGS. 26-31.

Figure 11:
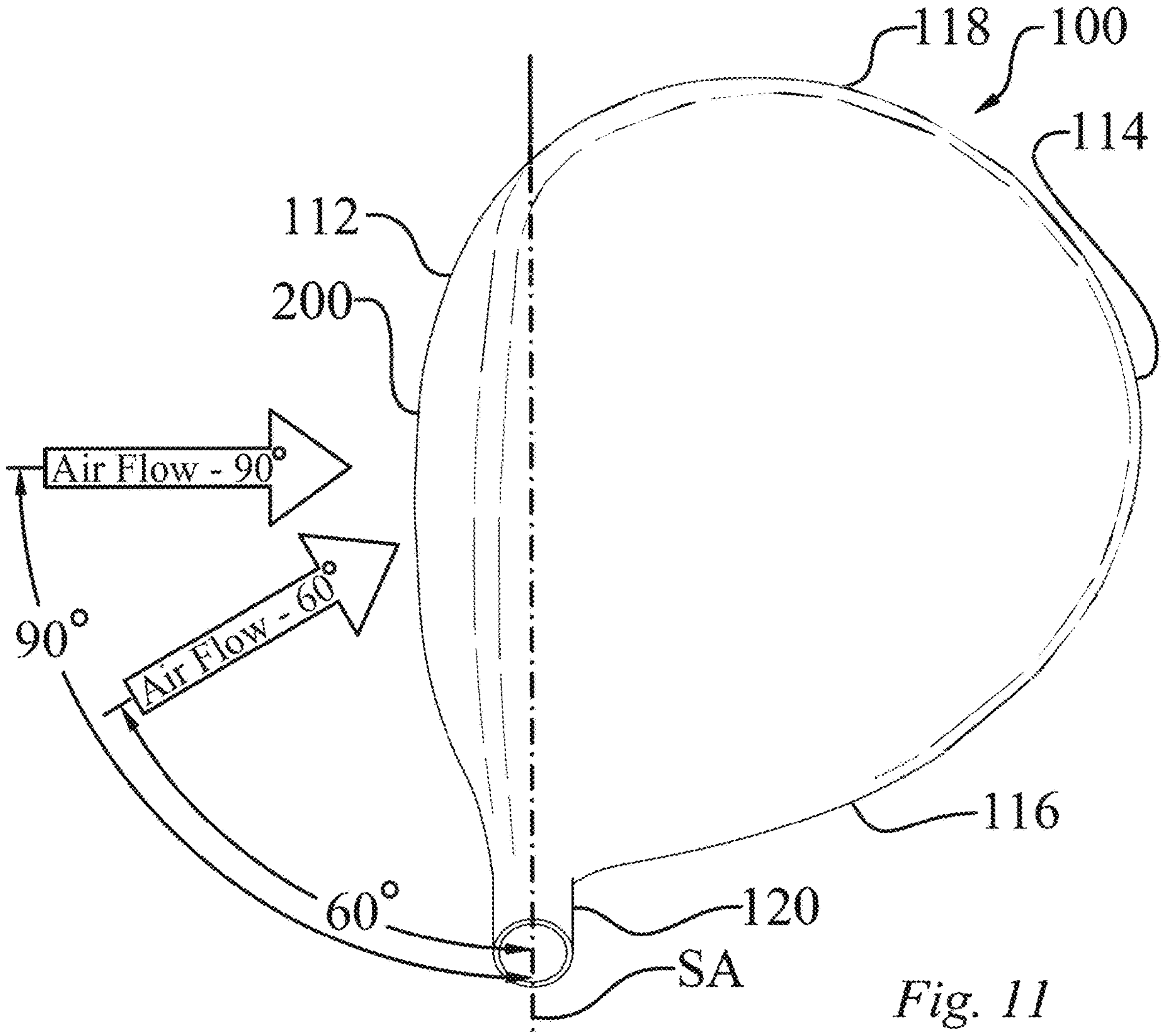
FIG. 11 shows a top plan view of a high volume aerodynamic golf club head, not to scale.

In a further embodiment, a second aerodynamic drag force is introduced, namely the 30 degree offset aerodynamic drag force, as previously explained with reference to FIG. 11. In this embodiment the 30 degree offset normalized aerodynamic drag force is less than 1.3 lbf when exposed to a 100 mph wind parallel to the ground plane (GP) when the high volume aerodynamic golf club head (100) is positioned in a design orientation and the wind is oriented thirty degrees from a vertical plane normal to the face (200) with the wind originating from the heel (116) side of the high volume aerodynamic golf club head (100). In addition to having the face-on normalized aerodynamic drag force less than 1.5 lbf, introducing a 30 degree offset normalized aerodynamic drag force of less than 1.3 lbf further reduces the drop in club head speed associated with large volume, large FB dimension golf club heads.

Figure 12:
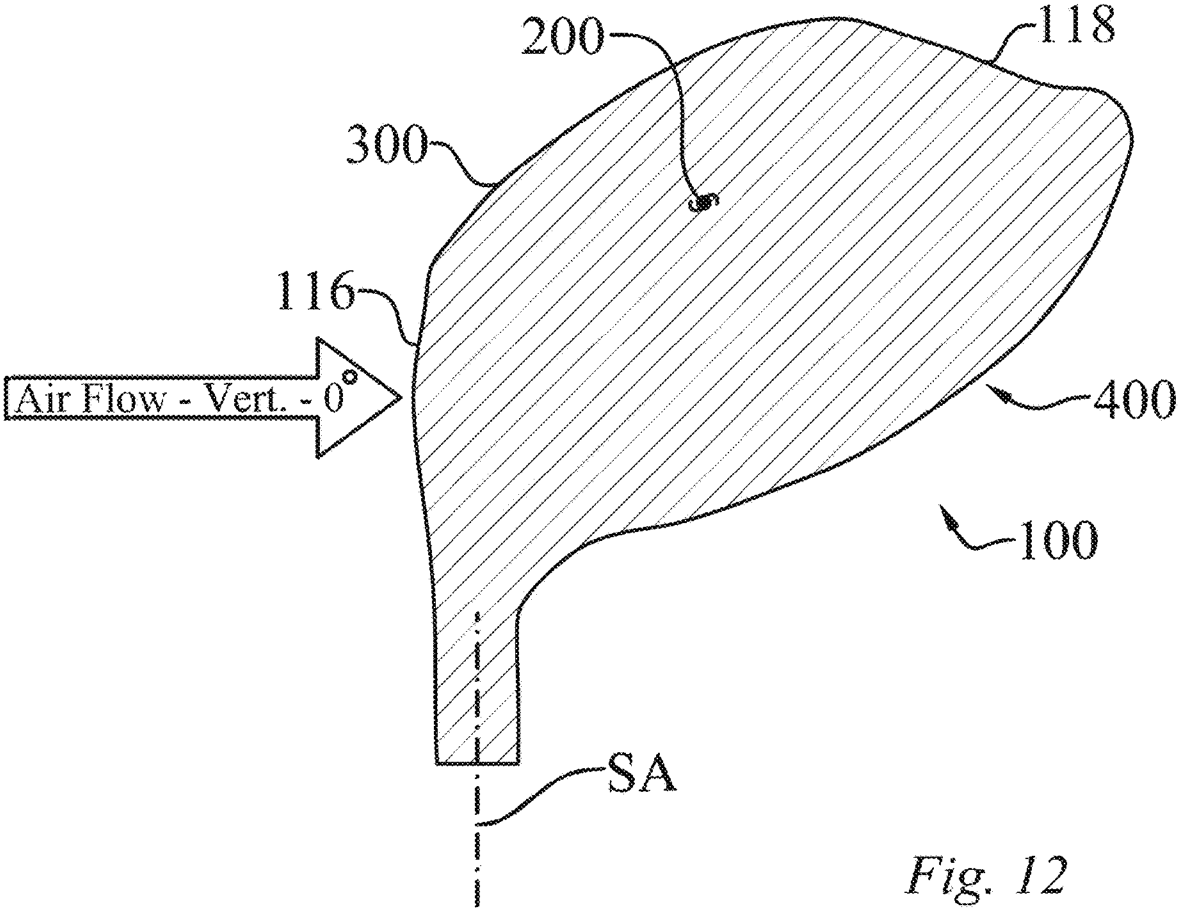
FIG. 12 shows a rotated front elevation view of a high volume aerodynamic golf club head with a vertical shaft axis orientation, not to scale.

Yet another embodiment introduces a third aerodynamic drag force, namely the heel normalized aerodynamic drag force, as previously explained with reference to FIG. 12. In this particular embodiment, the heel normalized aerodynamic drag force is less than 1.9 lbf when exposed to a horizontal 100 mph wind directed at the heel (116) with the body (110) oriented to have a vertical shaft axis (SA). In addition to having the face-on normalized aerodynamic drag force of less than 1.5 lbf and the 30 degree offset normalized aerodynamic drag force of less than 1.3 lbf, having a heel normalized aerodynamic drag force of less than 1.9 lbf further reduces the drop in club head speed associated with large volume, large FB dimension golf club heads.

A still further embodiment has recognized that having the apex-to-front radius of curvature (Ra-f) at least 25% less than the apex-to-rear radius of curvature (Ra-r) produces a particularly aerodynamic golf club head (100) further assisting in airflow reattachment and preferred airflow attachment over the crown section (400). Yet another embodiment further encourages quick airflow reattachment by incorporating an apex ratio of the apex height (AH) to the maximum top edge height (TEH) that is at least 1.2. This concept is taken even further in yet another embodiment in which the apex ratio of the apex height (AH) to the maximum top edge height (TEH) is at least 1.25. Again, these large apex ratios produce a bulbous crown section (400) that facilitates airflow reattachment as close to the face (200) as possible, thereby resulting in reduced aerodynamic drag forces and resulting in higher club head speeds.

Reducing aerodynamic drag by encouraging airflow reattachment, or conversely discouraging extended lengths of airflow separation, may be further obtained in yet another embodiment in which the apex-to-front radius of curvature (Ra-f) is less than the apex-to-rear radius of curvature (Ra-r), and the apex-to-rear radius of curvature (Ra-r) is less than the heel-to-toe radius of curvature (Rh-t). Such a shape is contrary to conventional high volume, long FB dimension golf club heads, yet produces a particularly aerodynamic shape.

Taking this embodiment a step further in another embodiment, a high volume aerodynamic golf club head (100) having the apex-to-front radius of curvature (Ra-f) less than 2.85 inches and the heel-to-toe radius of curvature (Rh-t) less than 3.85 inches produces a reduced face-on aerodynamic drag force. Another embodiment focuses on the playability of the high volume aerodynamic golf club head (100) by having a maximum top edge height (TEH) that is at least 2 inches, thereby ensuring that the face area is not reduced to an unforgiving level. Even further, another embodiment incorporates a maximum top edge height (TEH) that is at least 2.15 inches, further instilling confidence in the golfer that they are not swinging a golf club head (100) with a small striking face (200).

The foregoing embodiments may be utilized having even larger FB dimensions. For example, the previously described aerodynamic attributes may be incorporated into an embodiment having a front-to-back dimension (FB) that is at least 4.6 inches, or even further a front-to-back dimension (FB) that is at least 4.75 inches. These embodiments allow the high volume aerodynamic golf club head (100) to obtain even higher MOIy values without reducing club head speed due to excessive aerodynamic drag forces.

Yet a further embodiment balances all of the radii of curvature requirements to obtain a high volume aerodynamic golf club head (100) while minimizing the risk of an unnatural appearing golf club head by ensuring that less than 10% of the club head volume is above the elevation of the maximum top edge height (TEH). A further embodiment accomplishes the goals herein with a golf club head (100) having between 5% to 10% of the club head volume located above the elevation of the maximum top edge height (TEH). This range achieves the desired crown apex (410) and radii of curvature to ensure desirable aerodynamic drag while maintaining an aesthetically pleasing look of the golf club head (100).

The location of the crown apex (410) is dictated to a degree by the apex-to-front radius of curvature (Ra-f); however, yet a further embodiment identifies that the crown apex (410) should be behind the forwardmost point on the face (200) a distance that is a crown apex setback dimension (412), seen in FIG. 9, which is greater than 10% of the FB dimension and less than 70% of the FB dimension, thereby further reducing the period of airflow separation and resulting in desirable airflow over the crown section (400). One particular embodiment within this range incorporates a crown apex setback dimension (412) that is less than 1.75 inches. An even further embodiment balances playability with the volume shift toward the face (200) inherent in the present club head (100) by positioning the performance mass to produce a center of gravity (CG) further away from the forwardmost point on the face (200) than the crown apex setback dimension (412).

Additionally, the heel-to-toe location of the crown apex (410) also plays a significant role in the aerodynamic drag force. The location of the crown apex (410) in the heel-to-toe direction is identified by the crown apex ht dimension (414), as seen in FIG. 8. This figure also introduces a heel-to-toe (HT) dimension which is measured in accordance with USGA rules. The location of the crown apex (410) is dictated to a degree by the heel-to-toe radius of curvature (Rh-t); however, yet a further embodiment identifies that the crown apex (410) location should result in a crown apex ht dimension (414) that is greater than 30% of the HT dimension and less than 70% of the HT dimension, thereby aiding in reducing the period of airflow separation. In an even further embodiment, the crown apex (410) is located in the heel-to-toe direction between the center of gravity (CG) and the toe (118).

The present high volume aerodynamic golf club head (100) has a club head volume of at least 400 cc. Further embodiments incorporate the various features of the above described embodiments and increase the club head volume to at least 440 cc, or even further to the current USGA limit of 460 cc. However, one skilled in the art will appreciate that the specified radii and aerodynamic drag requirements are not limited to these club head sizes and apply to even larger club head volumes. Likewise, a heel-to-toe (HT) dimension of the present club head (100), as seen in FIG. 8, is greater than the FB dimension, as measured in accordance with USGA rules.

As one skilled in the art understands, the hollow body (110) has a center of gravity (CG). The location of the center of gravity (CG) is described with reference to an origin point, seen in FIG. 8. The origin point is the point at which a shaft axis (SA) with intersects with a horizontal ground plane (GP). The hollow body (110) has a bore having a center that defines the shaft axis (SA). The bore is present in club heads having traditional hosels, as well as hosel-less club heads. The center of gravity (CG) is located vertically toward the crown section (400) from the origin point a distance Ycg in a direction orthogonal to the ground plane (GP), as seen in FIG. 8. Further, the center of gravity (CG) is located horizontally from the origin point toward the toe (118) a distance Xcg that is parallel to a vertical plane defined by the shaft axis (SA) and parallel to the ground plane (GP). Lastly, the center of gravity (CG) is located a distance Zcg, seen in FIG. 14, from the origin point toward the back (114) in a direction orthogonal to the vertical direction used to measure Ycg and orthogonal to the horizontal direction used to measure Xcg.

Figure 16:
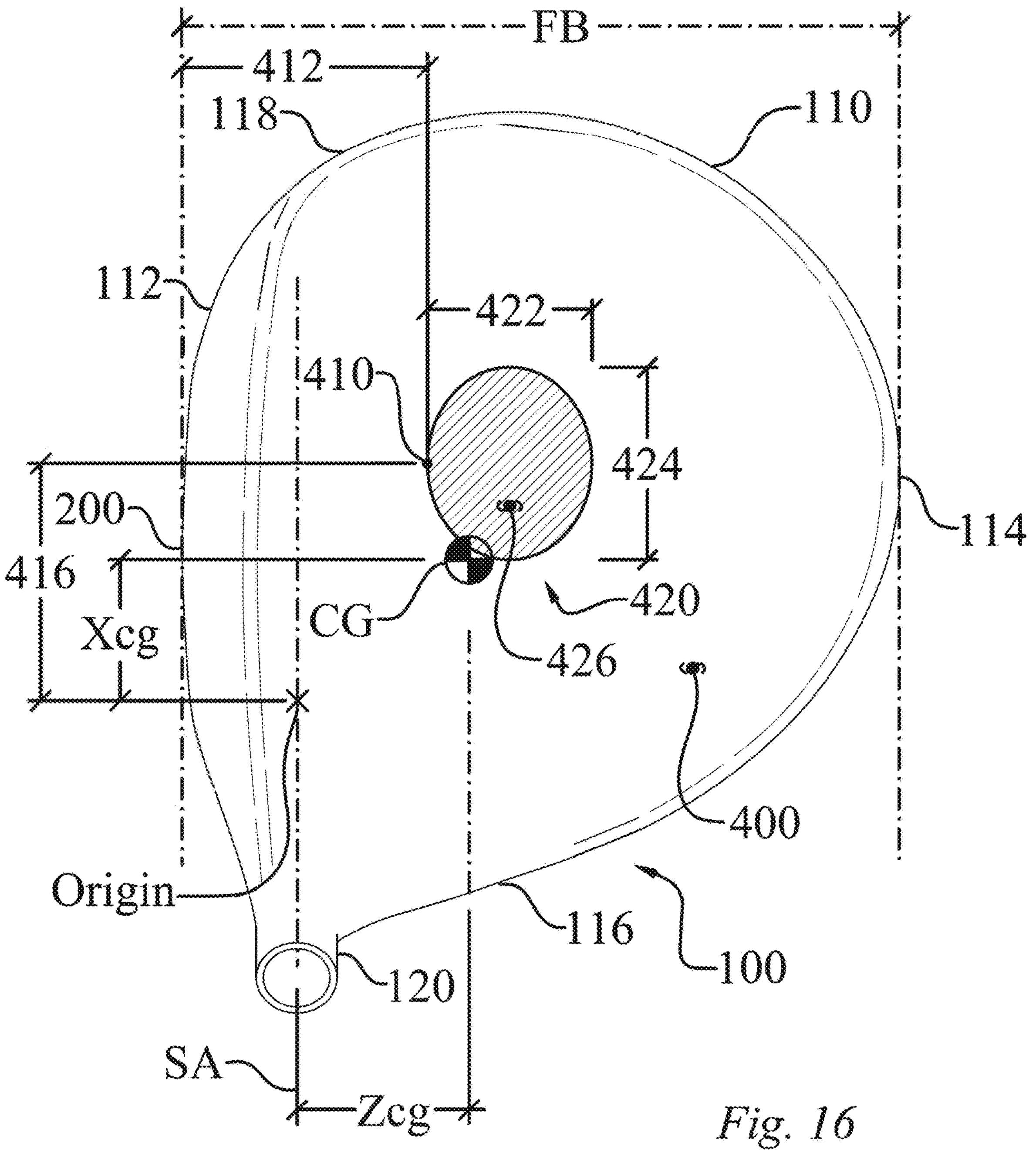
FIG. 16 shows a top plan view of a high volume aerodynamic golf club head having a post apex attachment promoting region, not to scale.
Figure 17:
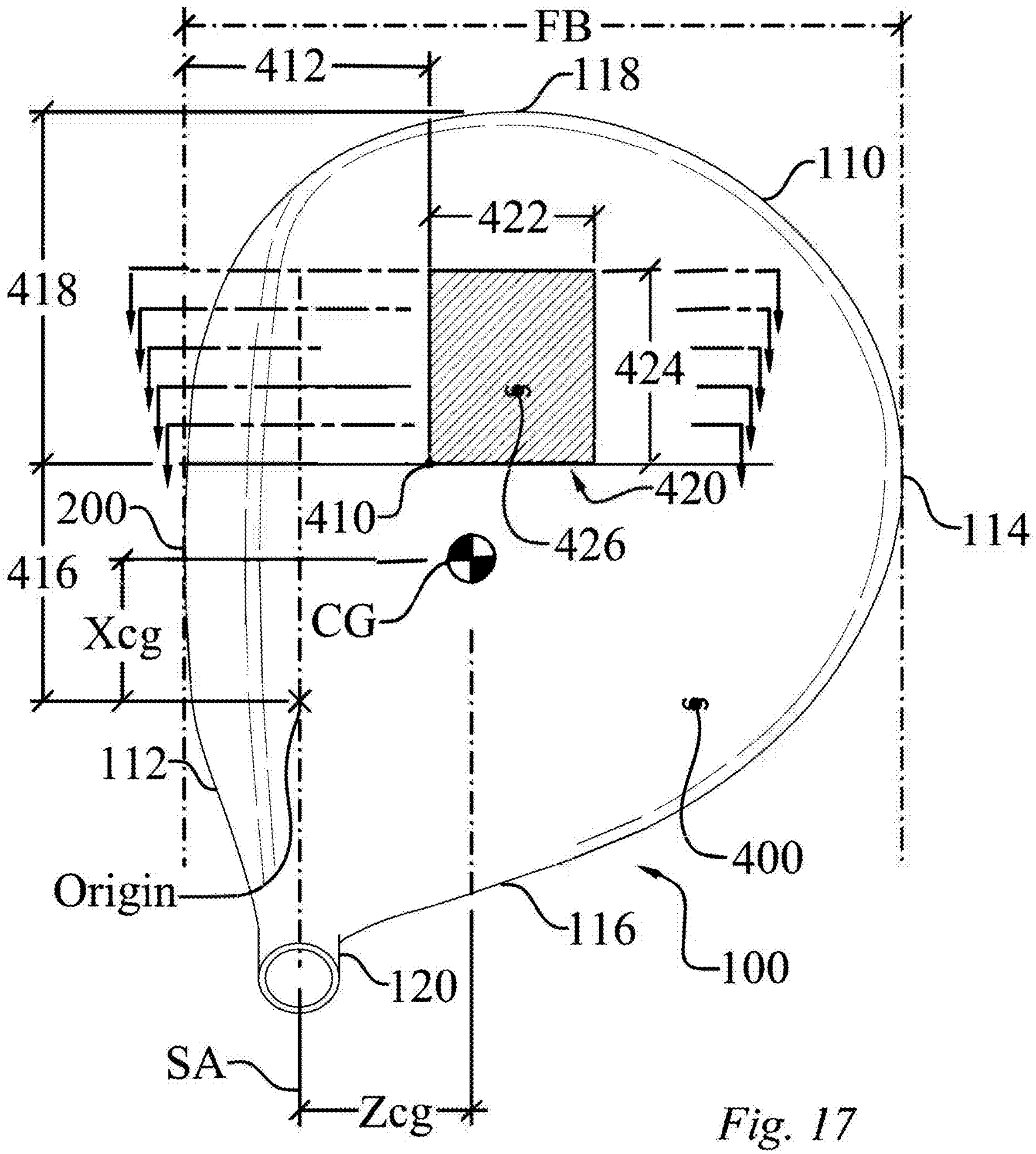
FIG. 17 shows a top plan view of a high volume aerodynamic golf club head having a post apex attachment promoting region, not to scale.
Figure 18:
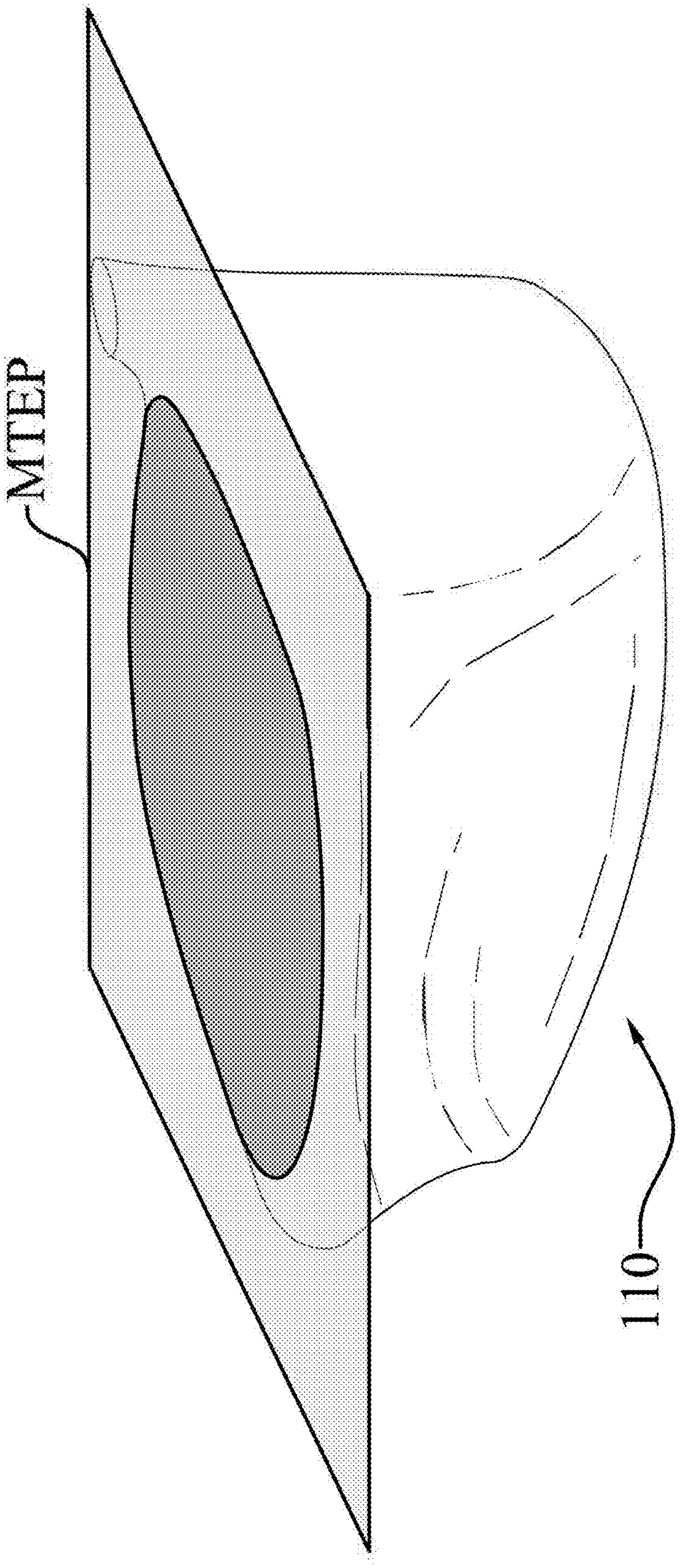
FIG. 18 shows a partial isometric view of a high volume aerodynamic golf club head having a post apex attachment promoting region intersected by the maximum top edge plane, not to scale.
Figure 19:
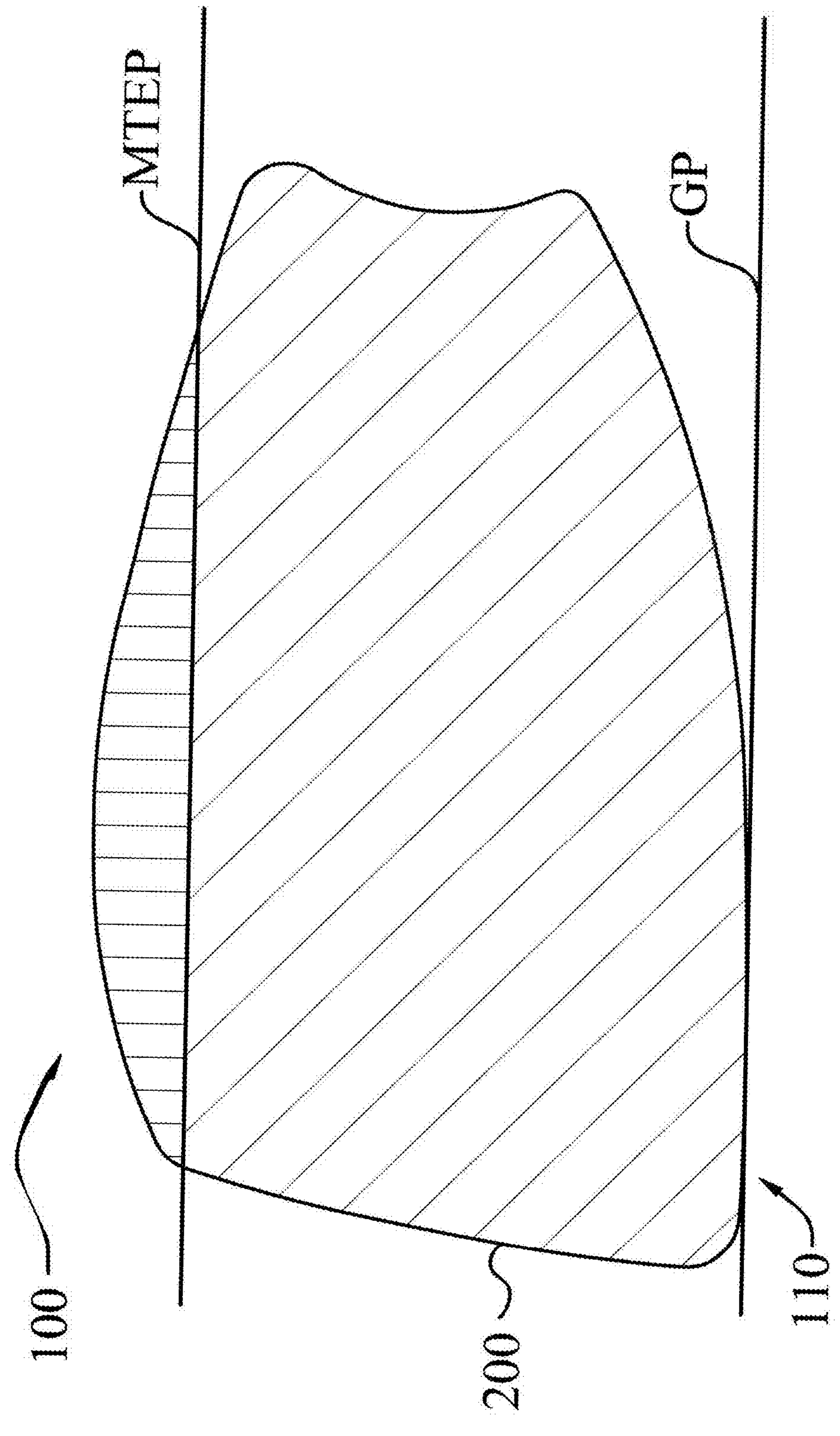
FIG. 19 shows a cross-sectional view taken through a center of the face of a high volume aerodynamic golf club head having a post apex attachment promoting region, not to scale.
Figure 20:
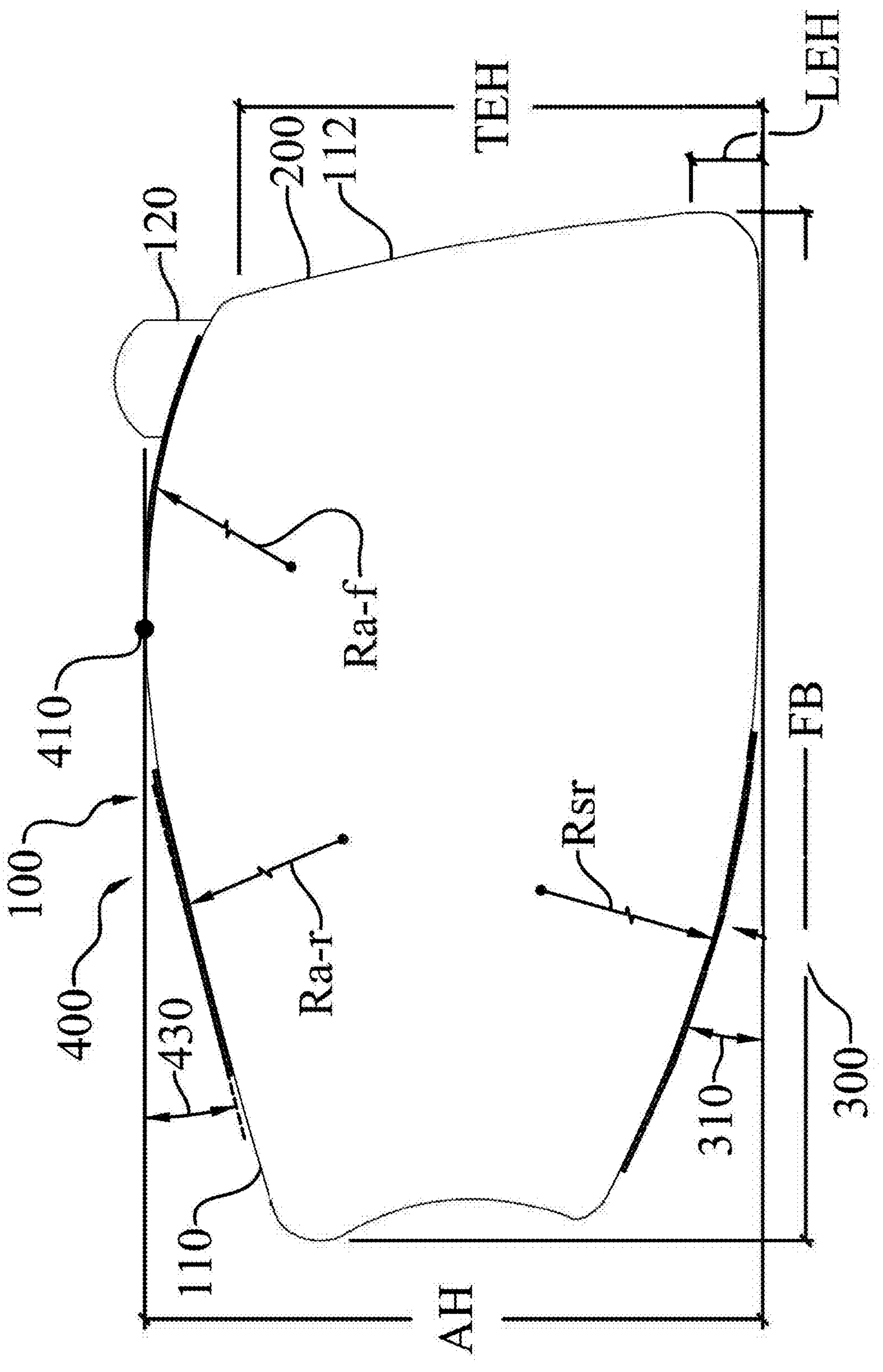
FIG. 20 shows a cross-sectional view taken through a center of the face of a high volume aerodynamic golf club head having a post apex attachment promoting region, not to scale.
Figure 21:
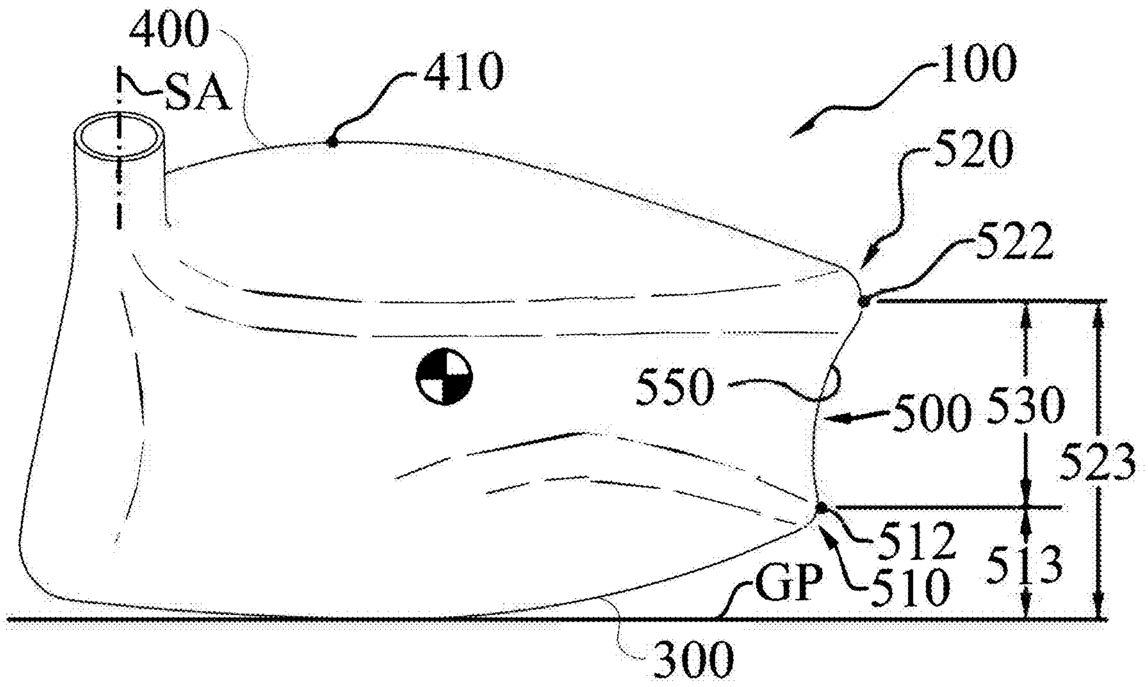
FIG. 21 shows a heel-side elevation view of a high volume aerodynamic golf club head having a post apex attachment promoting region, not to scale.
Figure 22:
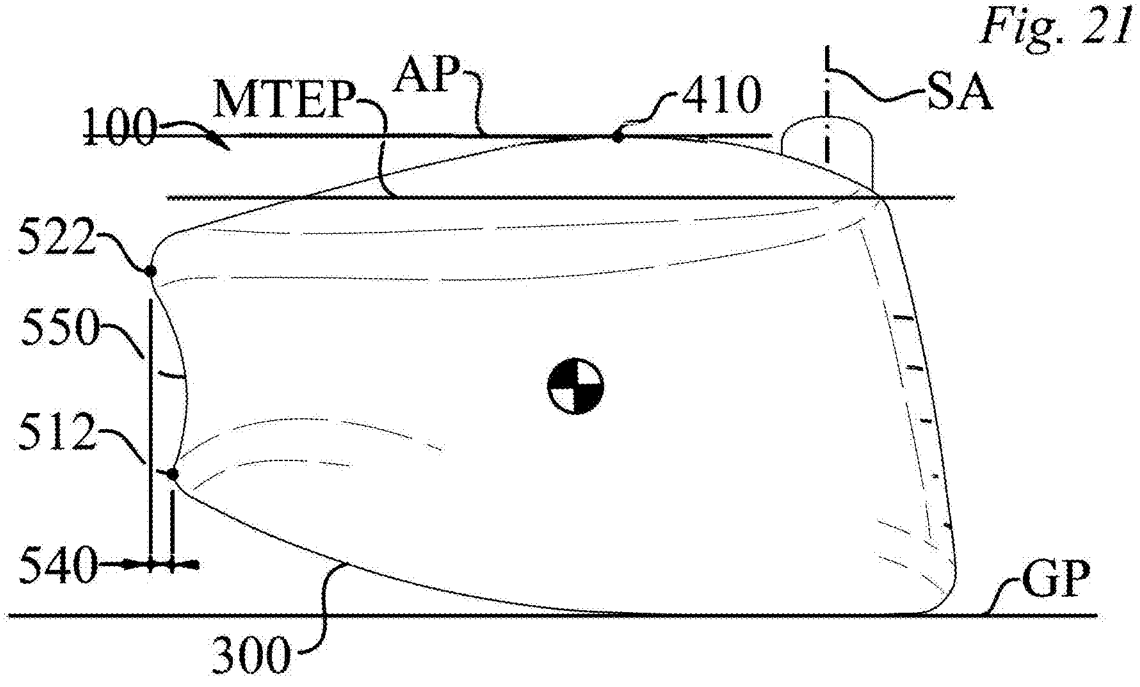
FIG. 22 shows a toe-side elevation view of a high volume aerodynamic golf club head having a post apex attachment promoting region, not to scale.

Several more embodiments, seen in FIGS. 14-25, incorporate a post apex attachment promoting region (420) on the surface of the crown section (400) at an elevation above a maximum top edge plane (MTEP), illustrated in FIGS. 18, 19, and 22, wherein the post apex attachment promoting region (420) begins at the crown apex (410) and extends toward the back (114) of the club head (100). The incorporation of this post apex attachment promoting region (420) creates a high volume aerodynamic golf club head having a post apex attachment promoting region (100) as seen in several embodiments in FIGS. 14-25. The post apex attachment promoting region (420) is a relatively flat portion of the crown section (400) that is behind the crown apex (410), yet above the maximum top edge plane (MTEP), and aids in keeping airflow attached to the club head (100) once it flows past the crown apex (410).

As with the prior embodiments, the embodiments containing the post apex attachment promoting region (420) include a maximum top edge height (TEH) of at least 2 inches and an apex ratio of the apex height (AH) to the maximum top edge height (TEH) of at least 1.13.

Figure 14:
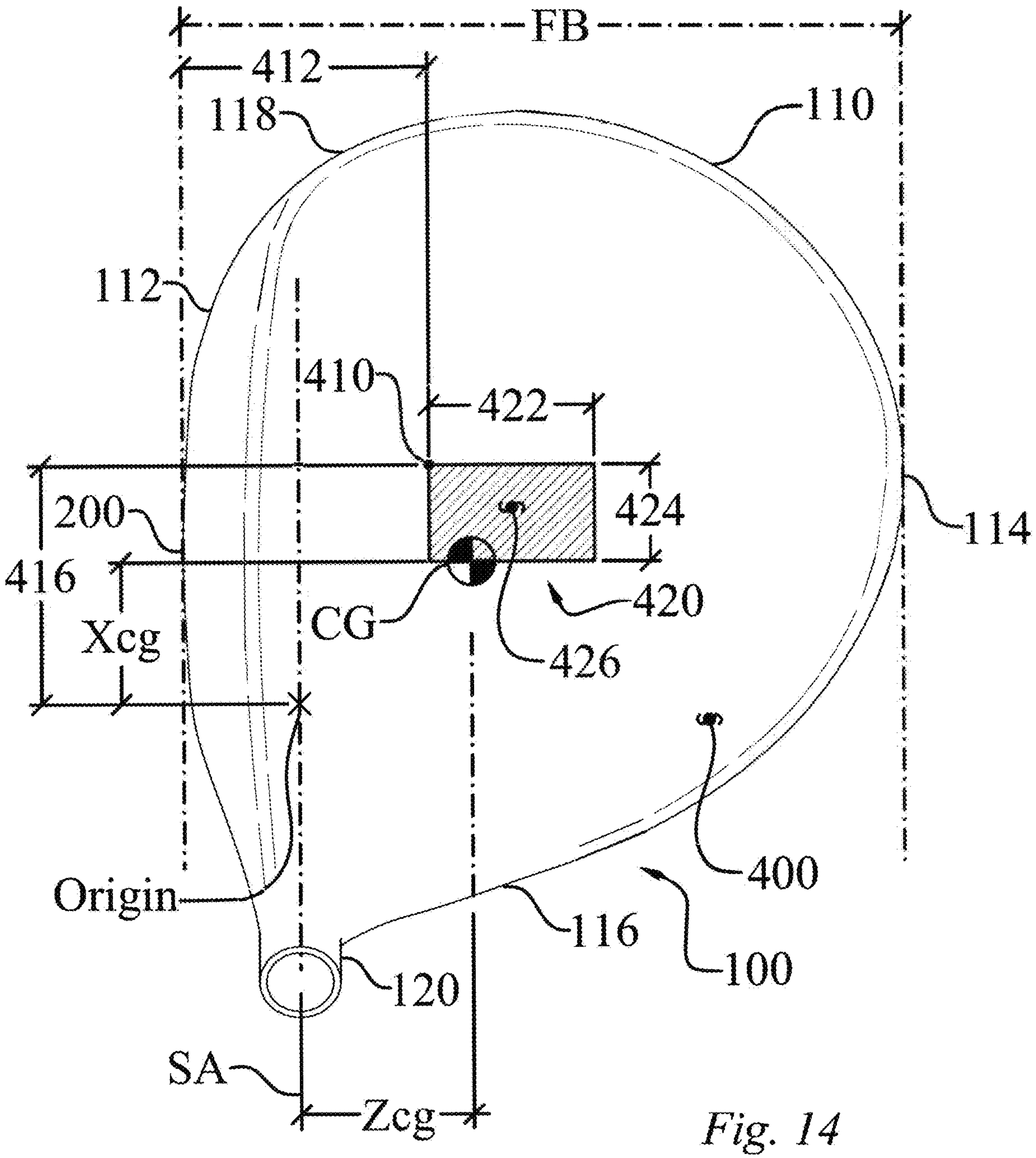
FIG. 14 shows a top plan view of a high volume aerodynamic golf club head having a post apex attachment promoting region, not to scale.

As seen in FIG. 14, the crown apex (410) is located a distance from the origin point toward the toe (118) a crown apex x-dimension (416) distance that is parallel to the vertical plane defined by the shaft axis (SA) and parallel to the ground plane (GP).

In this particular embodiment, the crown section (400) includes a post apex attachment promoting region (420) on the surface of the crown section (400). Many of the previously described embodiments incorporate characteristics of the crown section (400) located between the crown apex (410) and the face (200) that promote airflow attachment to the club head (100) thereby reducing aerodynamic drag. The post apex attachment promoting region (420) is also aimed at reducing aerodynamic drag by encouraging the airflow passing over the crown section (400) to stay attached to the club head (100); however, the post apex attachment promoting region (420) is located between the crown apex (410) and the back (114) of the club head (100), while also being above the maximum top edge height (TEH), and thus above the maximum top edge plane (MTEP).

Many conventional high volume, large MOIy golf club heads having large FB dimensions have crown sections that often never extend above the face. Further, these prior clubs often have crown sections that aggressively slope down to the sole section. While these designs appear as though they should cut through the air, the opposite is often true with such shapes achieving poor airflow reattachment characteristics and increased aerodynamic drag forces. The present club head (100) has recognized the significance of proper club head shaping to account for rapid airflow reattachment in the crown section (400) trailing the face (200) via the apex ratio, as well as encouraging the to airflow remain attached to the club head (100) behind the crown apex (410) via the apex ratio and the post apex attachment promoting region (420).

With reference to FIG. 14, the post apex attachment promoting region (420) includes an attachment promoting region length (422) measured along the surface of the crown section (400) and orthogonal to the vertical plane defined by the shaft axis (SA). The attachment promoting region length (422) is at least as great as fifty percent of the crown apex setback dimension (412). The post apex attachment promoting region (420) also has an apex promoting region width (424) measured along the surface of the crown section (400) in a direction parallel to the vertical plane defined by the shaft axis (SA). The attachment promoting region width (424) is at least as great as the difference between the crown apex x-dimension (416) and the distance Xcg. The relationship of the attachment promoting region length (422) to the crown apex setback dimension (412) recognizes the natural desire of the airflow to separate from the club head (100) as it passes over the crown apex (410). Similarly, the relationship of the attachment promoting region width (424) to the difference between the crown apex x-dimension (416) and the distance Xcg recognizes the natural desire of the airflow to separate from the club head (100) as it passes over the crown apex (410) in a direction other than directly from the face (200) to the back (114). Incorporating a post apex attachment promoting region (420) that has the claimed length (422) and width (424) establishes the amount of the club head (100) that is above the maximum top edge plane (MTEP) and behind the crown apex (410). In the past many golf club heads sough to minimize, or eliminate, the amount of club head (100) that is above the maximum top edge plane (MTEP)

While the post apex attachment promoting region (420) has both a length (422) and a width (424), the post apex attachment promoting region (420) need not be rectangular in nature. For instance, FIG. 16 illustrates an elliptical post apex attachment promoting region (420) having both a length (422) and a width (424), which may be thought of as a major axis and a minor axis. Thus, the post apex attachment promoting region (420) may be in the shape of any polygon or curved object including, but not limited to, triangles (equilateral, scalene, isosceles, right, acute, obtuse, etc.), quadrilaterals (trapezoid, parallelogram, rectangle, square, rhombus, kite), polygons, circles, ellipses, and ovals. The post apex attachment promoting region (420) is simply an area on the surface of the crown section (400) possessing the claimed attributes, and one skilled in the art will recognize that it will blend into the rest of the crown section (400) and may be indistinguishable by the naked eye.

Like the previous embodiments having aerodynamic characteristics in front of the crown apex (410), the present embodiment incorporating the post apex attachment promoting region (420) located behind the crown apex (410) also has a face-on normalized aerodynamic drag force of less than 1.5 lbf when exposed to a 100 mph wind parallel to the ground plane (GP) when the high volume aerodynamic golf club head having a post apex attachment promoting region (100) is positioned in a design orientation and the wind is oriented at the front (112) of the high volume aerodynamic golf club head having a post apex attachment promoting region (100), as previously explained in detail.

In a further embodiment, a second aerodynamic drag force is introduced, namely the 30 degree offset aerodynamic drag force, as previously explained with reference to FIG. 11. In this embodiment the 30 degree offset normalized aerodynamic drag force is less than 1.3 lbf when exposed to a 100 mph wind parallel to the ground plane (GP) when the high volume aerodynamic golf club head having a post apex attachment promoting region (100) is positioned in a design orientation and the wind is oriented thirty degrees from a vertical plane normal to the face (200) with the wind originating from the heel (116) side of the high volume aerodynamic golf club head having a post apex attachment promoting region (100). In addition to having the face-on normalized aerodynamic drag force less than 1.5 lbf, introducing a 30 degree offset normalized aerodynamic drag force of less than 1.3 lbf further reduces the drop in club head speed associated with large volume, large FB dimension golf club heads.

Yet another embodiment introduces a third aerodynamic drag force, namely the heel normalized aerodynamic drag force, as previously explained with reference to FIG. 12. In this particular embodiment, the heel normalized aerodynamic drag force is less than 1.9 lbf when exposed to a horizontal 100 mph wind directed at the heel (116) with the body (110) oriented to have a vertical shaft axis (SA). In addition to having the face-on normalized aerodynamic drag force of less than 1.5 lbf and the 30 degree offset normalized aerodynamic drag force of less than 1.3 lbf, having a heel normalized aerodynamic drag force of less than 1.9 lbf further reduces the drop in club head speed associated with large volume, large FB dimension golf club heads.

Just as the embodiments that don't incorporate a post apex attachment promoting region (420) benefit from a relatively high apex ratio of the apex height (AH) to the maximum top edge height (TEH), so to do the embodiments incorporating a post apex attachment promoting region (420). After all, by definition the post apex attachment promoting region (420) is located above the maximum top edge plane (MTEP), which means that if the apex ratio is less than 1 then there can be no post apex attachment promoting region (420). An apex ratio of at least 1.13 provides for the height of the crown apex (410) that enables the incorporation of the post apex attachment promoting region (420) to reduce aerodynamic drag forces. Yet another embodiment further encourages airflow attachment behind the crown apex (410) by incorporating an apex ratio that is at least 1.2, thereby further increasing the available area on the crown section (400) above the maximum top edge height (TEH) suitable for a post apex attachment promoting region (420). The greater the amount of crown section (400) behind the crown apex (410), but above the maximum top edge height (TEH), and having the claimed attributes of the post apex attachment promoting region (420); the more likely the airflow is to remain attached to the club head (100) as it flows past the crown apex (410) and reduce the aerodynamic drag force.

With reference to FIGS. 14-17, in one of many embodiments the attachment promoting region length (422) is at least as great as seventy five percent of the crown apex setback dimension (412). As the attachment promoting region length (422) increases in proportion to the crown apex setback dimension (412), the amount of airflow separation behind the crown apex (410) is reduced. Further, as the attachment promoting region length (422) increases in proportion to the crown apex setback dimension (412), the geometry of the club head (100) is partially defined in that the amount of crown section (400) above the maximum top edge plane (MTEP) is set, thereby establishing the deviation of the crown section (400) from the crown apex (410) in the area behind the crown apex (410). Thus, at least a portion of the crown section (400) behind the crown apex (410) must be relatively flat, or deviate from an apex plane (AP), seen in FIG. 22, by less than twenty degrees thereby reducing the amount of airflow separation behind the crown apex (410).

Figure 15:
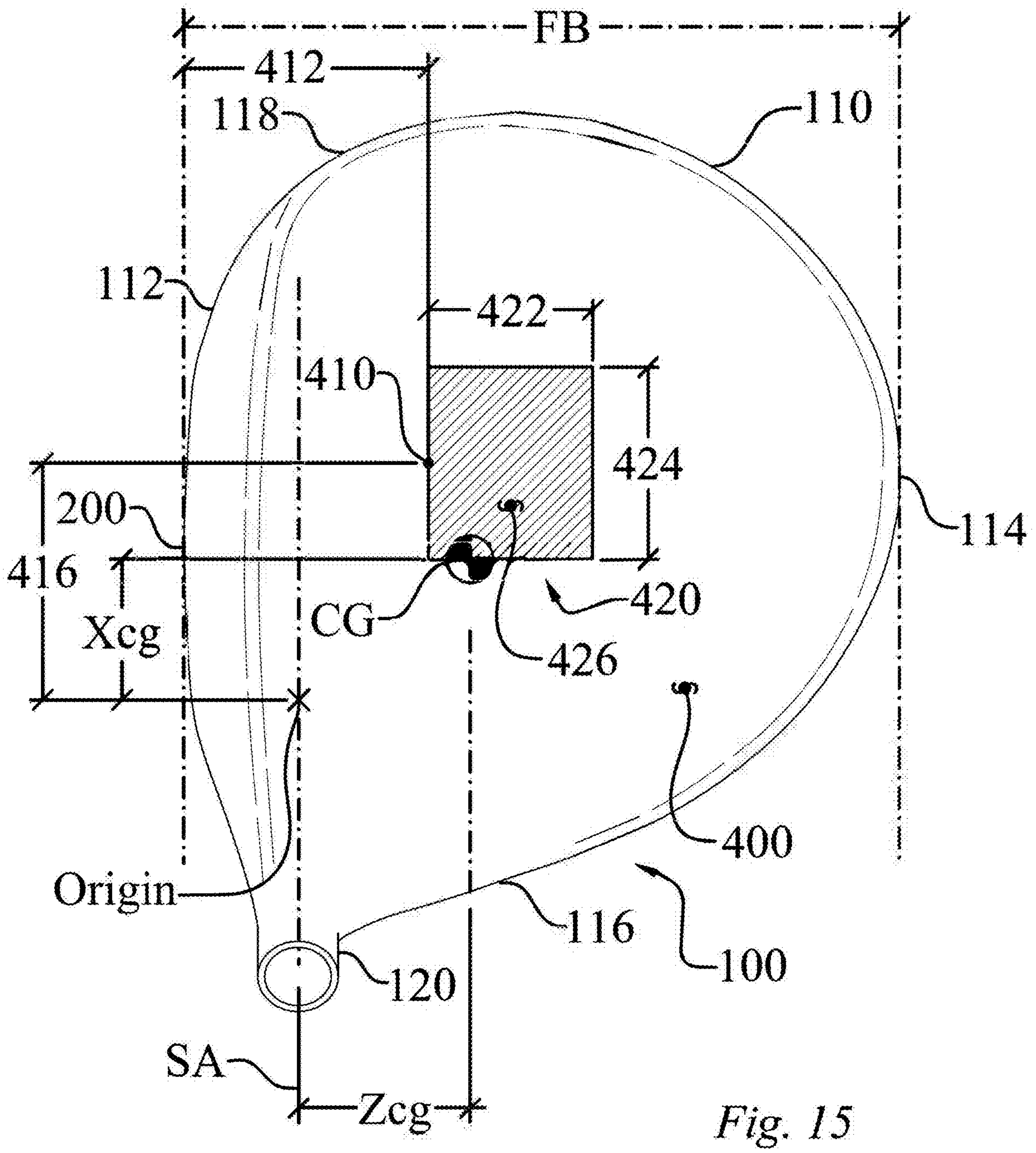
FIG. 15 shows a top plan view of a high volume aerodynamic golf club head having a post apex attachment promoting region, not to scale.

In a further embodiment seen in FIG. 15, the apex promoting region width (424) is at least twice as great as the difference between the crown apex x-dimension (416) and the distance Xcg. As the apex promoting region width (424) increases, more airflow coming over the crown apex (410) is exposed to the post apex attachment promoting region (420) further promoting airflow attachment to the club head (100) behind the crown apex (410) and reducing aerodynamic drag force.

Yet another embodiment focuses not solely on the size of the post apex attachment promoting region (420), but also on the location of it. It is helpful to define a new dimension to further characterize the placement of the post apex attachment promoting region (420); namely, as seen in FIG. 17, the hollow body (110) has a crown apex-to-toe dimension (418) measured from the crown apex (410) to the toeward-most point on the hollow body (110) in a direction parallel to the vertical plane defined by the shaft axis (SA) and parallel to the ground plane (GP). The present embodiment recognizes the significance of having the major portion of the crown section (400) between the crown apex (410) and the toe (118) incorporating a post apex attachment promoting region (420). Thus, in this embodiment, the post apex attachment promoting region width (424) is at least fifty percent of the crown apex-to-toe dimension (418). In a further embodiment, at least fifty percent of the crown apex-to-toe dimension (418) includes a portion of the post apex attachment promoting region (420). Generally it is easier to promote airflow attachment to the club head (100) on the crown section (400) behind the crown apex (410) in the region from the crown apex (410) to the toe (118), when compared to the region from the crown apex (410) to the heel (116), because of the previously explained airflow disruption associated with the hosel of the club head (100).

Another embodiment builds upon the post apex attachment promoting region (420) by having at least 7.5 percent of the club head volume located above the maximum top edge plane (MTEP), illustrated in FIG. 18. Incorporating such a volume above the maximum top edge plane (MTEP)

increases the surface area of the club head (100) above the maximum top edge height (TEH) facilitating the post apex attachment promoting region (420) and reducing airflow separation between the crown apex (410) and the back (114) of the club head (100). Another embodiment, seen in FIG. 19, builds upon this relationship by incorporating a club head (100) design characterized by a vertical cross-section taken through the hollow body (110) at a center of the face (200) extending orthogonal to the vertical plane through the shaft axis (SA) has at least 7.5 percent of the cross-sectional area located above the maximum top edge plane (MTEP).

As previously mentioned, in order to facilitate the post apex attachment promoting region (420), at least a portion of the crown section (400) has to be relatively flat and not aggressively sloped from the crown apex (410) toward the ground plane (GP). In fact, in one embodiment, a portion of the post apex attachment promoting region (420) has an apex-to-rear radius of curvature (Ra-r), seen in FIG. 20, that is greater than 5 inches. In yet another embodiment, a portion of the post apex attachment promoting region (420) has an apex-to-rear radius of curvature (Ra-r) that is greater than both the bulge and the roll of the face (200). An even further embodiment has a portion of the post apex attachment promoting region (420) having an apex-to-rear radius of curvature (Ra-r) that is greater than 20 inches. These relatively flat portions of the post apex attachment promoting region (420), which is above the maximum top edge plane (MTEP), promote airflow attachment to the club head (100) behind the crown apex (410).

Further embodiments incorporate a post apex attachment promoting region (420) in which a majority of the cross sections taken from the face (200) to the back (114) of the club head (100), perpendicular to the vertical plane through the shaft axis (SA), which pass through the post apex attachment promoting region (420), have an apex-to-rear radius of curvature (Ra-r) that is greater than 5 inches. In fact, in one particular embodiment, at least seventy five percent of the vertical plane cross sections taken perpendicular to a vertical plane passing through the shaft axis (SA), which pass through the post apex attachment promoting region (420), are characterized by an apex-to-rear radius of curvature (Ra-r) that is greater than 5 inches within the post apex attachment promoting region (420); thereby further promoting airflow attachment between the crown apex (410) and the back (114) of the club head (100).

Another embodiment incorporates features that promote airflow attachment both in front of the crown apex (410) and behind the crown apex (410). In this embodiment, seen in FIG. 20, the previously described vertical plane cross sections taken perpendicular to a vertical plane passing through the shaft axis (SA), which pass through the post apex attachment promoting region (420), also have an apex-to-front radius of curvature (Ra-f) that is less than 3 inches, and wherein at least fifty percent of the vertical plane cross sections taken perpendicular to a vertical plane passing through the shaft axis (SA), which pass through the post apex attachment promoting region (420), are characterized by an apex-to-front radius of curvature (Ra-f) of at least 50% less than the apex-to-rear radius of curvature (Ra-r). This combination of a very curved crown section (400) from the crown apex (410) to the face (200), along with a relatively flat crown section (400) from the crown apex (410) toward the back (114), both being above the maximum top edge plane (MTEP), promotes airflow attachment over the crown section (400) and reduces aerodynamic drag force. Yet another embodiment takes this relationship further and increases the percentage of the vertical plane cross sections taken perpendicular to a vertical plane passing through the shaft axis (SA), previously discussed, to at least seventy five percent of the vertical plane cross sections taken perpendicular to a vertical plane passing through the shaft axis (SA); thus further promoting airflow attachment over the crown section (400) of the club head (100).

The attributes of the claimed crown section (400) tend to keep the crown section (400) distant from the sole section (300). One embodiment, seen in FIGS. 21 and 22, incorporates a skirt (500) connecting a portion of the crown section (400) to the sole section (300). The skirt (500) includes a skirt profile (550) that is concave within a profile region angle (552), seen in FIG. 25, originating at the crown apex (410) wherein the profile region angle (552) is at least 45 degrees. With specific reference to FIG. 21, the concave skirt profile (550) creates a skirt-to-sole transition region (510), also referred to as "SSTR," at the connection to the sole section (300) and the skirt-to-sole transition region (510) has a rearwardmost SSTR point (512) located above the ground plane (GP) at a rearwardmost SSTR point elevation (513). Similarly, a skirt-to-crown transition region (520), also referred to as "SSCR," is present at the connection to the crown section (400) and the skirt-to-crown transition region (520) has a rearwardmost SCTR point (522) located above the ground plane (GP) at a rearwardmost SCTR point elevation (523).

Figure 25:
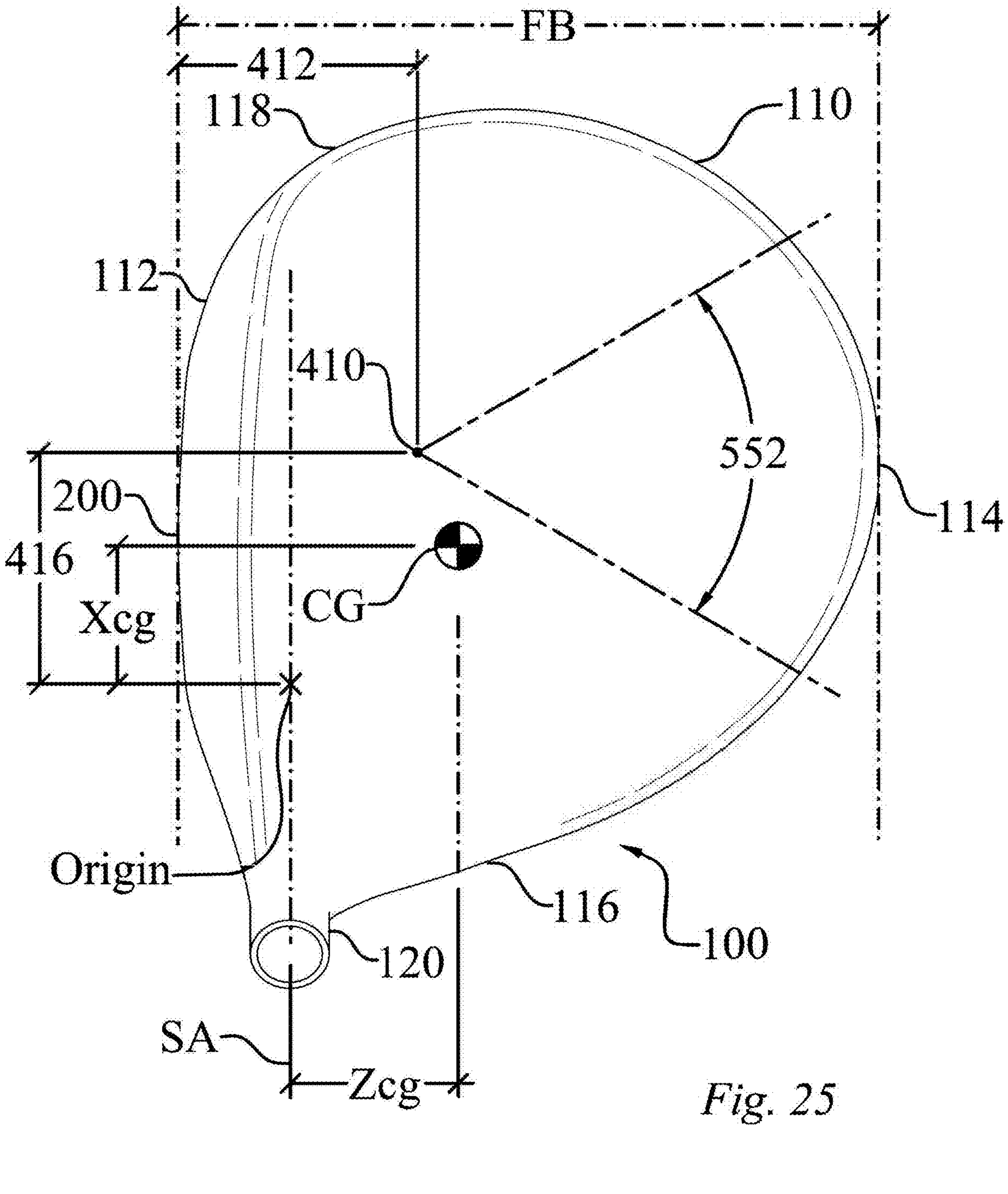
FIG. 25 shows a top plan view of a high volume aerodynamic golf club head having a post apex attachment promoting region, not to scale.

In this particular embodiment the rearwardmost SSTR point (512) and the rearwardmost SCTR point (522) need not be located vertically in-line with one another, however they are both located within the profile region angle (552) of FIG. 25. Referring again to FIG. 21, the rearwardmost SSTR point (512) and the rearwardmost SCTR point (522) are vertically separated by a vertical separation distance (530) that is at least thirty percent of the apex height (AH); while also being horizontally separated in a heel-to-toe direction by a heel-to-toe horizontal separation distance (545), seen in FIG. 23; and horizontally separated in a front-to-back direction by a front-to-back horizontal separation distance (540), seen in FIG. 22. This combination of relationships among the elements of the skirt (500) further promotes airflow attachment in that it establishes the location and elevation of the rear of the crown section (400), and thus a profile of the crown section (400) from the crown apex (410) to the back (114) of the club head (100). Further, another embodiment incorporating a rearwardmost SSTR point elevation (513) that is at least twenty five percent of the rearwardmost SCTR point elevation (523) defines a sole section (300) curvature that promotes airflow attachment on the sole section (300).

Figure 23:
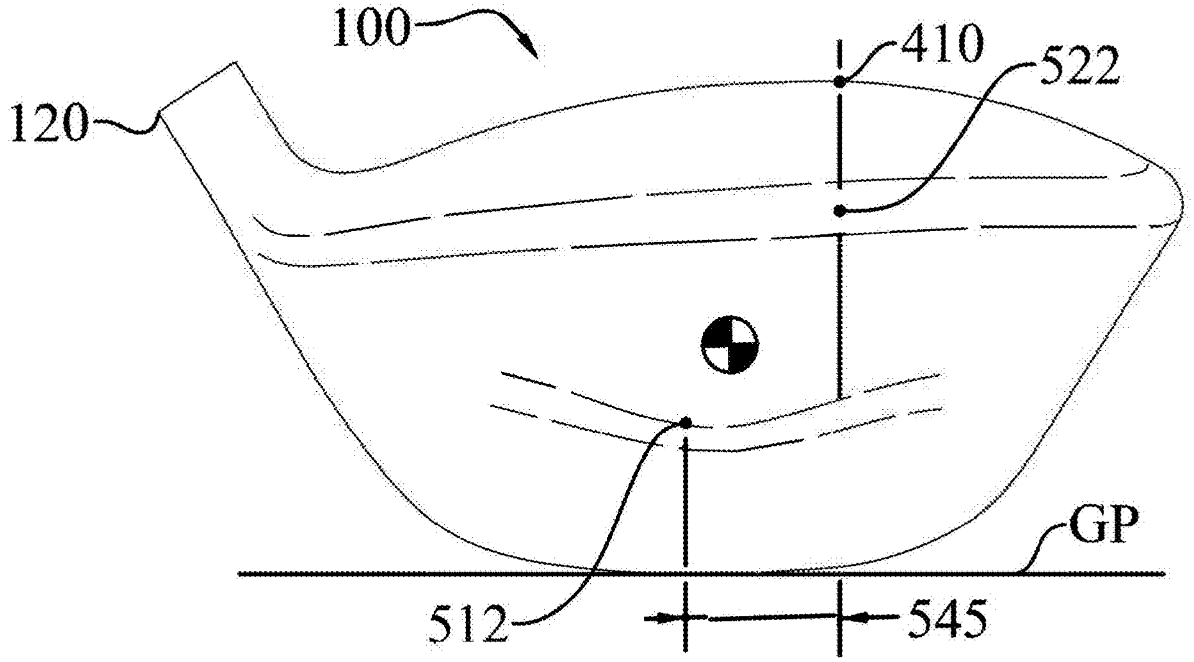
FIG. 23 shows a rear elevation view of a high volume aerodynamic golf club head having a post apex attachment promoting region, not to scale.
Figure 24:
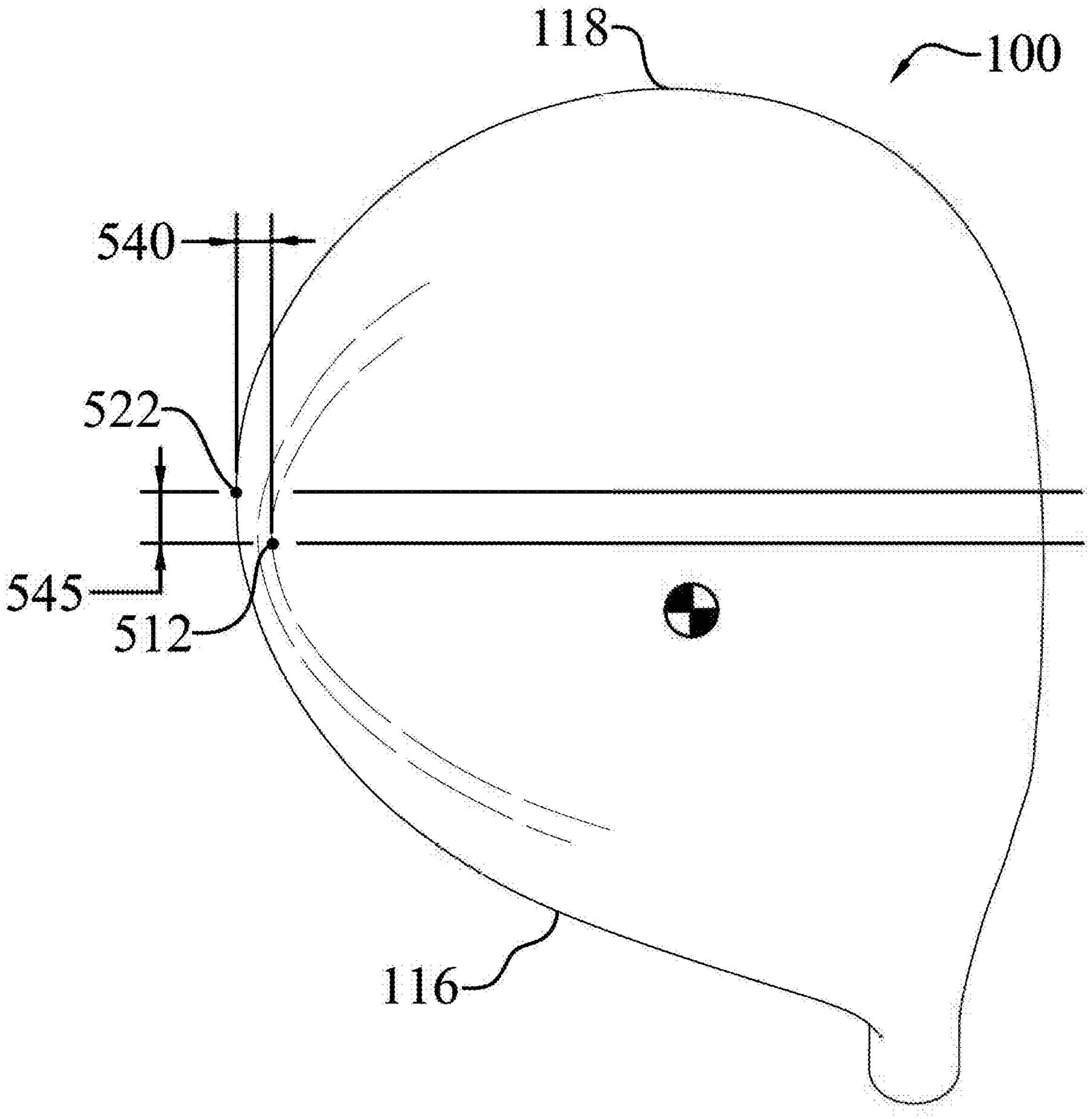
FIG. 24 shows a bottom plan view of a high volume aerodynamic golf club head having a post apex attachment promoting region, not to scale.

In a further embodiment, illustrated best in FIG. 23, the rearwardmost SCTR point (522) is substantially in-line vertically with the crown apex (410) producing the longest airflow path over the crown section (400) along the vertical cross section that passes through the crown apex (410) and thus maximizing the airflow attachment propensity of the crown section (400) design. Another variation incorporates a heel-to-toe horizontal separation distance (545) is at least at great as the difference between the crown apex x-dimension (416) and the distance Xcg. A further embodiment has the front-to-back horizontal separation distance (540) is at least thirty percent of the difference between the apex height (AH) and the maximum top edge height (TEH). These additional relationships further promote airflow attachment to the club head (100) by reducing the interference of other airflow paths with the airflow passing over the post apex attachment promoting region (420).

Another embodiment advancing this principle has the rearwardmost SSTR point (512) is located on the heel (116)

side of the center of gravity, and the rearwardmost SCTR point (522) is located on the toe (118) side of the center of gravity, as seen in FIG. 23. An alternative embodiment has both the rearwardmost SSTR point and the rearwardmost SCTR point (522) located on the toe (118) side of the center of gravity, but offset by a heel-to-toe horizontal separation distance (545) that is at least as great as the difference between the apex height (AH) and the maximum top edge height (TEH).

Several more high volume aerodynamic golf club head embodiments, seen in and described by reference to FIGS. 26-40, incorporate a "face portion" having a relatively large projected area of the face portion $A_f$ and having a crown section (400) that defines a relatively large drop contour area (620). In some embodiments, the projected area of the face portion $A_f$ desirably is within the range of 8.3 to 11.25 square inches. More desirably, in some embodiments, $A_f$ is within the range of 8.5 to 10.75 square inches. Even more desirably, in some embodiments, $A_f$ is within the range of 8.75 to 10.75 square inches. In some embodiments, the drop contour area (620) is located at an elevation above a maximum top edge plane (MTEP). As defined below, the drop contour area (CA) is a relatively flat portion of the crown section (400) that surrounds the drop contour crown apex (610) and that aids in keeping airflow attached to the club head (100) once it flows over the crown (400) prior to and past the drop contour crown apex (610).

As discussed above, the present high volume aerodynamic golf club heads have a face (200) that is intended to hit the golf ball. In a transition zone (230) of a club head the face (200) transitions to the external contour of the body (110), as shown in FIGS. 26A-C. The shapes of the face (200) and the transition zone (230) can vary substantially from club-head to club-head and from manufacturer to manufacturer. In view of these differences, it is important to have a standard definition of and method for measuring projected area of the face portion $A_f$. Part of the task of defining projected area of the face portion $A_f$ is dealing with the hosel (120). The hosel (120) is generally not intended as a ball-impact location and thus should not be included in the determination of projected area of the face portion $A_f$. Since the hosel (120) serves only to connect the club-head to the shaft of the golf club, and since a few club heads currently available have so-called "internal hosel" configurations, the manner of determining projected area of the face portion $A_f$ should exclude any contributions by the hosel, regardless of the club-head configuration.

Figure 27:
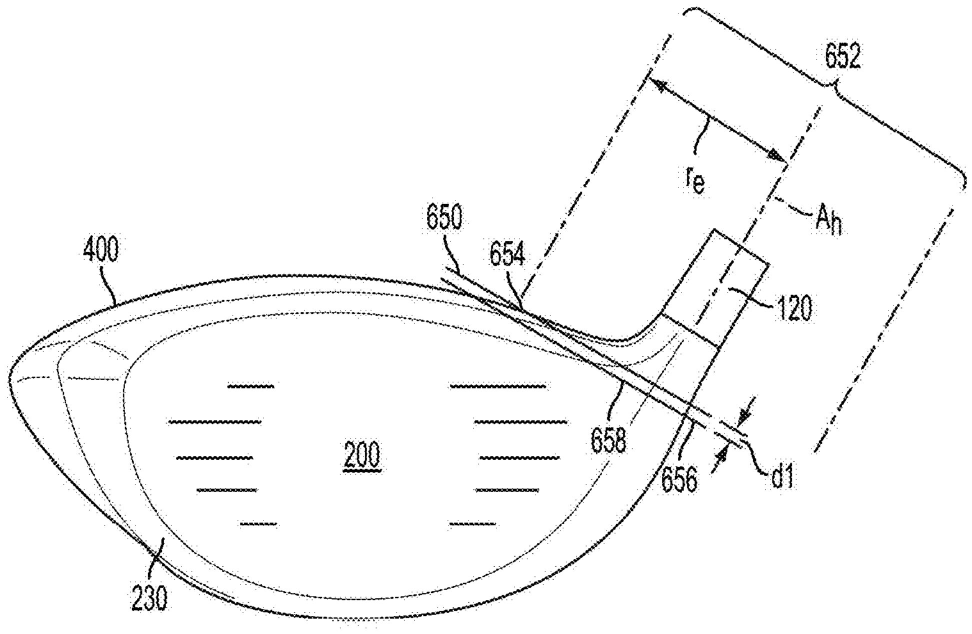
FIG. 27 shows a front elevational view of a high volume aerodynamic golf club head, depicting the manner of defining a first cut plane in the method for obtaining a face portion of the club head for obtaining a standard measurement, as disclosed herein, of projected area of the face portion, not to scale.

For consideration of the high volume aerodynamic golf club heads seen in and described in relation to FIGS. 26-35, the desired manner of determining projected area of the face portion $A_f$ is as follows, described with reference to the club head shown in FIG. 27. The club head includes a body (110), a sole section (300), a face (200) and a hosel (120). The hosel (120) extends along a hosel axis $A_h$. A "hosel-normal" plane (650) is defined that is normal to the hosel axis $A_h$. The hosel axis $A_h$ also is the axis of rotation of a cylinder (652) having a radius $r_e$ of 15 mm. The hosel-normal plane (650) is located on the hosel axis $A_h$ such that the cylinder (652) intersects the hosel-normal plane (650) and touches the surface of the body (110) at the point (654). A first cut plane (656) is defined as being parallel to the hosel-normal plane (650) but displaced 1 mm toward the sole (300). The first cut plane (656) can be denoted by the line (658) that can be scribed on the face (200) and used later as a cut-line for removing the hosel (120) from the club-head.

Figure 28:
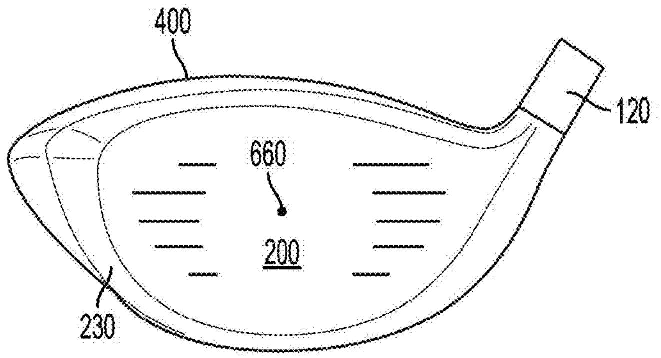
FIG. 28 shows a front elevational view of the club head of FIG. 27, depicting a face on which a face center has been defined as part of the method for obtaining a face portion, not to scale.
Figure 29:
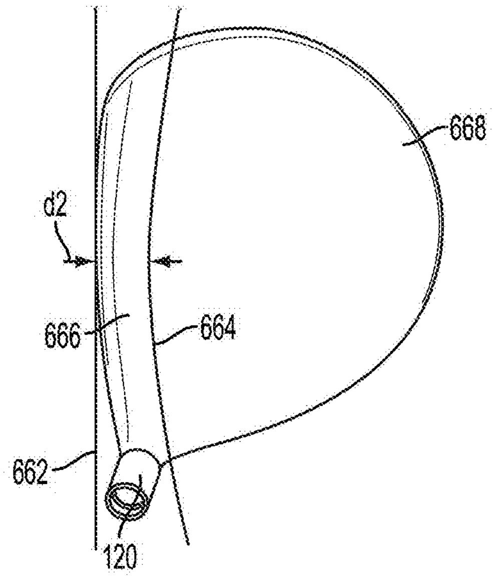
FIG. 29 shows a top view of the club head of FIG. 27, depicting the manner of defining a second cut plane in the method for obtaining a face portion, not to scale.
Figure 30A:
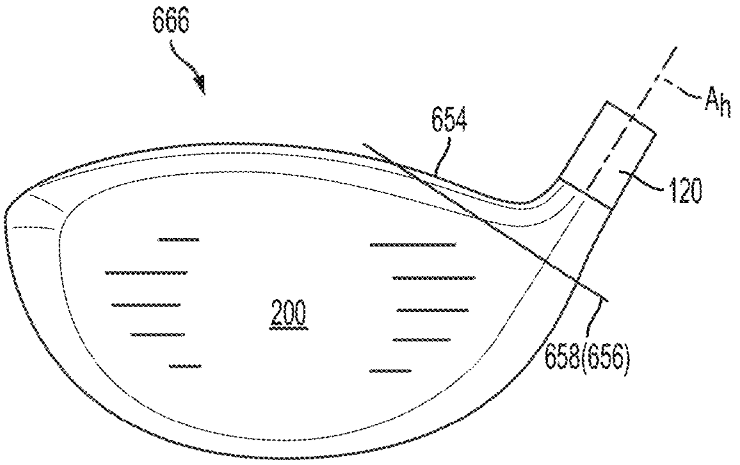
FIG. 30A shows a front elevational view of the club head of FIG. 27, depicting the first cut plane, used in the method for obtaining a face portion, not to scale.
Figure 30B:
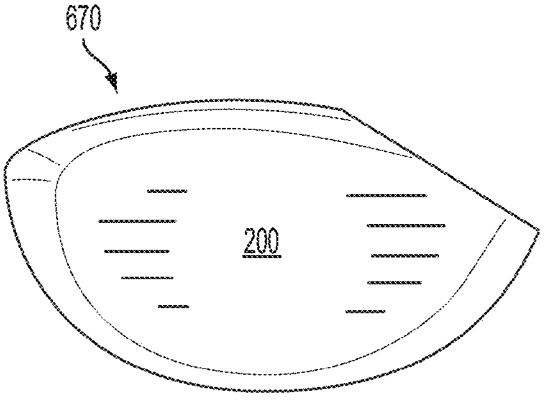
FIG. 30B shows a front elevational view of the face portion produced according to the method, not to scale.

As noted above, the face center (660) of the face (200) is determined in accordance with the USGA "Procedure for Measuring the Flexibility of a Golf Clubhead," Revision 2.0, Mar. 25, 2005, which is incorporated herein by reference. A typical face center (660) is shown in FIG. 28. Turning now to FIG. 29, the club head is rotated such that a normal to the face center (660) is parallel to the ground plane and is oriented in the direction of the target line. A "tangent plane" (662) is defined as being tangent to the face (200) at the face center (660) and normal to the "loft plane" (not shown) of the club head. A best fit bulge radius is then determined within a plane that is parallel to the ground plane and passing through the face center (660), using the face center (660) and two points located at 35 mm on either side of the face center (660). The best fit bulge radius is then extended in a vertical direction (i.e., perpendicular to the ground plane) in both directions (i.e., above and below the face center (660)) and is offset by a distance $d_2$ of 5 mm toward the rear of the club head to define an offset bulge radius cut plane (664).

The club head desirably is cut first along the offset bulge radius cut plane (664) (FIG. 29) to remove the front portion (666) from the rear portion (668). Then, on the front portion (666) (FIG. 30A), a second cut is made along the first cut plane (656), using the line (658) as a guide, to remove the hosel (120). The resulting face portion (670) (FIG. 30B) is used for determining the projected area of the face portion $A_f$ of the club head onto the X-Y plane.

Figure 31:
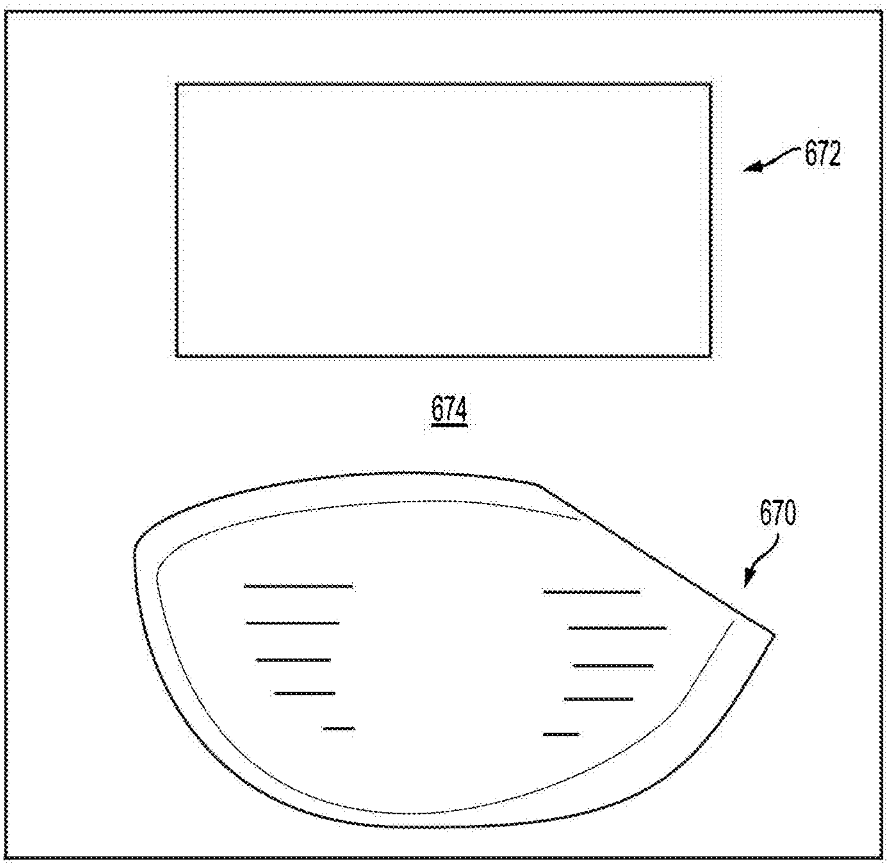
FIG. 31 shows a schematic view of a reference surface (having a precisely known area) and a face portion positioned for obtaining a determination of the projected area of the face portion, not to scale.
Figure 32A:
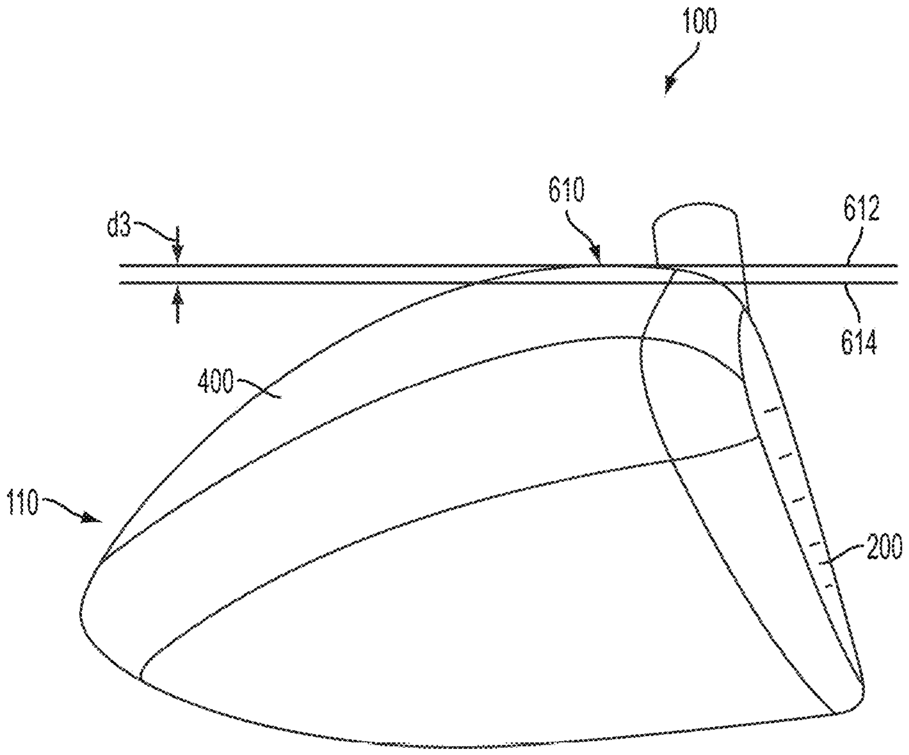
FIG. 32A shows a toe-side elevation view of a high volume aerodynamic golf club head in a 12 degree pitched up orientation, not to scale.
Figure 32B:
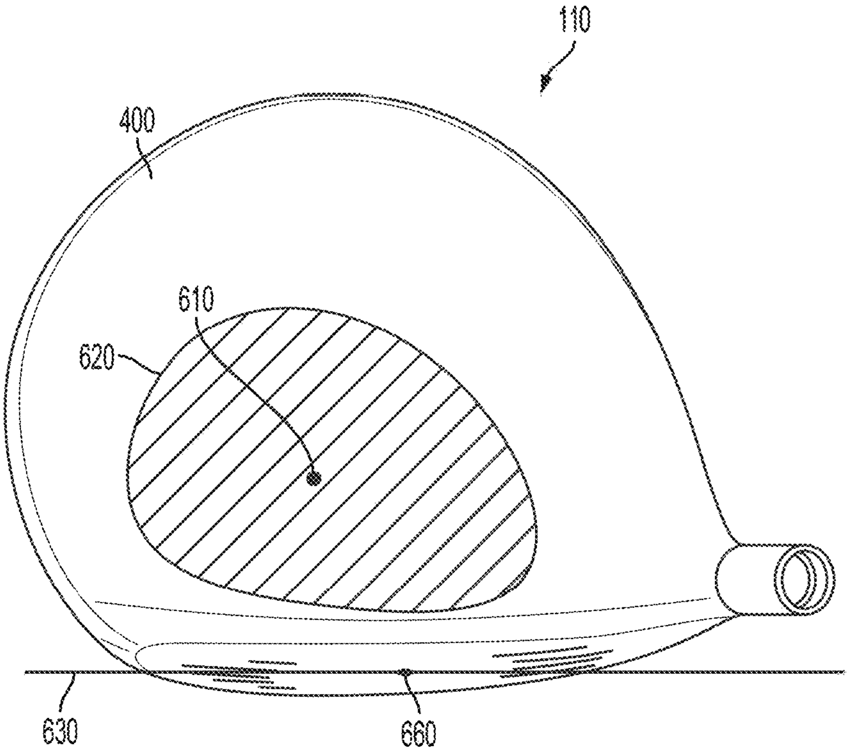
FIG. 32B shows a top plan view of the high volume aerodynamic golf club head of FIG. 32A illustrating an 8 mm drop contour area, not to scale.
Figure 33:
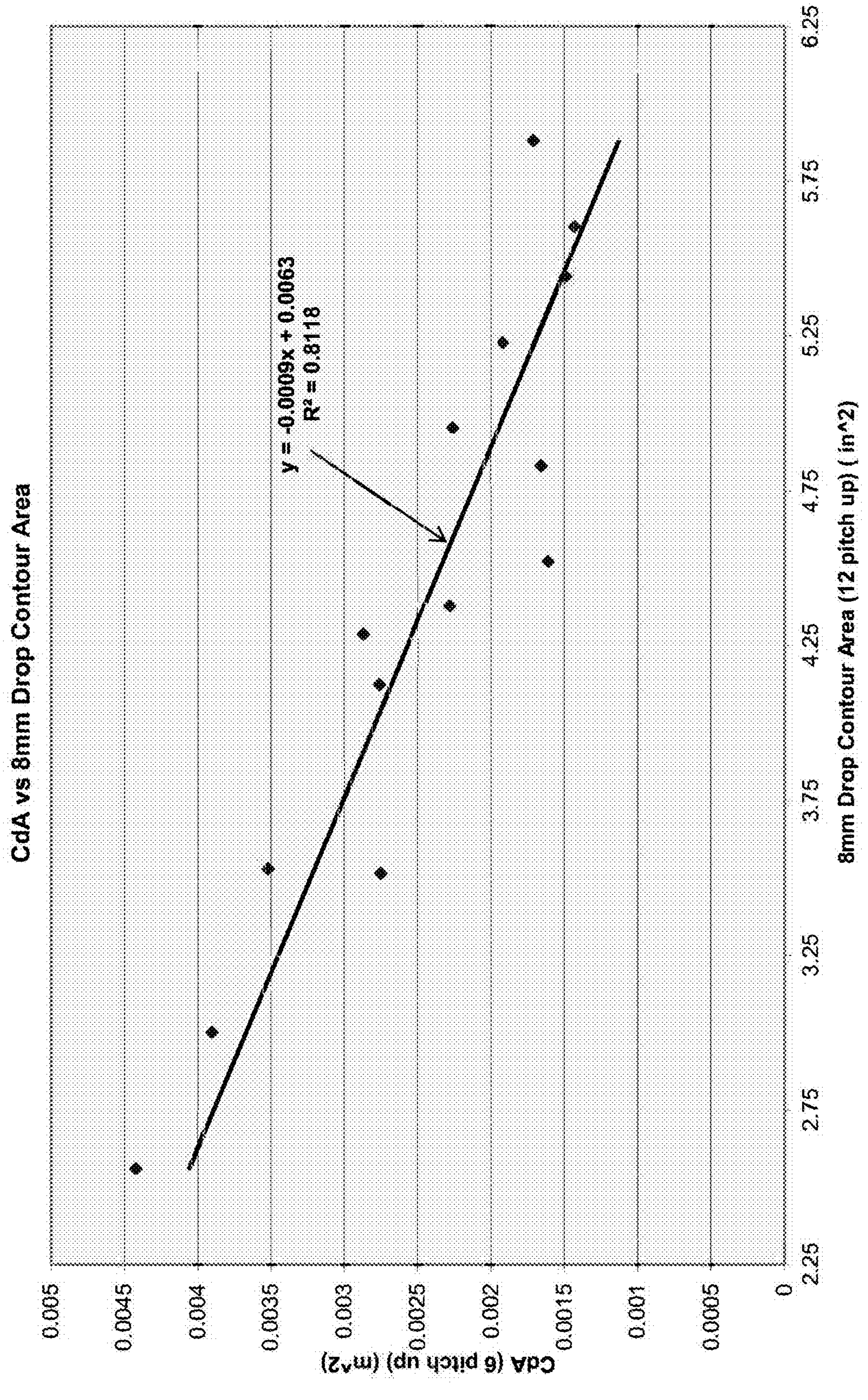
FIG. 33 shows a graph of 8 mm drop contour area (CA) versus the product of the drag coefficient (Cd) and the effective cross-sectional area (A)

To determine the projected area of the face portion $A_f$, and turning now to FIG. 31, the face portion (670) is placed adjacent a reference portion (672) (having a precisely known reference area) on a planar background (674). The face portion (670) and reference portion (672) are imaged (preferably digitally) from a position normal to the planar background (674). Photo-editing software is used to detect the edges of, and the number of pixels inside, the reference portion (672) (in one example 259,150 "black" pixels made up the reference area of 7.77 in$^2$). Similarly, the software is used to detect the edges of, and number of pixels inside, the face portion (670) (in the example 298,890 black pixels made up the area of the face portion (670)). The projected area of the face portion is calculated as follows:

$$A_f = P_f * (A_r/P_r)$$

wherein $A_f$ is the projected area of the face portion, $P_f$ is the pixel count in the face portion (670), $A_r$ is the area of the reference portion (672), and $P_r$ is the pixel count in the reference portion (672). In the example, if $A_r$=7.77 in$^2$, $P_f$=298,890 pixels, and $P_r$=259,150 pixels, then $A_f$=9.14 in$^2$.

It will be understood that the pixel-counting technique described above is an example of a technique capable of measuring area accurately and precisely. Other area-measurement techniques can be employed in alternative methods In various embodiments, the projected area of the face portion $A_f$ is generally greater than 8.3 in$^2$, desirably in the range of 8.3 to 15.5 in$^2$, more desirably in the range of 9.0 to 12.5 in$^2$, and most desirably in the range of 9.5 to 10.5 in$^2$.

The golf club head (100) embodiments shown in and described in relation to FIGS. 26-35 obtain superior aerodynamic performance through the use of unique club head shapes that satisfy a unique relationship between the projected area of the face portion $A_f$ of the club head and the club head drop contour area (CA). Referring now to FIGS. 32A-B, a method for determining the drop contour area of a club head will be described. As shown, a golf club head (100) includes a club head body (110) having a crown section (400) and a face (200). A center face tangent (630)

extends parallel to the ground plane and tangent to the face (200) at the location of the face center (660). With the club head oriented at an absolute lie angle of 55 degrees and a square face angle (i.e., a normal to the face (200) at the face center (660) lies within a target plane), the club head body (110) is pitched upward about the centerface tangent (630) to a pitch angle of 12 degrees. This orientation is referred to herein as the 12 degree pitched up orientation. With the club head body (110) positioned in the 12 degree pitched up orientation, the peak height of the crown section relative to the ground plane is located and designated as the 12 degree pitched up crown apex (610). (See FIG. 32A). A crown apex tangent plane (612) is parallel to the ground plane and is tangent to the crown section (400) at the 12 degree pitched up crown apex (610). An 8 mm drop plane (614) is located parallel to and displaced a distance $d_3$ of 8 mm downward (toward the ground plane) from the crown apex tangent plane (612). An area within an intersection of the 8 mm drop contour plane (614) and the crown section (400) is designated as the 8 mm drop contour area (620) of the club head body (110).

Using the foregoing methods for measuring projected area of the face portion ($A_f$) and the 8 mm drop contour area (CA), swing path data was investigated for a number of example golf clubs. For a given golf club head orientation, the drag force of the club head moving through air can be calculated according to the following equation:

$$\text{Drag Force} = 0.5 * \rho * u^2 * Cd * A$$

where ρ is the air density, u is the airspeed of the club head, Cd is the drag coefficient, and A is the projected area of the golf club head. Resolving the equation for the product Cd*A provides the following:

$$Cd * A = \text{Drag Force}/0.5 * \rho * u^2$$

Through swing path analysis, it was found that the range along the swing path between 6 degree and 12 degree pitched up orientations of the golf club head were the most important for contributing to club head aerodynamics because it is within this range of club head orientation that the club head aerodynamic performance will have the most impact on club head speed. A drag force for the number of example golf clubs described above was measured experimentally under known conditions of air speed and air density. Values for the product of Cd*A were then determined for the golf club heads. These results were then plotted against the measured 8 mm drop contour area for the golf club heads in the 6 degree pitched up orientation. The results are provided in the graph shown in FIG. 33, and show a high correlation between the 8 mm drop contour area and the aerodynamic performance of the golf club head. Moreover, the results provided in the graph at FIG. 33 demonstrate that a relatively larger 8 mm drop contour area provides a golf club head having improved aerodynamic performance.

Turning next to FIGS. 34-39, a number of prior golf club heads manufactured by the TaylorMade Golf Company ("Comparative Embodiments") and a number of competitor prior golf club heads ("Competitor Club Heads") were analyzed to determine the projected area of the face portion ($A_f$) and 8 mm drop contour area (CA) at a 12 degree pitched up orientation for each of the club heads. These measurements were then compared to measurements of several novel golf club heads described herein ("Novel Club Heads") in the same 12 degree pitched up orientation. The results show that the novel club heads provide a combination of a relatively large projected area of the face portion ($A_f$) while maintaining an aerodynamically preferable large value for the 8 mm drop contour area (CA) in a manner that was not shown by the Comparative Embodiments or the Competitor Club Heads.

Figure 34:
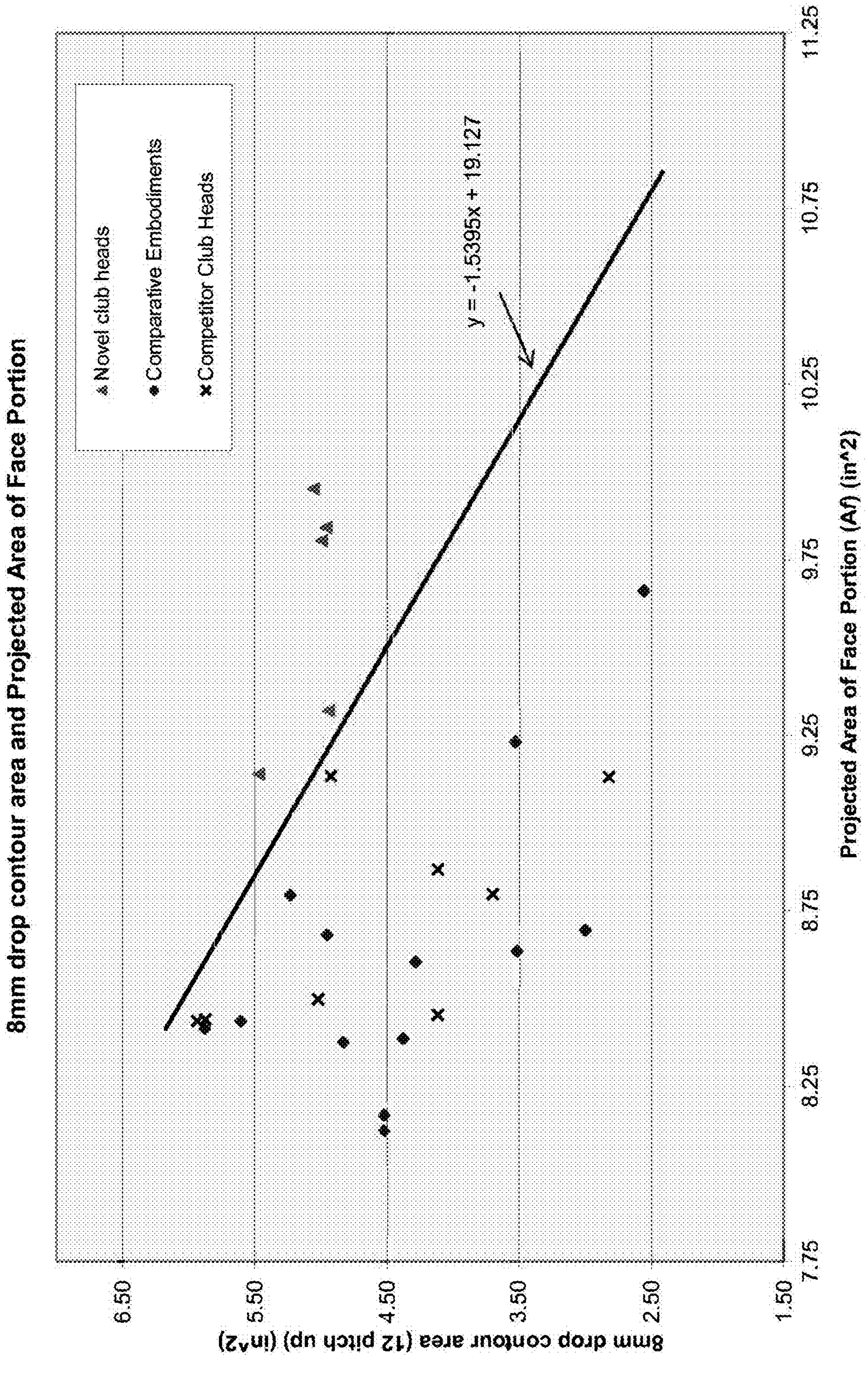
FIGS. 34-39 show graphs of projected area of the face portion (Af) versus 8 mm drop contour area (CA)

In particular, as shown in FIG. 34, the results show that the novel club heads had a relationship between projected area of the face portion ($A_f$) and 8 mm drop contour area (CA) that extends within a region of the graph that is defined in part by the following lower boundary equation:

$$CA = -1.5395 * A_f + 19.127 \quad \text{Eq. 1}$$

In Equation 1, CA is the 8 mm drop contour area (at the 12 degree pitched orientation), expressed in square inches, and $A_f$ is the projected area of the face portion (as defined hereinabove), also expressed in square inches. The novel club head region extends between a projected area of the face portion ($A_f$) of 8.3 $in^2$ to 11.25 $in^2$ on the x-axis, and extends between about 6.5 $in^2$ down to the boundary of Equation 1 described above on the y-axis. A narrower novel club head region extends between about 6.0 $in^2$ and the boundary of Equation 1 on the y-axis, and has an x-axis limit between a projected area of the face portion ($A_f$) of 8.5 $in^2$ to 10.75 $in^2$, 8.75 $in^2$ to 10.75 $in^2$, 9.0 $in^2$ to 10.5 $in^2$, or 9.0 $in^2$ to 10.25 $in^2$.

Figure 35:
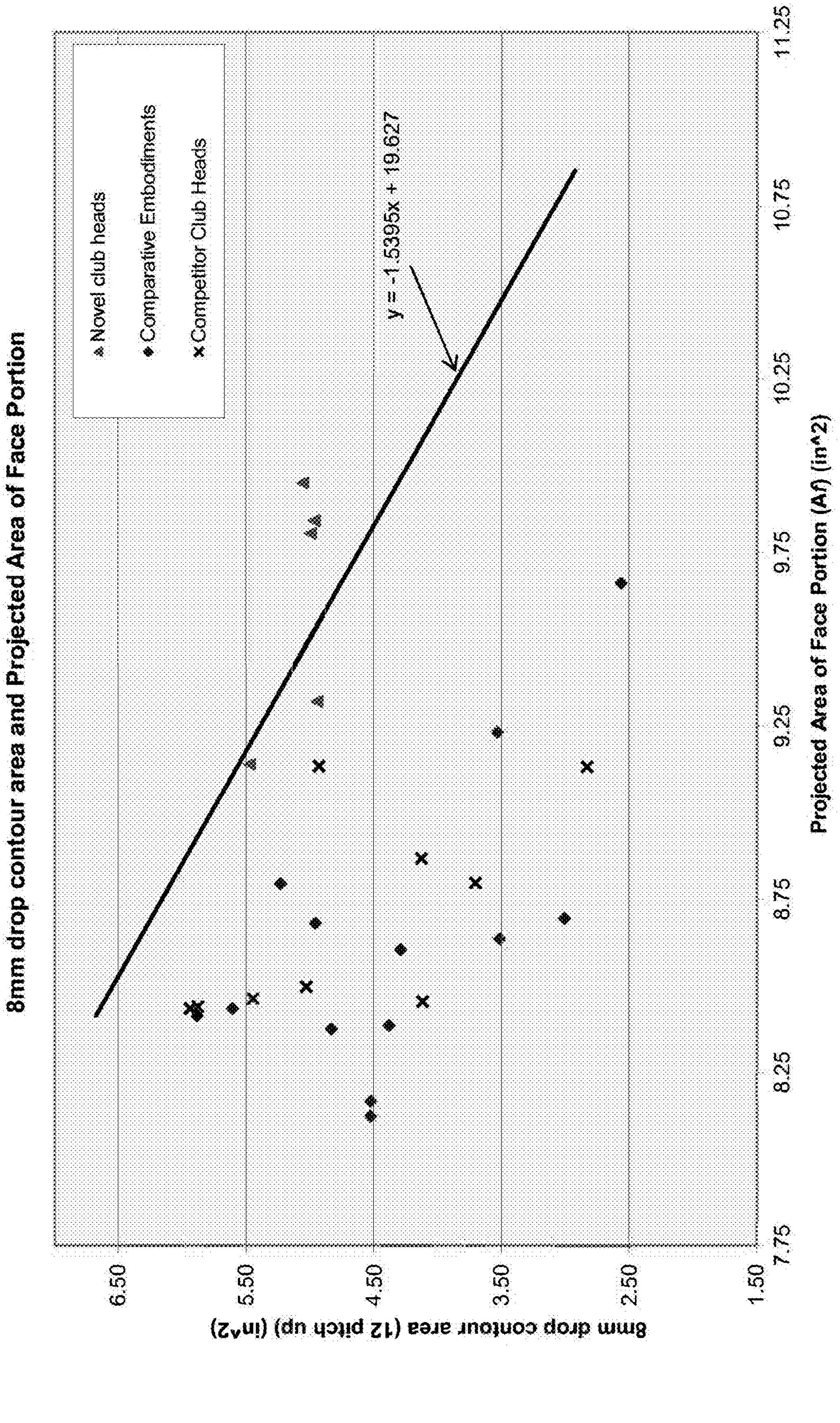

Turning to FIG. 35, an alternative relationship for the novel club heads between projected area of the face portion ($A_f$) and 8 mm drop contour area (CA) extends within a region of the graph that is defined in part by the following lower boundary equation:

$$CA = -1.5395 * A_f + 19.627 \quad \text{Eq. 2}$$

In Equation 2, CA is the 8 mm drop contour area (at the 12 degree pitched orientation), expressed in square inches, and $A_f$ is the projected area of the face portion (as defined hereinabove), also expressed in square inches. The novel club head region shown in FIG. 35 extends between a projected area of the face portion ($A_f$) of 8.75 $in^2$ to 11.25 $in^2$ on the x-axis, and extends between about 6.5 $in^2$ down to the boundary of Equation 2 described above on the y-axis. A narrower novel club head region extends between about 6.0 $in^2$ and the boundary of Equation 2 on the y-axis, and has an x-axis limit between a projected area of the face portion ($A_f$) of 9.0 $in^2$ to 10.75 $in^2$, 9.0 $in^2$ to 10.75 $in^2$, 9.0 $in^2$ to 10.5 $in^2$, or 9.0 $in^2$ to 10.25 $in^2$.

Figure 36:
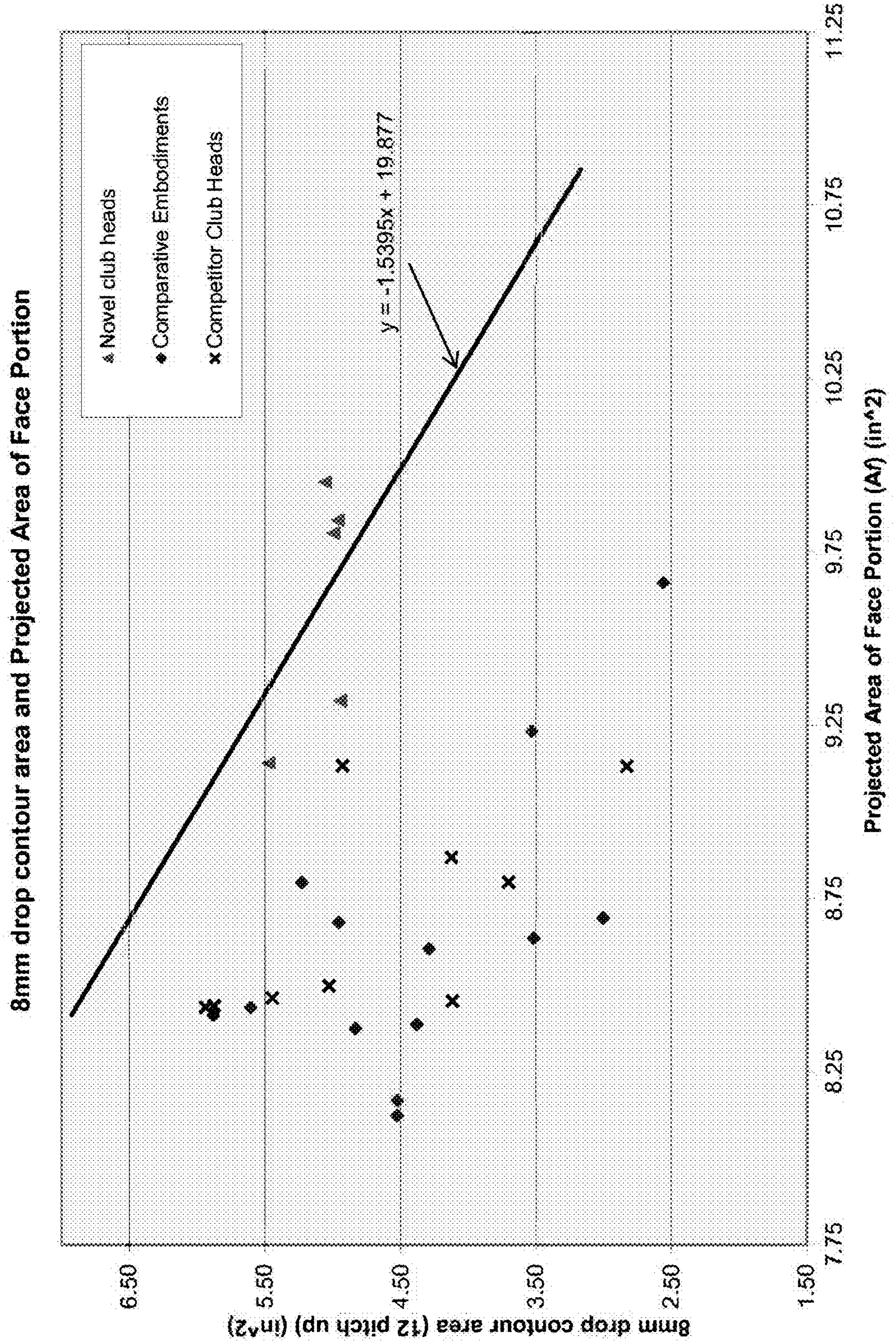

Turning to FIG. 36, another alternative relationship for the novel club heads between projected area of the face portion ($A_f$) and 8 mm drop contour area (CA) extends within a region of the graph that is defined in part by the following lower boundary equation:

$$CA = -1.5395 * A_f + 19.877 \quad \text{Eq. 3}$$

In Equation 3, CA is the 8 mm drop contour area (at the 12 degree pitched orientation), expressed in square inches, and $A_f$ is the projected area of the face portion (as defined hereinabove), also expressed in square inches. The novel club head region shown in FIG. 36 extends between a projected area of the face portion ($A_f$) of 8.75 $in^2$ to 11.25 $in^2$ on the x-axis, and extends between about 6.5 $in^2$ down to the boundary of Equation 3 described above on the y-axis. A narrower novel club head region extends between about 6.0 $in^2$ and the boundary of Equation 3 on the y-axis, and has an x-axis limit between a projected area of the face portion ($A_f$) of 9.25 $in^2$ to 10.75 $in^2$, 9.25 $in^2$ to 10.75 $in^2$, 9.25 $in^2$ to 10.5 $in^2$, or 9.25 $in^2$ to 10.25 $in^2$.

Figure 37:
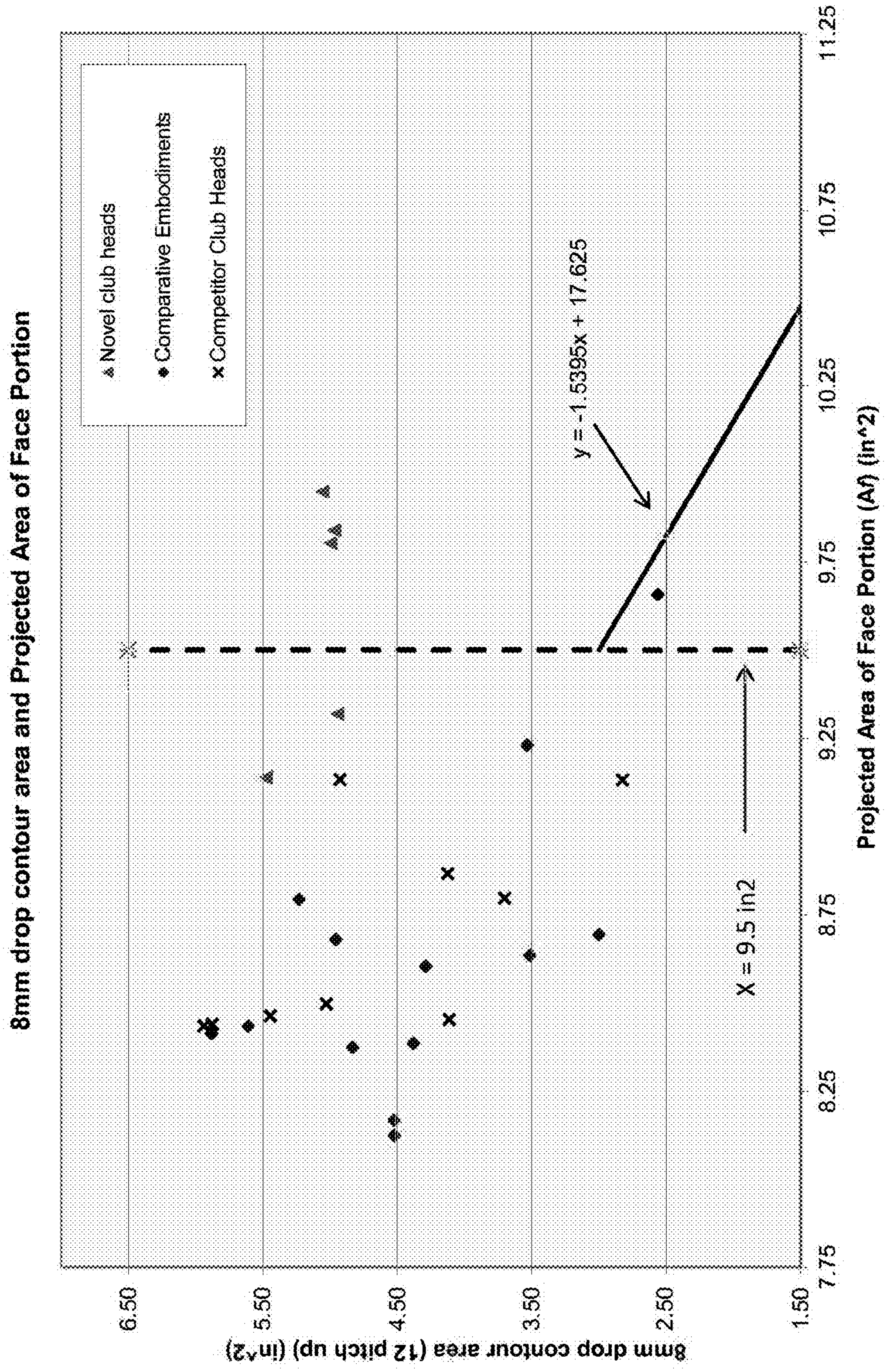

Turning next to FIG. 37, still another alternative relationship between projected area of the face portion ($A_f$) and 8 mm drop contour area (CA) is defined for novel golf club heads having projected area of the face portion ($A_f$) values greater than 9.5 $in^2$. For these novel golf club heads, the relationship between $A_f$ and CA extends within a region of the graph that is defined in part by the following lower boundary equation:

$$CA = -1.5395 * A_f + 17.625 \quad \text{Eq. 4}$$

In Equation 4, CA is the 8 mm drop contour area (at the 12 degree pitched orientation), expressed in square inches, and $A_f$ is the projected area of the face portion (as defined hereinabove), also expressed in square inches. The novel club head region shown in FIG. 37 extends between a projected area of the face portion ($A_f$) of 9.5 $in^2$ to 11.25 $in^2$ on the x-axis, and extends between about 6.5 $in^2$ down to the boundary of Equation 4 described above on the y-axis. A narrower novel club head region extends between about 6.0 $in^2$ and the boundary of Equation 4 on the y-axis, and has an x-axis limit between a projected area of the face portion ($A_f$) of 9.5 $in^2$ to 10.75 $in^2$, 9.5 $in^2$ to 10.5 $in^2$, 9.5 $in^2$ to 10.25 $in^2$, or 9.75 $in^2$ to 10.25 $in^2$.

Figure 38:
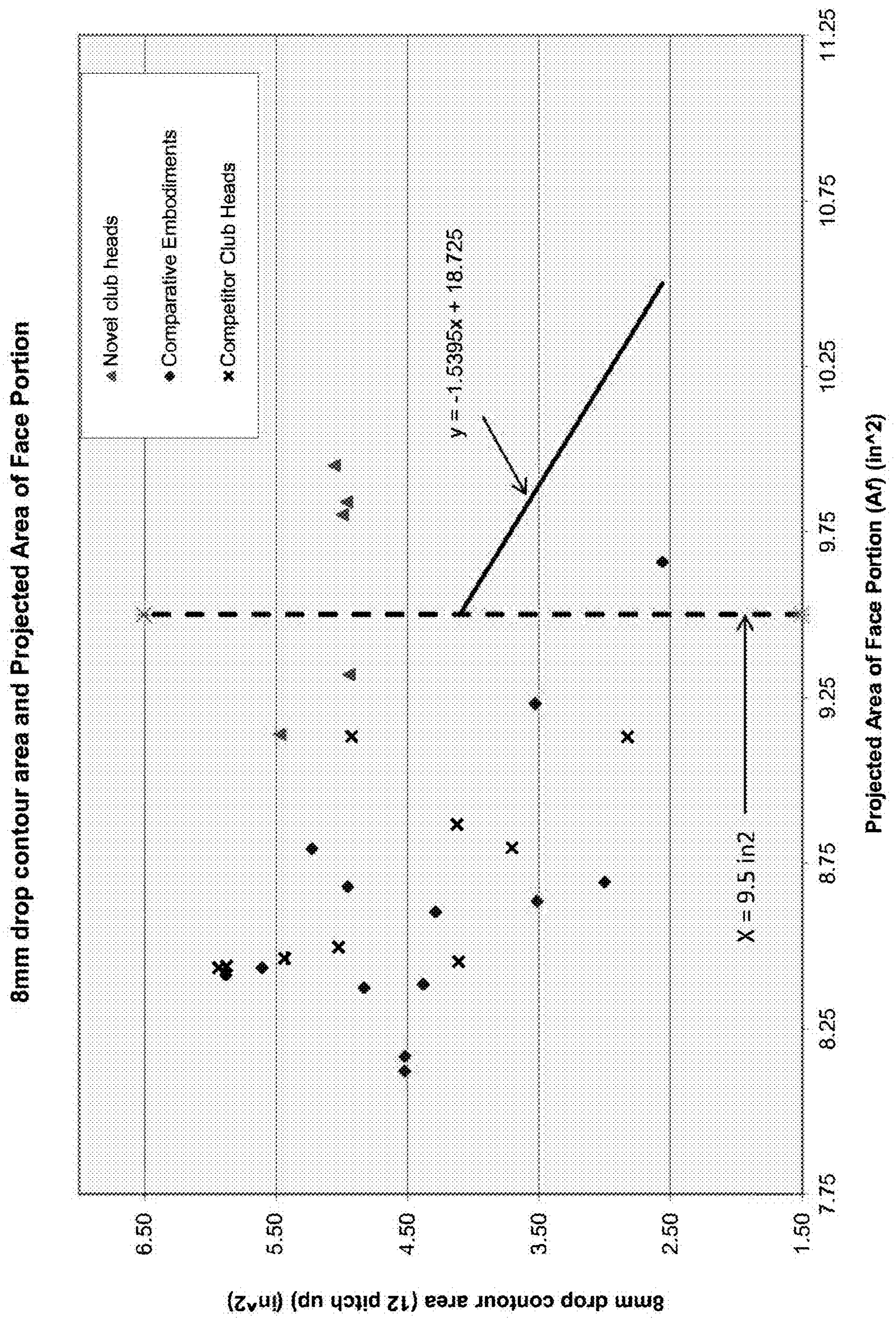
Figure 39:
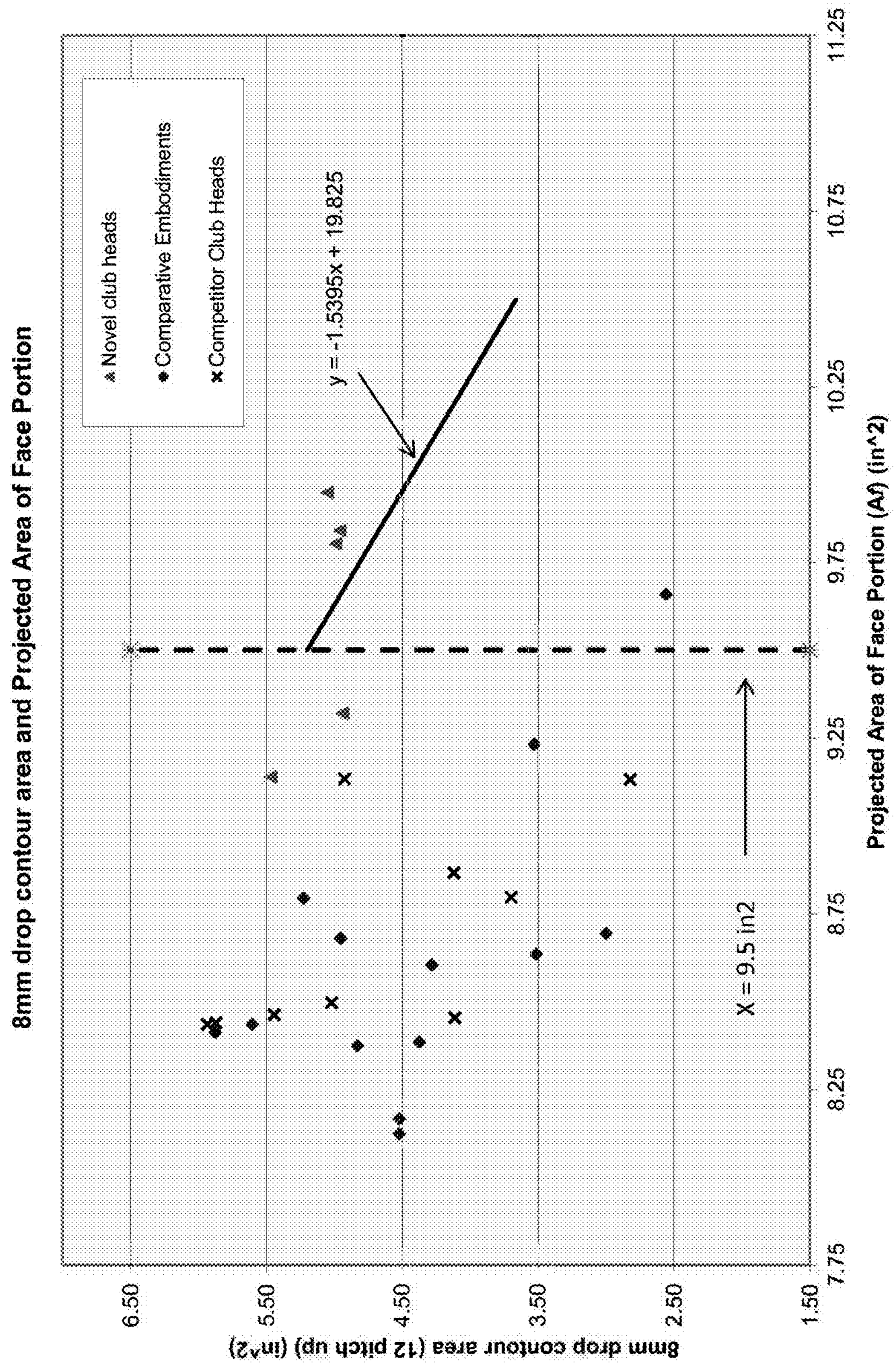

Turning next to FIG. 38, a still further alternative relationship between projected area of the face portion ($A_f$) and 8 mm drop contour area (CA) is defined for novel golf club heads having projected area of the face portion ($A_f$) values greater than 9.5 $in^2$. For these novel golf club heads, the relationship between $A_f$ and CA extends within a region of the graph that is defined in part by the following lower boundary equation:

$$CA = -1.5395 * A_f + 18.725 \quad \text{Eq. 5}$$

In Equation 5, CA is the 8 mm drop contour area (at the 12 degree pitched orientation), expressed in square inches, and $A_f$ is the projected area of the face portion (as defined hereinabove), also expressed in square inches. The novel club head region shown in FIG. 38 extends between a projected area of the face portion ($A_f$) of 9.5 $in^2$ to 11.25 $in^2$ on the x-axis, and extends between about 6.5 $in^2$ down to the boundary of Equation 5 described above on the y-axis. A narrower novel club head region extends between about 6.0 $in^2$ and the boundary of Equation 5 on the y-axis, and has an x-axis limit between a projected area of the face portion ($A_f$) of 9.5 $in^2$ to 10.75 $in^2$, 9.5 $in^2$ to 10.5 $in^2$, 9.5 $in^2$ to 10.25 $in^2$, or 9.75 $in^2$ to 10.25 $in^2$.

Turning next to FIG. 38, another alternative relationship between projected area of the face portion ($A_f$) and 8 mm drop contour area (CA) is defined for novel golf club heads having projected area of the face portion ($A_f$) values greater than 9.5 $in^2$. For these novel golf club heads, the relationship between $A_f$ and CA extends within a region of the graph that is defined in part by the following lower boundary equation:

$$CA = -1.5395 * A_f + 19.825 \quad \text{Eq. 6}$$

In Equation 6, CA is the 8 mm drop contour area (at the 12 degree pitched orientation), expressed in square inches, and $A_f$ is the projected area of the face portion (as defined hereinabove), also expressed in square inches. The novel club head region shown in FIG. 39 extends between a projected area of the face portion ($A_f$) of 9.5 $in^2$ to 11.25 $in^2$ on the x-axis, and extends between about 6.5 $in^2$ down to the boundary of Equation 6 described above on the y-axis. A narrower novel club head region extends between about 6.0 $in^2$ and the boundary of Equation 6 on the y-axis, and has an x-axis limit between a projected area of the face portion ($A_f$) of 9.5 $in^2$ to 10.75 $in^2$, 9.5 $in^2$ to 10.5 $in^2$, 9.5 $in^2$ to 10.25 $in^2$, or 9.75 $in^2$ to 10.25 $in^2$.

Figure 40A:
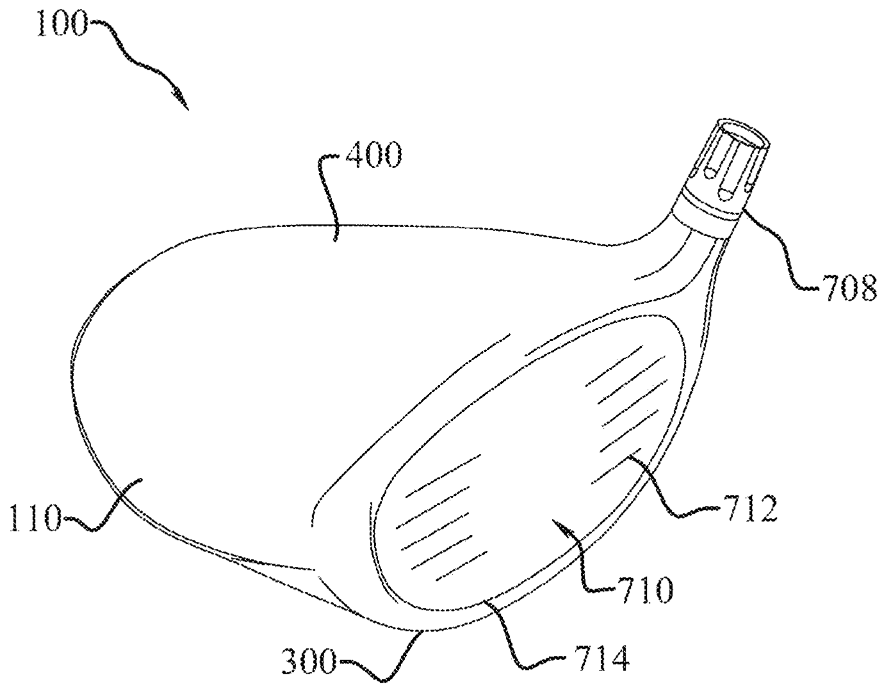
FIG. 40A is an isometric view of a high volume aerodynamic golf club head having a composite face insert, not to scale.

In several embodiments, the larger projected area of the face portion ($A_f$) may be achieved by providing a golf club head (100) that includes one or more parts formed from a lightweight material, including conventional metallic and nonmetallic materials known and used in the art, such as steel (including stainless steel), titanium alloys, magnesium alloys, aluminum alloys, carbon fiber composite materials, glass fiber composite materials, carbon pre-preg materials, polymeric materials, and the like. For example, in some embodiments, the face (200) may be provided as a face insert formed of a composite material. FIG. 40A shows an isometric view of a golf club head (100) including a hollow body (110) having a crown section (400) and a sole section (300). A composite face insert (710) is inserted into a front opening inner wall (714) located in the front portion of the club head body (110). The face insert (710) can include a plurality of score lines (712).

Figure 40B:
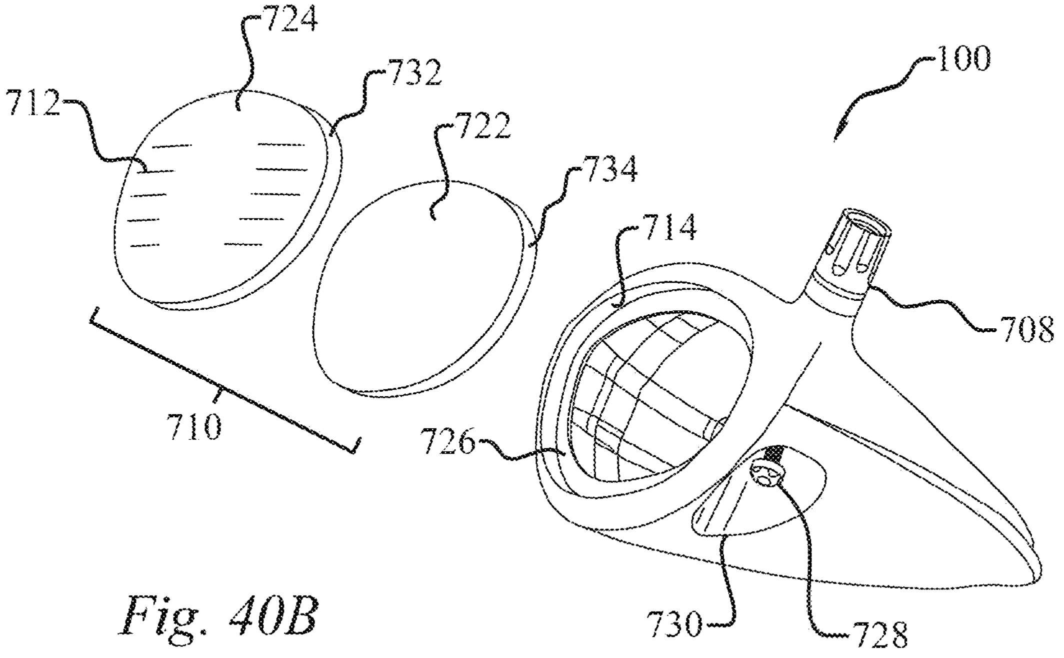
FIG. 40B is an exploded view of the high volume aerodynamic golf club head of FIG. 40A, not to scale.

FIG. 40B illustrates an exploded assembly view of the golf club head (100) and a face insert (710) including a composite face insert (722) and a metallic cap (724). In certain embodiments, the metallic cap (724) is a titanium alloy, such as 6-4 titanium or CP titanium. In some embodiments, the metallic cap (724) includes a rim portion (732) that covers a portion of a side wall (734) of the composite insert (722). In other embodiments, the metallic cap (724) does not have a rim portion (732) but includes an outer peripheral edge that is substantially flush and planar with the side wall (734) of the composite insert (722). A plurality of score lines (712) can be located on the metallic cap (724). The composite face insert (710) has a variable thickness and is adhesively or mechanically attached to the insert car (726) located within the front opening and connected to the front opening inner wall (714). The insert car (726) and the composite face insert (710) can be of the type described in, e.g., U.S. patents application Ser. Nos. 11/825,138, 11/960,609, and 11/960,610, and U.S. Pat. Nos. 7,267,620, RE42,544, 7,874,936, 7,874,937, 7,985,146, and 8,096,897 which are incorporated by reference herein in their entirety.

FIG. 40B further shows a heel opening (730) located in the heel region (706) of the club head (100). A fastening member (728) is inserted into the heel opening (730) to secure a sleeve (708) in a locked position as shown. The sleeve (708) is configured to be attached (e.g., by bonding) to the distal end of a shaft, to thereby provide a user-adjustable head-shaft connection assembly. In certain embodiments, the sleeve (708) can have any of several specific design parameters and is capable of providing various face angle and loft angle orientations as described in, for example, U.S. patent application Ser. No. 12/474,973 and U.S. Pat. Nos. 7,887,431 and 8,303,431, which are incorporated by reference herein in their entirety.

According to several additional embodiments, a desired combination of a relatively large projected area of the face portion ($A_f$) and relatively large 8 mm drop contour area (CA) may be obtained by the provision of thin wall construction for one or more parts of the golf club head. Among other advantages, thin wall construction facilitates the redistribution of material from one part of a club head to another part of the club head. Because the redistributed material has a certain mass, the material may be redistributed to locations in the golf club head to enhance performance parameters related to mass distribution, such as CG location and moment of inertia magnitude. Club head material that is capable of being redistributed without affecting the structural integrity of the club head is commonly called discretionary weight. In some embodiments of the presently described high volume aerodynamic golf club head, thin wall construction enables discretionary weight to be removed from one or a combination of the striking plate, crown, skirt, or sole and redistributed in the form of weight ports and corresponding weights.

Thin wall construction can include a thin sole construction, e.g., a sole with a thickness less than about 0.9 mm but greater than about 0.4 mm over at least about 50% of the sole surface area; and/or a thin skirt construction, e.g., a skirt with a thickness less than about 0.8 mm but greater than about 0.4 mm over at least about 50% of the skirt surface area; and/or a thin crown construction, e.g., a crown with a thickness less than about 0.8 mm but greater than about 0.4 mm over at least about 50% of the crown surface area. In one embodiment, the club head is made of titanium and has a thickness less than 0.65 mm over at least 50% of the crown in order to free up enough weight to achieve the desired CG location.

The thin wall construction can be described according to areal weight as defined by the equation below:

$$AW = \rho \cdot t$$

In the above equation, AW is defined as areal weight, ρ is defined as density, and t is defined as the thickness of the material. In one exemplary embodiment, the golf club head is made of a material having a density, ρ, of about 4.5 g/cm$^3$ or less. In one embodiment, the thickness of a crown or sole portion is between about 0.04 cm and about 0.09 cm. Therefore the areal weight of the crown or sole portion is between about 0.18 g/cm$^2$ and about 0.41 g/cm$^2$. In some embodiments, the areal weight of the crown or sole portion is less than 0.41 g/cm$^2$ over at least about 50% of the crown or sole surface area. In other embodiments, the areal weight of the crown or sole is less than about 0.36 g/cm$^2$ over at least about 50% of the entire crown or sole surface area.

In certain embodiments, the thin wall construction may be implemented according to U.S. patent application Ser. No. 11/870,913 and/or U.S. Pat. No. 7,186,190, which are incorporated by reference herein in their entirety.

Several of the features of the high volume aerodynamic golf club heads described herein—including the provision of a relatively large projected area of the face portion ($A_f$) and relatively large 8 mm drop contour area (CA)—will tend to cause the location of the center of gravity (CG) to be relatively higher (i.e., larger Ycg value) than a comparably constructed golf club head that does not include these features. Through the provision of one or more of the features described above, such as a lightweight face and/or lightweight construction in other parts of the golf club head, along with relocation of discretionary weight to other parts of the club head, several embodiments of the presently described high volume aerodynamic golf club heads may obtain a desirable downward shift in the location of the center of gravity (CG).

As noted above, the hollow body (110) has center of gravity coordinates (Xcg, Ycg, Zcg) that are described with reference to the origin point, seen in FIG. 8. Alternatively, the location of the vertical component of the center of gravity may be designated by reference to a "horizontal center face plane" (HCFP), which is defined herein as a horizontal plane (i.e., a plane parallel to the ground plane) that passes through the center of the face (200) when the club head is positioned in its design orientation. A vertical component of the location of the center of gravity may be expressed as Vcg, which is the distance of the center of gravity (CG) from the horizontal center face plane (HCFP) in a direction orthogonal to the ground plane (GP). Positive values for Vcg indicate a center of gravity (CG) location above the horizontal center face plane (HCFP), while negative values for Vcg indicate a center of gravity (CG) location below the horizontal center face plane (HCFP). Using this alternative designation, in some embodiments, the hollow body (110) of the high volume aerodynamic golf club head is provided with a center of gravity (CG) such that Vcg≤0, such as Vcg≤−0.08 inch, such as Vcg≤−0.16 inch.

Several of the high volume aerodynamic golf club embodiments described above in relation to FIGS. 26-40 may also include one or more of the same club head shape and performance features contained in the embodiments described above in relation to FIGS. 7-13. For example, as with the prior embodiments, several of the embodiments containing the large projected area of the face portion ($A_f$) and large 8 mm drop contour area (CA) may also include a front-to-back dimension (FB) of at least 4.4 inches, such as at least about 4.6 inches, or at least about 4.75 inches. In addition, as with the prior embodiments, several of these embodiments may include a maximum top edge height (TEH) of at least about 2 inches, such as at least about 2.15 inches, and an apex ratio of the apex height (AH) to the maximum top edge height (TEH) of at least 1.13, such as at least 1.2, or at least 1.25.

The high volume aerodynamic golf club head (100) described in relation to FIGS. 26-40 may also have a head volume of at least 400 cc. Further embodiments may incorporate the various features of the above described embodiments and increase the club head volume to at least 440 cc, or even further to the current USGA limit of 460 cc. However, one skilled in the art will appreciate that the specific aerodynamic features are not limited to those club head sizes and will apply to even larger club head volumes.

Moreover, several embodiments of the high volume aerodynamic golf club head (100) described in relation to FIGS. 26-40 may also obtain a first moment of inertia (MOIy) about a vertical axis through a center of gravity (CG) of the golf club head (100) (see FIG. 7) that is at least 4000 g*cm$^2$. Further, several of these embodiments may obtain a second moment of inertia (MOIx) about a horizontal axis through the center of gravity (CG), as seen in FIG. 9, that is at least 2000 g*cm$^2$.

Still other embodiments of the high volume aerodynamic golf club head (100) described in relation to FIGS. 26-40 also have a crown section (400), at least a portion of which between the crown apex (410) and the front (112) may have an apex-to-front radius of curvature (Ra-f) that is less than about 3 inches, such as less than about 2.85 inches. In addition, some embodiments include at least a portion of the crown section between the crown apex (410) and the back (114) of the body that may have an apex-to-rear radius of curvature (Ra-r) that is less than 3.75 inches, and/or at least a portion of which has a heel-to-toe radius of curvature (Rh-t) that may be less than about 4 inches, such as less than about 3.85 inches. Moreover, still other embodiments include an apex-to-front radius of curvature (Ra-f) that may be at least 25% less than the apex-to-rear curvature (Ra-r). Still other embodiments may demonstrate the following relationship between the curvature radii at the following portions of the crown section (400): Ra-f<Ra-r<Rh-t.

Still other embodiments of the club head described in relation to FIGS. 26-40 may be constructed such that less than 10%—such as between 5% to 10%—of the club head volume is located above the elevation of the maximum top edge height (MTEH).

Several additional embodiments may include a crown apex setback dimension (412) that is less than 1.75 inches. Still other embodiments may include a crown apex (410) location that results in a crown apex ht dimension (414) that is greater than 30% of the HT dimension and less than 70% of the HT dimension, thereby aiding in reducing the period of airflow separation. In an even further embodiment, the crown apex (410) may be located in the heel-to-toe direction between the center of gravity (CG) and the toe (118).

Moreover, the high volume aerodynamic golf club head embodiments described above in relation to FIGS. 26-40 may also be provided with the post apex attachment promoting region (420) illustrated above in relation to FIGS. 18, 19, and 22, and having the lengths, widths, shapes, and locations described above in relation to FIGS. 14-25. Still further, these embodiments of the high volume aerodynamic golf club head may also be provided with the skirt profiles (550) described above in relation to FIGS. 21-25.

All of the previously described aerodynamic characteristics with respect to the crown section (400) apply equally to the sole section (300) of the high volume aerodynamic golf club head (100). In other words, one skilled in the art will appreciate that just like the crown section (400) has a crown apex (410), the sole section (300) may have a sole apex. Likewise, the three radii of the crown section (400) may just as easily be three radii of the sole section (300). Thus, all of the embodiments described herein with respect to the crown section (400) are incorporated by reference with respect to the sole section (300).

The various parts of the golf club head (100) may be made from any suitable or desired materials without departing from the claimed club head (100), including conventional metallic and nonmetallic materials known and used in the art, such as steel (including stainless steel), titanium alloys, magnesium alloys, aluminum alloys, carbon fiber composite materials, glass fiber composite materials, carbon pre-preg materials, polymeric materials, and the like. The various sections of the club head (100) may be produced in any suitable or desired manner without departing from the claimed club head (100), including in conventional manners known and used in the art, such as by casting, forging, molding (e.g., injection or blow molding), etc. The various sections may be held together as a unitary structure in any suitable or desired manner, including in conventional manners known and used in the art, such as using mechanical connectors, adhesives, cements, welding, brazing, soldering, bonding, and other known material joining techniques. Additionally, the various sections of the golf club head (100) may be constructed from one or more individual pieces, optionally pieces made from different materials having different densities, without departing from the claimed club head (100).

Until noted otherwise, the element numbers in the following disclosure is directed to FIGS. 109-115, but will be understood to apply to all figures. As illustrated in FIGS. 109-115, a wood-type (e.g., driver or fairway wood) golf club head, such as golf club head 2, includes a hollow body 10. The body 10 includes a crown 12, a sole 14, a skirt 16, a striking face, or face portion, 18 defining an interior cavity. The body 10 can include a hosel 20, which defines a hosel bore 24 adapted to receive a golf club shaft (see FIG. 114). The body 10 further includes a heel portion 26, a toe portion 28, a front portion 30, and a rear portion 32. The club head 2 also has a volume, typically measured in cubic-centimeters ($cm^3$), equal to the volumetric displacement of the club head 2. In some implementations, the golf club head 2 has a volume between approximately 400 $cm^3$ and approximately 490 $cm^3$, and a total mass between approximately 185 g and approximately 215 g. Referring to FIG. 1, in one specific implementation, the golf club head 2 has a volume of approximately 458 $cm^3$ and a total mass of approximately 200 g.

Figure 114:
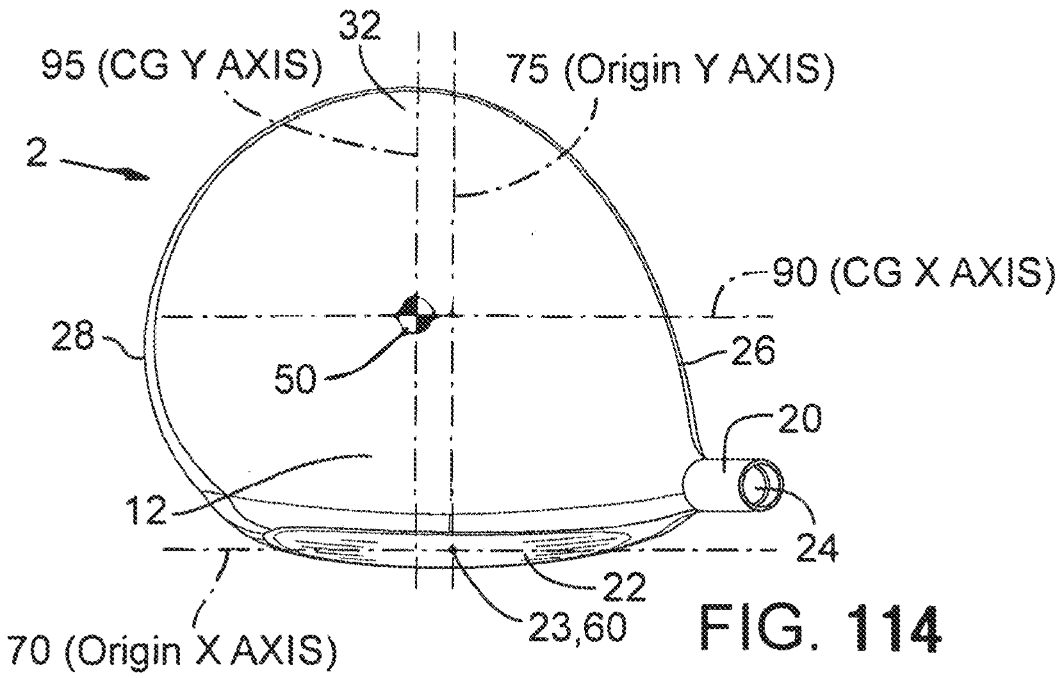

The crown 12 is defined as an upper portion of the club head (1) above a peripheral outline 34 of the club head as viewed from a top-down direction; and (2) rearwards of the topmost portion of a ball striking surface 22 of the striking face 18 (see FIG. 114). The striking surface 22 is defined as a front or external surface of the striking face 18 and is adapted for impacting a golf ball (not shown).

A golf club head, such as the club head 2, is at its proper address position when the longitudinal axis 21 of the hosel 20 or shaft is substantially normal to the target direction and at the proper lie angle such that the scorelines are substantially horizontal (e.g., approximately parallel to the ground plane 17) and the face angle relative to target line is substantially square (e.g., the horizontal component of a vector normal to the geometric center of the striking surface 22 substantially points towards the target line). If the faceplate 18 does not have horizontal scorelines, then the proper lie angle is set at an approximately 60-degrees. The loft angle 15 is the angle defined between a face plane 27, defined as the plane tangent to an ideal impact location 23 on the striking surface 22, and a vertical plane 29 relative to the ground 17 when the club head 2 is at proper address position. Lie angle 19 is the angle defined between a longitudinal axis 21 of the hosel 20 or shaft and the ground 17 when the club head 2 is at proper address position. The ground, as used herein, is assumed to be a level plane.

The skirt 16 includes a side portion of the club head 2 between the crown 12 and the sole 14 that extends across a periphery 34 of the club head, excluding the striking surface 22, from the toe portion 28, around the rear portion 32, to the heel portion 26.

Figure 112:
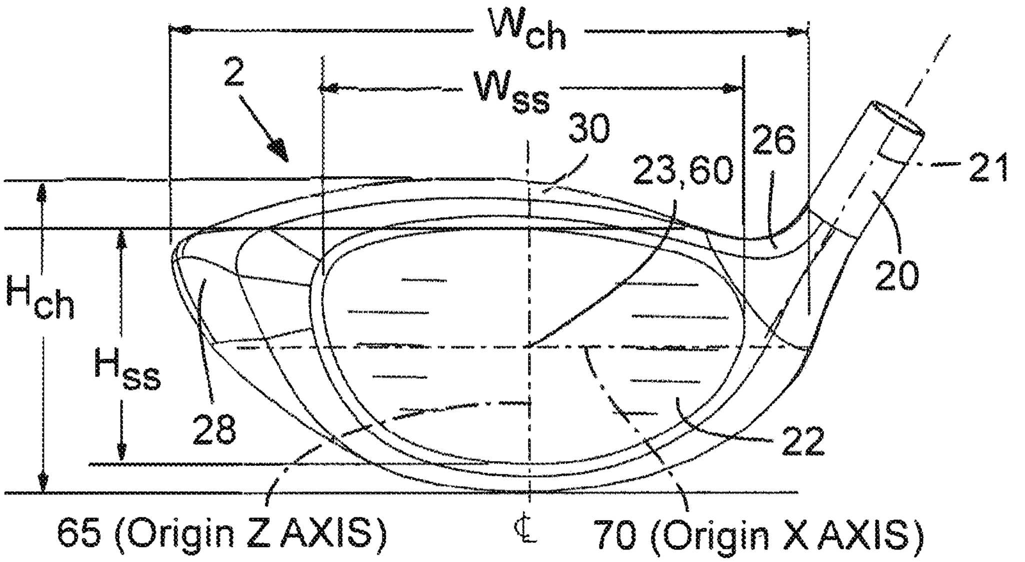

In the illustrated embodiment, the ideal impact location 23 of the golf club head 2 is disposed at the geometric center of the striking surface 22 (see FIG. 112). The ideal impact location 23 is typically defined as the intersection of the midpoints of a height (Hss) and width (Wss) of the striking surface 22. Both Hss and Wss are determined using the striking face curve (Sss). The striking face curve is bounded on its periphery by all points where the face transitions from a substantially uniform bulge radius (face heel-to-toe radius of curvature) and a substantially uniform roll radius (face crown-to-sole radius of curvature) to the body (see e.g., FIG. 112). In the illustrated example, Hss is the distance from the periphery proximate to the sole portion of Sss to the perhiphery proximate to the crown portion of Sss measured in a vertical plane (perpendicular to ground) that extends through the geometric center of the face (e.g., this plane is substantially normal to the x-axis). Similarly, Wss is the distance from the periphery proximate to the heel portion of Sss to the periphery proximate to the toe portion of Sss measured in a horizontal plane (e.g., substantially parallel to ground) that extends through the geometric center of the face (e.g., this plane is substantially normal to the z-axis). See USGA "Procedure for Measuring the Flexibility of a Golf Clubhead," Revision 2.0 for the methodology to measure the geometric center of the striking face. In some implementations, the golf club head face, or striking surface, 22, has a height (Hss) between approximately 45 mm and approximately 65 mm, and a width (Wss) between approximately 75 mm and approximately 105 mm.

Figure 113:
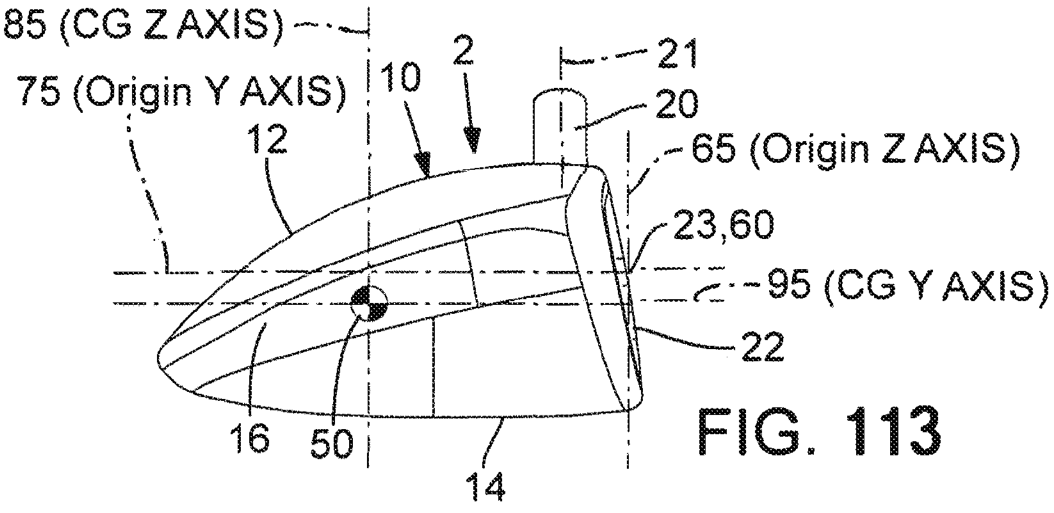

A club head origin coordinate system may be defined such that the location of various features of the club head (including, e.g., a club head center-of-gravity (CG) 50 (see FIGS. 113 and 114)) can be determined. Referring to FIGS. 112-114, a club head origin 60 is represented on club head 2. The club head origin 60 is positioned at the ideal impact location 23, or geometric center, of the striking surface 22.

Referring to FIGS. 113 and 114, the head origin coordinate system, as defined with respect to the head origin 60, includes three axes: a z-axis 65 extending through the head origin 60 in a generally vertical direction relative to the ground 17 when the club head 2 is at the address position; an x-axis 70 extending through the head origin 60 in a toe-to-heel direction generally parallel to the striking surface 22, i.e., generally tangential to the striking surface 22 at the ideal impact location 23, and generally perpendicular to the z-axis 65; and a y-axis 75 extending through the head origin 60 in a front-to-back direction and generally perpendicular to the x-axis 70 and to the z-axis 65. The x-axis 70 and the y-axis 75 both extend in generally horizontal directions relative to the ground 17 when the club head 2 is at the address position. The x-axis 70 extends in a positive direction from the origin 60 to the heel 26 of the club head 2. The y-axis 75 extends in a positive direction from the origin 60 towards the rear portion 32 of the club head 2. The z-axis 65 extends in a positive direction from the origin 60 towards the crown 12.

Referring to FIG. 112, club head 2 has a maximum club head height (Hch) defined as the distance between the lowest and highest points on the outer surface of the body 10 measured along an axis parallel to the z-axis when the club head 2 is at proper address position; a maximum club head width (Wch) defined as the distance between the maximum extents of the heel and toe portions 26, 28 of the body measured along an axis parallel to the x-axis when the club head 2 is at proper address position; and a maximum club head depth (Dch), or length, defined as the distance between the forwardmost and rearwardmost points on the surface of the body 10 measured along an axis parallel to the y-axis when the club head 2 is at proper address position. The height and width of club head 2 is measured according to the USGA "Procedure for Measuring the Clubhead Size of Wood Clubs" Revision 1.0. In some implementations, the golf club head 2 has a height (Hch) between approximately 48 mm and approximately 72 mm, a width (Wch) between approximately 100 mm and approximately 130 mm, and a depth (Dch) between approximately 100 mm and approximately 130 mm.

Referring to FIGS. 113 and 114, golf club head moments of inertia are typically defined about three axes extending through the golf club head CG 50: (1) a CG z-axis 85 extending through the CG 50 in a generally vertical direction relative to the ground 17 when the club head 2 is at address position; (2) a CG x-axis 90 extending through the CG 50 in a heel-to-toe direction generally parallel to the striking surface 22 and generally perpendicular to the CG z-axis 85; and (3) a CG y-axis 95 extending through the CG 50 in a front-to-back direction and generally perpendicular to the CG x-axis 90 and the CG z-axis 85. The CG x-axis 90 and the CG y-axis 95 both extend in a generally horizontal direction relative to the ground 17 when the club head 2 is at the address position.

A moment of inertia about the golf club head CG x-axis 90 is calculated by the following equation $$Ixx = \int (y^2 + z^2)\mathrm{dm}$$

where y is the distance from a golf club head CG xz-plane to an infinitesimal mass dm and z is the distance from a golf club head CG xy-plane to the infinitesimal mass dm. The golf club head CG xz-plane is a plane defined by the golf club head CG x-axis 90 and the golf club head CG z-axis 85. The CG xy-plane is a plane defined by the golf club head CG x-axis 90 and the golf club head CG y-axis 95.

A moment of inertia about the golf club head CG z-axis 85 is calculated by the following equation $$I_{zz} = \int (x^2 + y^2)\mathrm{dm}$$

where x is the distance from a golf club head CG yz-plane to an infinitesimal mass dm and y is the distance from the golf club head CG xz-plane to the infinitesimal mass dm. The golf club head CG yz-plane is a plane defined by the golf club head CG y-axis 95 and the golf club head CG z-axis 85.

As the moment of inertia about the CG z-axis (Izz) is an indication of the ability of a golf club head to resist twisting about the CG z-axis, the moment of inertia about the CG x-axis (Ixx) is an indication of the ability of the golf club head to resist twisting about the CG x-axis. The higher the moment of inertia about the CG x-axis (Ixx), the greater the forgiveness of the golf club head on high and low off-center impacts with a golf ball. In other words, a golf ball hit by a golf club head on a location of the striking surface 18 above the ideal impact location 23 causes the golf club head to twist upwardly and the golf ball to have a higher trajectory than desired. Similarly, a golf ball hit by a golf club head on a location of the striking surface 18 below the ideal impact location 23 causes the golf club head to twist downwardly and the golf ball to have a lower trajectory than desired. Increasing the moment of inertia about the CG x-axis (Ixx) reduces upward and downward twisting of the golf club head to reduce the negative effects of high and low off-center impacts.

In some implementations, the striking surface 122 golf club head 100 has a height (Hss) between approximately 45 mm and approximately 65 mm, and a width (Wss) between approximately 75 mm and approximately 105 mm. In one specific implementation, the striking face 122 has a height (Hss) of approximately 54.4 mm, width (Wss) of approximately 90.6 mm, and total striking surface area of approximately 4,098 $mm^2$.

In some implementations, the golf club head 100 has a height (Hch) between approximately 48 mm and approximately 72 mm, a width (Wch) between approximately 100 mm and approximately 130 mm, and a depth (Dch) between approximately 100 mm and approximately 130 mm. In one specific implementation, the golf club head 100 has a height (Hch) of approximately 62.2 mm, width (Wch) of approximately 119.3 mm, and depth (Dch) of approximately 103.9 mm.

Figure 115:
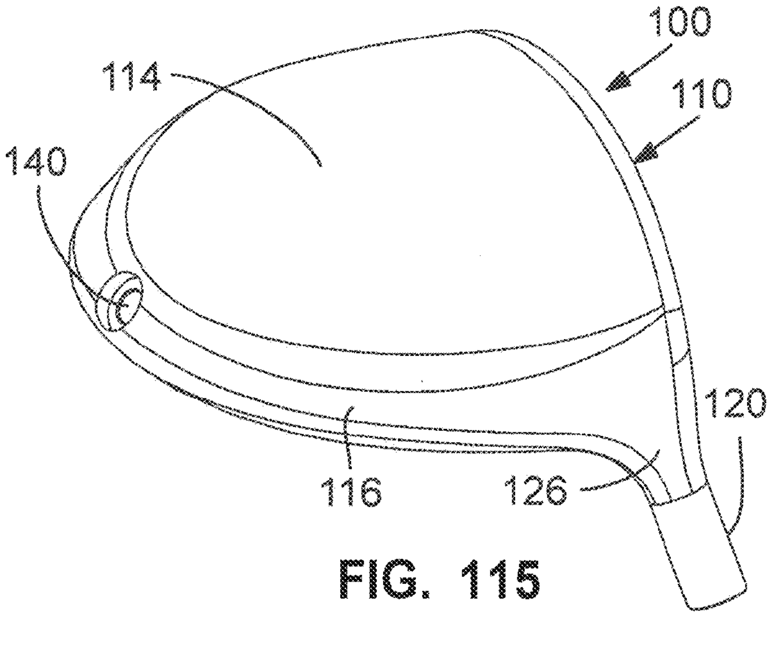

In at least one implementation, the golf club head 100 includes a weight port 140 formed in the skirt 116 proximate the rear portion 132 of the club head (see FIG. 115). The weight port 140 can have any of a number of various configurations to receive and retain any of a number of weights or weight assemblies, such as described in U.S. patents application Ser. Nos. 11/066,720 and 11/065,772, which are incorporated herein by reference.

Now having defined the coordinate system for CG location and definition of moments of inertia, we turn our attention away from FIGS. 109-115, and until noted otherwise, the element numbers in the following disclosure is directed to FIGS. 41A-108, but will be understood to apply to all figures.

As used herein, the singular forms "a," "an," and "the" refer to one or more than one, unless the context clearly dictates otherwise.

As used herein, the term "includes" means "comprises." For example, a device that includes or comprises A and B contains A and B but may optionally contain C or other components other than A and B. A device that includes or comprises A or B may contain A or B or A and B, and optionally one or more other components such as C.

Referring first to FIGS. 41A-41D, there is shown characteristic angles of golf clubs by way of reference to a golf club head 300 having a removable shaft 50, according to one embodiment. The club head 300 comprises a centerface, or striking face, 310, scorelines 320, a hosel 330 having a hosel opening 340, and a sole 350. The hosel 330 has a hosel longitudinal axis 60 and the shaft 50 has a shaft longitudinal axis. In the illustrated embodiment, the ideal impact location 312 of the golf club head 300 is disposed at the geometric center of the striking surface 310 (see FIG. 41A). The ideal impact location 312 is typically defined as the intersection of the midpoints of a height (Hss) and width (Wss) of the striking surface 310.

Both Hss and Wss are determined using the striking face curve (Sss). The striking face curve is bounded on its periphery by all points where the face transitions from a substantially uniform bulge radius (face heel-to-toe radius of curvature) and a substantially uniform roll radius (face crown-to-sole radius of curvature) to the body (see e.g., FIG. 41). In the illustrated example, Hss is the distance from the periphery proximate the sole portion of Sss to the perhiphery proximate the crown portion of Sss measured in a vertical plane (perpendicular to ground) that extends through the geometric center of the face. Similarly, Wss is the distance from the periphery proximate the heel portion of Sss to the periphery proximate the toe portion of Sss measured in a horizontal plane (e.g., substantially parallel to ground) that extends through the geometric center of the face. See USGA "Procedure for Measuring the Flexibility of a Golf Clubhead," Revision 2.0 for the methodology to measure the geometric center of the striking face.

Figure 41A:
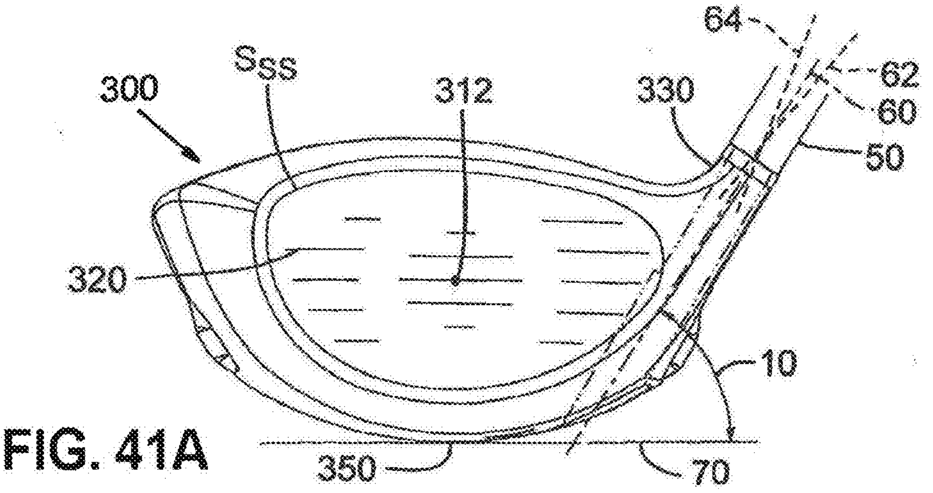
FIG. 41A is a front elevational view of a golf club head in accordance with one embodiment.

As shown in FIG. 41A, a lie angle 10 (also referred to as the "scoreline lie angle") is defined as the angle between the hosel longitudinal axis 60 and a playing surface 70 when the club is in the grounded address position. The grounded address position is defined as the resting position of the head on the playing surface when the shaft is supported at the grip (free to rotate about its axis) and the shaft is held at an angle to the ground such that the scorelines 320 are horizontal (if the club does not have scorelines, then the lie shall be set at 60-degrees). The centerface target line vector is defined as a horizontal vector which is perpendicular to the shaft when the club is in the address position and points outward from the centerface point. The target line plane is defined as a vertical plane which contains the centerface target line vector. The square face address position is defined as the head position when the sole is lifted off the ground, and the shaft is held (both positionally and rotationally) such that the scorelines are horizontal and the centerface normal vector completely lies in the target line plane (if the head has no scorelines, then the shaft shall be held at 60-degrees relative to ground and then the head rotated about the shaft axis until the centerface normal vector completely lies in the target line plane). The actual, or measured, lie angle can be defined as the angle 10 between the hosel longitudinal axis 60 and the playing surface 70, whether or not the club is held in the grounded address position with the scorelines horizontal. Studies have shown that most golfers address the ball with actual lie angle that is 10 to 20 degrees less than the intended scoreline lie angle 10 of the club. The studies have also shown that for most golfers the actual lie angle at impact is between 0 and 10 degrees less than the intended scoreline lie angle 10 of the club.

Figure 41B:
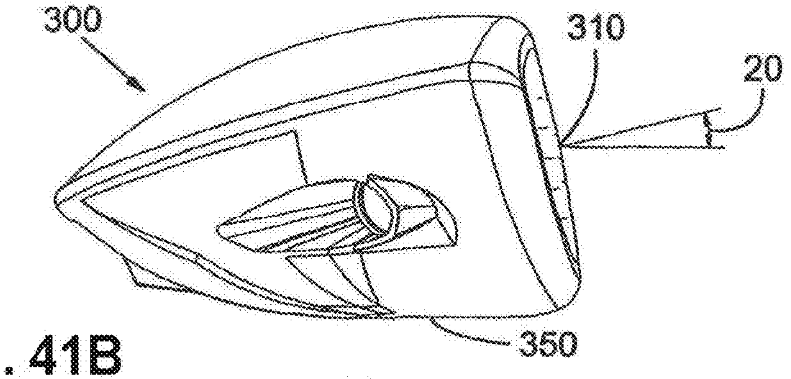
FIG. 41B is a side elevational view of the golf club head of FIG. 41A.

As shown in FIG. 41B, a loft angle 20 of the club head (referred to as "square loft") is defined as the angle between the centerface normal vector and the ground plane when the head is in the square face address position. As shown in FIG. 41D, a hosel loft angle 72 is defined as the angle between the hosel longitudinal axis 60 projected onto the target line plane and a plane 74 that is tangent to the center of the centerface. The shaft loft angle is the angle between plane 74 and the longitudinal axis of the shaft 50 projected onto the target line plane. The "grounded loft" 80 of the club head is the vertical angle of the centerface normal vector when the club is in the grounded address position (i.e., when the sole 350 is resting on the ground), or stated differently, the angle between the plane 74 of the centerface and a vertical plane when the club is in the grounded address position.

Figure 41C:
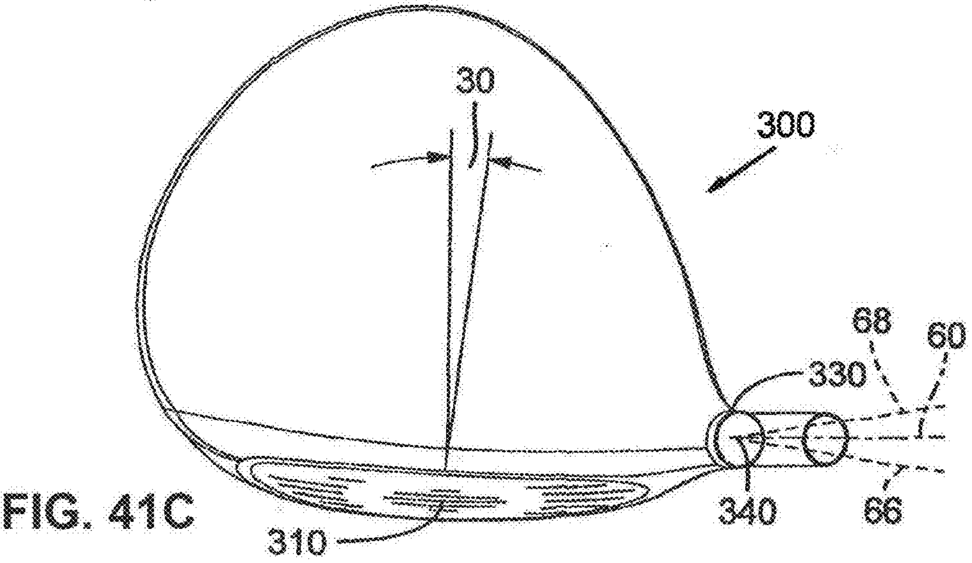
FIG. 41C is a top plan view of the golf club head of FIG. 41A.
Figure 41D:
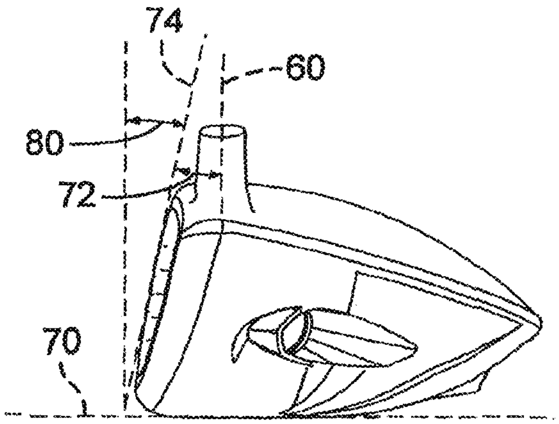
FIG. 41D is a side elevational view of the golf club head of FIG. 41A.

As shown in FIG. 41C, a face angle 30 is defined by the horizontal component of the centerface normal vector and a vertical plane ("target line plane") that is normal to the vertical plane which contains the shaft longitudinal axis when the shaft 50 is in the correct lie (i.e., typically 60 degrees+/−5 degrees) and the sole 350 is resting on the playing surface 70 (the club is in the grounded address position).

The lie angle 10 and/or the shaft loft can be modified by adjusting the position of the shaft 50 relative to the club head. Traditionally, adjusting the position of the shaft has been accomplished by bending the shaft and the hosel relative to the club head. As shown in FIG. 41A, the lie angle 10 can be increased by bending the shaft and the hosel inward toward the club head 300, as depicted by shaft longitudinal axis 64. The lie angle 10 can be decreased by bending the shaft and the hosel outward from the club head 300, as depicted by shaft longitudinal axis 62. As shown in FIG. 41C, bending the shaft and the hosel forward toward the striking face 310, as depicted by shaft longitudinal axis 66, increases the shaft loft. Bending the shaft and the hosel rearward toward the rear of the club head, as depicted by shaft longitudinal axis 68, decreases the shaft loft. It should be noted that in a conventional club the shaft loft typically is the same as the hosel loft because both the shaft and the hosel are bent relative to the club head. In certain embodiments disclosed herein, the position of the shaft can be adjusted relative to the hosel to adjust shaft loft. In such cases, the shaft loft of the club is adjusted while the hosel loft is unchanged.

Adjusting the shaft loft is effective to adjust the square loft of the club by the same amount. Similarly, when shaft loft is adjusted and the club head is placed in the address position, the face angle of the club head increases or decreases in proportion to the change in shaft loft. Hence, shaft loft is adjusted to effect changes in square loft and face angle. In addition, the shaft and the hosel can be bent to adjust the lie angle and the shaft loft (and therefore the square loft and the face angle) by bending the shaft and the hosel in a first direction inward or outward relative to the club head to adjust the lie angle and in a second direction forward or rearward relative to the club head to adjust the shaft loft.

Head-Shaft Connection Assembly

Figures 42, 44:
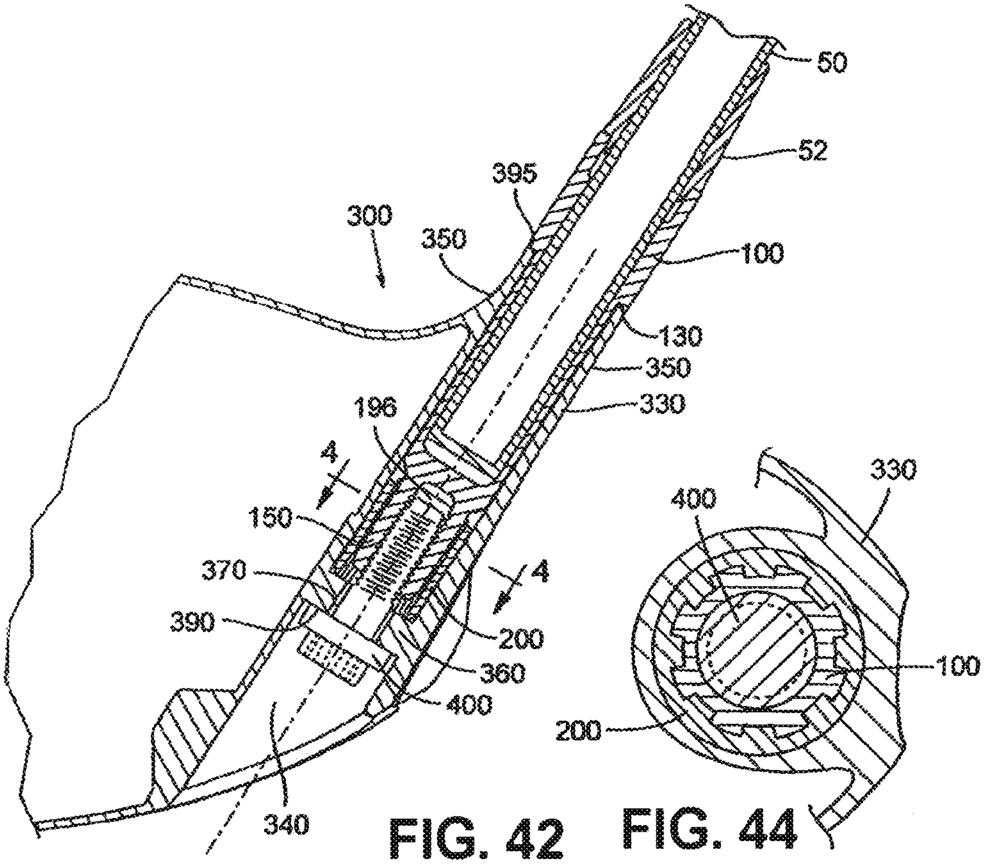
FIG. 42 is a cross-sectional view of a golf club head having a removable shaft, in accordance with one embodiment.
FIG. 44 is a cross-sectional view of the golf club head of FIG. 42, taken along the line 4-4 of FIG. 42.
Figure 43:
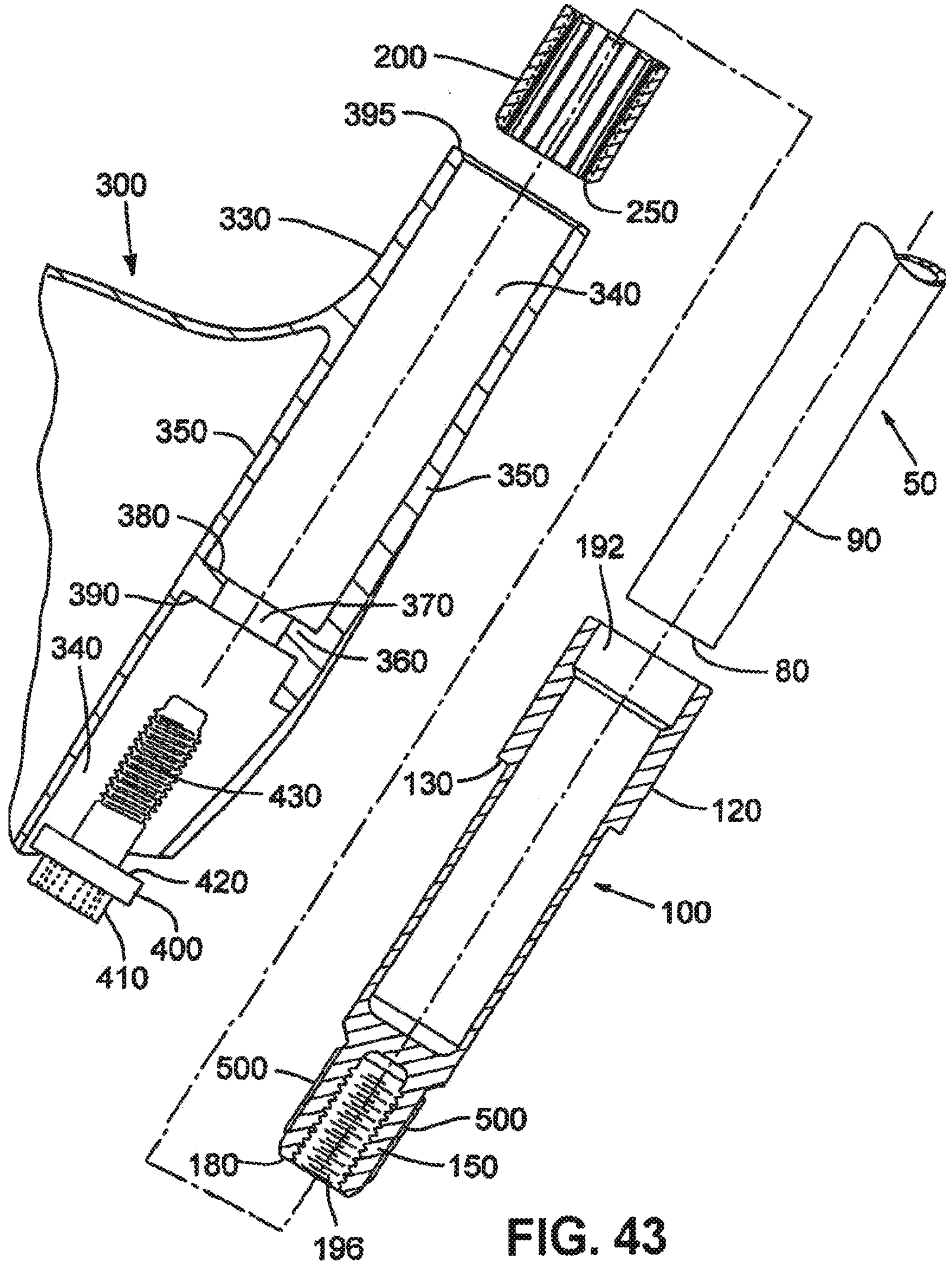
FIG. 43 is an exploded cross-sectional view of the shaft-club head connection assembly of FIG. 42.

Now with reference to FIGS. 42-44, there is shown a golf club comprising a golf club head 300 attached to a golf club shaft 50 via a removable head-shaft connection assembly, which generally comprises in the illustrated embodiment a shaft sleeve 100, a hosel insert 200 and a screw 400. The club head 300 is formed with a hosel opening, or passageway, 340 that extends from the hosel 330 through the club head and opens at the sole, or bottom surface, of the club head. Generally, the club head 300 is removably attached to the shaft 50 by the sleeve 100 (which is mounted to the lower end portion of the shaft 50) by inserting the sleeve 100 into the hosel opening 340 and the hosel insert 200 (which is mounted inside the hosel opening 340), and inserting the screw 400 upwardly through the opening in the sole and tightening the screw into a threaded opening of the sleeve, thereby securing the club head 300 to the sleeve 100.

By way of example, the club head 300 comprises the head of a "wood-type" golf club. All of the embodiments disclosed in the present specification can be implemented in all types of golf clubs, including but not limited to, drivers, fairway woods, utility clubs, putters, wedges, etc. As used herein, a shaft that is "removably attached" to a club head means that the shaft can be connected to the club head using one or more mechanical fasteners, such as a screw or threaded ferrule, without an adhesive, and the shaft can be disconnected and separated from the head by loosening or removing the one or more mechanical fasteners without the need to break an adhesive bond between two components.

The sleeve 100 is mounted to a lower, or tip end portion 90 of the shaft 50. The sleeve 100 can be adhesively bonded, welded or secured in equivalent fashion to the lower end portion of the shaft 50. In other embodiments, the sleeve 100 may be integrally formed as part of the shaft 50. As shown in FIG. 42, a ferrule 52 can be mounted to the end portion 90 of the shaft just above shaft sleeve 100 to provide a smooth transition between the shaft sleeve and the shaft and to conceal the glue line between the shaft and the sleeve. The ferrule also helps minimize tip breakage of the shaft.

As best shown in FIG. 43, the hosel opening 340 extends through the club head 300 and has hosel sidewalls 350. A flange 360 extends radially inward from the hosel sidewalls 350 and forms the bottom wall of the hosel opening. The flange defines a passageway 370, a flange upper surface 380 and a flange lower surface 390. The hosel insert 200 can be mounted within the hosel opening 340 with a bottom surface 250 of the insert contacting the flange upper surface 380. The hosel insert 200 can be adhesively bonded, welded, brazed or secured in another equivalent fashion to the hosel sidewalls 350 and/or the flange to secure the insert 200 in place. In other embodiments, the hosel insert 200 can be formed integrally with the club head 300 (e.g., the insert can be formed and/or machined directly in the hosel opening).

Figure 45:
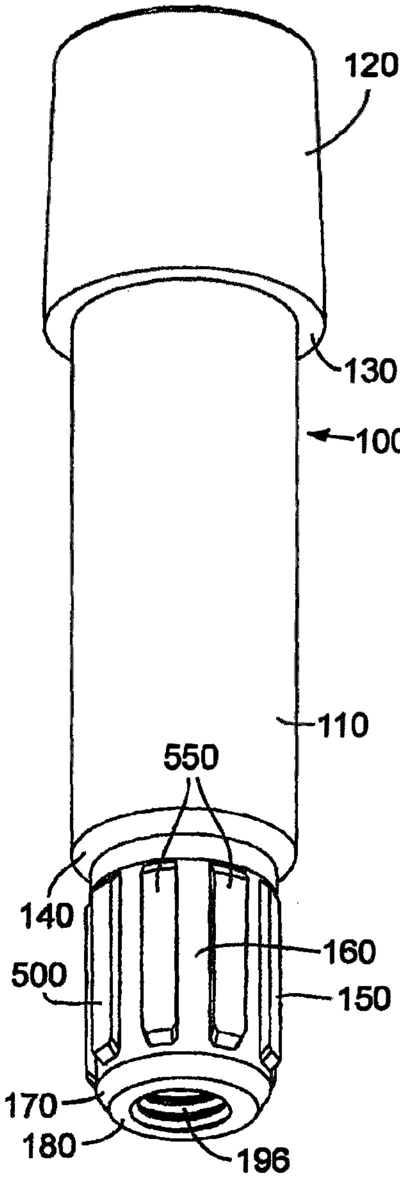
FIG. 45 is a perspective view of the shaft sleeve of the connection assembly shown in FIG. 42.
Figure 46:
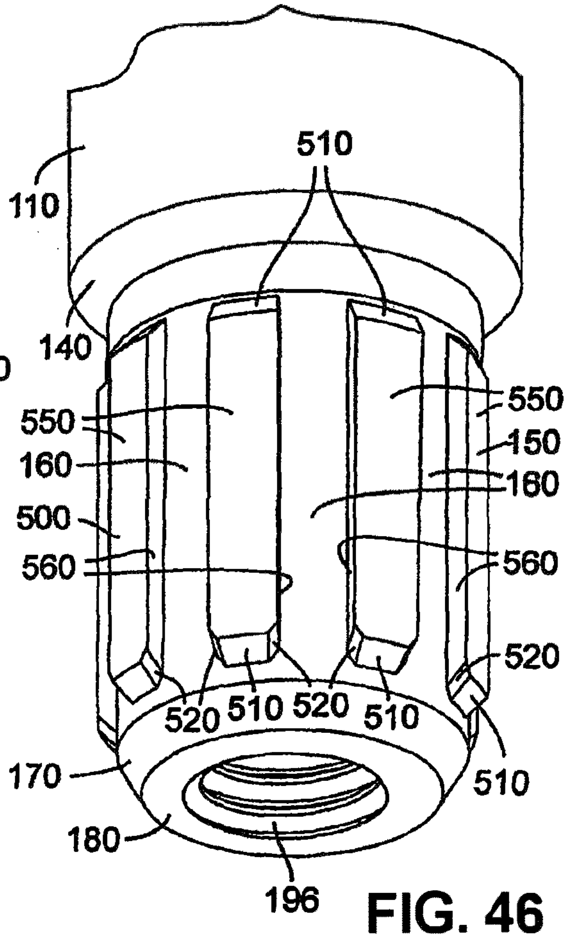
FIG. 46 is an enlarged perspective view of the lower portion of the sleeve of FIG. 45.
Figure 48:
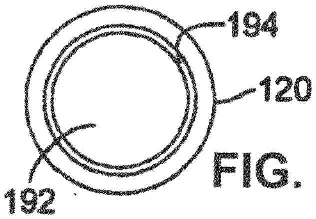
FIG. 48 is a top plan view of the sleeve of FIG. 45.

To restrict rotational movement of the shaft 50 relative to the head 300 when the club head 300 is attached to the shaft 50, the sleeve 100 has a rotation prevention portion that mates with a complementary rotation prevention portion of the insert 200. In the illustrated embodiment, for example, the shaft sleeve has a lower portion 150 having a non-circular configuration complementary to a non-circular configuration of the hosel insert 200. In this way, the sleeve lower portion 150 defines a keyed portion that is received by a keyway defined by the hosel insert 200. In particular embodiments, the rotational prevention portion of the sleeve comprises longitudinally extending external splines 500 formed on an external surface 160 of the sleeve lower portion 150, as illustrated in FIGS. 45-46 and the rotation prevention portion of the insert comprises complementary-configured internal splines 240, formed on an inner surface 250 of the hosel insert 200, as illustrated in FIGS. 51-54. In alternative embodiments, the rotation prevention portions can be elliptical, rectangular, hexagonal or various other non-circular configurations of the sleeve external surface 160 and a complementary non-circular configuration of the hosel insert inner surface 250.

In the illustrated embodiment of FIG. 43, the screw 400 comprises a head 410 having a surface 420, and threads 430. The screw 400 is used to secure the club head 300 to the shaft 50 by inserting the screw through passageway 370 and tightening the screw into a threaded bottom opening 196 in the sleeve 100. In other embodiments, the club head 300 can be secured to the shaft 50 by other mechanical fasteners. When the screw 400 is fully engaged with the sleeve 100, the head surface 420 contacts the flange lower surface 390 and an annular thrust surface 130 of the sleeve 100 contacts a hosel upper surface 395 (FIG. 42). The sleeve 100, the hosel insert 200, the sleeve lower opening 196, the hosel opening 340 and the screw 400 in the illustrated example are co-axially aligned.

It is desirable that a golf club employing a removable club head-shaft connection assembly as described in the present application have substantially similar weight and distribution of mass as an equivalent conventional golf club so that the golf club employing a removable shaft has the same "feel" as the conventional club. Thus, it is desired that the various components of the connection assembly (e.g., the sleeve 100, the hosel insert 200 and the screw 400) are constructed from light-weight, high-strength metals and/or alloys (e.g., T6 temper aluminum alloy 7075, grade 5 6Al-4V titanium alloy, etc.) and designed with an eye towards conserving mass that can be used elsewhere in the golf club to enhance desirable golf club characteristics (e.g., increasing the size of the "sweet spot" of the club head or shifting the center of gravity to optimize launch conditions).

The golf club having an interchangeable shaft and club head as described in the present application provides a golfer with a club that can be easily modified to suit the particular needs or playing style of the golfer. A golfer can replace the club head 300 with another club head having desired characteristics (e.g., different loft angle, larger face area, etc.) by simply unscrewing the screw 400 from the sleeve 100, replacing the club head and then screwing the screw 400 back into the sleeve 100. The shaft 50 similarly can be exchanged. In some embodiments, the sleeve 100 can be removed from the shaft 50 and mounted on the new shaft, or the new shaft can have another sleeve already mounted on or formed integral to the end of the shaft.

In particular embodiments, any number of shafts are provided with the same sleeve and any number of club heads is provided with the same hosel configuration and hosel insert 200 to receive any of the shafts. In this manner, a pro shop or retailer can stock a variety of different shafts and club heads that are interchangeable. A club or a set of clubs that is customized to suit the needs of a consumer can be immediately assembled at the retail location.

With reference now to FIGS. 45-50, there is shown the sleeve 100 of the club head-shaft connection assembly of FIGS. 42-44. The sleeve 100 in the illustrated embodiment is substantially cylindrical and desirably is made from a light-weight, high-strength material (e.g., T6 temper aluminum alloy 7075). The sleeve 100 includes a middle portion 110, an upper portion 120 and a lower portion 150. The upper portion 120 can have a wider thickness than the remainder of the sleeve as shown to provide, for example, additional mechanical integrity to the connection between the shaft 50 and the sleeve 100. In other embodiments, the upper portion 120 may have a flared or frustroconical shape, to provide, for example, a more streamlined transition between the shaft 50 and club head 300. The boundary between the upper portion 120 and the middle portion 110 comprises an upper annular thrust surface 130 and the boundary between the middle portion 110 and the lower portion 150 comprises a lower annular surface 140. In the illustrated embodiment, the annular surface 130 is perpendicular to the external surface of the middle portion 110. In other embodiments, the annular surface 130 may be frustroconical or otherwise taper from the upper portion 120 to the middle portion 110. The annular surface 130 bears against the hosel upper surface 395 when the shaft 50 is secured to the club head 300.

Figure 47:
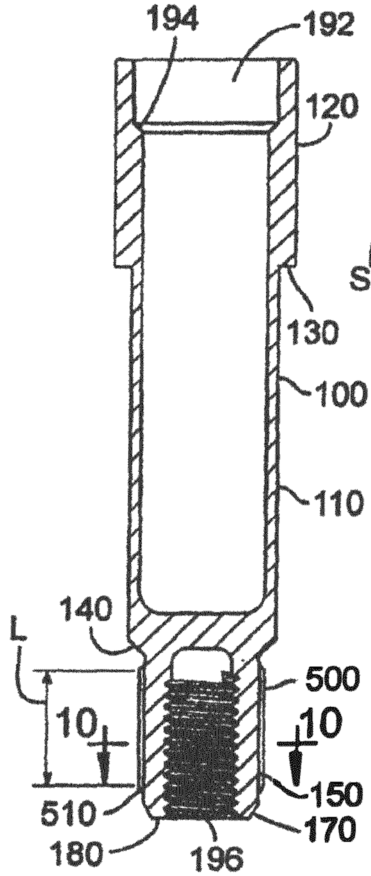
FIG. 47 is a cross-sectional view of the sleeve of FIG. 45.
Figure 49:
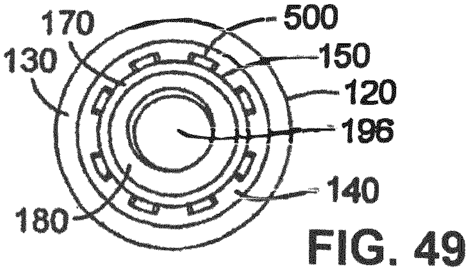
FIG. 49 is a bottom plan view of the sleeve of FIG. 45.

As shown in FIG. 47, the sleeve 100 further comprises an upper opening 192 for receiving the lower end portion 90 of the shaft 50 and an internally threaded opening 196 in the lower portion 150 for receiving the screw 400. In the illustrated embodiment, the upper opening 192 has an annular surface 194 configured to contact a corresponding surface 70 of the shaft 50 (FIG. 43). In other embodiments, the upper opening 192 can have a configuration adapted to mate with various shaft profiles (e.g., a constant inner diameter, plurality of stepped inner diameters, chamfered and/or perpendicular annular surfaces, etc.). With reference to the illustrated embodiment of FIG. 47, splines 500 are located below opening 192 (and therefore below the lower end of the shaft) to minimize the overall diameter of the sleeve. The threads in the lower opening 196 can be formed using a Spiralock® tap.

Figure 50:
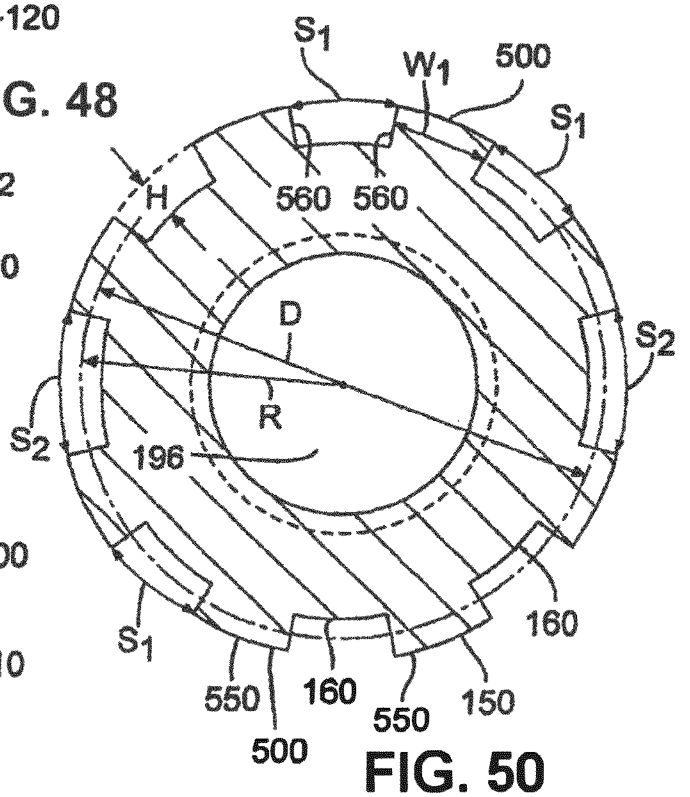
FIG. 50 is a cross-sectional view of the sleeve, taken along the line 10-10 of FIG. 47.

As noted above, the rotation prevention portion of the sleeve 100 for restricting relative rotation between the shaft and the club comprises a plurality of external splines 500 formed on an external surface of the lower portion 150 and gaps, or keyways, between adjacent splines 500. Each keyway has an outer surface 160. In the illustrated embodiment of FIGS. 45-46, 9-10, the sleeve comprises eight angularly spaced splines 500 elongated in a direction parallel to the longitudinal axis of the sleeve 100. Referring to FIGS. 46 and 50, each of the splines 500 in the illustrated configuration has a pair of sidewalls 560 extending radially outwardly from the external surface 160, beveled top and bottom edges 510, bottom chamfered corners 520 and an arcuate outer surface 550. The sidewalls 560 desirably diverge or flair moving in a radially outward direction so that the width of the spline near the outer surface 550 is greater than the width at the base of the spline (near surface 160). With reference to features depicted in FIG. 50, the splines 500 have a height H (the distance the sidewalls 550 extend radially from the external surface 160), and a width $W_1$ at the mid-span of the spline (the straight line distance extending between sidewalls 560 measured at locations of the sidewalls equidistant from the outer surface 550 and the surface 160). In other embodiments, the sleeve comprises more or fewer splines and the splines 500 can have different shapes and sizes.

Embodiments employing the spline configuration depicted in FIGS. 46-50 provide several advantages. For example, a sleeve having fewer, larger splines provides for greater interference between the sleeve and the hosel insert, which enhances resistance to stripping, increases the load-bearing area between the sleeve and the hosel insert and provides for splines that are mechanically stronger. Further, complexity of manufacturing may be reduced by avoiding the need to machine smaller spline features. For example, various Rosch-manufacturing techniques (e.g., rotary, thru-broach or blind-broach) may not be suitable for manufacturing sleeves or hosel inserts having more, smaller splines. In some embodiments, the splines 500 have a spline height H of between about 0.15 mm to about 1.0 mm with a height H of about 0.5 mm being a specific example and a spline width $W_1$ of between about 0.979 mm to about 2.87 mm, with a width $W_1$ of about 1.367 mm being a specific example.

The non-circular configuration of the sleeve lower portion 150 can be adapted to limit the manner in which the sleeve 100 is positionable within the hosel insert 200. In the illustrated embodiment of FIGS. 49-50, the splines 500 are substantially identical in shape and size. Six of the eight spaces between adjacent splines can have a spline-to-spline spacing $S_1$ and two diametrically-opposed spaces can have a spline-to-spline spacing $S_2$, where $S_2$ is a different than $S_1$ ($S_2$ is greater than $S_1$ in the illustrated embodiment). In the illustrated embodiment, the arc angle of $S_1$ is about 21 degrees and the arc angle of $S_2$ is about 33 degrees. This spline configuration allows the sleeve 100 to be dually positionable within the hosel insert 200 (i.e., the sleeve 100 can be inserted in the insert 200 at two positions, spaced 180 degrees from each other, relative to the insert). Alternatively, the splines can be equally spaced from each other around the longitudinal axis of the sleeve. In other embodiments, different non-circular configurations of the lower portion 150 (e.g., triangular, hexagonal, more of fewer splines) can provide for various degrees of positionability of the shaft sleeve.

The sleeve lower portion 150 can have a generally rougher outer surface relative to the remaining surfaces of the sleeve 100 in order to provide, for example, greater friction between the sleeve 100 and the hosel insert 200 to further restrict rotational movement between the shaft 50 and the club head 300. In particular embodiments, the external surface 160 can be roughened by sandblasting, although alternative methods or techniques can be used.

The general configuration of the sleeve 100 can vary from the configuration illustrated in FIGS. 45-50. In other embodiments, for example, the relative lengths of the upper portion 120, the middle portion 110 and the lower portion 150 can vary (e.g., the lower portion 150 could comprise a greater or lesser proportion of the overall sleeve length). In additional embodiments, additional sleeve surfaces could contact corresponding surfaces in the hosel insert 200 or hosel opening 340 when the club head 300 is attached to the shaft 50. For example, annular surface 140 of the sleeve may contact upper spline surfaces 230 of the hosel insert 200, annular surface 170 of the sleeve may contact a corresponding surface on an inner surface of the hosel insert 200, and/or a bottom face 180 of the sleeve may contact the flange upper surface 360. In additional embodiments, the lower opening 196 of the sleeve can be in communication with the upper opening 192, defining a continuous sleeve opening and reducing the weight of the sleeve 100 by removing the mass of material separating openings 196 and 192.

With reference now to FIGS. 51-54, the hosel insert 200 desirably is substantially tubular or cylindrical and can be made from a light-weight, high-strength material (e.g., grade 5 6Al-4V titanium alloy). The hosel insert 200 comprises an inner surface 250 having a non-circular configuration complementary to the non-circular configuration of the external surface of the sleeve lower portion 150. In the illustrated embodiment, the non-circulation configuration comprises splines 240 complementary in shape and size to the splines 500 of the sleeve 150. That is, there are eight splines 240 elongated in a direction parallel to the longitudinal axis of the hosel insert 200 and the splines 240 have sidewalls 260 extending radially inward from the inner surface 250, chamfered top edges 230 and an inner surface 270. The sidewalls 260 desirably taper or converge toward each other moving in a radially inward direction to mate with the flared splines 500 of the sleeve. The radially inward sidewalls 260 have at least one advantage in that full surface contact occurs between the teeth and the mating teeth of the sleeve insert. In addition, at least one advantage, is that the translational movement is more constrained within the assembly compared to other spline geometries having the same tolerance. Furthermore, the radially inward sidewalls 260 promote full sidewall engagement rather than localized contact resulting in higher stresses and lower durability.

Figure 53:
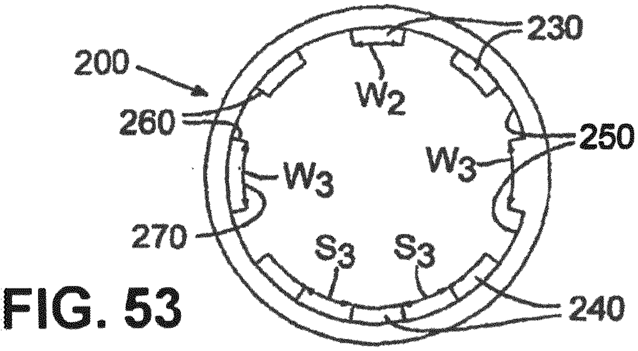
FIG. 53 is a top plan view of the hosel insert of FIG. 51.
Figure 51:
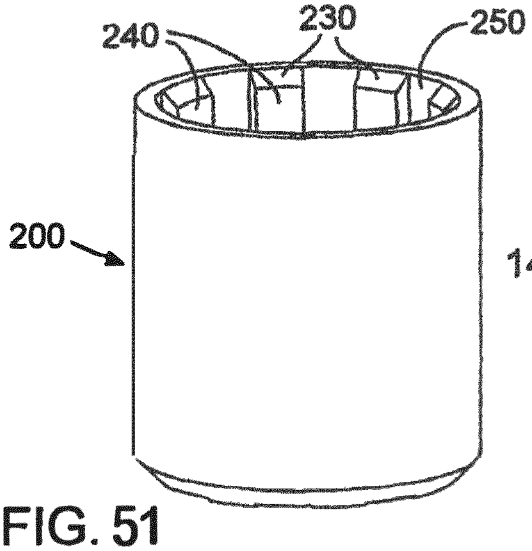
FIG. 51 is a perspective view of the hosel insert of the connection assembly shown in FIG. 42.
Figure 52:
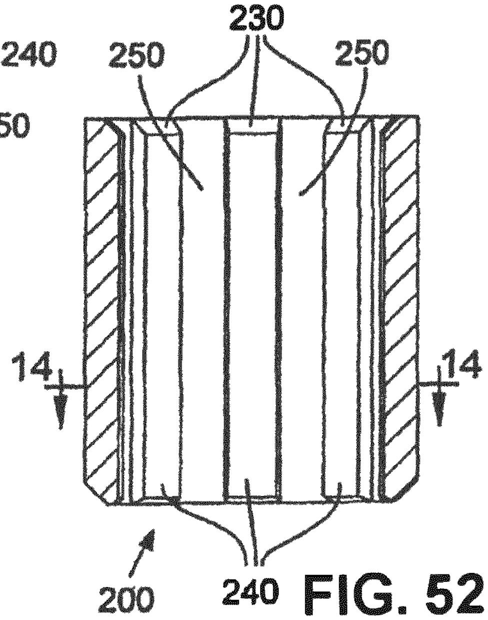
FIG. 52 is a cross-sectional view of the hosel insert of FIG. 42.
Figure 54:
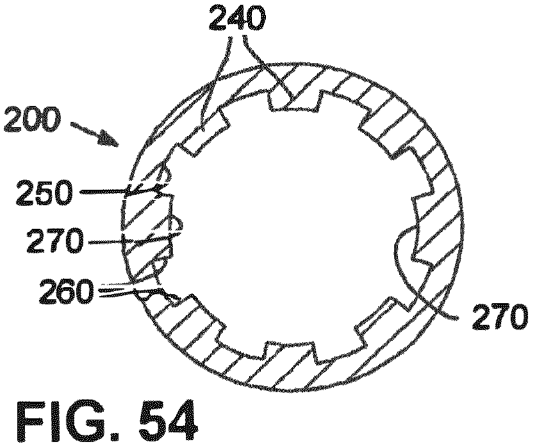
FIG. 54 is a cross-sectional view of the hosel insert of FIG. 42, taken along the line 14-14 of FIG. 52.

With reference to the features of FIG. 53, the spline configuration of the hosel insert is complementary to the spline configuration of the sleeve lower portion 150 and as such, adjacent pairs of splines 240 have a spline-to-spline spacing $S_3$ that is slightly greater than the width of the sleeve splines 500. Six of the splines 240 have a width $W_2$ slightly less than inter-spline spacing $S_1$ of the sleeve splines 500 and two diametrically-opposed splines have a width $W_3$ slightly less than inter-spline spacing $S_2$ of the sleeve splines 500, wherein $W_2$ is less than $W_3$. In additional embodiments, the hosel insert inner surface can have various non-circular configurations complementary to the non-circular configuration of the sleeve lower portion 160.

Selected surfaces of the hosel insert 200 can be roughened in a similar manner to the exterior surface 160 of the shaft. In some embodiments, the entire surface area of the insert can be provided with a roughened surface texture. In other embodiments, only the inner surface 240 of the hosel insert 200 can be roughened.

With reference now to FIGS. 42-44, the screw 400 desirably is made from a light-weight, high-strength material (e.g., T6 temper aluminum alloy 7075). In certain embodiments, the major diameter (i.e., outer diameter) of the threads 430 is less than 6 mm (e.g., ISO screws smaller than M6) and is either about 4 mm or 5 mm (e.g., M4 or M5 screws). In general, reducing the thread diameter increases the ability of the screw to elongate or stretch when placed under a load, resulting in a greater preload for a given torque. The use of relatively smaller diameter screws (e.g., M4 or M5 screws) allows a user to secure the club head to the shaft with less effort and allows the golfer to use the club for longer periods of time before having to retighten the screw.

Figure 55:
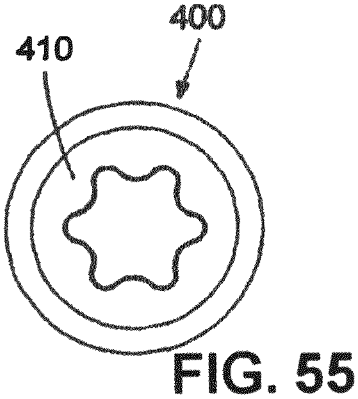
FIG. 55 is a bottom plan view of the screw of the connection assembly shown in FIG. 42.

The head 410 of the screw can be configured to be compatible with a torque wrench or other torque-limiting mechanism. In some embodiments, the screw head comprises a "hexalobular" internal driving feature (e.g., a TORX screw drive) (such as shown in FIG. 55) to facilitate application of a consistent torque to the screw and to resist cam-out of screwdrivers. Securing the club head 300 to the shaft 50 with a torque wrench can ensure that the screw 400 is placed under a substantially similar preload each time the club is assembled, ensuring that the club has substantially consistent playing characteristics each time the club is assembled. In additional embodiments, the screw head 410 can comprise various other drive designs (e.g., Phillips, Pozidriv, hexagonal, TTAP, etc.), and the user can use a conventional screwdriver rather than a torque wrench to tighten the screw.

The club head-shaft connection desirably has a low axial stiffness. The axial stiffness, k, of an element is defined as $$K=(E*A)/L$$

where E is the Young's modulus of the material of the element, A is the cross-sectional area of the element and L is the length of the element. The lower the axial stiffness of an element, the greater the element will elongate when placed in tension or shorten when placed in compression. A club head-shaft connection having low axial stiffness is desirable to maximize elongation of the screw 400 and the sleeve, allowing for greater preload to be applied to the screw 400 for better retaining the shaft to the club head. For example, with reference to FIG. 56, when the screw 400 is tightened into the sleeve lower opening 196, various surfaces of the sleeve 100, the hosel insert 200, the flange 360 and the screw 400 contact each other as previously described, which is effective to place the screw, the shaft, and the sleeve in tension and the hosel in compression.

Figure 56:
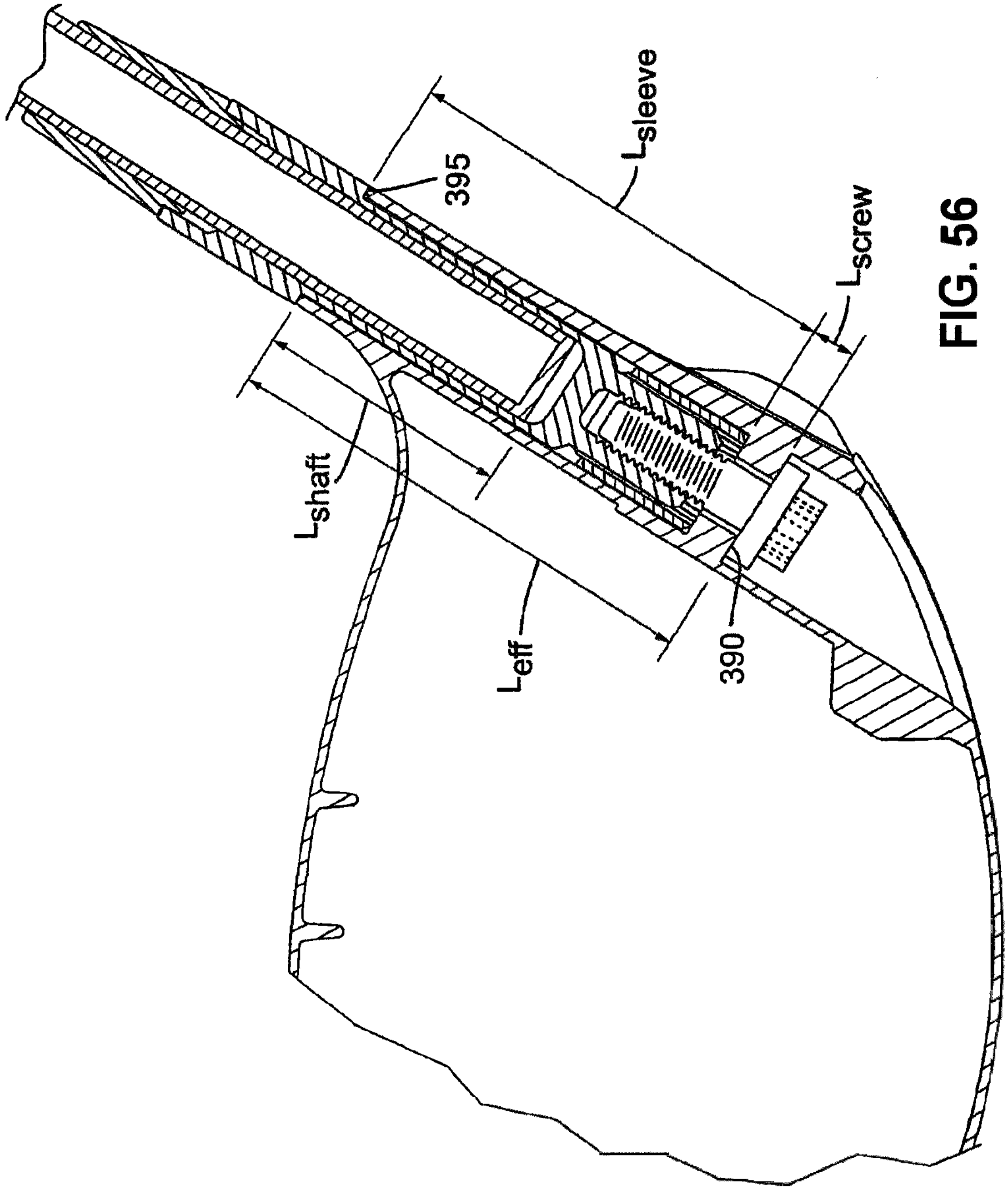
FIG. 56 is a cross-sectional view similar to FIG. 42 identifying lengths used in calculating the stiffness of components of the shaft-head connection assembly.

The axial stiffness of the club head-shaft connection, $k_{eff}$, can be determined by the equation $$(1/k_{eff})=(1/k_{screw})+(1/k_{sleeve}+k_{shaft})$$

where $k_{screw}$, $k_{shaft}$ and $k_{sleeve}$ are the stiffnesses of the screw, shaft, and sleeve, respectively, over the portions that have associated lengths $L_{screw}$, $L_{shaft}$, and $L_{sleeve}$, respectively, as shown in FIG. 56. $L_{screw}$ is the length of the portion of the screw placed in tension (measured from the flange bottom 390 to the bottom end of the shaft sleeve). $L_{shaft}$ is the length of the portion of the shaft 50 extending into the hosel opening 340 (measured from hosel upper surface 395 to the end of the shaft); and $L_{sleeve}$ is the length of the sleeve 100 placed in tension (measured from hosel upper surface 395 to the end of the sleeve), as depicted in FIG. 56.

Accordingly, $k_{screw}$, $k_{shaft}$ and $k_{sleeve}$ can be determined using the lengths in Equation 7. Table 1 shows calculated k values for certain components and combinations thereof for the connection assembly of FIGS. 42-54 and those of other commercially available connection assemblies used with removably attachable golf club heads. Also, the effective hosel stiffness, $K_{hosel}$, is also shown for comparison purposes (calculated over the portion of the hosel that is in compression during screw preload). A low $k_{eff}/k_{hosel}$ ratio indicates a small shaft connection assembly stiffness compared to the hosel stiffness, which is desirable in order to help maintain preload for a given screw torque during dynamic loading of the head. The $k_{eff}$ of the sleeve-shaft-screw combination of the connection assembly of illustrated embodiment is $9.27\times10^7$ N/m, which is the lowest among the compared connection assemblies.

TABLE 1

| Component(s) | Present technology | Nakashima (N/m) | Callaway Opti-Fit (N/m) | Versus Golf (N/m) |
|---|---|---|---|---|
| $k_{sleeve}$ (sleeve) | $5.57 \times 10^7$ | $9.65 \times 10^7$ | $9.64 \times 10^7$ | $4.03 \times 10^7$ |
| $k_{sleeve} + k_{shaft}$ (sleeve + shaft) | $1.86 \times 10^8$ | $1.87 \times 10^8$ | $2.03 \times 10^8$ | $1.24 \times 10^8$ |
| $k_{screw}$ (screw) | $1.85 \times 10^8$ | $5.03 \times 10^8$ | $2.51 \times 10^8$ | $1.88 \times 10^9$ |
| $k_{eff}$ (sleeve + shaft + screw) | $9.27 \times 10^7$ | $1.36 \times 10^8$ | $1.12 \times 10^8$ | $1.24 \times 10^8$ |
| $k_{hosel}$ | $1.27 \times 10^8$ | $1.27 \times 10^8$ | $1.27 \times 10^8$ | $1.27 \times 10^8$ |
| $k_{eff}/k_{hosel}$ (tension/compression ratio) | 0.73 | 1.07 | 0.88 | 0.98 |

Figure 57:
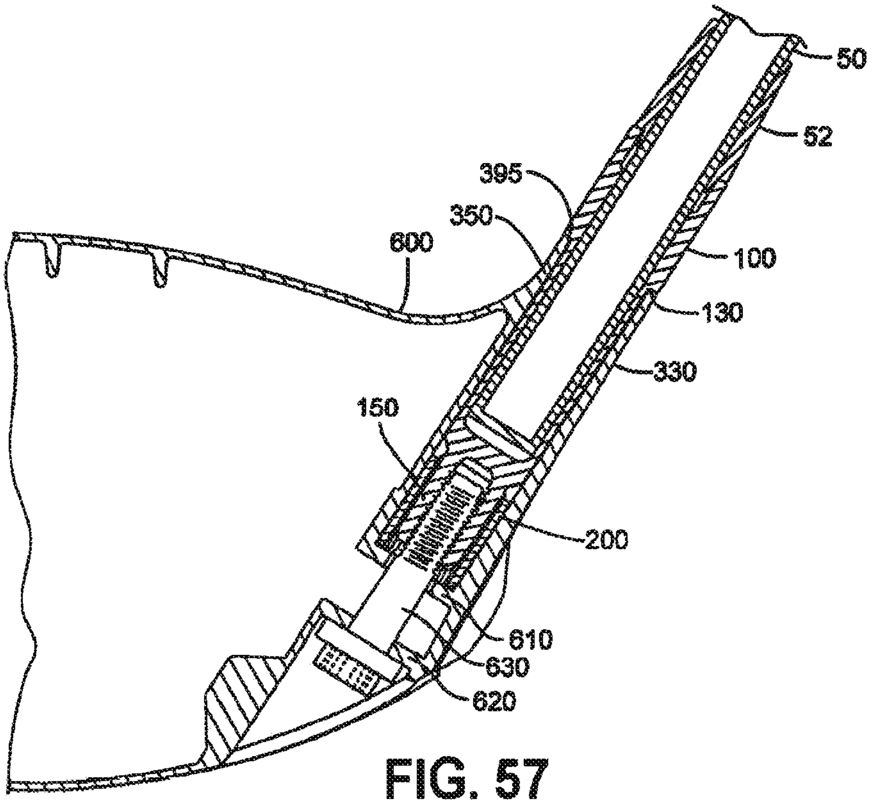
FIG. 57 is a cross-sectional view of a golf club head having a removable shaft, according to another embodiment.

The components of the connection assembly can be modified to achieve different values. For example, the screw 400 can be longer than shown in FIG. 56. In some embodiments, the length of the opening 196 can be increased along with a corresponding increase in the length of the screw 400. In additional embodiments, the construction of the hosel opening 340 can vary to accommodate a longer screw. For example, with reference to FIG. 57, a club head 600 comprises an upper flange 610 defining the bottom wall of the hosel opening and a lower flange 620 spaced from the upper flange 610 to accommodate a longer screw 630. Such a hosel construction can accommodate a longer screw, and thus can achieve a lower $k_{eff}$, while retaining compatibility with the sleeve 100 of FIGS. 45-50.

In the illustrated embodiment of FIGS. 42-50, the cross-sectional area of the sleeve 100 is minimized to minimize $k_{sleeve}$ by placing the splines 500 below the shaft, rather than around the shaft as used in prior art configurations.

EXAMPLES

In certain embodiments, a shaft sleeve can have 4, 6, 8, 10, or 12 splines. The height H of the splines of the shaft sleeve in particular embodiments can range from about 0.15 mm to about 0.95 mm, and more particularly from about 0.25 mm to about 0.75 mm, and even more particularly from about 0.5 mm to about 0.75 mm. The average diameter D of the spline portion of the shaft sleeve can range from about 6 mm to about 12 mm, with 8.45 mm being a specific example. As shown in FIG. 50, the average diameter is the diameter of the spline portion of a shaft sleeve measured between two points located at the mid-spans of two diametrically opposed splines.

The length L of the splines of the shaft sleeve in particular embodiments can range from about 2 mm to about 10 mm. For example, when the connection assembly is implemented in a driver, the splines can be relatively longer, for example, 7.5 mm or 10 mm. When the connection assembly is implemented in a fairway wood, which is typically smaller than a driver, it is desirable to use a relatively shorter shaft sleeve because less space is available inside the club head to receive the shaft sleeve. In that case, the splines can be relatively shorter, for example, 2 mm or 3 mm in length, to reduce the overall length of the shaft sleeve.

The ratio of spline width $W_1$ (at the midspan of the spline) to average diameter of the spline portion of the shaft sleeve in particular embodiments can range from about 0.1 to about 0.5, and more desirably, from about 0.15 to about 0.35, and even more desirably from about 0.16 to about 0.22. The ratio of spline width $W_1$ to spline H in particular embodiments can range from about 1.0 to about 22, and more desirably from about 2 to about 4, and even more desirably from about 2.3 to about 3.1. The ratio of spline length L to average diameter in particular embodiments can range from about 0.15 to about 1.7.

Tables 2-4 below provide dimensions for a plurality of different spline configurations for the sleeve 100 (and other shaft sleeves disclosed herein). In Table 2, the average radius R is the radius of the spline portion of a shaft sleeve measured at the mid-span of a spine, i.e., at a location equidistant from the base of the spline at surface 160 and to the outer surface 550 of the spline (see FIG. 50). The arc length in Tables 2 and 3 is the arc length of a spline at the average radius.

Table 2 shows the spline arc angle, average radius, average diameter, arc length, arc length, arc length/average radius ratio, width at midspan, width (at midspan)/average diameter ratio for different shaft sleeves having 8 splines (with two 33 degree gaps as shown in FIG. 50), 8 equally-spaced splines, 6 equally-spaced splines, 10 equally-spaced splines, 4 equally-spaced splines. Table 3 shows examples of shaft sleeves having different number of splines and spline heights. Table 4 shows examples of different combinations of lengths and average diameters for shaft sleeves apart from the number of splines, spline height H, and spline width $W_1$.

The specific dimensions provided in the present specification for the shaft sleeve 100 (as well as for other components disclosed herein) are given to illustrate the invention and not to limit it. The dimensions provided herein can be modified as needed in different applications or situations.

TABLE 2

| # Splines | Spline arc angle (deg.) | Average radius (mm) | Average diameter (mm) | Arc length (mm) | Arc length/ Average radius | Width at midspan (mm) | Width/ Average diameter |
|---|---|---|---|---|---|---|---|
| 8 (w/ two 33 deg. gaps) | 21 | 4.225 | 8.45 | 1.549 | 0.367 | 1.540 | 0.182 |
| 8 (equally spaced) | 22.5 | 4.225 | 8.45 | 1.659 | 0.393 | 1.649 | 0.195 |
| 6 (equally spaced) | 30 | 4.225 | 8.45 | 2.212 | 0.524 | 2.187 | 0.259 |
| 10 (equally spaced) | 18 | 4.225 | 8.45 | 1.327 | 0.314 | 1.322 | 0.156 |
| 4 (equally spaced) | 45 | 4.225 | 8.45 | 3.318 | 0.785 | 3.234 | 0.383 |
| 12 (equally spaced) | 15 | 4.225 | 8.45 | 1.106 | 0.262 | 1.103 | 0.131 |

TABLE 3

| # Splines | Spline height (mm) | Arc length (mm) | Width at Midspan (mm) | Arc length/ Height | Width/ Height |
|---|---|---|---|---|---|
| 8 (w/two 33 deg. gaps) | 0.5 | 1.549 | 1.540 | 3.097 | 3.080 |
| 8 (w/two 33 deg/gaps) | 0.25 | 1.549 | 1.540 | 6.194 | 6.160 |
| 8 (w/two 33 deg/gaps) | 0.75 | 1.549 | 1.540 | 2.065 | 2.053 |
| 8 (equally spaced) | 0.5 | 1.659 | 1.649 | 3.318 | 3.297 |
| 6 (equally spaced) | 0.15 | 2.212 | 2.187 | 14.748 | 14.580 |
| 4 (equally spaced) | 0.95 | 1.127 | 1.321 | 1.397 | 1.391 |
| 4 (equally spaced) | 0.15 | 3.318 | 3.234 | 22.122 | 21.558 |
| 12 (equally spaced) | 0.95 | 1.106 | 1.103 | 1.164 | 1.161 |

TABLE 4

| Average sleeve diameter at splines (mm) | Spline length (mm) | Spline length/ Average diameter |
|---|---|---|
| 6 | 7.5 | 1.25 |
| 6 | 3 | 0.5 |
| 6 | 10 | 1.667 |
| 6 | 2 | .333 |
| 8.45 | 7.5 | 0.888 |
| 8.45 | 3 | 0.355 |
| 8.45 | 10 | 1.183 |
| 8.45 | 2 | 0.237 |
| 12 | 7.5 | 0.625 |
| 12 | 3 | 0.25 |
| 12 | 10 | 0.833 |
| 12 | 2 | 0.167 |

Adjustable Lie/Loft Connection Assembly

Figure 58:
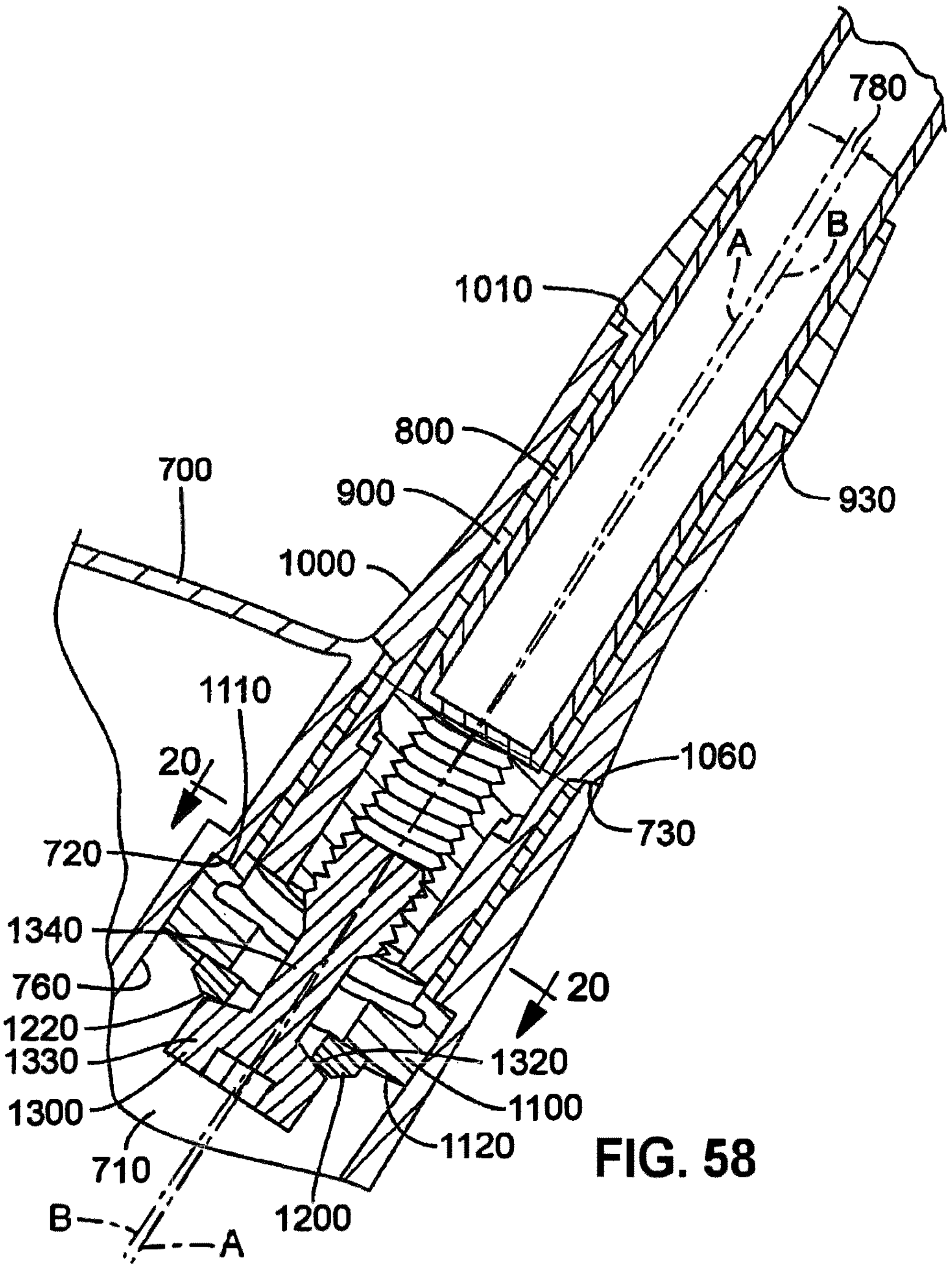
FIG. 58 is an enlarged cross-sectional view of a golf club head having a removable shaft, in accordance with another embodiment.
Figure 59:
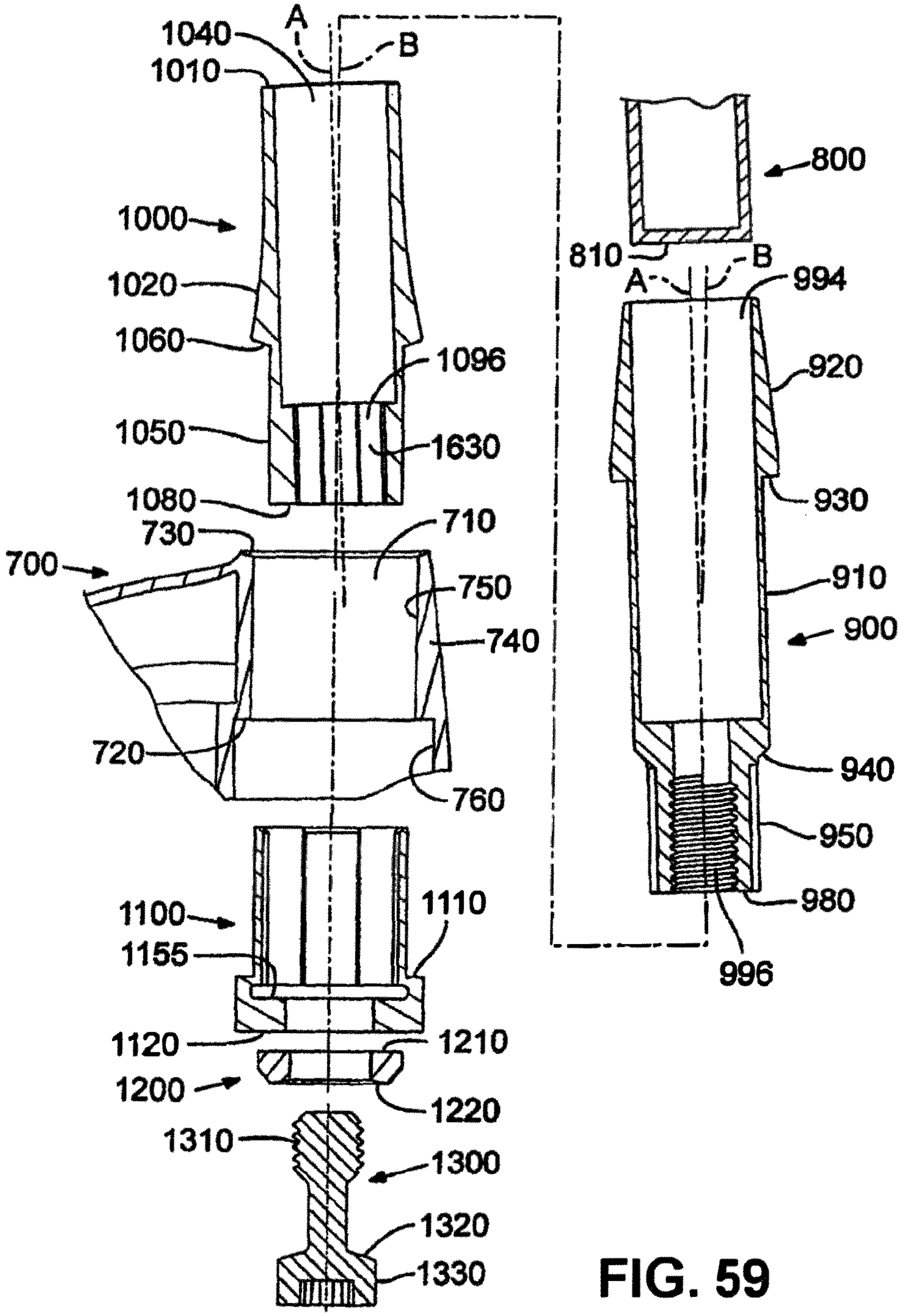
FIG. 59 is an exploded cross-sectional view of the shaft-club head connection assembly of FIG. 58.
Figure 60:
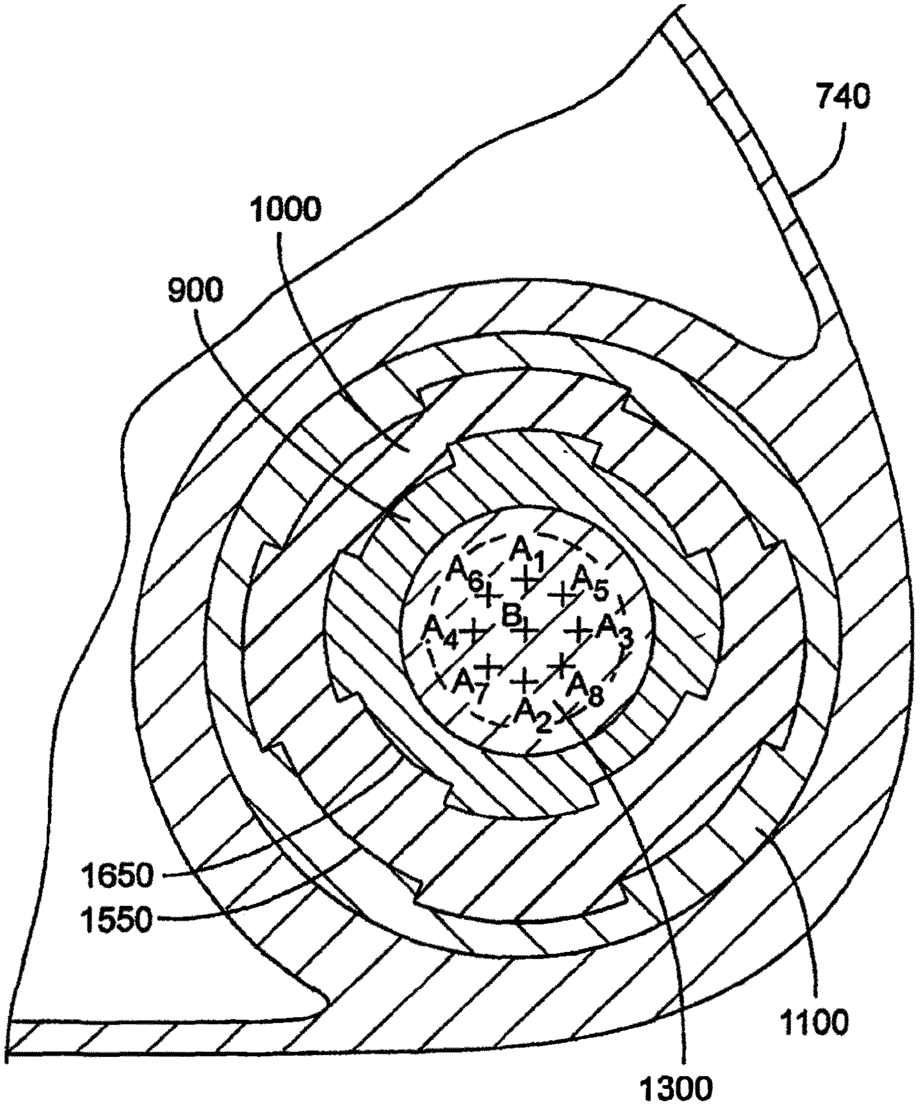
FIG. 60 is an enlarged cross-sectional view of the golf club head of FIG. 58, taken along the line 20-20 of FIG. 58.

Now with reference to FIGS. 58-60, there is shown a golf club comprising a head 700 attached to a removable shaft 800 via a removable head-shaft connection assembly. The connection assembly generally comprises a shaft sleeve 900, a hosel sleeve 1000 (also referred to herein as an adapter sleeve), a hosel insert 1100, a washer 1200 and a screw 1300. The club head 700 comprises a hosel 702 defining a hosel opening, or passageway 710. The passageway 710 in the illustrated embodiment extends through the club head and forms an opening in the sole of the club head to accept the screw 1300. Generally, the club head 700 is removably attached to the shaft 800 by the shaft sleeve 900 (which is mounted to the lower end portion of the shaft 800) being inserted into and engaging the hosel sleeve 1000. The hosel sleeve 1000 is inserted into and engages the hosel insert 1100 (which is mounted inside the hosel opening 710). The screw 1300 is tightened into a threaded opening of the shaft sleeve 900, with the washer 1200 being disposed between the screw 1300 and the hosel insert 1100, to secure the shaft to the club head.

The shaft sleeve 900 can be adhesively bonded, welded or secured in equivalent fashion to the lower end portion of the shaft 800. In other embodiments, the shaft sleeve 900 may be integrally formed with the shaft 800. As best shown in FIG. 59, the hosel opening 710 extends through the club head 700 and has hosel sidewalls 740 defining a first hosel inner surface 750 and a second hosel inner surface 760, the boundary between the first and second hosel inner surfaces defining an inner annular surface 720. The hosel sleeve 1000 is disposed between the shaft sleeve 900 and the hosel insert 1100. The hosel insert 1100 can be mounted within the hosel opening 710. The hosel insert 1100 can have an annular surface 1110 that contacts the hosel annular surface 720. The hosel insert 1100 can be adhesively bonded, welded or secured in equivalent fashion to the first hosel surface 740, the second hosel surface 750 and/or the hosel annular surface 720 to secure the hosel insert 1100 in place. In other embodiments, the hosel insert 1100 can be formed integrally with the club head 700.

Figure 61:
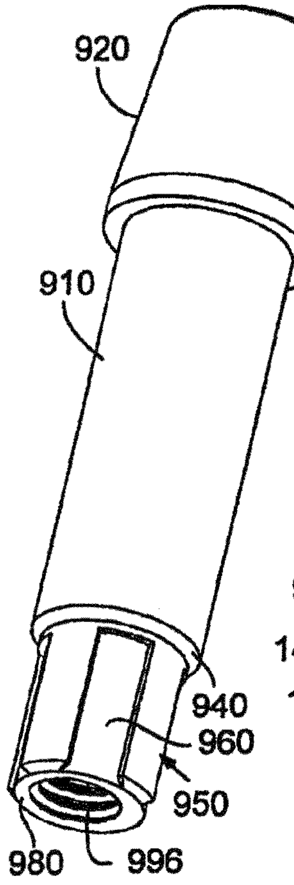
FIG. 61 is a perspective view of the shaft sleeve of the connection assembly shown in FIG. 58.
Figure 62:
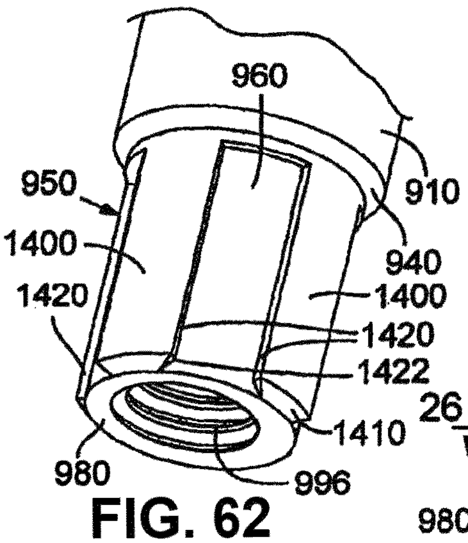
FIG. 62 is an enlarged perspective view of the lower portion of the shaft sleeve of FIG. 61.
Figure 64:
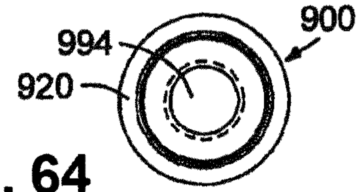
FIG. 64 is a top plan view of the shaft sleeve of FIG. 61.
Figure 71:
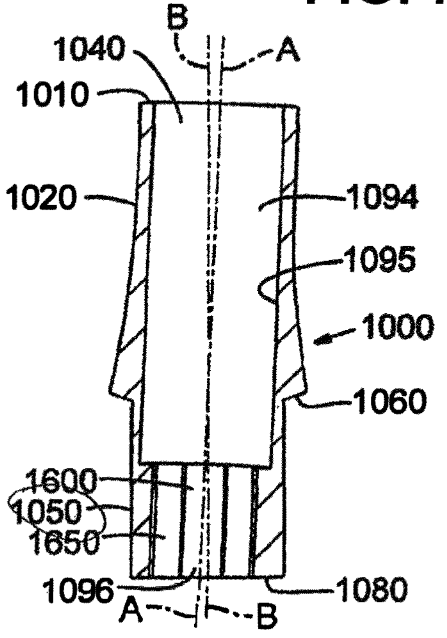
FIG. 71 is a cross-sectional view of the hosel sleeve of FIG. 67.
Figure 70:
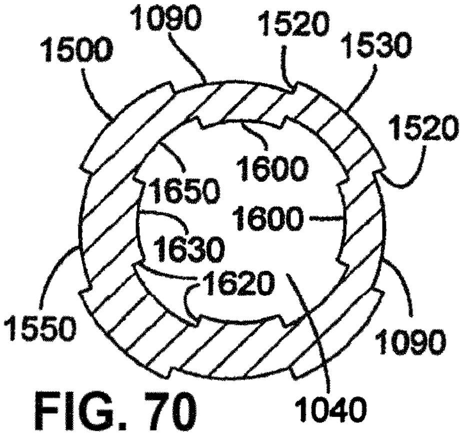
FIG. 70 is a cross-sectional view of the hosel sleeve, taken along line 30-30 of FIG. 67.
Figure 73:
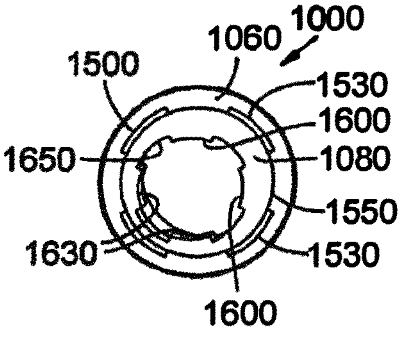
FIG. 73 is a bottom plan view of the hosel sleeve of FIG. 67.

Rotational movement of the shaft 800 relative to the club head 700 can be restricted by restricting rotational movement of the shaft sleeve 900 relative to the hosel sleeve 1000 and by restricting rotational movement of the hosel sleeve 1000 relative to the club head 700. To restrict rotational movement of the shaft sleeve 900 relative to the hosel sleeve 1000, the shaft sleeve has a lower, rotation prevention portion 950 having a non-circular configuration that mates with a complementary, non-circular configuration of a lower, rotation prevention portion 1096 inside the hosel sleeve 1000. The rotation prevention portion of the shaft sleeve 900 can comprise longitudinally extending splines 1400 formed on an external surface 960 of the lower portion 950, as best shown in FIGS. 61-62. The rotation prevention portion of the hosel sleeve can comprise complementary-configured splines 1600 formed on an inner surface 1650 of the lower portion 1096 of the hosel sleeve, as best shown in FIGS. 70-71.

Figure 69:
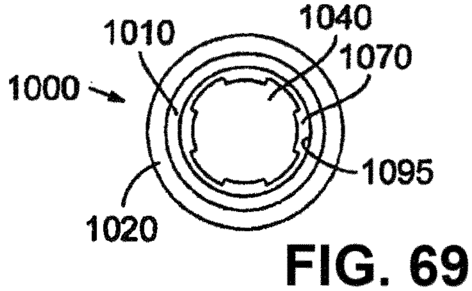
FIG. 69 is a top plan view of the hosel sleeve of FIG. 67, as viewed along longitudinal axis B defined by the outer surface of the lower portion of the hosel sleeve.
Figure 72:
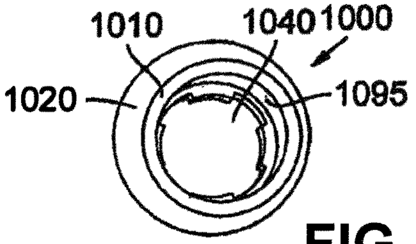
FIG. 72 is a top plan view of the hosel sleeve of FIG. 67.
Figure 67:
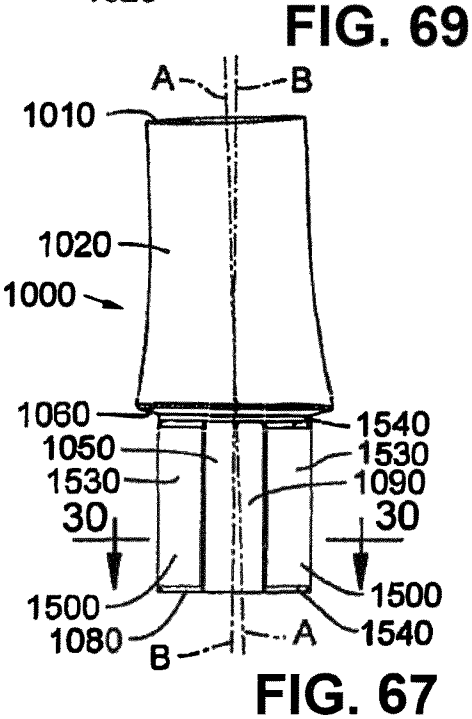
FIG. 67 is a side elevational view of the hosel sleeve of the connection assembly shown in FIG. 58.
Figure 68:
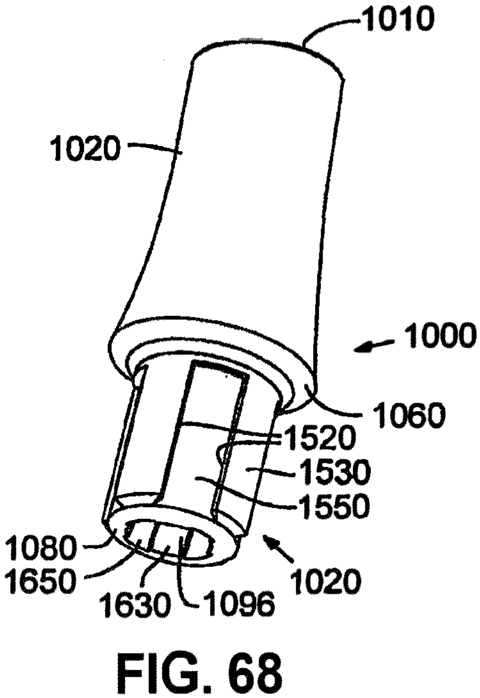
FIG. 68 is a perspective view of the hosel sleeve of FIG. 67.
Figure 76:
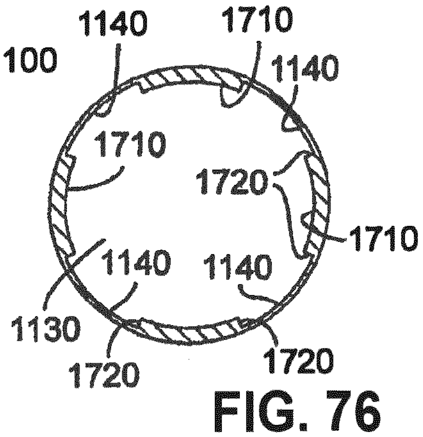
FIG. 76 is a cross-sectional view of the hosel insert, taken along line 36-36 of FIG. 74.
Figure 74:
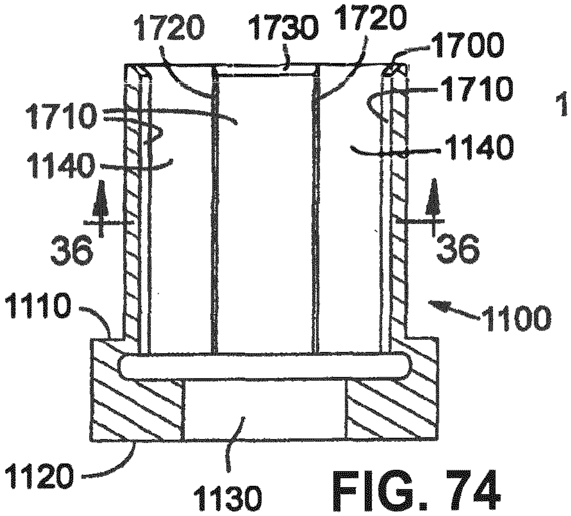
FIG. 74 is a cross-sectional view of the hosel insert of the connection usually shown in FIG. 58.
Figure 78:
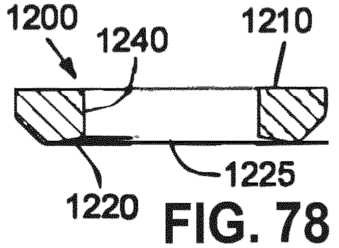
FIG. 78 is a cross-sectional view of the washer of the connection assembly shown in FIG. 58.
Figure 77:
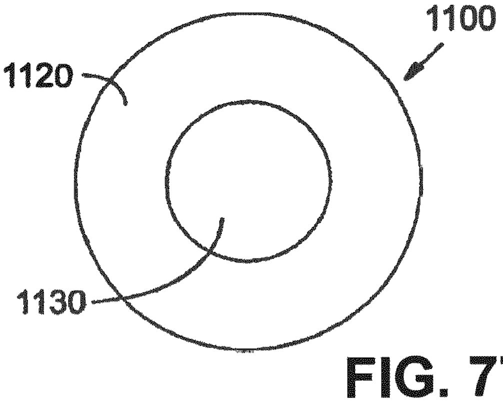
FIG. 77 is a bottom plan view of the hosel insert of FIG. 74.
Figure 79:
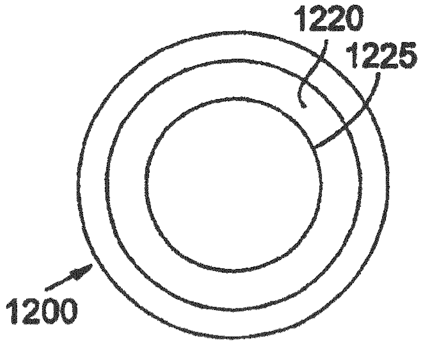
FIG. 79 is a bottom plan view of the washer of FIG. 78.
Figure 80:
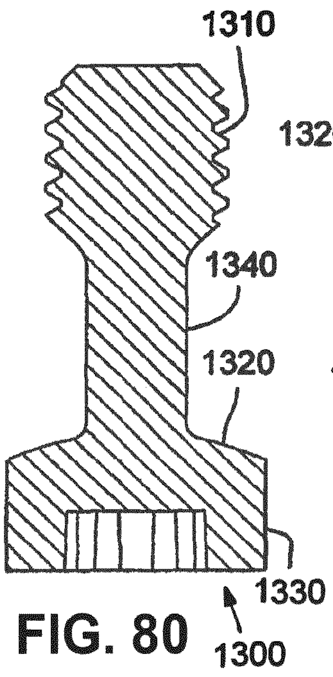
FIG. 80 is a cross-sectional view of the screw of FIG. 58.

To restrict rotational movement of the hosel sleeve 1000 relative to the club head 700, the hosel sleeve 1000 can have a lower, rotation prevention portion 1050 having a non-circular configuration that mates with a complementary, non-circular configuration of a rotation prevention portion of the hosel insert 1100. The rotation prevention portion of the hosel sleeve can comprise longitudinally extending splines 1500 formed on an external surface 1090 of a lower portion 1050 of the hosel sleeve 1000, as best shown in FIGS. 67-68 and 69. The rotation prevention portion of the hosel insert can comprise of complementary-configured splines 1700 formed on an inner surface 1140 of the hosel insert 1100, as best shown in FIGS. 74 and 76.

Accordingly, the shaft sleeve lower portion 950 defines a keyed portion that is received by a keyway defined by the hosel sleeve inner surface 1096, and hosel sleeve outer surface 1050 defines a keyed portion that is received by a keyway defined by the hosel insert inner surface 1140. In alternative embodiments, the rotation prevention portions can be elliptical, rectangular, hexagonal or other non-circular complementary configurations of the shaft sleeve lower portion 950 and the hosel sleeve inner surface 1096, and the hosel sleeve outer surface 1050 and the hosel insert inner surface 1140.

Referring to FIG. 58, the screw 1300 comprises a head 1330 having head, or bearing, surface 1320, a shaft 1340 extending from the head and external threads 1310 formed on a distal end portion of the screw shaft. The screw 1300 is used to secure the club head 700 to the shaft 800 by inserting the screw upwardly into passageway 710 via an opening in the sole of the club head. The screw is further inserted through the washer 1200 and tightened into an internally threaded bottom portion 996 of an opening 994 in the sleeve 900. In other embodiments, the club head 700 can be secured to the shaft 800 by other mechanical fasteners. With reference to FIGS. 58-59, when the screw 1300 is securely tightened into the shaft sleeve 900, the screw head surface 1320 contacts the washer 1200, the washer 1200 contacts a bottom surface 1120 of the hosel insert 1100, an annular surface 1060 of the hosel sleeve 1000 contacts an upper annular surface 730 of the club 700 and an annular surface 930 of the shaft sleeve 900 contacts an upper surface 1010 of the hosel sleeve 1000.

The hosel sleeve 1000 is configured to support the shaft 50 at a desired orientation relative to the club head to achieve a desired shaft loft and/or lie angle for the club. As best shown in FIGS. 67 and 71, the hosel sleeve 1000 comprises an upper portion 1020, a lower portion 1050, and a bore or longitudinal opening 1040 extending therethrough. The upper portion, which extends parallel the opening 1040, extends at an angle with respect to the lower portion 1050 defined as an "offset angle" 780 (FIG. 58). As best shown in FIG. 58, when the hosel insert 1040 is inserted into the hosel opening 710, the outer surface of the lower portion 1050 is co-axially aligned with the hosel insert 1100 and the hosel opening. In this manner, the outer surface of the lower portion 1050 of the hosel sleeve, the hosel insert 1100, and the hosel opening 710 collectively define a longitudinal axis B. When the shaft sleeve 900 is inserted into the hosel sleeve, the shaft sleeve and the shaft are co-axially aligned with the opening 1040 of the hosel sleeve. Accordingly, the shaft sleeve, the shaft, and the opening 1040 collectively define a longitudinal axis A of the assembly. As can be seen in FIG. 58, the hosel sleeve is effective to support the shaft 50 along longitudinal axis A, which is offset from longitudinal axis B by offset angle 780.

Consequently, the hosel sleeve 1000 can be positioned in the hosel insert 1100 in one or more positions to adjust the shaft loft and/or lie angle of the club. For example, FIG. 60 represents a connection assembly embodiment wherein the hosel sleeve can be positioned in four angularly spaced, discrete positions within the hosel insert 1100. As used herein. a sleeve having a plurality of "discrete positions" means that once the sleeve is inserted into the club head, it cannot be rotated about its longitudinal axis to an adjacent position, except for any play or tolerances between mating splines that allows for slight rotational movement of the sleeve prior to tightening the screw or other fastening mechanism that secures the shaft to the club head. In other words, the sleeve is not continuously adjustable and has a fixed number of finite positions and therefore has a fixed number of "discrete positions".

Referring to FIG. 60, crosshairs $A_1$-$A_4$ represent the position of the longitudinal axis A for each position of the hosel sleeve 1000. Positioning the hosel sleeve within the club head such that the shaft is adjusted inward towards the club head (such that the longitudinal axis A passes through crosshair $A_4$ in FIG. 60) increases the lie angle from an initial lie angle defined by longitudinal axis B; positioning the hosel sleeve such that the shaft is adjusted away from the club head (such that axis A passes through crosshair $A_3$) reduces the lie angle from an initial lie angle defined by longitudinal axis B. Similarly, positioning the hosel sleeve such that the shaft is adjusted forward toward the striking face (such that axis A passes through crosshair $A_2$) or rearward toward the rear of the club head (such that axis A passes through the crosshair $A_1$) will increase or decrease the shaft loft, respectively, from an initial shaft loft angle defined by longitudinal axis B. As noted above, adjusting the shaft loft is effective to adjust the square loft by the same amount. Similarly, the face angle is adjusted in proportion to the change in shaft loft. The amount of increase or decrease in shaft loft or lie angle in this example is equal to the offset angle 780.

Similarly, the shaft sleeve 900 can be inserted into the hosel sleeve at various angularly spaced positions around longitudinal axis A. Consequently, if the orientation of the shaft relative to the club head is adjusted by rotating the position of the hosel sleeve 1000, the position of the shaft sleeve within the hosel sleeve can be adjusted to maintain the rotational position of the shaft relative to longitudinal axis A. For example, if the hosel sleeve is rotated 90 degrees with respect to the hosel insert, the shaft sleeve can be rotated 90 degrees in the opposite direction with respect to the hosel sleeve in order to maintain the position of the shaft relative to its longitudinal axis. In this manner, the grip of the shaft and any visual indicia on the shaft can be maintained at the same position relative to the shaft axis as the shaft loft and/or lie angle is adjusted.

In another example, a connection assembly can employ a hosel sleeve that is positionable at eight angularly spaced positions within the hosel insert 1100, as represented by cross hairs $A_1$-$A_8$ in FIG. 60. Crosshairs $A_5$-$A_8$ represent hosel sleeve positions within the hosel insert 1100 that are effective to adjust both the lie angle and the shaft loft (and therefore the square loft and the face angle) relative to an initial lie angle and shaft loft defined by longitudinal axis B by adjusting the orientation of the shaft in a first direction inward or outward relative to the club head to adjust the lie angle and in a second direction forward or rearward relative to the club head to adjust the shaft loft. For example, crosshair $A_5$ represents a hosel sleeve position that adjusts the orientation of the shaft outward and rearward relative to the club head, thereby decreasing the lie angle and decreasing the shaft loft.

The connection assembly embodiment illustrated in FIGS. 58-60 provides advantages in addition to those provided by the illustrated embodiment of FIGS. 42-44 (e.g., case of exchanging a shaft or club head) and already described above. Because the hosel sleeve can introduce a non-zero angle between the shaft and the hosel, a golfer can easily change the loft, lie and/or face angles of the club by changing the hosel sleeve. For example, the golfer can unscrew the screw 1300 from the shaft sleeve 900, remove the shaft 800 from the hosel sleeve 1000, remove the hosel sleeve 1000 from the hosel insert 1100, select another hosel sleeve having a desired offset angle, insert the shaft sleeve 900 into the replacement hosel sleeve, insert the replacement hosel sleeve into the hosel insert 1000, and tighten the screw 1300 into the shaft sleeve 900.

Thus, the use of a hosel sleeve in the shaft-head connection assembly allows the golfer to adjust the position of the shaft relative to the club head without having to resort to such traditional methods such as bending the shaft relative to the club head as described above. For example, consider a golf club utilizing the club head-shaft connection assembly of FIGS. 58-60 comprising a first hosel sleeve wherein the shaft axis is co-axially aligned with the hosel axis (i.e., the offset angle is zero, or, axis A passes through crosshair B). By exchanging the first hosel sleeve for a second hosel sleeve having a non-zero offset angle, a set of adjustments to the shaft loft, lie and/or face angles are possible, depending, in part, on the position of the hosel sleeve within the hosel insert.

In particular embodiments, the replacement hosel sleeves could be purchased individually from a retailer. In other embodiments, a kit comprising a plurality of hosel sleeves, each having a different offset angle can be provided. The number of hosel sleeves in the kit can vary depending on a desired range of offset angles and/or a desired granularity of angle adjustments. For example, a kit can comprise hosel sleeves providing offset angles from 0 degrees to 3 degrees, in 0.5 degree increments.

In particular embodiments, hosel sleeve kits that are compatible with any number of shafts and any number of club heads having the same hosel configuration and hosel insert 1100 are provided. In this manner, a pro shop or retailer need not necessarily stock a large number of shaft or club head variations with various loft, lie and/or face angles. Rather, any number of variations of club characteristic angles can be achieved by a variety of hosel sleeves, which can take up less retail shelf and storeroom space and provide the consumer with a more economic alternative to adjusting loft, lie or face angles (i.e., the golfer can adjust a loft angle by purchasing a hosel sleeve instead of a new club).

With reference now to FIGS. 61-66, there is shown the shaft sleeve 900 of the head-shaft connection assembly of FIGS. 58-60. The shaft sleeve 900 in the illustrated embodiment is substantially cylindrical and desirably is made from a light-weight, high-strength material (e.g., T6 temper aluminum alloy 7075). The shaft sleeve 900 can include a middle portion 910, an upper portion 920 and a lower portion 950. The upper portion 920 can have a greater thickness than the remainder of the shaft sleeve to provide, for example, additional mechanical integrity to the connection between the shaft 800 and the shaft sleeve 900. The upper portion 920 can have a flared or frustroconical shape as shown, to provide, for example, a more streamlined transition between the shaft 800 and club head 700. The boundary between the upper portion 920 and the middle portion 910 defines an upper annular thrust surface 930 and the boundary between the middle portion 910 and the lower portion 950 defines a lower annular surface 940. The shaft sleeve 900 has a bottom surface 980. In the illustrated embodiment, the annular surface 930 is perpendicular to the external surface of the middle portion 910. In other embodiments, the annular surface 930 may be frustroconical or otherwise taper from the upper portion 920 to the middle portion 910. The annular surface 930 bears against the upper surface 1010 of the hosel insert 1000 when the shaft 800 is secured to the club head 700 (FIG. 58).

Figure 63:
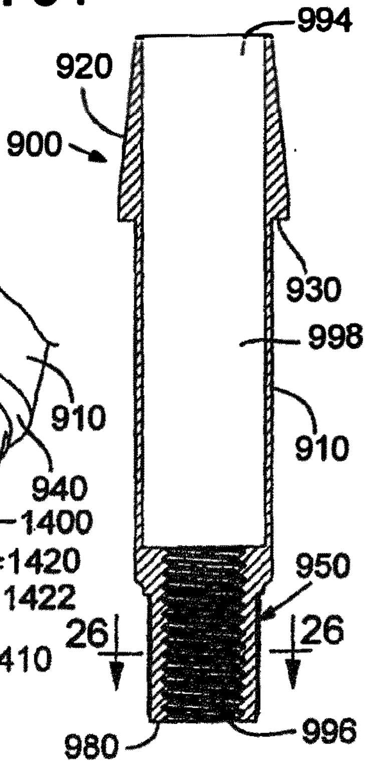
FIG. 63 is a cross-sectional view of the shaft sleeve of FIG. 61.
Figure 65:
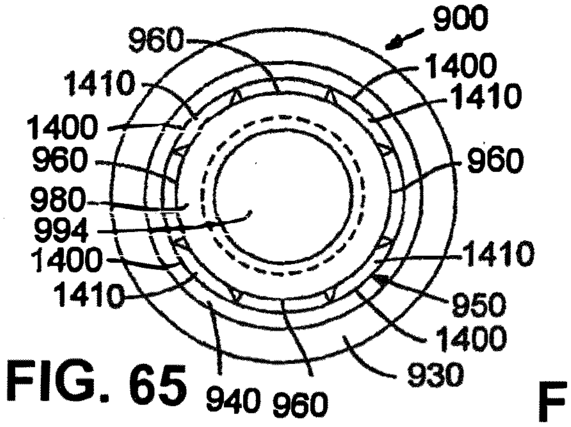
FIG. 65 is a bottom plan view of the shaft sleeve of FIG. 61.

The shaft sleeve 900 further comprises an opening 994 extending the length of the shaft sleeve 900, as depicted in FIG. 63. The opening 994 has an upper portion 998 for receiving the shaft 800 and an internally threaded bottom portion 996 for receiving the screw 1300. In the illustrated embodiment, the opening upper portion 998 has an internal sidewall having a constant diameter that is complementary to the configuration of the lower end portion of the shaft 800. In other embodiments, the opening upper portion 998 can have a configuration adapted to mate with various shaft profiles (e.g., the opening upper portion 998 can have more than one inner diameter, chamfered and/or perpendicular annular surfaces, etc.). With reference to the illustrated embodiment of FIG. 63, splines 1400 are located below the opening upper portion 998 and therefore below the shaft to minimize the overall diameter of the shaft sleeve. In certain embodiments, the internal threads of the lower opening 996 are created using a Spiralock® tap.

Figure 66:
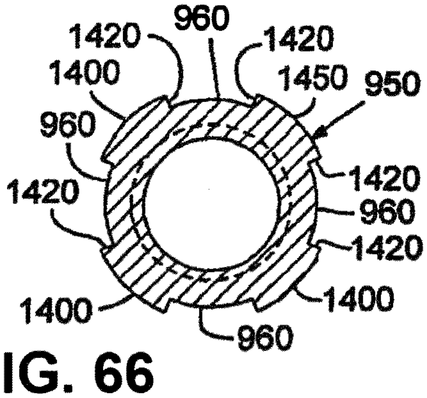
FIG. 66 is a cross-sectional view of the shaft sleeve, taken along line 26-26 of FIG. 63.

In particular embodiments, the rotation prevention portion of the shaft sleeve comprises a plurality of splines 1400 on an external surface 960 of the lower portion 950 that are elongated in the direction of the longitudinal axis of the shaft sleeve 900, as shown in FIGS. 61-62 and 66. The splines 1400 have sidewalls 1420 extending radially outwardly from the external surface 960, bottom edges 1410, bottom corners 1422 and arcuate outer surfaces 1450. In other embodiments, the external surface 960 can comprise more splines (such as up to 12) or fewer than four splines and the splines 1400 can have different shapes and sizes.

With reference now to FIGS. 67-73, there is shown the hosel sleeve 1000 of the head-shaft connection assembly of FIGS. 58-60. The hosel sleeve 1000 in the illustrated embodiment is substantially cylindrical and desirably is made from a light-weight, high-strength material (e.g., T6 temper aluminum alloy 7075). As noted above, the hosel sleeve 1000 includes an upper portion 1020 and a lower portion 1050. As shown in the illustrated embodiment of FIG. 67, the upper portion 1020 can have a flared or frustroconical shape, with the boundary between the upper portion 1020 and the lower portion 1050 defining an annular thrust surface 1060. In the illustrated embodiment, the annular surface 1060 tapers from the upper portion 1020 to the lower portion 1050. In other embodiments, the annular surface 1060 can be perpendicular to the external surface 1090 of the lower portion 1050. As best shown in FIG. 58, the annular surface 1060 bears against the upper annular surface 730 of the hosel when the shaft 800 is secured to the club head 700.

The hosel sleeve 1000 further comprises an opening 1040 extending the length of the hosel sleeve 1000. The hosel sleeve opening 1040 has an upper portion 1094 with internal sidewalls 1095 that are complementary configured to the configuration of the shaft sleeve middle portion 910, and a lower portion 1096 defining a rotation prevention portion having a non-circular configuration complementary to the configuration of shaft sleeve lower portion 950.

The non-circular configuration of the hosel sleeve lower portion 1096 comprises a plurality of splines 1600 formed on an inner surface 1650 of the opening lower portion 1096. With reference to FIGS. 70-71, the inner surface 1650 comprises four splines 1600 elongated in the direction of the longitudinal axis (axis A) of the hosel sleeve opening.

The splines 1600 in the illustrated embodiment have sidewalls 1620 extending radially inwardly from the inner surface 1650 and arcuate inner surfaces 1630. The external surface of the lower portion 1050 defines a rotation prevention portion comprising four splines 1500 elongated in the direction of and are parallel to longitudinal axis B defined by the external surface of the lower portion, as depicted in FIGS. 67 and 71. The splines 1500 have sidewalls 1520 extending radially outwardly from the surface 1550, top and bottom edges 1540 and accurate outer surfaces 1530.

The splined configuration of the shaft sleeve 900 dictates the degree to which the shaft sleeve 900 is positionable within the hosel sleeve 1000. In the illustrated embodiment of FIGS. 66 and 70, the splines 1400 and 1600 are substantially identical in shape and size and adjacent pairs of splines 1400 and 1600 have substantially similar spline-to-spline spacings. This spline configuration allows the shaft sleeve 900 to be positioned within the hosel sleeve 1000 at four angularly spaced positions relative to the hosel sleeve 1000. Similarly, the hosel sleeve 1000 can be positioned within the club head 700 at four angularly spaced positions. In other embodiments, different non-circular configurations (e.g., triangular, hexagonal, more or fewer splines, variable spline-to-spline spacings or spline widths) of the shaft sleeve lower portion 950, the hosel opening lower portion 1096, the hosel lower portion 1050 and the hosel insert inner surface 1140 could provide for various degrees of positionability.

The external surface of the shaft sleeve lower portion 950, the internal surface of the hosel sleeve opening lower portion 1096, the external surface of the hosel sleeve lower portion 1050, and the internal surface of the hosel insert can have generally rougher surfaces relative to the remaining surfaces of the shaft sleeve 900, the hosel sleeve 1000 and the hosel insert. The enhanced surface roughness provides, for example, greater friction between the shaft sleeve 900 and the hosel sleeve 1000 and between the hosel sleeve 1000 and the hosel insert 1100 to further restrict relative rotational movement between these components. The contacting surfaces of shaft sleeve, the hosel sleeve and the hosel insert can be roughened by sandblasting, although alternative methods or techniques can be used.

Figure 75:
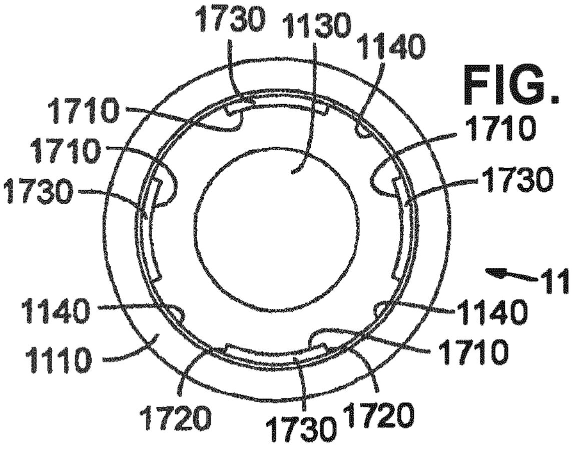
FIG. 75 is a top plan view of the hosel insert of FIG. 74.

With reference now to FIGS. 74-76, the hosel insert 1100 desirably is substantially tubular or cylindrical and can be made from a light-weight, high-strength material (e.g., grade 5 6Al-4V titanium alloy). The hosel insert 1100 comprises an inner surface 1140 defining a rotation prevention portion having a non-circular configuration that is complementary to the non-circular configuration of the hosel sleeve outer surface 1090. In the illustrated embodiment, the non-circulation configuration of inner surface 1140 comprises internal splines 1700 that are complementary in shape and size to the external splines 1500 of the hosel sleeve 1000. That is, there are four splines 1700 elongated in the direction of the longitudinal axis of the hosel insert 1100, and the splines 1700 have sidewalls 1720 extending radially inwardly from the inner surface 1140, chamfered top edges 1730 and inner surfaces 1710. The hosel insert 1100 can comprises an annular surface 1110 that contacts hosel annual surface 720 when the insert 1100 is mounted in the hosel opening 710 as depicted in FIG. 58. Additionally, the hosel opening 710 can have an annular shoulder (similar to shoulder 360 in FIG. 43). The insert 1100 can be welded or otherwise secured to the shoulder.

With reference now to FIGS. 58-60, the screw 1300 desirably is made from a lightweight, high-strength material (e.g., T6 temper aluminum alloy 7075). In certain embodiments, the major diameter (i.e., outer diameter) of the threads 1310 is about 4 mm (e.g., ISO screw size) but may be smaller or larger in alternative embodiments. The benefits of using a screw 1300 having a reduced thread diameter (about 4 mm or less) include the benefits described above with respect to screw 400 (e.g., the ability to place the screw under a greater preload for a given torque).

The head 1330 of the screw 1300 can be similar to the head 410 of the screw 400 (FIG. 55) and can comprise a hexalobular internal driving feature as described above. In additional embodiments, the screw head 1330 can comprise various other drive designs (e.g., Phillips, Pozidriv, hexagonal, TTAP, etc.), and the user can use a conventional screwdriver to tighten the screw.

As best shown in FIGS. 78-82, the screw 1300 desirably has an inclined, spherical bottom surface 1320. The washer 1200 desirably comprises a tapered bottom surface 1220, an upper surface 1210, an inner surface 1240 and an inner circumferential edge 1225 defined by the boundary between the tapered surface 1220 and the inner surface 1240. As discussed above and as shown in FIG. 58, a hosel sleeve 1000 can be selected to support the shaft at a non-zero angle with respect to the longitudinal axis of the hosel opening. In such a case, the shaft sleeve 900 and the screw 1300 extend at a non-zero angle with respect to the longitudinal axis of the hosel insert 1100 and the washer 1200. Because of the inclined surfaces 1320 and 1220 of the screw and the washer, the screw head can make complete contact with the washer through 360 degrees to better secure the shaft sleeve in the hosel insert. In certain embodiments, the screw head can make complete contact with the washer regardless of the position of the screw relative to the longitudinal axis of the hosel opening.

Figure 81:
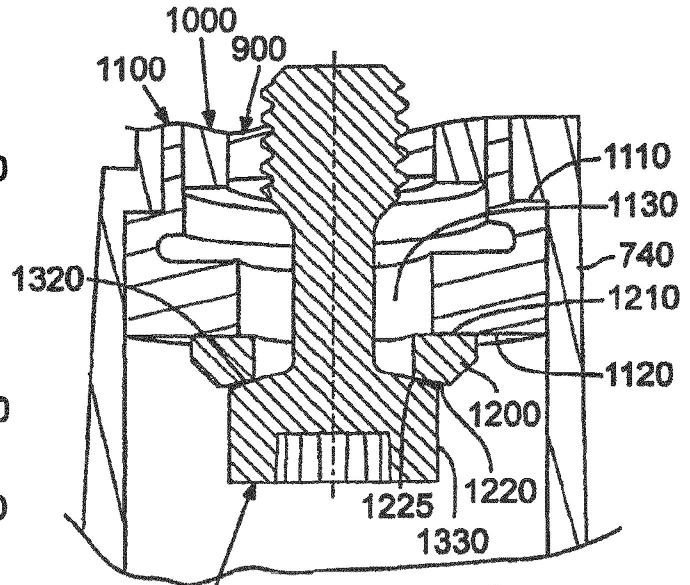
FIG. 81 is a cross-sectional view depicting the screw-washer interface of a connection assembly where the hosel sleeve longitudinal axis is aligned with the longitudinal axis of the hosel opening.
Figure 82:
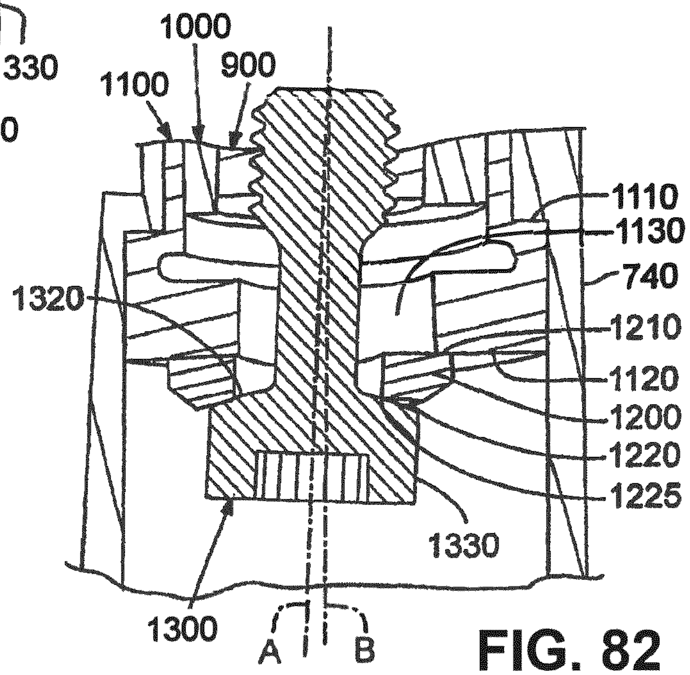
FIG. 82 is a cross-sectional view depicting a screw-washer interface of a connection assembly where the hosel sleeve longitudinal axis is offset from the longitudinal axis of the hosel opening.

For example, in the illustrated embodiment of FIG. 81, the head-shaft connection assembly employs a first hosel sleeve having a longitudinal axis that is co-axially aligned with the hosel sleeve opening longitudinal axis (i.e., the offset angle between the two longitudinal axes A and B is zero). The screw 1300 contacts the washer 1200 along the entire circumferential edge 1225 of the washer 1200. When the first hosel sleeve is exchanged for a second hosel sleeve having a non-zero offset angle, as depicted in FIG. 82, the tapered washer surface 1220 and the tapered screw head surface 1320 allow for the screw 1300 to maintain contact with the entire circumferential edge 1225 of the washer 1200. Such a washer-screw connection allows the bolt to be loaded in pure axial tension without being subjected to any bending moments for a greater preload at a given installation torque, resulting in the club head 700 being more reliably and securely attached to the shaft 800. Additionally, this configuration allows for the compressive force of the screw head to be more evenly distributed across the washer upper surface 1210 and hosel insert bottom surface 1120 interface.

Figure 83A:
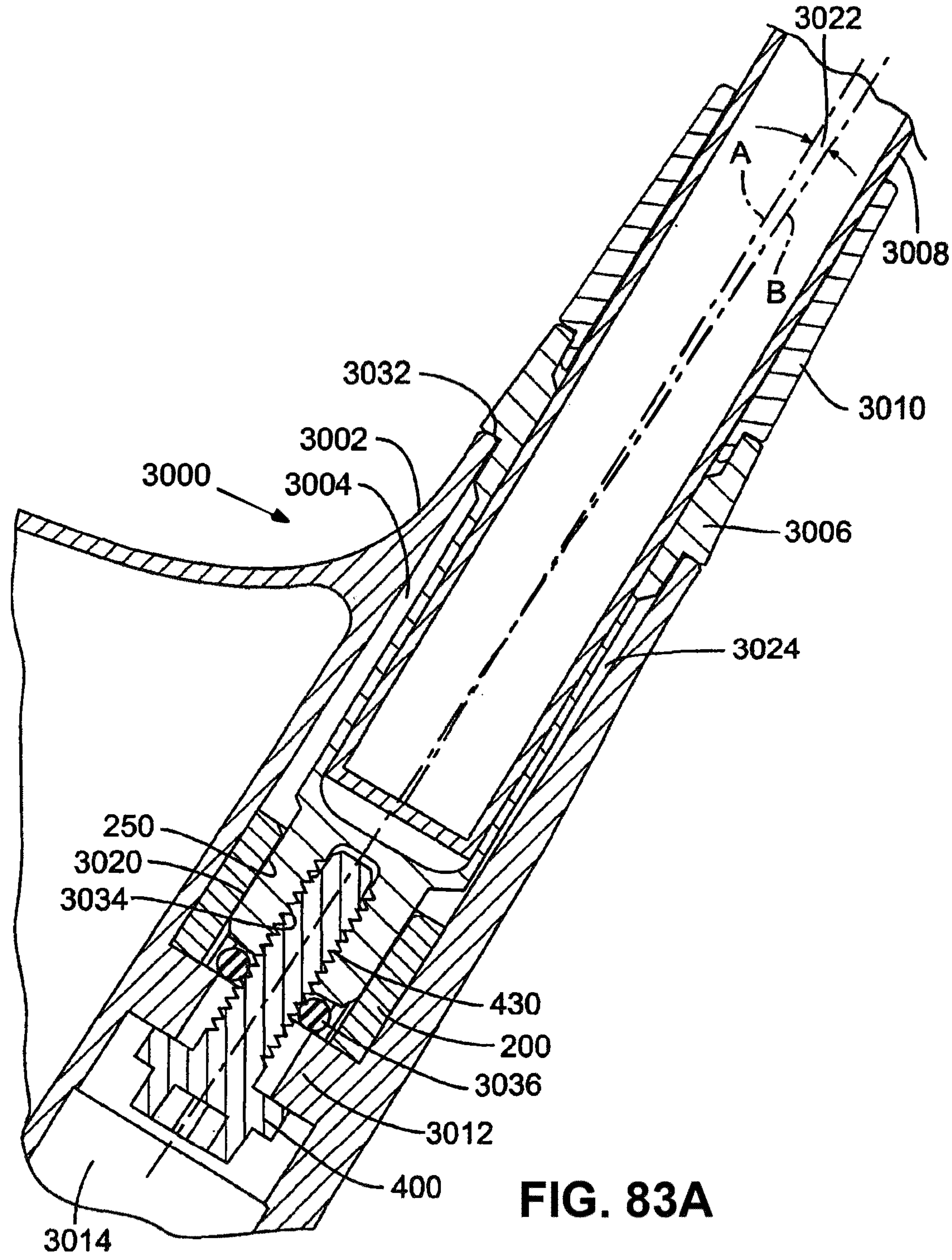
FIG. 83A is an enlarged cross-sectional view of a golf club head having a removable shaft, in accordance with another embodiment.

FIG. 83A shows another embodiment of a gold club assembly that has a removable shaft that can be supported at various positions relative to the head to vary the shaft loft and/or the lie angle of the club. The assembly comprises a club head 3000 having a hosel 3002 defining a hosel opening 3004. The hosel opening 3004 is dimensioned to receive a shaft sleeve 3006, which in turn is secured to the lower end portion of a shaft 3008. The shaft sleeve 3006 can be adhesively bonded, welded or secured in equivalent fashion to the lower end portion of the shaft 3008. In other embodiments, the shaft sleeve 3006 can be integrally formed with the shaft 3008. As shown, a ferrule 3010 can be disposed on the shaft just above the shaft sleeve 3006 to provide a transition piece between the shaft sleeve and the outer surface of the shaft 3008.

The hosel opening 3004 is also adapted to receive a hosel insert 200 (described in detail above), which can be positioned on an annular shoulder 3012 inside the club head. The hosel insert 200 can be secured in place by welding, an adhesive, or other suitable techniques. Alternatively, the insert can be integrally formed in the hosel opening. The club head 3000 further includes an opening 3014 in the bottom or sole of the club head that is sized to receive a screw 400. Much like the embodiment shown in FIG. 42, the screw 400 is inserted into the opening 3014, through the opening in shoulder 3012, and is tightened into the shaft sleeve 3006 to secure the shaft to the club head. However, unlike the embodiment shown in FIG. 42, the shaft sleeve 3006 is configured to support the shaft at different positions relative to the club head to achieve a desired shaft loft and/or lie angle.

Figure 83B:
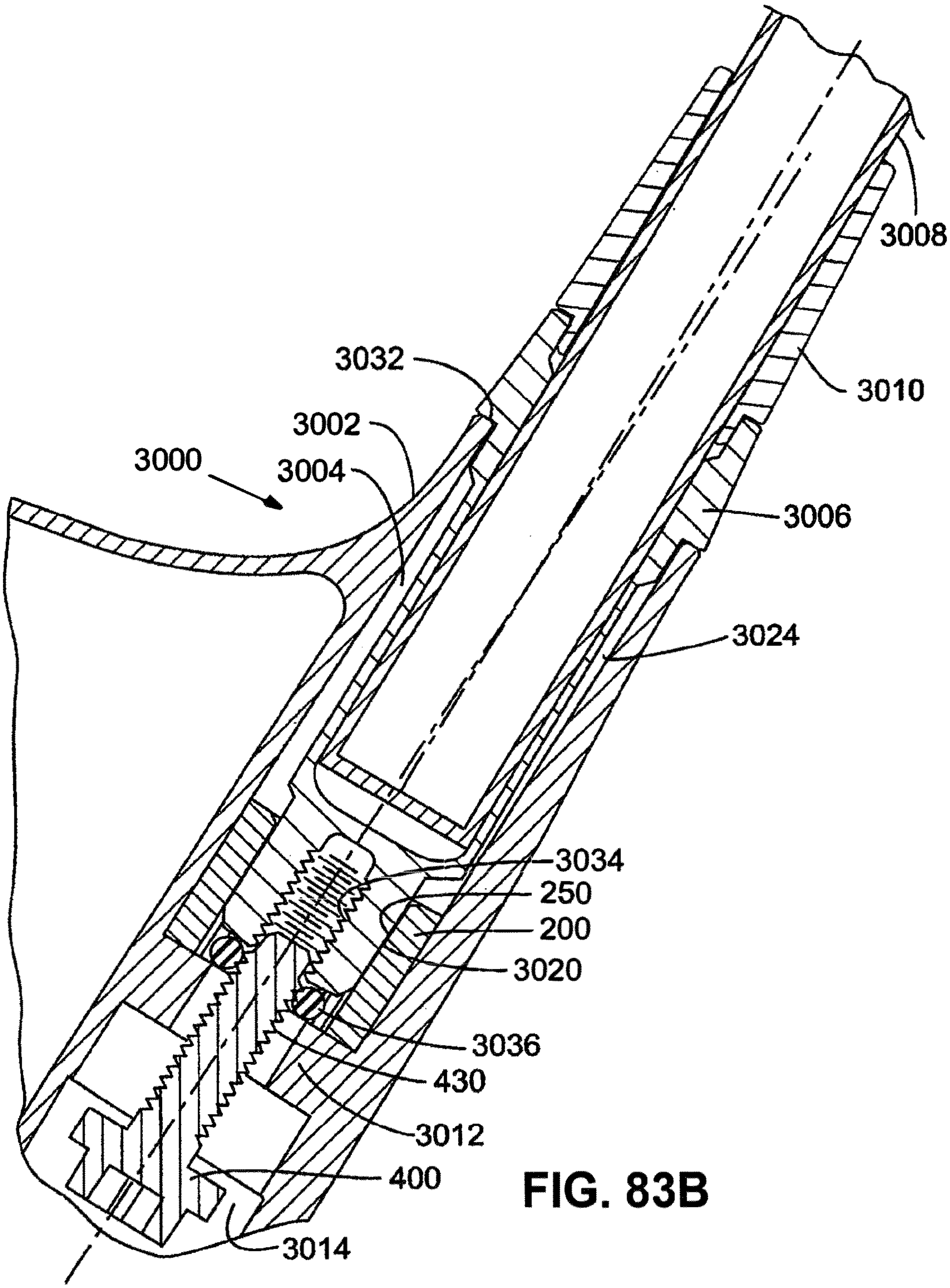
FIG. 83B shows the golf club head of FIG. 83A with the screw loosened to permit removal of the shaft from the club head.
Figure 84:
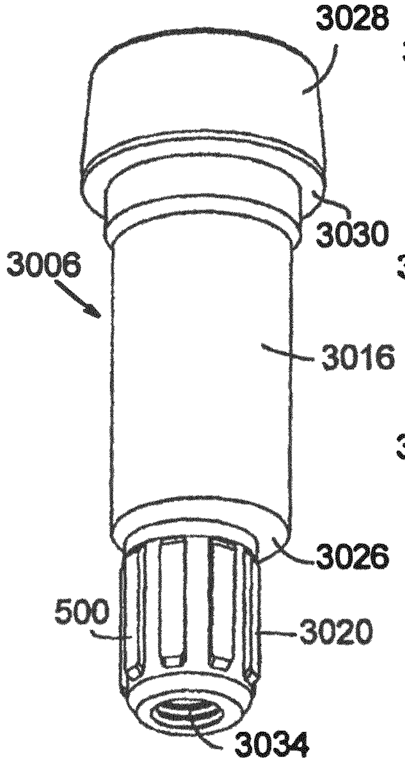
FIG. 84 is a perspective view of the shaft sleeve of the assembly shown in FIG. 83.
Figure 85:
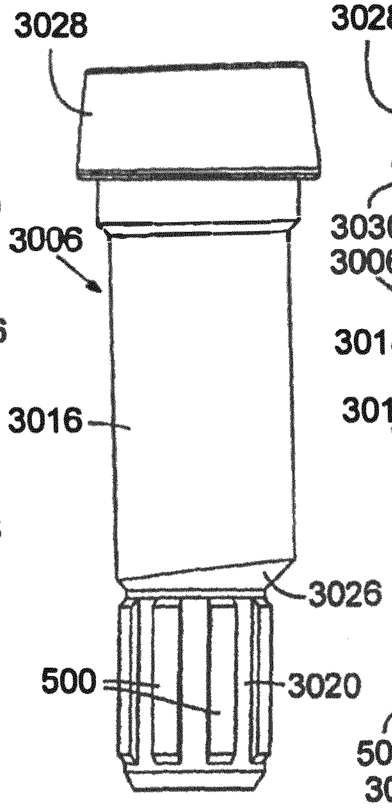
FIG. 85 is a side elevation view of the shaft sleeve of FIG. 84.

If desired, a screw capturing device, such as in the form of an o-ring or washer 3036, can be placed on the shaft of the screw 400 above shoulder 3012 to retain the screw in place within the club head when the screw is loosened to permit removal of the shaft from the club head. The ring 3036 desirably is dimensioned to frictionally engage the threads of the screw and has a outer diameter that is greater than the central opening in shoulder 3012 so that the ring 3036 cannot fall through the opening. When the screw 400 is tightened to secure the shaft to the club head, as depicted in FIG. 83A, the ring 3036 desirably is not compressed between the shoulder 3012 and the adjacent lower surface of the shaft sleeve 3006. FIG. 83B shows the screw 400 removed from the shaft sleeve 3006 to permit removal of the shaft from the club head. As shown, in the disassembled state, the ring 3036 captures the distal end of the screw to retain the screw within the club head to prevent loss of the screw. The ring 3036 desirably comprises a polymeric or elastomeric material, such as rubber, Viton, Neoprene, silicone, or similar materials. The ring 3036 can be an o-ring having a circular cross-sectional shape as depicted in the illustrated embodiment. Alternatively, the ring 3036 can be a flat washer having a square or rectangular cross-sectional shape. In other embodiments, the ring 3036 can various other cross-sectional profiles.

The shaft sleeve 3006 is shown in greater detail in FIGS. 84-87. The shaft sleeve 3006 in the illustrated embodiment comprises an upper portion 3016 having an upper opening 3018 for receiving and a lower portion 3020 located below the lower end of the shaft. The lower portion 3020 can have a threaded opening 3034 for receiving the threaded shaft of the screw 400. The lower portion 3020 of the sleeve can comprise a rotation prevention portion configured to mate with a rotation prevention portion of the hosel insert 200 to restrict relative rotation between the shaft and the club head. As shown, the rotation prevention portion can comprise a plurality of longitudinally extending external splines 500 that are adapted to mate with corresponding internal splines 240 of the hosel insert 200 (FIGS. 51-54). The lower portion 3020 and the external splines 500 formed thereon can have the same configuration as the shaft lower portion 150 and splines 500 shown in FIGS. 45-47 and 49-50 and described in detail above. Thus, the details of splines 500 are not repeated here.

Unlike the embodiment shown in FIGS. 45-47 and 49-50, the upper portion 3016 of the sleeve extends at an offset angle 3022 relative to the lower portion 3020. As shown in FIG. 83, when inserted in the club head, the lower portion 3020 is co-axially aligned with the hosel insert 200 and the hosel opening 3004, which collectively define a longitudinal axis B. The upper portion 3016 of the shaft sleeve 3006 defines a longitudinal axis A and is effective to support the shaft 3008 along axis A, which is offset from longitudinal axis B by offset angle 3022. Inserting the shaft sleeve at different angular positions relative to the hosel insert is effective to adjust the shaft loft and/or the lie angle, as further described below.

Figure 87:
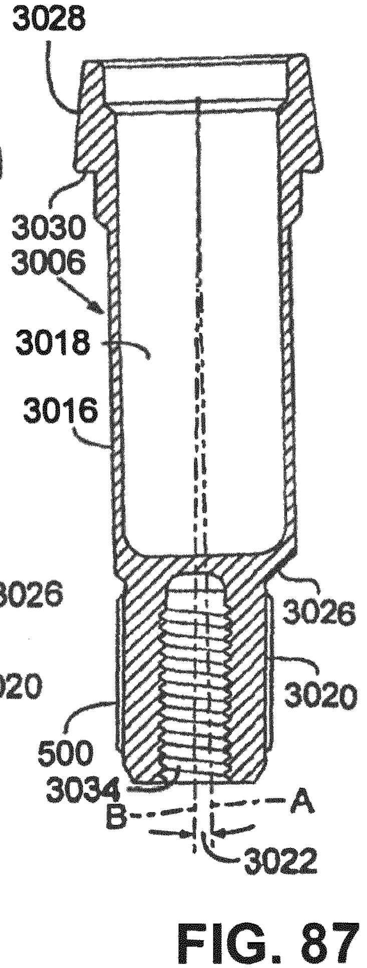
FIG. 87 is a cross-sectional view of the shaft sleeve taken along line 47-47 of FIG. 86.
Figure 86:
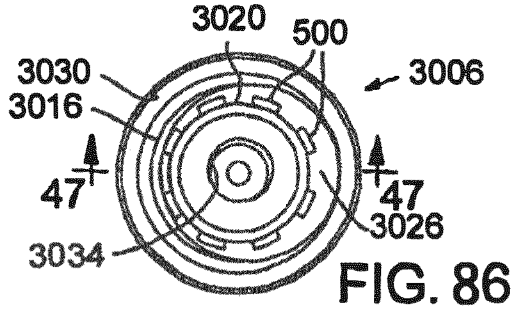
FIG. 86 is a bottom plan view of the shaft sleeve of FIG. 84.

As best shown in FIG. 87, the upper portion 3016 of the shaft sleeve desirably has a constant wall thickness from the lower end of opening 3018 to the upper end of the shaft sleeve. A tapered surface portion 3026 extends between the upper portion 3016 and the lower portion 3020. The upper portion 3016 of the shaft sleeve has an enlarged head portion 3028 that defines an annular bearing surface 3030 that contacts an upper surface 3032 of the hosel 3002 (FIG. 83). The bearing surface 3030 desirably is oriented at a 90-degree angle with respect to longitudinal axis B so that when the shaft sleeve is inserted in to the hosel, the bearing surface 3030 can make complete contact with the opposing surface 3032 of the hosel through 360 degrees.

As further shown in FIG. 83, the hosel opening 3004 desirably is dimensioned to form a gap 3024 between the outer surface of the upper portion 3016 of the sleeve and the opposing internal surface of the club head. Because the upper portion 3016 is not co-axially aligned with the surrounding inner surface of the hosel opening, the gap 3024 desirably is large enough to permit the shaft sleeve to be inserted into the hosel opening with the lower portion extending into the hosel insert at each possible angular position relative to longitudinal axis B. For example, in the illustrated embodiment, the shaft sleeve has eight external splines 500 that are received between eight internal splines 240 of the hosel insert 200. The shaft sleeve and the hosel insert can have the configurations shown in FIGS. 50 and 53, respectively. This allows the sleeve to be positioned within the hosel insert at two positions spaced 180 degrees from each other, as previously described.

Figure 88:
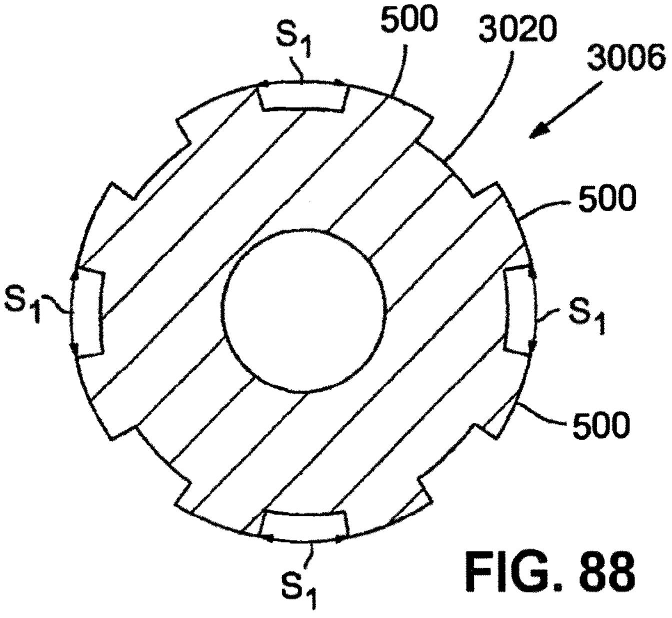
FIG. 88 is a cross-sectional view of another embodiment of a shaft sleeve and FIG. 89 is a top plan view of a hosel insert that is adapted to receive the shaft sleeve.
Figure 89:
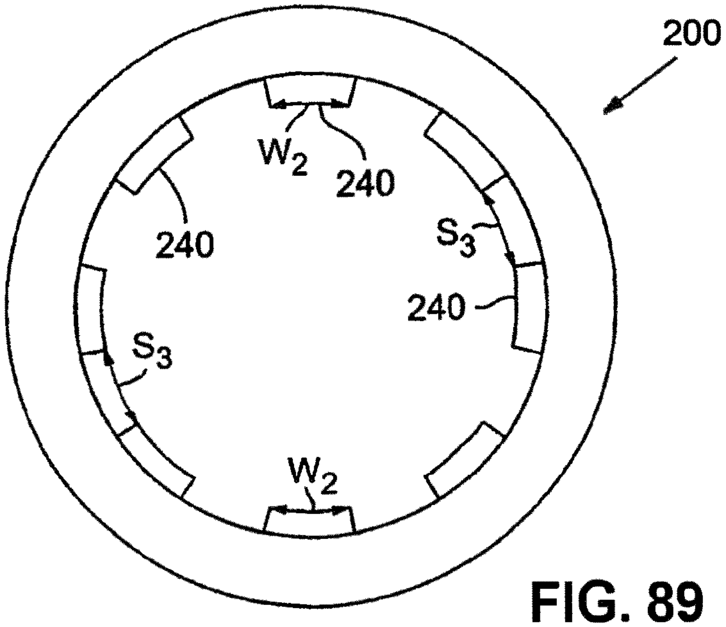

Other shaft sleeve and hosel insert configurations can be used to vary the number of possible angular positions for the shaft sleeve relative to the longitudinal axis B. FIGS. 88 and 89, for example, show an alternative shaft sleeve and hosel insert configuration in which the shaft sleeve 3006 has eight equally spaced splines 500 with radial sidewalls 502 that are received between eight equally spaced splines 240 of the hosel insert 200. Each spline 500 is spaced from an adjacent spline by spacing $S_1$ dimensioned to receive a spline 240 of the hosel insert having a width $W_2$. This allows the lower portion 3020 of the shaft sleeve to be inserted into the hosel insert 200 at eight angularly spaced positions around longitudinal axis B (similar to locations $A_1$-$A_8$ shown in FIG. 60). In a specific embodiment, the spacing $S_1$ is about 23 degrees, the arc angle of each spline 500 is about 22 degrees, and the width $W_2$ is about 22.5 degrees.

Figure 90:
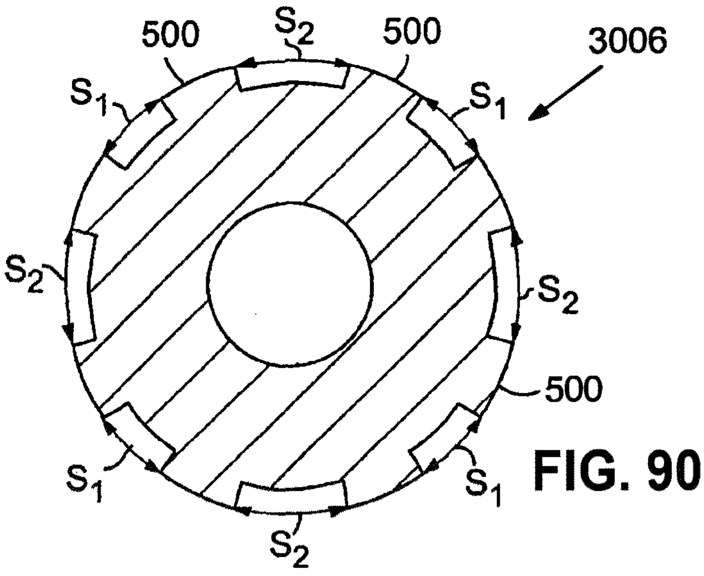
FIG. 90 is a cross-sectional view of another embodiment of a shaft sleeve.
Figure 91:
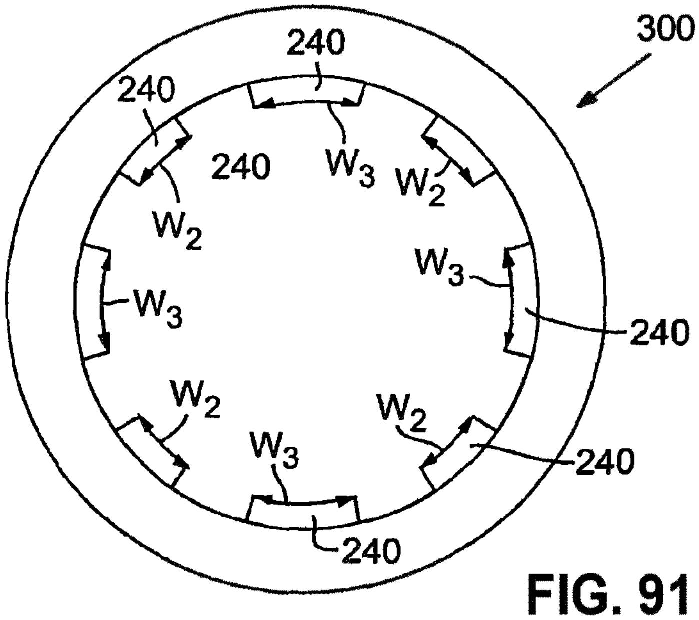
FIG. 91 is a top plan view of a hosel insert that is adapted to receive the shaft sleeve.

FIGS. 90 and 91 show another embodiment of a shaft sleeve and hosel insert configuration. In the embodiment of FIGS. 90 and 91, the shaft sleeve 3006 (FIG. 90) has eight splines 500 that are alternately spaced by spline-to-spline spacing $S_1$ and $S_2$, where $S_2$ is greater than $S_1$. Each spline has radial sidewalls 502 providing the same advantages previously described with respect to radial sidewalls. Similarly, the hosel insert 200 (FIG. 91) has eight splines 240 having alternating widths $W_2$ and $W_3$ that are slightly less than spline spacing $S_1$ and $S_2$, respectively, to allow each spline 240 of width $W_2$ to be received within spacing $S_1$ of the shaft sleeve and each spline 240 of width $W_3$ to be received within spacing $S_2$ of the shaft sleeve. This allows the lower portion 3020 of the shaft sleeve to be inserted into the hosel insert 200 at four angularly spaced positions around longitudinal axis B. In a particular embodiment, the spacing $S_1$ is about 19.5 degrees, the spacing $S_2$ is about 29.5 degrees, the arc angle of each spline 500 is about 20.5 degrees, the width $W_2$ is about 19 degrees, and the width $W_3$ is about 29 degrees. In addition, using a greater or fewer number of splines on the shaft sleeve and mating splines on the hosel insert increases and decreases, respectively, the number of possible positions for shaft sleeve.

As can be appreciated, the assembly shown in FIGS. 83-91 is similar to the embodiment shown in FIGS. 58-60 in that both permit a shaft to be supported at different orientations relative to the club head to vary the shaft loft and/or lie angle. An advantage of the assembly of FIGS. 83-91 is that it includes less pieces than the assembly of FIGS. 58-60, and therefore is less expensive to manufacture and has less mass (which allows for a reduction in overall weight).

Figure 100:
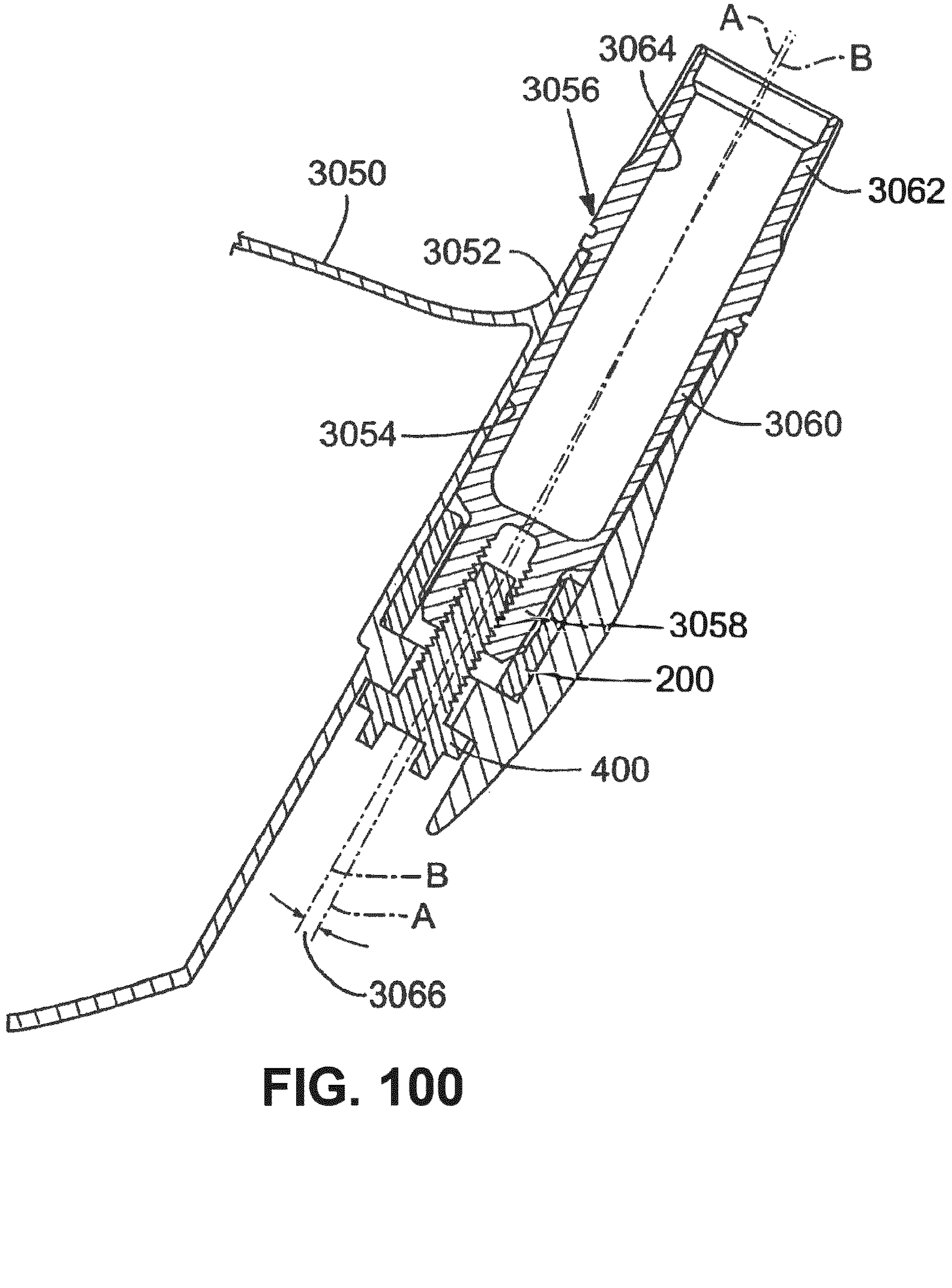
FIG. 100 is an enlarged cross-sectional view of a golf club head having a removable shaft, in accordance with another embodiment.

FIG. 100 shows another embodiment of a golf club assembly that is similar to the embodiment shown in FIG. 83A. The embodiment of FIG. 100 includes a club head 3050 having a hosel 3052 defining a hosel opening 3054, which in turn is adapted to receive a hosel insert 200. The hosel opening 3054 is also adapted to receive a shaft sleeve 3056 mounted on the lower end portion of a shaft (not shown in FIG. 100) as described herein.

The shaft sleeve 3056 has a lower portion 3058 including splines that mate with the splines of the hosel insert 200, an intermediate portion 3060 and an upper head portion 3062. The intermediate portion 3060 and the head portion 3062 define an internal bore 3064 for receiving the tip end portion of the shaft. In the illustrated embodiment, the intermediate portion 3060 of the shaft sleeve has a cylindrical external surface that is concentric with the inner cylindrical surface of the hosel opening 3054. In this manner, the lower and intermediate portions 3058, 3060 of the shaft sleeve and the hosel opening 3054 define a longitudinal axis B. The bore 3064 in the shaft sleeve defines a longitudinal axis A to support the shaft along axis A, which is offset from axis B by a predetermined angle 3066 determined by the bore 3064. As described above, inserting the shaft sleeve 3056 at different angular positions relative to the hosel insert 200 is effective to adjust the shaft loft and/or the lie angle.

Figure 101:
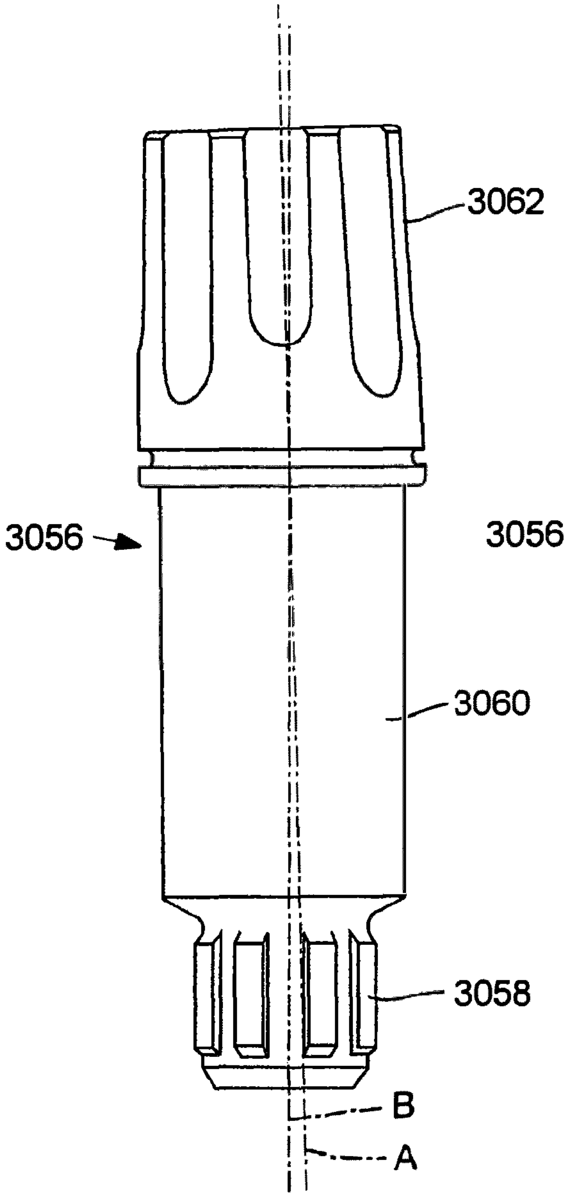
FIGS. 101 AND 102 are front elevation and cross-sectional views, respectively, of the shaft sleeve of the assembly shown in FIG. 100.
Figure 102:
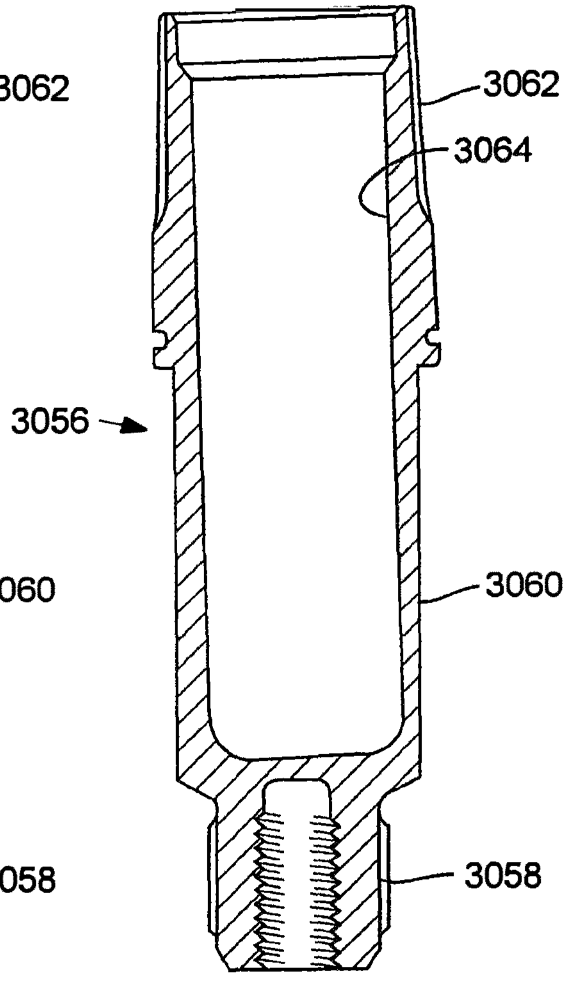

In this embodiment, because the intermediate portion 3060 is concentric with the hosel opening 3054, the outer surface of the intermediate portion 3060 can contact the adjacent surface of the hosel opening, as depicted in FIG. 100. This allows easier alignment of the mating features of the assembly during installation of the shaft and further improves the manufacturing process and efficiency. FIGS. 101 and 102 are enlarged views of the shaft sleeve 3056. As shown, the head portion 3062 of the shaft sleeve (which extends above the hosel 3052) can be angled relative to the intermediate portion 3060 by the angle 3066 so that the shaft and the head portion 3062 are both aligned along axis A. In alternative embodiments, the head portion 3062 can be aligned along axis B so that it is parallel to the intermediate portion 3060 and the lower portion 3058.

Adjustable Sole

As discussed above, the grounded loft 80 of a club head is the vertical angle of the centerface normal vector when the club is in the address position (i.e., when the sole is resting on the ground), or stated differently, the angle between the club face and a vertical plane when the club is in the address position. When the shaft loft of a club is adjusted, such as by employing the system disclosed in FIGS. 58-82 or the system shown in FIGS. 83-91 or by traditional bending of the shaft, the grounded loft does not change because the orientation of the club face relative to the sole of the club head does not change. On the other hand, adjusting the shaft loft is effective to adjust the square loft of the club by the same amount. Similarly, when shaft loft is adjusted and the club head is placed in the address position, the face angle of the club head increases or decreases in proportion to the change in shaft loft. For example, for a club having a 60-degree lie angle, decreasing the shaft loft by approximately 0.6 degree increases the face angle by +1.0 degree, resulting in the club face being more "open" or turned out. Conversely, increasing the shaft loft by approximately 0.6 degree decreases the face angle by −1.0 degree, resulting in the club face being more "closed" or turned in.

Figure 92:
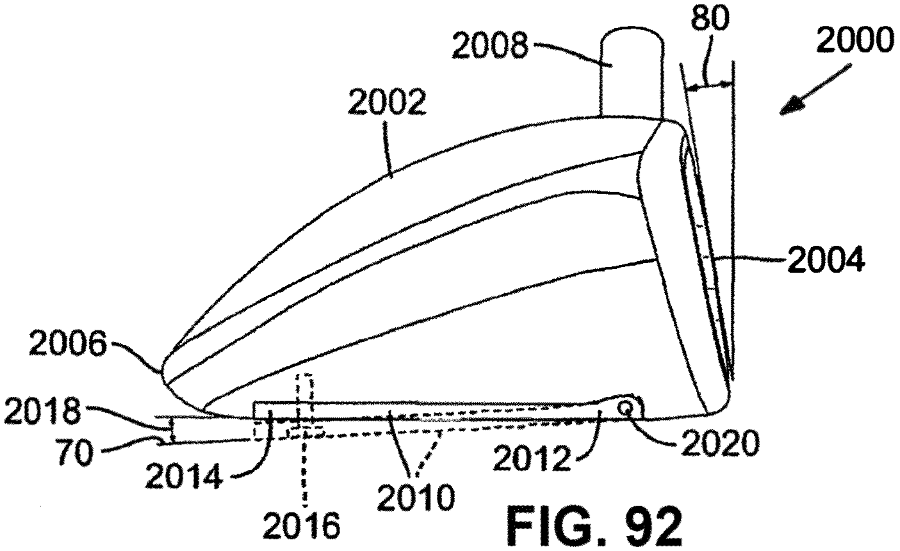
FIG. 92 is a side elevational view of a golf club head having an adjustable sole plate, in accordance with one embodiment.
Figure 93:
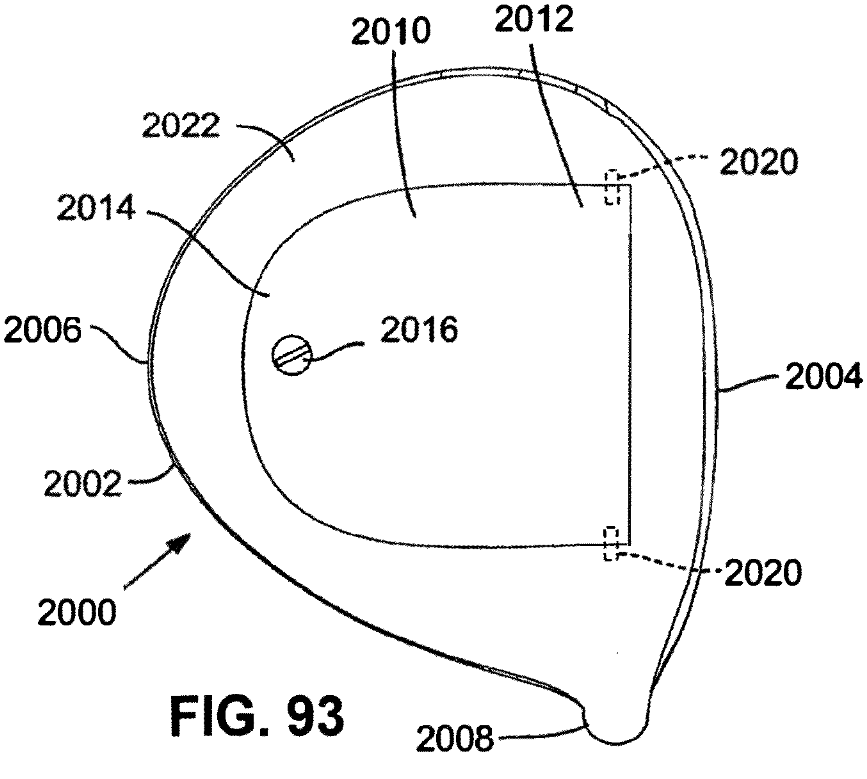
FIG. 93 is a bottom plan view of the golf club head of FIG. 88.
Figure 94:
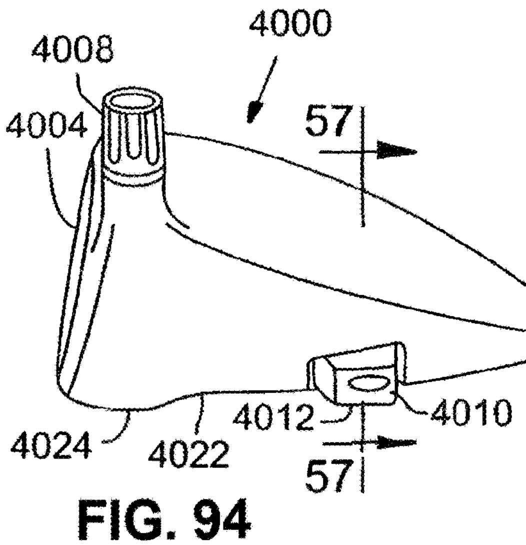
FIG. 94 is a side elevation view of a golf club head having an adjustable sole portion, according to another embodiment.
Figure 95:
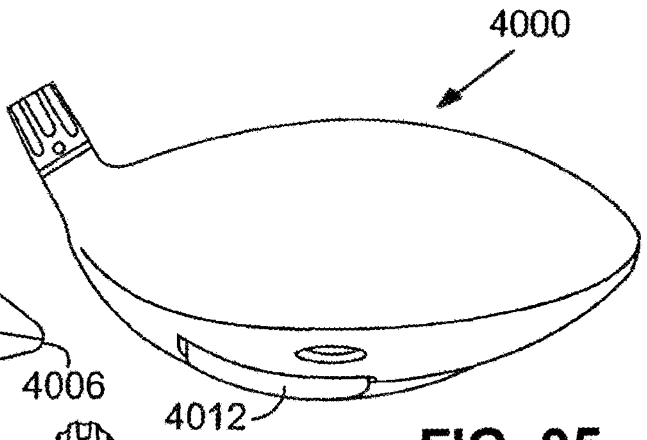
FIG. 95 is a rear elevation view of the golf club head of FIG. 94.

Conventional clubs do not allow for adjustment of the hosel/shaft loft without causing a corresponding change in the face angle. FIGS. 92-93 illustrates a club head 2000, according to one embodiment, configured to "decouple" the relationship between face angle and hosel/shaft loft (and therefore square loft), that is, allow for separate adjustment of square loft and face angle. The club head 2000 in the illustrated embodiment comprises a club head body 2002 having a rear end 2006, a striking face 2004 defining a forward end of the body, and a bottom portion 2022. The body also has a hosel 2008 for supporting a shaft (not shown).

The bottom portion 2022 comprises an adjustable sole 2010 (also referred to as an adjustable "sole portion") that can be adjusted relative to the club head body 2002 to raise and lower at least the rear end of the club head relative to the ground. As shown, the sole 2010 has a forward end portion 2012 and a rear end portion 2014. The sole 2010 can be a flat or curved plate that can be curved to conform to the overall curvature of the bottom 2022 of the club head. The forward end portion 2012 is pivotably connected to the body 2002 at a pivot axis defined by pivot pins 2020 to permit pivoting of the sole relative to the pivot axis. The rear end portion 2014 of the sole therefore can be adjusted upwardly or downwardly relative to the club head body so as to adjust the "sole angle" 2018 of the club (FIG. 92), which is defined as the angle between the bottom of the adjustable sole 2010 and the non-adjustable bottom surface 2022 of the club head body. As can be seen, varying the sole angle 2018 causes a corresponding change in the grounded loft 80. By pivotably connecting the forward end portion of the adjustable sole, the lower leading edge of the club head at the junction of the striking face and the lower surface can be positioned just off the ground at contact between the club head and a ball. This is desirable to help avoid so-called "thin" shots (when the club head strikes the ball too high, resulting in a low shot) and to allow a golfer to hit a ball "off the deck" without a tee if necessary.

The club head can have an adjustment mechanism that is configured to permit manual adjustment of the sole 2010. In the illustrated embodiment, for example, an adjustment screw 2016 extends through the rear end portion 2014 and into a threaded opening in the body (not shown). The axial position of the screw relative to the sole 2010 is fixed so that adjustment of the screw causes corresponding pivoting of the sole 2010. For example, turning the screw in a first direction lowers the sole 2010 from the position shown in solid lines to the position shown in dashed lines in FIG. 92. Turning the screw in the opposite direction raises the sole relative to the club head body. Various other techniques and mechanisms can be used to affect raising and lowering of the sole 2010.

Moreover, other techniques or mechanisms can be implemented in the club head 2000 to permit raising and lowering of the sole angle of the club. For example, the club head can comprise one or more lifts that are located near the rear end of the club head, such as shown in the embodiment of FIGS. 94-98, discussed below. The lifts can be configured to be manually extended downwardly through openings in the bottom portion 2022 of the club head to increase the sole angle and retracted upwardly into the club head to decrease the sole angle. In a specific implementation, a club head can have a telescoping protrusion near the aft end of the head which can be telescopingly extended and retracted relative to the club head to vary the sole angle.

In particular embodiments, the hosel 2008 of the club head can be configured to support a removable shaft at different predetermined orientations to permit adjustment of the shaft loft and/or lie angle of the club. For example, the club head 2000 can be configured to receive the assembly described above and shown in FIG. 59 (shaft sleeve 900, adapter sleeve 1000, and insert 1100) to permit a user to vary the shaft loft and/or lie angle of the club by selecting an adapter sleeve 1000 that supports the club shaft at the desired orientation. Alternatively, the club head can be adapted to receive the assembly shown in FIGS. 83-87 to permit adjustment of the shaft loft and/or lie angle of the club. In other embodiments, a club shaft can be connected to the hosel 2008 in a conventional manner, such as by adhesively bonding the shaft to the hosel, and the shaft loft can be adjusted by bending the shaft and hosel relative to the club head in a conventional manner. The club head 2000 also can be configured for use with the removable shaft assembly described above and disclosed in FIGS. 41-56.

Varying the sole angle of the club head changes the address position of the club head, and therefore the face angle of the club head. By adjusting the position of the sole and by adjusting the shaft loft (either by conventional bending or using a removable shaft system as described herein), it is possible to achieve various combinations of square loft and face angle with one club. Moreover, it is possible to adjust the shaft loft (to adjust square loft) while maintaining the face angle of club by adjusting the sole a predetermined amount.

As an example, Table 5 below shows various combinations of square loft, grounded loft, face angle, sole angle, and hosel loft that can be achieved with a club head that has a nominal or initial square loft of 10.4 degrees and a nominal or initial face angle of 6.0 degrees and a nominal or initial grounded loft of 14 degrees at a 60-degree lie angle. The nominal condition in Table 5 has no change in sole angle or hosel loft angle (i.e., Δsole angle=0.0 and Δhosel loft angle=0.0). The parameters in the other rows of Table 5 are deviations to this nominal state (i.e., either the sole angle and/or the hosel loft angle has been changed relative to the nominal state). In this example, the hosel loft angle is increased by 2 degrees, decreased by 2 degrees or is unchanged, and the sole angle is varied in 2-degree increments. As can be seen in the table, these changes in hosel loft angle and sole angle allows the square loft to vary from 8.4, 10.4, and 12.4 with face angles of −4.0, −0.67, 2.67, −7.33, 6.00, and 9.33. In other examples, smaller increments and/or larger ranges for varying the sole angle and the hosel loft angle can be used to achieve different values for square loft and face angle.

Also, it is possible to decrease the hosel loft angle and maintain the nominal face angle of 6.0 degrees by increasing the sole angle as necessary to achieve a 6.0-degree face angle at the adjusted hosel loft angle. For example, decreasing the hosel loft angle by 2 degrees of the club head represented in Table 5 will increase the face angle to 9.33 degrees. Increasing the sole angle to about 2.0 degrees will readjust the face angle to 6.0 degrees.

TABLE 5

| Square loft (deg) | Grounded loft (deg) | Face angle (deg) "+" = open "−" = closed | Δ Sole angle (deg) | Δ Hosel loft angle (deg) "+" = weaker "−" = stronger |
|---|---|---|---|---|
| 12.4 | 10.0 | −4.00 | 4.0 | 2.0 |
| 10.4 | 8.0 | −4.00 | 6.0 | 0.0 |
| 8.4 | 6.0 | −4.00 | 8.0 | −2.0 |
| 12.4 | 12.0 | −0.67 | 2.0 | 2.0 |
| 10.4 | 10.0 | −0.67 | 4.0 | 0.0 |
| 8.4 | 8.0 | −0.67 | 6.0 | −2.0 |
| 12.4 | 14.0 | 2.67 | 0.0 | 2.0 |
| 10.4 | 12.0 | 2.67 | 2.0 | 0.0 |
| 8.4 | 10.0 | 2.67 | 4.0 | −2.0 |
| 12.4 | 8.0 | −7.33 | 6.0 | 2.0 |
| 10.4 | 14.0 | 6.00 | 0.0 | 0.0 |
| 8.4 | 14.0 | 9.33 | 0.0 | −2.0 |
| 8.4 | 6.0 | −4.00 | 8.0 | −2.0 |

FIGS. 94-98 illustrates a golf club head 4000, according to another embodiment, that has an adjustable sole. The club head 4000 comprises a club head body 4002 having a rear end 4006, a striking face 4004 defining a forward end of the body, and a bottom portion 4022. The body also has a hosel 4008 for supporting a shaft (not shown). The bottom portion 4022 defines a leading edge surface portion 4024 adjacent the lower edge of the striking face that extends transversely across the bottom portion 4022 (i.e., the leading edge surface portion 4024 extends in a direction from the heel to the toe of the club head body).

Figure 96:
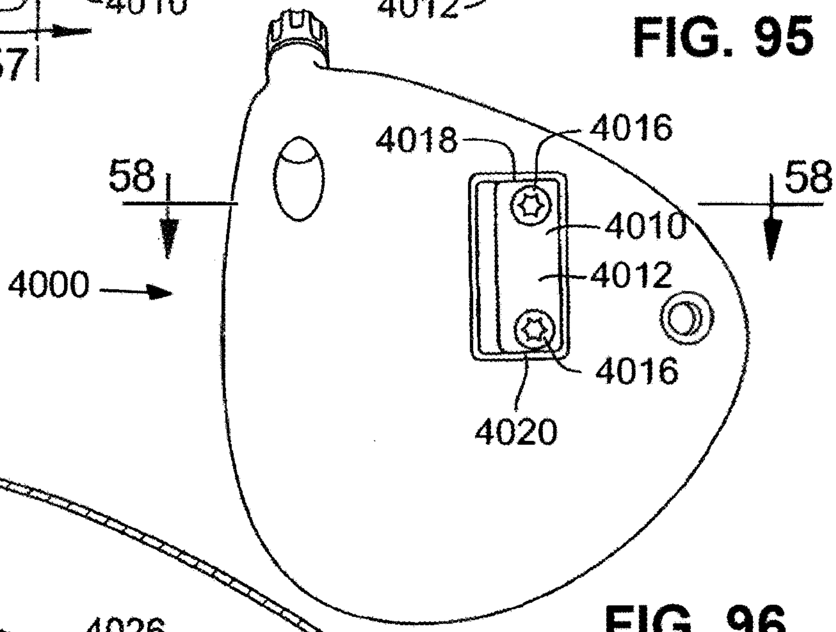
FIG. 96 is a bottom plan view of the golf club head of FIG. 94.

The bottom portion 4022 further includes an adjustable sole portion 4010 that can be adjusted relative to the club head body 4002 to raise and lower the rear end of the club head relative to the ground. As best shown in FIG. 96, the adjustable sole portion 4010 is elongated in the heel-to-toe direction of the club head and has a lower surface 4012 that desirably is curved to match the curvature of the leading edge surface portion 4024. In the illustrated embodiment, both the leading edge surface 4024 and the bottom surface 4012 of the sole portion 4010 are concave surfaces. In other embodiments, surfaces 4012 and 4024 are not necessarily curved surfaces but they desirably still have the same profile extending in the heel-to-toe direction. In this manner, if the club head deviates from the grounded address position (e.g., the club is held at a lower or flatter lie angle), the effective face angle of the club head does not change substantially, as further described below. The crown to face transition or top-line would stay relatively stable when viewed from the address position as the club is adjusted between the lie ranges described herein.

Therefore, the golfer is better able to align the club with the desired direction of the target line. In some embodiments, the top-line transition is clearly delineated by a masking line between the painted crown and the unpainted face.

The sole portion 4010 has a first edge 4018 located toward the heel of the club head and a second edge 4020 located at about the middle of the width of the club head. In this manner, the sole portion 4010 (from edge 4018 to edge 4020) has a length that extends transversely across the club head less than half the width of the club head. As noted above, studies have shown that most golfers address the ball with a lie angle between 10 and 20 degrees less than the intended scoreline lie angle of the club head (the lie angle when the club head is in the address position). The length of the sole portion 4010 in the illustrated embodiment is selected to support the club head on the ground at the grounded address position or any lie angle between 0 and 20 degrees less than the lie angle at the grounded address position. In alternative embodiments, the sole portion 4010 can have a length that is longer or shorter than that of the illustrated embodiment to support the club head at a greater or smaller range of lie angles. For example, the sole portion 4010 can extend past the middle of the club head to support the club head at lie angles that are greater than the scoreline lie angle (the lie angle at the grounded address position).

Figure 98:
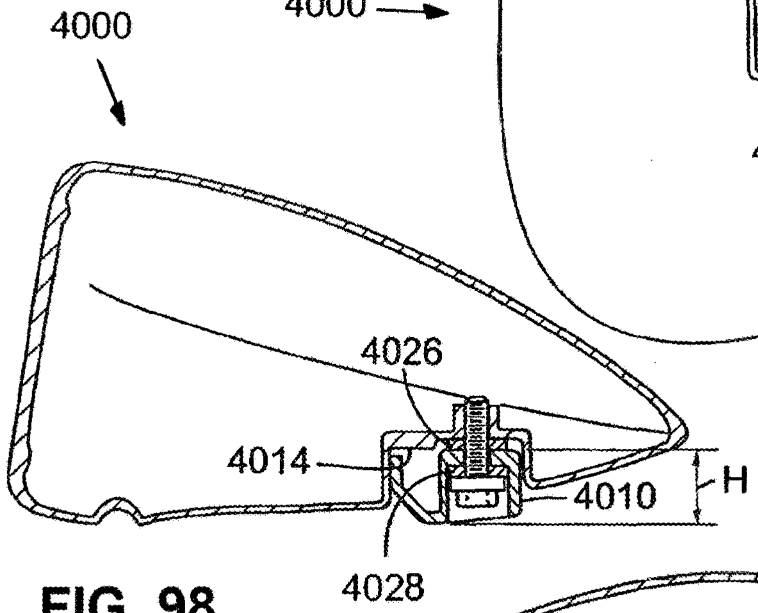
FIG. 98 is a cross-sectional view of the golf club head taken along line 58-58 of FIG. 96.
Figure 97:
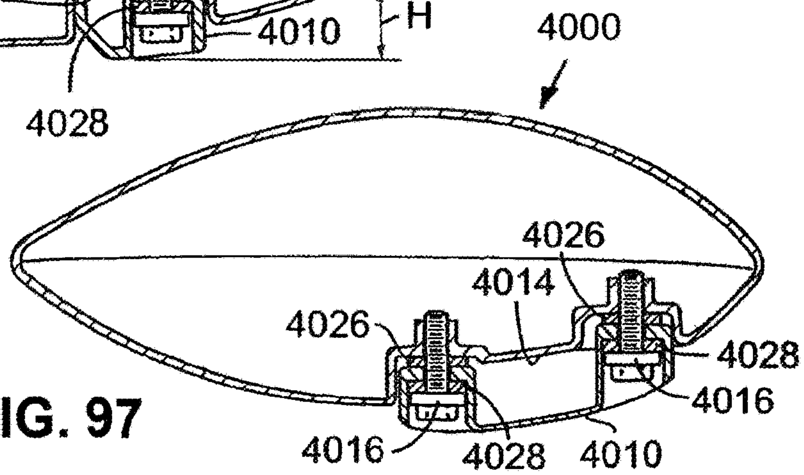
FIG. 97 is a cross-sectional view of the golf club head taken along line 57-57 of FIG. 94.

As best shown in FIGS. 97 and 98, the bottom portion of the club head body can be formed with a recess 4014 that is shaped to receive the adjustable sole portion 4010. One or more screws 4016 (two are shown in the illustrated embodiment) can extend through respective washers 4028, corresponding openings in the adjustable sole portion 4010, one or more shims 4026 and into threaded openings in the bottom portion 4022 of the club head body. The sole angle of the club head can be adjusted by increasing or decreasing the number of shims 4026, which changes the distance the sole portion 4010 extends from the bottom of the club head. The sole portion 4010 can also be removed and replaced with a shorter or taller sole portion 4010 to change the sole angle of the club. In one implementation, the club head is provided with a plurality of sole portions 4010, each having a different height H (FIG. 98) (e.g., the club head can be provided with a small, medium and large sole portion 4010). Removing the existing sole portion 4010 and replacing it with one having a greater height H increases the sole angle while replacing the existing sole portion 4010 with one having a smaller height H will decrease the sole angle.

In an alternative embodiment, the axial position of each of the screws 4016 relative to the sole portion 4010 is fixed so that adjustment of the screws causes the sole portion 4010 to move away from or closer to the club head. Adjusting the sole portion 4010 downwardly increases the sole angle of the club head while adjusting the sole portion upwardly decreases the sole angle of the club head. When a golfer changes the actual lie angle of the club by tilting the club toward or away from the body so that the club head deviates from the grounded address position, there is a slight corresponding change in face angle due to the loft of the club head. The effective face angle, eFA, of the club head is a measure of the face angle with the loft component removed (i.e. the angle between the horizontal component of the face normal vector and the target line vector), and can be determined by the following equation:

$$FA = -\arctan\left[\frac{(\sin\Delta lie \cdot \sin GL \cdot \cos MFA) - (\cos\Delta lie * \sin MFA)}{\cos GL \cdot \cos MFA}\right]$$

where Δlie=measured lie angle–scoreline lie angle, GL is the grounded loft angle of the club head, and MFA is the measured face angle.

As noted above, the adjustable sole portion 4010 has a lower surface 4012 that matches the curvature of the leading edge surface portion 4024 of the club head. Consequently, the effective face angle remains substantially constant as the golfer holds the club with the club head on the playing surface and the club is tilted toward and away from the golfer so as to adjust the actual lie angle of the club. In particular embodiments, the effective face angle of the club head 4000 is held constant within a tolerance of +/−0.2 degrees as the lie angle is adjusted through a range of 0 degrees to about 20 degrees less than the scoreline lie angle. In a specific implementation, for example, the scoreline lie angle of the club head is 60 degrees and the effective face angle is held constant within a tolerance of +/−0.2 degrees for lie angles between 60 degrees and 40 degrees. In another example, the scoreline lie angle of the club head is 60 degrees and the effective face angle is held constant within a tolerance of +/−0.1 degrees for lie angles between 60 degrees and 40 degrees. In several embodiments, the effective face angle is held constant within a tolerance of about +/−0.1 degrees to about +/−0.5 degrees. In certain embodiments, the effective face angle is held constant within a tolerance of about less than +/−1 degree or about less than +/−0.7 degrees.

Figure 99:
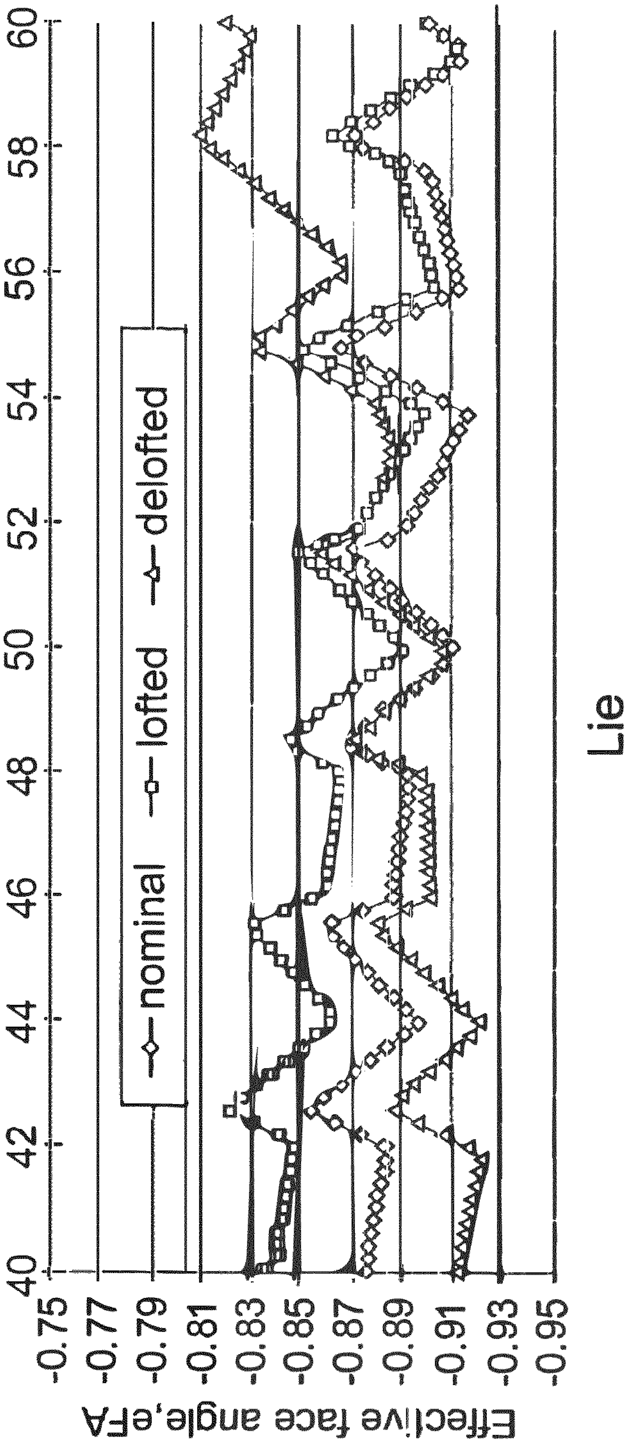
FIG. 99 is a graph showing the effective face angle through a range of lie angles for a shaft positioned at a nominal position, a lofted position and a delofted position.

FIG. 99 illustrates the effective face angle of a club head through a range of lie angles for a nominal state (the shaft loft is unchanged), a lofted state (the shaft loft is increased by 1.5 degrees), and a delofted state (the shaft loft is decreased by 1.5 degrees). In the lofted state, the sole portion 4010 was removed and replaced with a sole portion 4010 having a smaller height H to decrease the sole angle of the club head. In the delofted state, the sole portion was removed and replaced with a sole portion 4010 having a greater height H to increase the sole angle of the club head. As shown in FIG. 99, the effective face angle of the club head in the nominal, lofted and delofted state remained substantially constant through a lie angle range of about 40 degrees to about 60 degrees.

Materials

The components of the head-shaft connection assemblies disclosed in the present specification can be formed from any of various suitable metals, metal alloys, polymers, composites, or various combinations thereof.

In addition to those noted above, some examples of metals and metal alloys that can be used to form the components of the connection assemblies include, without limitation, carbon steels (e.g., 1020 or 8620 carbon steel), stainless steels (e.g., 304 or 410 stainless steel), PH (precipitation-hardenable) alloys (e.g., 17-4, C450, or C455 alloys), titanium alloys (e.g., 3-2.5, 6-4, SP700, 15-3-3-3, 10-2-3, or other alpha/near alpha, alpha-beta, and beta/near beta titanium alloys), aluminum/aluminum alloys (e.g., 3000 series alloys, 5000 series alloys, 6000 series alloys, such as 6061-T6, and 7000 series alloys, such as 7075), magnesium alloys, copper alloys, and nickel alloys.

Some examples of composites that can be used to form the components include, without limitation, glass fiber reinforced polymers (GFRP), carbon fiber reinforced polymers (CFRP), metal matrix composites (MMC), ceramic matrix composites (CMC), and natural composites (e.g., wood composites).

Some examples of polymers that can be used to form the components include, without limitation, thermoplastic materials (e.g., polyethylene, polypropylene, polystyrene, acrylic, PVC, ABS, polycarbonate, polyurethane, polyphenylene oxide (PPO), polyphenylene sulfide (PPS), polyether block amides, nylon, and engineered thermoplastics), thermosetting materials (e.g., polyurethane, epoxy, and polyester), copolymers, and elastomers (e.g., natural or synthetic rubber, EPDM, and Teflon®).

EXAMPLES

Table 6 illustrates twenty-four possible driver head configurations between a sleeve position and movable weight positions. Each configuration shown in Table 6 has a different configuration for providing a desired shot bias. An associated loft angle, face angle, and lie angle is shown corresponding to each sleeve position shown.

The tabulated values in Table 6 are assuming a nominal club loft of 10.5°, a nominal lie angle of 60°, and a nominal face angle of 2.0° in a neutral position. In the exemplary embodiment of Table 6, the offset angle is nominally 1.0°. The eight discrete sleeve positions "L", "N", NU", "R", "N-R", "N-L", NU-R", and NU-L" represent the different spline positions a golfer can position a sleeve with respect to the club head. Of course, it is understood that four, twelve, or sixteen sleeve positions are possible. In each embodiment, the sleeve positions are symmetric about four orthogonal positions. The preferred method to locate and lock these positions is with spline teeth engaged in a mating slotted piece in the hosel as described in the embodiments described herein.

The "L" or left position allows the golfer to hit a draw or draw biased shot. The "NU" or neutral upright position enables a user to hit a slight draw (less draw than the "L" position). The "N" or neutral position is a sleeve position having little or no draw or fade bias. In contrast, the "R" or right position increases the probability that a user will hit a shot with a fade bias.

TABLE 6

| Config. No. | Sleeve Position | Toe Weight | Rear Weight | Heel Weight | Loft Angle | Face Angle | Lie Angle |
|---|---|---|---|---|---|---|---|
| 1 | L | 16 g | 1 g | 1 g | 11.5° | 0.3° | 60° |
| 2 | L | 1 g | 16 g | 1 g | 11.5° | 0.3° | 60° |
| 3 | L | 1 g | 1 g | 16 g | 11.5° | 0.3° | 60° |
| 4 | N | 16 g | 1 g | 1 g | 10.5° | 2.0° | 59° |
| 5 | N | 1 g | 16 g | 1 g | 10.5° | 2.0° | 59° |
| 6 | N | 1 g | 1 g | 16 g | 10.5° | 2.0° | 59° |
| 7 | NU | 16 g | 1 g | 1 g | 10.5° | 2.0° | 61° |
| 8 | NU | 1 g | 16 g | 1 g | 10.5° | 2.0° | 61° |
| 9 | NU | 1 g | 1 g | 16 g | 10.5° | 2.0° | 61° |
| 10 | R | 16 g | 1 g | 1 g | 9.5° | 3.7° | 60° |
| 11 | R | 1 g | 16 g | 1 g | 9.5° | 3.7° | 60° |
| 12 | R | 1 g | 1 g | 16 g | 9.5° | 3.7° | 60° |
| 13 | N-R | 16 g | 1 g | 1 g | 9.8° | 3.2° | 59.3° |
| 14 | N-R | 1 g | 16 g | 1 g | 9.8° | 3.2° | 59.3° |
| 15 | N-R | 1 g | 1 g | 16 g | 9.8° | 3.2° | 59.3° |
| 16 | N-L | 16 g | 1 g | 1 g | 11.2° | 0.8° | 59.3° |
| 17 | N-L | 1 g | 16 g | 1 g | 11.2° | 0.8° | 59.3° |
| 18 | N-L | 1 g | 1 g | 16 g | 11.2° | 0.8° | 59.3° |
| 19 | NU-R | 16 g | 1 g | 1 g | 9.8° | 3.2° | 60.7° |
| 20 | NU-R | 1 g | 16 g | 1 g | 9.8° | 3.2° | 60.7° |
| 21 | NU-R | 1 g | 1 g | 16 g | 9.8° | 3.2° | 60.7° |
| 22 | NU-L | 16 g | 1 g | 1 g | 11.2° | 0.8° | 60.7° |
| 23 | NU-L | 1 g | 16 g | 1 g | 11.2° | 0.8° | 60.7° |
| 24 | NU-L | 1 g | 1 g | 16 g | 11.2° | 0.8° | 60.7° |

As shown in Table 6, the heaviest movable weight is about 16 g and two lighter weights are about 1 g. A total weight of 18 g is provided by movable weights in this exemplary embodiment. It is understood that the movable weights can be more than 18 g or less than 18 g depending on the desired CG location. The movable weights can be of a weight and configuration as described in U.S. Pat. Nos. 6,773,360, 7,166,040, 7,186,190, 7,407,447, 7,419,441 or U.S. patent application Ser. Nos. 11/025,469, 11/524,031, which are incorporated by reference herein. Placing the heaviest weight in the toe region will provide a draw biased shot. In contrast, placing the heaviest weight in the heel region will provide a fade biased shot and placing the heaviest weight in the rear position will provide a more neutral shot.

The exemplary embodiment shown in Table 6 provides at least five different loft angle values for eight different sleeve configurations. The loft angle value varies from about 9.5° to 11.5° for a nominal 10.5° loft (at neutral) club. In one embodiment, a maximum loft angle change is about 2°. The sleeve assembly or adjustable loft system described above can provide a total maximum loft change (Δloft) of about 0.5° to about 3° which can be described as the following expression:

$$0.5° \leq \Delta \text{loft} \leq 3°$$

The incremental loft change can be in increments of about 0.2° to about 1.5° in order to have a noticeable loft change while being small enough to fine tune the performance of the club head. As shown in Table 6, when the sleeve assembly is positioned to increase loft, the face angle is more closed with respect to how the club sits on the ground when the club is held in the address position. Similarly, when the sleeve assembly is positioned to decrease loft, the face angle sits more open.

Furthermore, five different face angle values for eight different sleeve configurations are provided in the embodiment of Table 6. The face angle varies from about 0.3° to 3.7° in the embodiment shown with a neutral face angle of 2.0°. In one embodiment, the maximum face angle change is about 3.4°. It should be noted that a 1° change in loft angle results in a 1.7° change in face angle.

The exemplary embodiment shown in Table 6 further provides five different lie angle values for eight different sleeve configurations. The lie angle varies from about 59° to 61° with a neutral lie angle of 60°. Therefore, in one embodiment, the maximum lie angle change is about 2°.

In an alternative exemplary embodiment, an equivalent 9.5° nominal loft club would have similar face angle and lie angle values described above in Table 6. However, the loft angle for an equivalent 9.5° nominal loft club would have loft values of about 1° less than the loft values shown throughout the various settings in Table 6. Similarly, an equivalent 8.5° nominal loft club would have a loft angle value of about 2° less than those shown in Table 6.

According to some embodiments of the present application, a golf club head has a loft angle between about 6 degrees and about 16 degrees or between about 13 degrees and about 30 degrees in the neutral position. In yet other embodiments, the golf club has a lie angle between about 55 degrees and about 65 degrees in the neutral position.

Table 7 illustrates another exemplary embodiment having a nominal club loft of 10.5°, a nominal lie angle of 60°, and a nominal face angle of 2.0°. In the exemplary embodiment of Table 7, the offset angle of the shaft is nominally 1.5°.

TABLE 7

| Sleeve Position | Loft Angle | Face Angle | Lie Angle |
|---|---|---|---|
| L | 12.0° | −0.5° | 60.0° |
| N | 10.5° | 2.0° | 58.5° |
| NU | 10.5° | 2.0° | 61.5° |
| R | 9.0° | 4.5° | 60.0° |
| N-R | 9.4° | 3.8° | 58.9° |
| N-L | 11.6° | 0.2° | 58.9° |
| NU-R | 9.4° | 3.8° | 61.1° |
| NU-L | 11.6° | 0.2° | 61.1° |

The different sleeve configurations shown in Table 7 can be combined with different movable weight configurations to achieve a desired shot bias, as already described above. In the embodiment of Table 7, the loft angle ranges from about 9.0° to 12.0° for a 10.5° neutral loft angle club resulting in a total maximum loft angle change of about 3°. The face angle in the embodiment of Table 7 ranges from about −0.5° to 4.5° for a 2.0° neutral face angle club thereby resulting in a total maximum face angle change of about 5°. The lie angle in Table 7 ranges from about 58.5° to 61.5° for a 60° neutral lie angle club resulting in a total maximum lie angle change of about 3°.

Figure 103A:
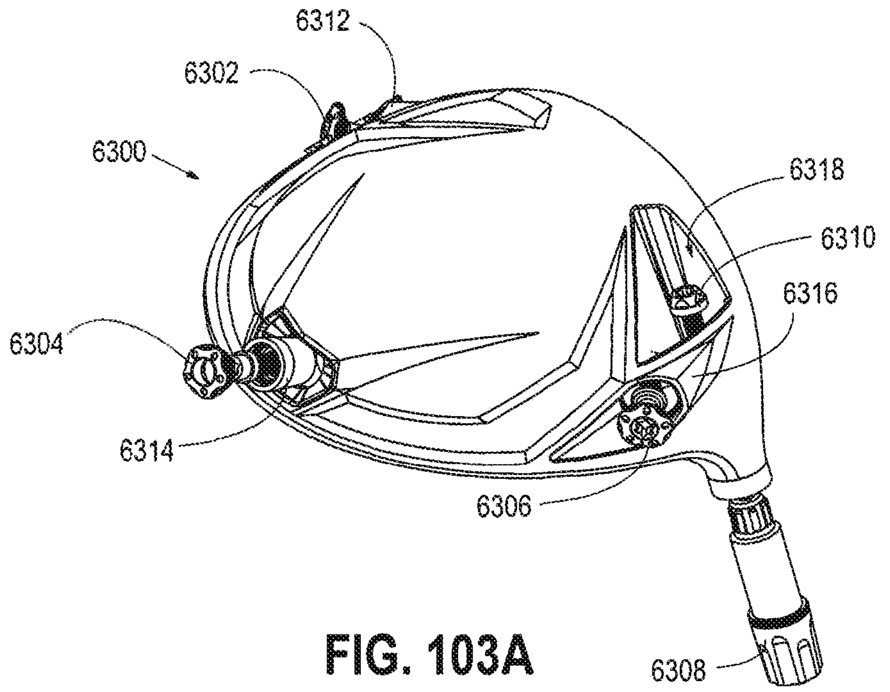
FIG. 103A is an exploded assembly view of a golf club head, in accordance with another embodiment.

FIG. 103A illustrates one exemplary embodiment of an exploded golf club head assembly. A golf club head 6300 is shown having a heel port 6316, a rear port 6314, a toe port 6312, a heel weight 6306, a rear weight 6304, and a toe weight 6302. The golf club head 6300 also includes a sleeve 6308 and screw 6310 as previously described. The screw 6310 is inserted into a hosel opening 6318 to secure the sleeve 6308 to the club head 6300.

Figure 103B:
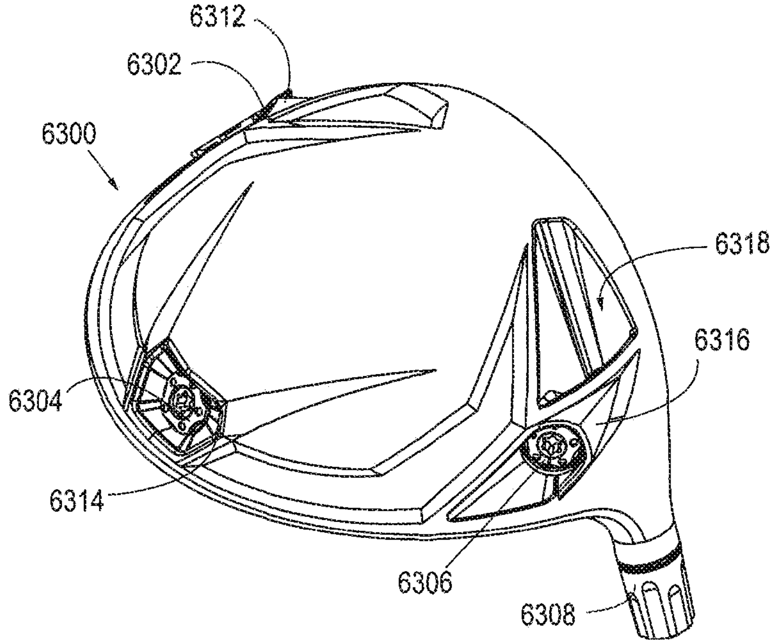
FIG. 103B is an assembled view of the golf club head of FIG. 103A.

FIG. 103B shows an assembled view of the golf club head 6300, sleeve 6308, screw 6310 and movable weights 6302, 6304, 6306. The golf club head 6300 includes the hosel opening 6318 which is comprised of primarily three planar surfaces or walls.

Mass Characteristics

A golf club head has a head mass defined as the combined masses of the body, weight ports, and weights. The total weight mass is the combined masses of the weight or weights installed on a golf club head. The total weight port mass is the combined masses of the weight ports and any weight port supporting structures, such as ribs.

In one embodiment, the rear weight 6304 is the heaviest weight being between about 15 grams to about 20 grams. In certain embodiments, the lighter weights can be about 1 gram to about 6 grams. In one embodiment, a single heavy weight of 16 g and two lighter weights of 1 g is preferred.

In some embodiments, a golf club head is provided with three weight ports having a total weight port mass between about 1 g and about 12 g. In certain embodiments, the weight port mass without ribs is about 3 g for a combined weight port mass of about 9 g. In some embodiments, the total weight port mass with ribbing is about 5 g to about 6 g for a combined total weight port mass of about 15 g to about 18 g.

Figure 104A:
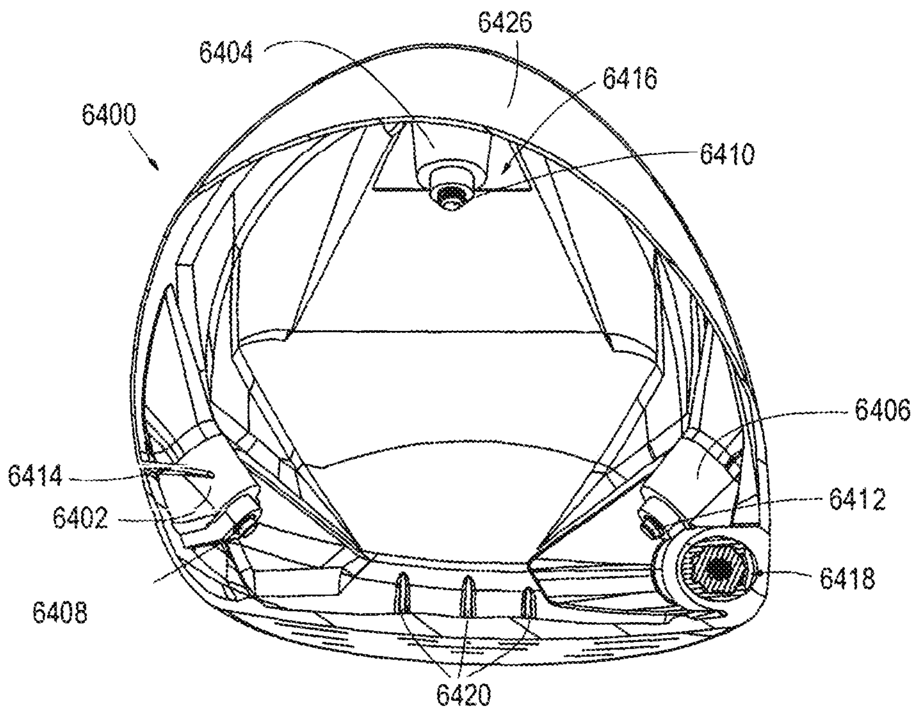
FIG. 104A is a top cross-sectional view of a golf club head, in accordance with another embodiment.

FIG. 104A illustrates a top cross-sectional view with a portion of the crown 6426 partially removed for purposes of illustration. A toe weight 6408, a rear weight 6410, and a heel weight 6412 are fully inserted into a toe weight port 6402, a rear weight port 6404, and a heel weight port 6406, respectively. A sleeve assembly 6418 of the type described herein is also shown. In one embodiment, the toe weight port 6402 is provided with at least one rib 6414 and the rear weight port 6404 is provided with at least one rib 6416. The heel weight port 6412 shown in FIG. 104A does not require a rib due to the additional stability and mass provided by the hosel recess walls 6422. Thus, in one embodiment, the heel weight port 6412 is lighter than the toe weight port 6402 and rear weight port 6404 due to the lack of ribbing. The toe weight port rib 6414 is comprised of a first rib 6414*a* and a second rib 6414*b* that attach the toe weight port rib to a portion of the interior wall of the sole 6424.

Figure 104B:
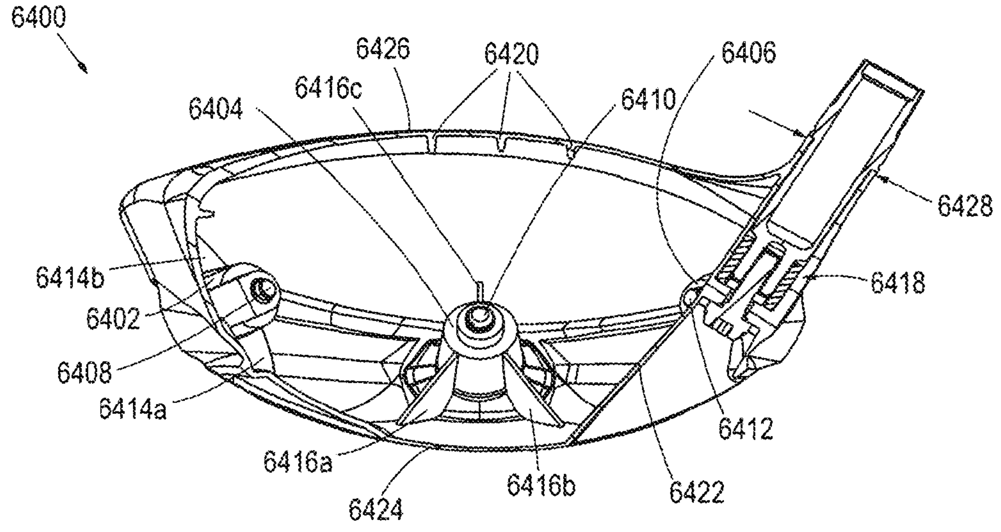
FIG. 104B is a front cross-section view of the golf club head of FIG. 104A.

FIG. 104B illustrates a front cross-sectional view showing the sleeve assembly 6418 and a hosel recess walls 6422. The heel weight port ribs 6416 are comprised of a first 6416*a*, second 6416*b*, and third 6416*c* rib. The first 6416*a* and second 6416*b* rib are attached to the outer surface of the rear weight port 6404 and an inner surface of the sole 6424. The third rib 6416*c* is attached to the outer surface of the rear weight port 6406 and an inner surface of the crown 6426.

In one embodiment, the addition of the sleeve assembly 6418 and hosel recess walls 6422 increase the weight in the heel region by about 10 g to about 12 g. In other words, a club head construction without the hosel recess walls 6422 and sleeve assembly 6418 would be about 10 g to about 12 g lighter. Due to the increase in weight in the heel region, a mass pad or fixed weight that might be placed in the heel region is unnecessary. Therefore, the additional weight from the hosel recess walls 6422 and sleeve assembly 6418 provides a sufficient impact on the center of gravity location without having to insert a mass pad or fixed weight.

In one exemplary embodiment, the weight port walls are roughly 0.6 mm to 1.5 mm thick and has a mass between 2 g to about 5 g. In one embodiment, the weight port walls alone weigh about 3 g to about 4 g. A hosel insert (as described above) has a weight of between 1 g to about 4 g. In one embodiment, the hosel insert is about 2 g. The sleeve that is inserted into the hosel insert weighs about 5 g to about 8 g. In one embodiment, the sleeve is about 6 g to about 7 g. The screw that is inserted into the sleeve weighs about 1 g to 2 g. In one exemplary embodiment, the screw weighs about 1 g to about 2 g.

Therefore, in certain embodiments, the hosel recess walls, hosel insert, sleeve, and screw have a combined weight of about 10 g to 15 g, and preferably about 14 g.

In some embodiments of the golf club head with three weight ports and three weights, the sum of the body mass, weight port mass, and weights is between about 80 g and about 220 g or between about 180 g and about 215 g. In specific embodiments the total mass of the club head is between 200 g and about 210 g and in one example is about 205 g.

The above mass characteristics seek to create a compact and lightweight sleeve assembly while accommodating the additional weight effects of the sleeve assembly on the CG of the club head. Preferably, the club head has a hosel outside diameter 6428 (shown in FIG. 104B) which is less than 15 mm or even more preferably less than 14 mm. The smaller hosel outside diameter when coupled with the sleeve assembly of the embodiments described above will ensure that a excessive weight in the hosel region is minimized and therefore does not have a significant effect on CG location. In other words, a small hosel diameter when coupled with the sleeve assembly is desirable for mass and CG properties and avoids the problems associated with a large, heavy, and bulky hosel. A smaller hosel outside diameter will also be more aesthetically pleasing to a player than a large and bulky hosel.

Volume Characteristics

The golf club head of the present application has a volume equal to the volumetric displacement of the club head body. In several embodiments, a golf club head of the present application can be configured to have a head volume between about 110 $cm^3$ and about 600 $cm^3$. In more particular embodiments, the head volume is between about 250 $cm^3$ and about 500 $cm^3$, 400 $cm^3$ and about 500 $cm^3$, 390 $cm^3$ and about 420 $cm^3$, or between about 420 $cm^3$ and 475 $cm^3$. In one exemplary embodiment, the head volume is about 390 to about 410 $cm^3$.

Moments of Inertia and CG Location

Golf club head moments of inertia are defined about axes extending through the golf club head CG. As used herein, the golf club head CG location can be provided with reference to its position on a golf club head origin coordinate system. The golf club head origin is positioned on the face plate at approximately the geometric center, i.e. the intersection of the midpoints of a face plate's height and width.

The head origin coordinate system includes an x-axis and a y-axis. The origin x-axis extends tangential to the face plate and generally parallel to the ground when the head is ideally positioned with the positive x-axis extending from the origin towards a heel of the golf club head and the negative x-axis extending from the origin to the toe of the golf club head. The origin y-axis extends generally perpendicular to the origin x-axis and parallel to the ground when the head is ideally positioned with the positive y-axis extending from the head origin towards the rear portion of the golf club. The head origin can also include an origin z-axis extending perpendicular to the origin x-axis and the origin y-axis and having a positive z-axis that extends from the origin towards the top portion of the golf club head and negative z-axis that extends from the origin towards the bottom portion of the golf club head.

In some embodiments, the golf club head has a CG with a head origin x-axis (CGx) coordinate between about −10 mm and about 10 mm and a head origin y-axis (CGy) coordinate greater than about 15 mm or less than about 50 mm. In certain embodiments, the club head has a CG with an origin x-axis coordinate between about −5 mm and about 5 mm, an origin y-axis coordinate greater than about 0 mm and an origin z-axis (CGz) coordinate less than about 0 mm.

More particularly, in specific embodiments of a golf club head having specific configurations, the golf club head has a CG with coordinates approximated in Table 8 below. The golf club head in Table 8 has three weight ports and three weights. In configuration 1, the heaviest weight is located in the back most or rear weight port. The heaviest weight is located in a heel weight port in configuration 2, and the heaviest weight is located in a toe weight port in configuration 3.

TABLE 8

| Configuration | CG origin x-axis coordinate (mm) | CG Y origin y-axis coordinate (mm) | CG Z origin z-axis coordinate (mm) |
|---|---|---|---|
| 1 | 0 to 5 | 31 to 36 | 0 to −5 |
| | 1 to 4 | 32 to 35 | −1 to −4 |
| | 2 to 3 | 33 to 34 | −2 to −3 |
| 2 | 3 to 8 | 27 to 32 | 0 to −5 |
| | 4 to 7 | 28 to 31 | −1 to −4 |
| | 5 to 6 | 29 to 30 | −2 to −3 |
| 3 | −2 to 3 | 27 to 32 | 0 to −5 |
| | −1 to 2 | 28 to 31 | −1 to −4 |
| | 0 to 1 | 29 to 30 | −2 to −3 |

Table 8 emphasizes the amount of CG change that can be possible by moving the movable weights. In one embodiment, the movable weight change can provide a CG change in the x-direction (heel-toe) of between about 2 mm and about 10 mm in order to achieve a large enough CG change to create significant performance change to offset or enhance the possible loft, lie, and face angel adjustments described above. A substantial change in CG is accomplished by having a large difference in the weight that is moved between different weight ports and having the weight ports spaced far enough apart to achieve the CG change. In certain embodiments, the CG is located below the center face with a CGz of less than 0. The CGx is between about −2 mm (toe-ward) and 8 mm (heel-ward) or even more preferably between about 0 mm and about 6 mm. Furthermore, the CGy can be between about 25 mm and about 40 mm (aft of the center-face).

A moment of inertia of a golf club head is measured about a CG x-axis, CG y-axis, and CG z-axis which are axes similar to the origin coordinate system except with an origin located at the center of gravity, CG.

In certain embodiments, the golf club head of the present invention can have a moment of inertia (Ixx) about the golf club head CG x-axis between about 70 kg·mm$^2$ and about 400 kg·mm$^2$. More specifically, certain embodiments have a moment of inertia about the CG x-axis between about 200 kg·mm$^2$ to about 300 kg·mm$^2$ or between about 200 kg·mm$^2$ and about 500 kg·mm$^2$.

In several embodiments, the golf club head of the present invention can have a moment of inertia (Izz) about the golf club head CG z-axis between about 200 kg·mm$^2$ and about 600 kg·mm$^2$. More specifically, certain embodiments have a moment of inertia about the CG z-axis between about 400 kg·mm$^2$ to about 500 kg·mm$^2$ or between about 350 kg·mm$^2$ and about 600 kg·mm$^2$.

In several embodiments, the golf club head of the present invention can have a moment of inertia (Iyy) about the golf club head CG y-axis between about 200 kg·mm$^2$ and 400 kg·mm$^2$. In certain specific embodiments, the moment of inertia about the golf club head CG y-axis is between about 250 kg·mm$^2$ and 350 kg·mm$^2$.

The moment of inertia can change depending on the location of the heaviest removable weight as illustrated in Table 9 below. Again, in configuration 1, the heaviest weight is located in the back most or rear weight port. The heaviest weight is located in a heel weight port in configuration 2, and the heaviest weight is located in a toe weight port in configuration 3.

TABLE 9

| Configuration | $I_{xx}$ (kg · mm$^2$) | $I_{yy}$ (kg · mm$^2$) | $I_{zz}$ (kg · mm$^2$) |
|---|---|---|---|
| 1 | 250 to 300 | 250 to 300 | 410 to 460 |
| | 260 to 290 | 260 to 290 | 420 to 450 |
| | 270 to 280 | 270 to 280 | 430 to 440 |
| 2 | 200 to 250 | 270 to 320 | 380 to 430 |
| | 210 to 240 | 280 to 310 | 390 to 420 |
| | 220 to 230 | 290 to 300 | 400 to 410 |
| 3 | 200 to 250 | 280 to 330 | 400 to 450 |
| | 210 to 240 | 290 to 320 | 410 to 440 |
| | 220 to 230 | 300 to 310 | 420 to 430 |

Thin Wall Construction

According to some embodiments of a golf club head of the present application, the golf club head has a thin wall construction. Among other advantages, thin wall construction facilitates the redistribution of material from one part of a club head to another part of the club head. Because the redistributed material has a certain mass, the material may be redistributed to locations in the golf club head to enhance performance parameters related to mass distribution, such as CG location and moment of inertia magnitude. Club head material that is capable of being redistributed without affecting the structural integrity of the club head is commonly called discretionary weight. In some embodiments of the present invention, thin wall construction enables discretionary weight to be removed from one or a combination of the striking plate, crown, skirt, or sole and redistributed in the form of weight ports and corresponding weights.

Thin wall construction can include a thin sole construction, i.e., a sole with a thickness less than about 0.9 mm but greater than about 0.4 mm over at least about 50% of the sole surface area; and/or a thin skirt construction, i.e., a skirt with a thickness less than about 0.8 mm but greater than about 0.4 mm over at least about 50% of the skirt surface area; and/or a thin crown construction, i.e., a crown with a thickness less than about 0.8 mm but greater than about 0.4 mm over at least about 50% of the crown surface area. In one embodiment, the club head is made of titanium and has a thickness less than 0.65 mm over at least 50% of the crown in order to free up enough weight to achieve the desired CG location.

More specifically, in certain embodiments of a golf club having a thin sole construction and at least one weight and two weight ports, the sole, crown and skirt can have respective thicknesses over at least about 50% of their respective surfaces between about 0.4 mm and about 0.9 mm, between about 0.8 mm and about 0.9 mm, between about 0.7 mm and about 0.8 mm, between about 0.6 mm and about 0.7 mm, or less than about 0.6 mm. According to a specific embodiment of a golf club having a thin skirt construction, the thickness of the skirt over at least about 50% of the skirt surface area can be between about 0.4 mm and about 0.8 mm, between about 0.6 mm and about 0.7 mm or less than about 0.6 mm.

The thin wall construction can be described according to areal weight as defined by the equation below.

$$AW = \rho \cdot t$$

In the above equation, AW is defined as areal weight, ρ is defined as density, and t is defined as the thickness of the material. In one exemplary embodiment, the golf club head is made of a material having a density, ρ, of about 4.5 $g/cm^3$ or less. In one embodiment, the thickness of a crown or sole portion is between about 0.04 cm to about 0.09 cm. Therefore the areal weight of the crown or sole portion is between about 0.18 $g/cm^2$ and about 0.41 $g/cm^2$. In some embodiments, the areal weight of the crown or sole portion is less than 0.41 $g/cm^2$ over at least about 50% of the crown or sole surface area. In other embodiments, the areal weight of the crown or sole is less than about 0.36 $g/cm^2$ over at least about 50% of the entire crown or sole surface area.

In certain embodiments, the thin wall construction is implemented according to U.S. patent application Ser. No. 11/870,913 and U.S. Pat. No. 7,186,190, which are incorporated herein by reference.

Variable Thickness Faceplate

According to some embodiments, a golf club head face plate can include a variable thickness faceplate. Varying the thickness of a faceplate may increase the size of a club head COR zone, commonly called the sweet spot of the golf club head, which, when striking a golf ball with the golf club head, allows a larger area of the face plate to deliver consistently high golf ball velocity and shot forgiveness. Also, varying the thickness of a faceplate can be advantageous in reducing the weight in the face region for re-allocation to another area of the club head.

Figure 105A:
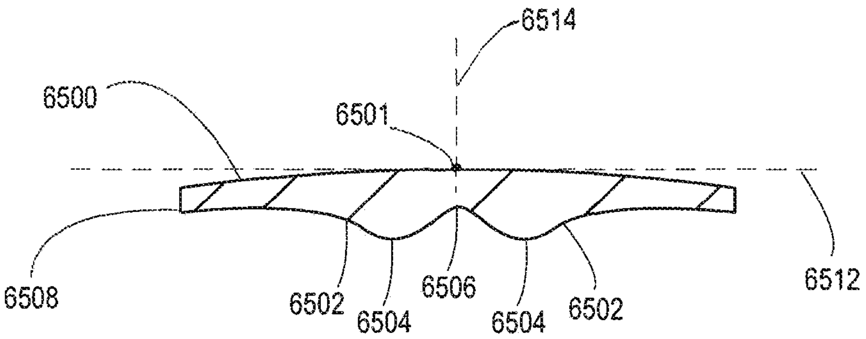
FIG. 105A is a cross-sectional view of a golf club head face plate protrusion.
Figure 105B:
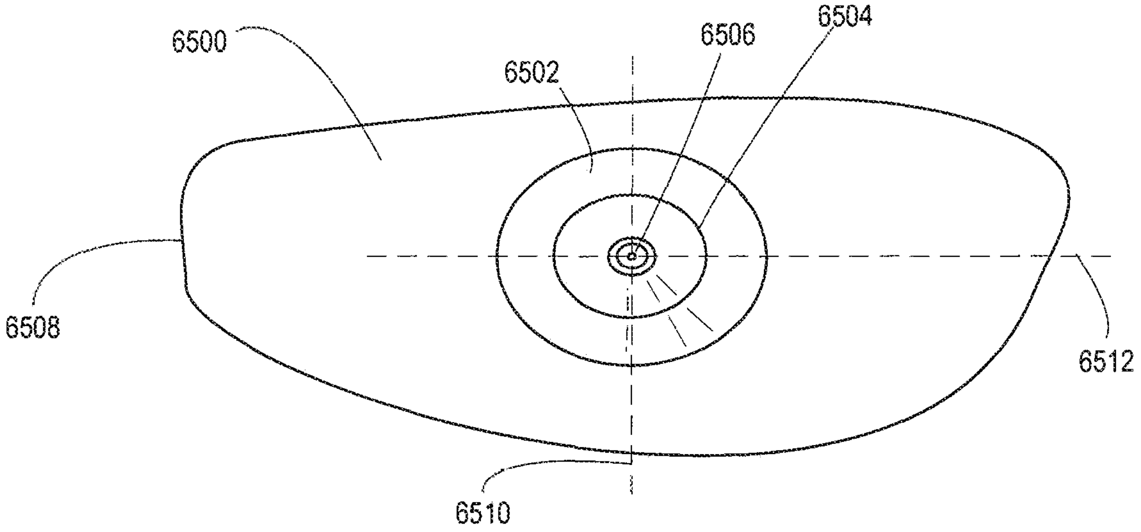
FIG. 105B is a rear view of a golf club face plate protrusion.

A variable thickness face plate 6500, according to one embodiment of a golf club head illustrated in FIGS. 105A and 105B, includes a generally circular protrusion 6502 extending into the interior cavity towards the rear portion of the golf club head. When viewed in cross-section, as illustrated in FIG. 105A, protrusion 6502 includes a portion with increasing thickness from an outer portion 6508 of the face plate 6500 to an intermediate portion 6504. The protrusion 6502 further includes a portion with decreasing thickness from the intermediate portion 6504 to an inner portion 6506 positioned approximately at a center of the protrusion preferably proximate the golf club head origin. An origin x-axis 6512 and an origin z-axis 6510 intersect near the inner portion 6506 across an x-z plane. However, the origin x-axis 6512, origin z-axis 6510, and an origin y-axis 6514 pass through an ideal impact location 6501 located on the striking surface of the face plate. In certain embodiments, the inner portion 6506 can be aligned with the ideal impact location with respect to the x-z plane.

In some embodiments of a golf club head having a face plate with a protrusion, the maximum face plate thickness is greater than about 4.8 mm, and the minimum face plate thickness is less than about 2.3 mm. In certain embodiments, the maximum face plate thickness is between about 5 mm and about 5.4 mm and the minimum face plate thickness is between about 1.8 mm and about 2.2 mm. In yet more particular embodiments, the maximum face plate thickness is about 5.2 mm and the minimum face plate thickness is about 2 mm. The face thickness should have a thickness change of at least 25% over the face (thickest portion compared to thinnest) in order to save weight and achieve a higher ball speed on off-center hits.

In some embodiments of a golf club head having a face plate with a protrusion and a thin sole construction or a thin skirt construction, the maximum face plate thickness is greater than about 3.0 mm and the minimum face plate thickness is less than about 3.0 mm. In certain embodiments, the maximum face plate thickness is between about 3.0 mm and about 4.0 mm, between about 4.0 mm and about 5.0 mm, between about 5.0 mm and about 6.0 mm or greater than about 6.0 mm, and the minimum face plate thickness is between about 2.5 mm and about 3.0 mm, between about 2.0 mm and about 2.5 mm, between about 1.5 mm and about 2.0 mm or less than about 1.5 mm.

In certain embodiments, a variable thickness face profile is implemented according to U.S. patent application Ser. No. 12/006,060, U.S. Pat. Nos. 6,997,820, 6,800,038, and 6,824,475, which are incorporated herein by reference.

Distance Between Weight Ports

In some embodiments of a golf club head having at least two weight ports, a distance between the first and second weight ports is between about 5 mm and about 200 mm. In more specific embodiments, the distance between the first and second weight ports is between about 5 mm and about 100 mm, between about 50 mm and about 100 mm, or between about 70 mm and about 90 mm. In some specific embodiments, the first weight port is positioned proximate a toe portion of the golf club head and the second weight port is positioned proximate a heel portion of the golf club head.

In some embodiments of the golf club head having first, second and third weight ports, a distance between the first and second weight port is between about 40 mm and about 100 mm, and a distance between the first and third weight port, and the second and third weight port, is between about 30 mm and about 90 mm. In certain embodiments, the distance between the first and second weight port is between about 60 mm and about 80 mm, and the distance between the first and third weight port, and the second and third weight port, is between about 50 mm and about 80 mm. In a specific example, the distance between the first and second weight port is between about 80 mm and about 90 mm, and the distance between the first and third weight port, and the second and third weight port, is between about 70 mm and about 80 mm. In some embodiments, the first weight port is positioned proximate a toe portion of the golf club head, the second weight port is positioned proximate a heel portion of the golf club head and the third weight port is positioned proximate a rear portion of the golf club head.

In some embodiments of the golf club head having first, second, third and fourth weights ports, a distance between the first and second weight port, the first and fourth weight port, and the second and third weight port is between about 40 mm and about 100 mm; a distance between the third and fourth weight port is between about 10 mm and about 80 mm; and a distance between the first and third weight port and the second and fourth weight port is about 30 mm to about 90 mm. In more specific embodiments, a distance between the first and second weight port, the first and fourth weight port, and the second and third weight port is between about 60 mm and about 80 mm; a distance between the first and third weight port and the second and fourth weight port is between about 50 mm and about 70 mm; and a distance between the third and fourth weight port is between about 30 mm and about 50 mm. In some specific embodiments, the first weight port is positioned proximate a front toe portion of the golf club head, the second weight port is positioned proximate a front heel portion of the golf club head, the third weight port is positioned proximate a rear toe portion of the golf club head and the fourth weight port is positioned proximate a rear heel portion of the golf club head.

Product of Distance Between Weight Ports and the Maximum Weight

As mentioned above, the distance between the weight ports and weight size contributes to the amount of CG change made possible in a system having the sleeve assembly described above.

In some embodiments of a golf club head of the present application having two, three or four weights, a maximum weight mass multiplied by the distance between the maximum weight and the minimum weight is between about 450 g·mm and about 2,000 g·mm or about 200 g·mm and 2,000 g·mm. More specifically, in certain embodiments, the maximum weight mass multiplied by the weight separation distance is between about 500 g·mm and about 1,500 g·mm, between about 1,200 g·mm and about 1,400 g·mm.

When a weight or weight port is used as a reference point from which a distance, i.e., a vectorial distance (defined as the length of a straight line extending from a reference or feature point to another reference or feature point) to another weight or weights port is determined, the reference point is typically the volumetric centroid of the weight port.

When a movable weight club head and the sleeve assembly are combined, it is possible to achieve the highest level of club trajectory modification while simultaneously achieving the desired look of the club at address. For example, if a player prefers to have an open club face look at address, the player can put the club in the "R" or open face position. If that player then hits a fade (since the face is open) shot but prefers to hit a straight shot, or slight draw, it is possible to take the same club and move the heavy weight to the heel port to promote draw bias. Therefore, it is possible for a player to have the desired look at address (in this case open face) and the desired trajectory (in this case straight or slight draw).

In yet another advantage, by combining the movable weight concept with an adjustable sleeve position (effecting loft, lie and face angle) it is possible to amplify the desired trajectory bias that a player may be trying to achieve.

For example, if a player wants to achieve the most draw possible, the player can adjust the sleeve position to be in the closed face position or "L" position and also put the heavy weight in the heel port. The weight and the sleeve position work together to achieve the greater draw bias possible. On the other hand, to achieve the greatest fade bias, the sleeve position can be set for the open face or "R" position and the heavy weight is placed in the top port.

Product of Distance Between Weight Ports the Maximum Weight, and the Maximum Loft Change As described above, the combination of a large CG change (measured by the heaviest weight multiplied by the distance between the ports) and a large loft change (measured by the largest possible change in loft between two sleeve positions, Δloft) results in the highest level of trajectory adjustability. Thus, a product of the distance between at least two weight ports, the maximum weight, and the maximum loft change is important in describing the benefits achieved by the embodiments described herein.

In one embodiment, the product of the distance between at least two weight ports, the maximum weight, and the maximum loft change is between about 50 mm·g·deg and about 6,000 mm·g·deg or even more preferably between about 500 mm·g·deg and about 3,000 mm·g·deg. In other words, in certain embodiments, the golf club head satisfies the following expressions:

$$50 \text{ mm}\cdot\text{g}\cdot\text{degrees} < Dwp\cdot Mhw\cdot \Delta loft < 6{,}000 \text{ mm}\cdot\text{g}\cdot\text{degrees}$$

$$500 \text{ mm}\cdot\text{g}\cdot\text{degrees} < Dwp\cdot Mhw\cdot \Delta loft < 3{,}000 \text{ mm}\cdot\text{g}\cdot\text{degrees}$$

In the above expressions, Dwp, is the distance between two weight port centroids (mm), Mhw, is the mass of the heaviest weight (g), and Δloft is the maximum loft change (degrees) between at least two sleeve positions. A golf club head within the ranges described above will ensure the highest level of trajectory adjustability.

Torque Wrench

Figure 106:
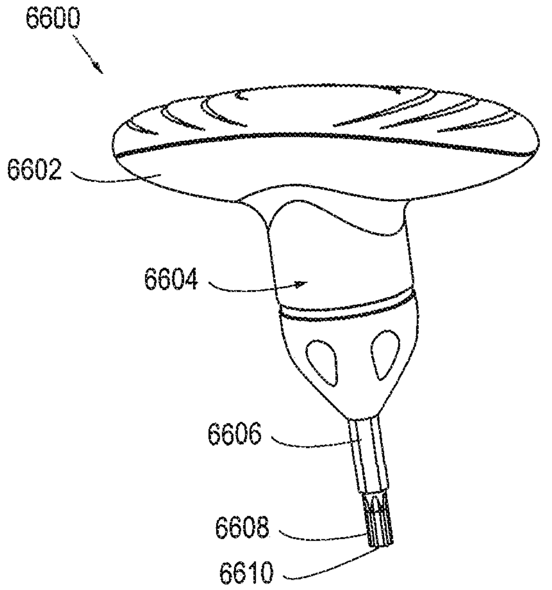
FIG. 106 is an isometric view of a tool.

With respect to FIG. 106, the torque wrench 6600 includes a grip 6602, a shank 6606 and a torque limiting mechanism housed inside the torque wrench. The grip 6602 and shank 6606 form a T-shape and the torque-limiting mechanism is located between the grip 6602 and shank 6606 in an intermediate region 6604. The torque-limiting mechanism prevents over-tightening of the movable weights, the adjustable sleeve, and the adjustable sole features of the embodiments described herein. In use, once the torque limit is met, the torque-limiting mechanism of the exemplary embodiment will cause the grip 6602 to rotationally disengage from the shank 6606. Preferably, the wrench 6600 is limited to between about 30 inch-lbs. and about 50 inch-lbs of torque. More specifically, the limit is between about 35 inch-lbs. and about 45 inch-lbs. of torque. In one exemplary embodiment, the wrench 6600 is limited to about 40 inch-lbs. of torque.

The use of a single tool or torque wrench 6600 for adjusting the movable weights, adjustable sleeve or adjustable loft system, and adjustable sole features provides a unique advantage in that a user is not required to carry multiple tools or attachments to make the desired adjustments.

The shank 6606 terminates in an engagement end i.e. tip 6610 configured to operatively mate with the movable weights, adjustable sleeve, and adjustable sole features described herein. In one embodiment, the engagement end or tip 6610 is a bit-type drive tip having one single mating configuration for adjusting the movable weights, adjustable sleeve, and adjustable sole features. The engagement end can be comprised of lobes and flutes spaced equidistantly about the circumference of the tip.

In certain embodiments, the single tool 6600 is provided to adjust the sole angle and the adjustable sleeve (i.e. affecting loft angle, lie angle, or face angle) only. In another embodiment, the single tool 6600 is provided to adjust the adjustable sleeve and movable weights only. In yet other embodiments, the single tool 6600 is provided to adjust the movable weights and sole angle only.

Composite Face Insert

Figure 107A:
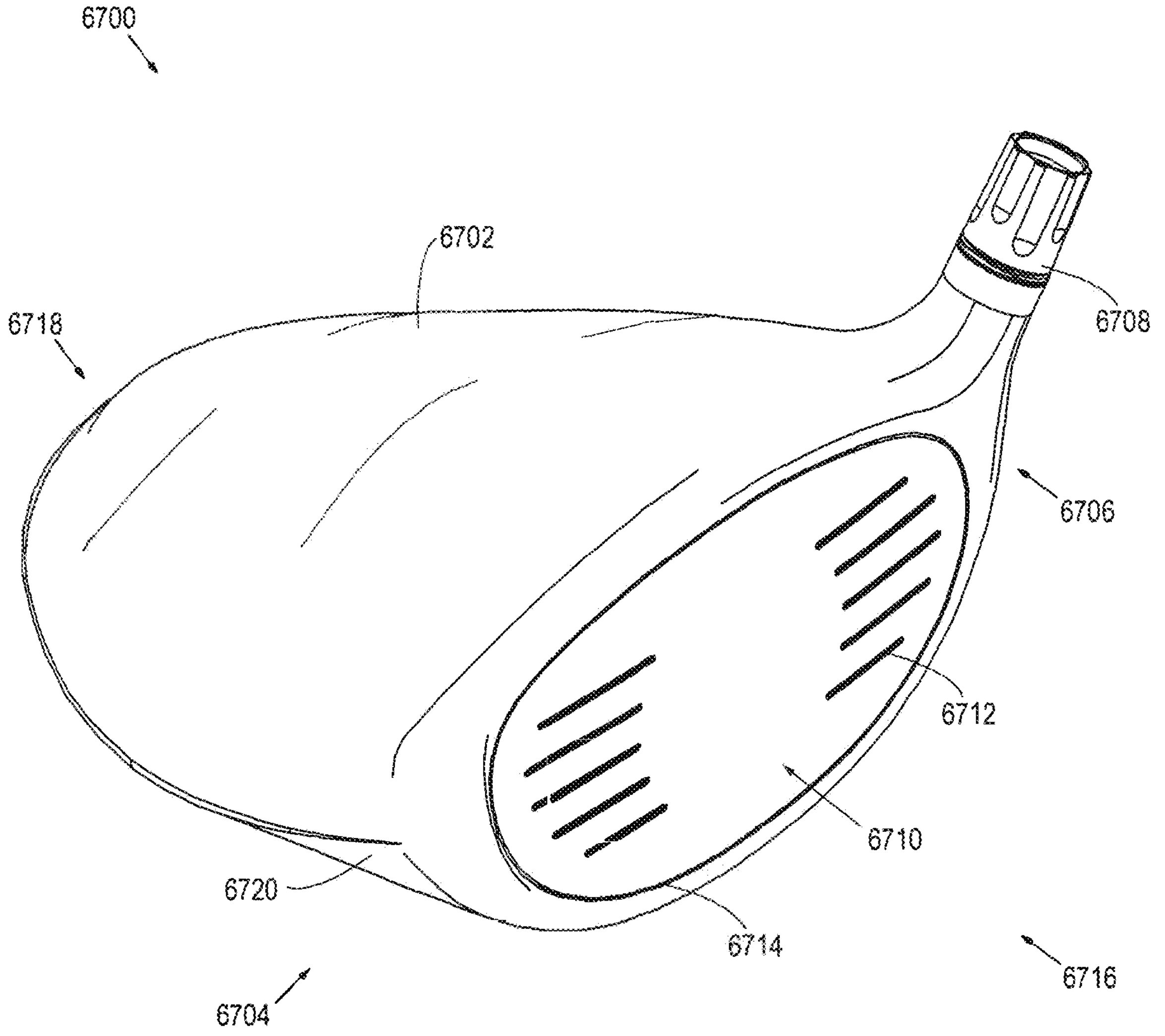
FIG. 107A is an isometric view of a golf club head.

FIG. 107A shows an isometric view of a golf club head 6700 including a crown portion 6702, a sole portion 6720, a rear portion 6718, a front portion 6716, a toe region 6704, heel region 6706, and a sleeve 6708. A face insert 6710 is inserted into a front opening inner wall 6714 located in the front portion 6716. The face insert 6710 can include a plurality of score lines.

Figure 107B:
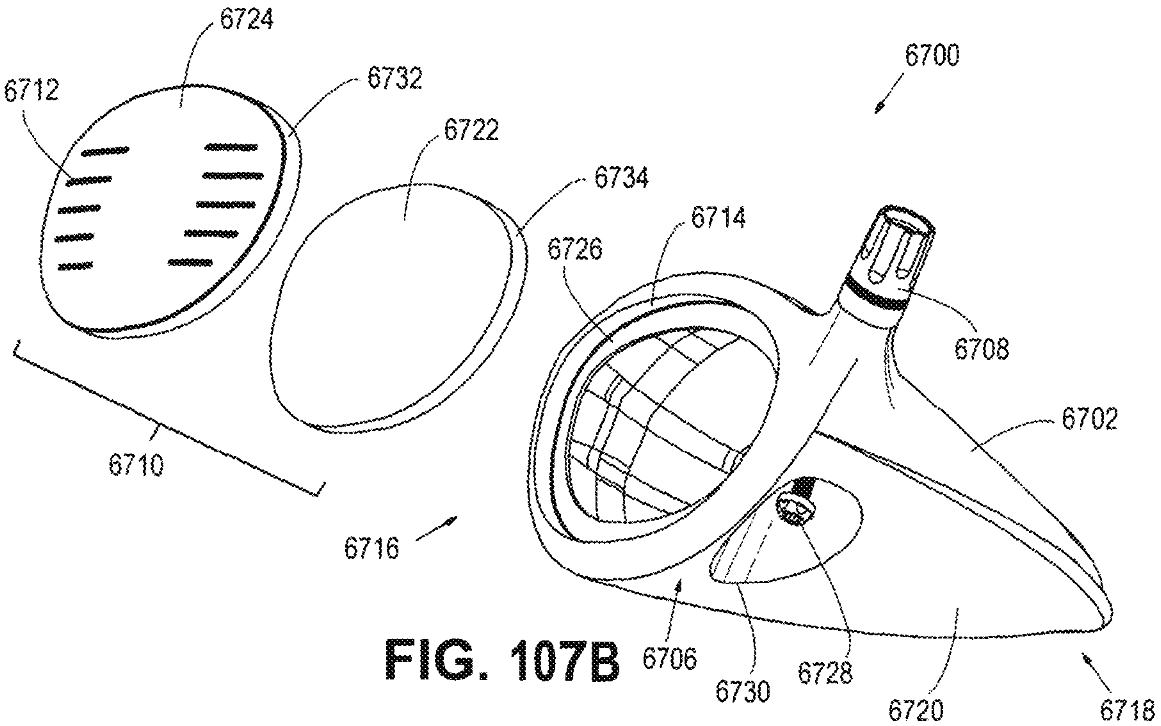
FIG. 107B is an exploded view of the golf club head of FIG. 107A.

FIG. 107B illustrates an exploded assembly view of the golf club head 6700 and a face insert 6710 including a composite face insert 6722 and a metallic cap 6724. In certain embodiments, the metallic cap 6724 is a titanium alloy, such as 6-4 titanium or CP titanium. In some embodiments, the metallic cap 6725 includes a rim portion 6732 that covers a portion of a side wall 6734 of the composite insert 6722.

In other embodiments, the metallic cap 6724 does not have a rim portion 6732 but includes an outer peripheral edge that is substantially flush and planar with the side wall 6734 of the composite insert 6722. A plurality of score lines 6712 can be located on the metallic cap 6724. The composite face insert 6710 has a variable thickness and is adhesively or mechanically attached to the insert ledge 6726 located within the front opening and connected to the front opening inner wall 6714. The insert ledge 6726 and the composite face insert 6710 can be of the type described in U.S. patent application Ser. Nos. 11/998,435, 11/642,310, 11/825,138, 11/823,638, 12/004,386, 12/004,387, 11/960,609, 11/960,610 and U.S. Pat. No. 7,267,620, which are herein incorporated by reference in their entirety.

FIG. 107B further shows a heel opening 6730 located in the heel region 6706 of the club head 6700. A fastening member 6728 is inserted into the heel opening 6730 to secure a sleeve 6708 in a locked position as shown in the various embodiments described above. In certain embodiments, the sleeve 6708 can have any of the specific design parameters disclosed herein and is capable of providing various face angle and loft angle orientations as described above.

Figure 107C:
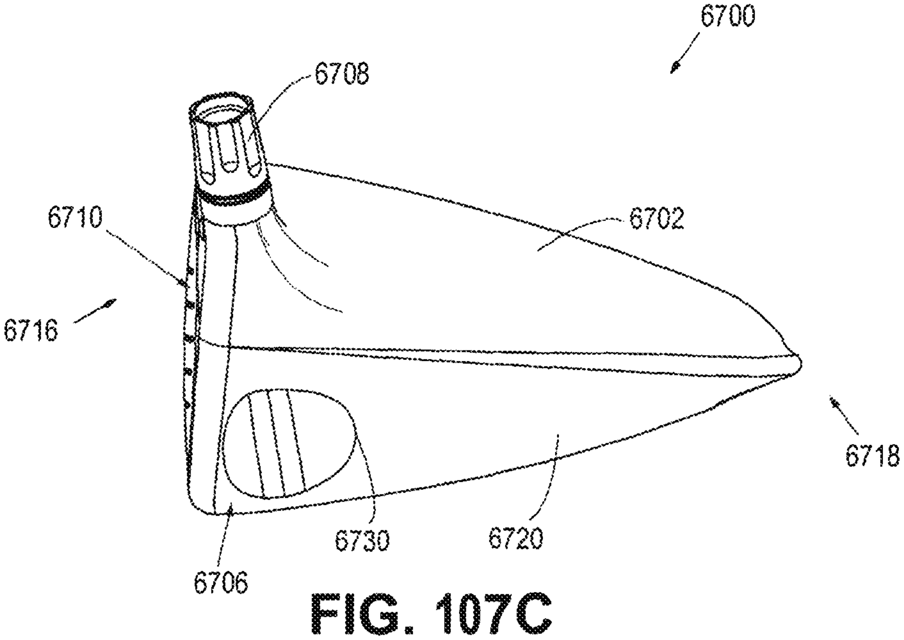
FIG. 107C is a side view of the golf club head of FIG. 107A.

FIG. 107C shows a heel-side view of the club head 6700 having the fastening member 6728 fully inserted into the heel opening 6730 to secure the sleeve 6708.

Figure 107D:
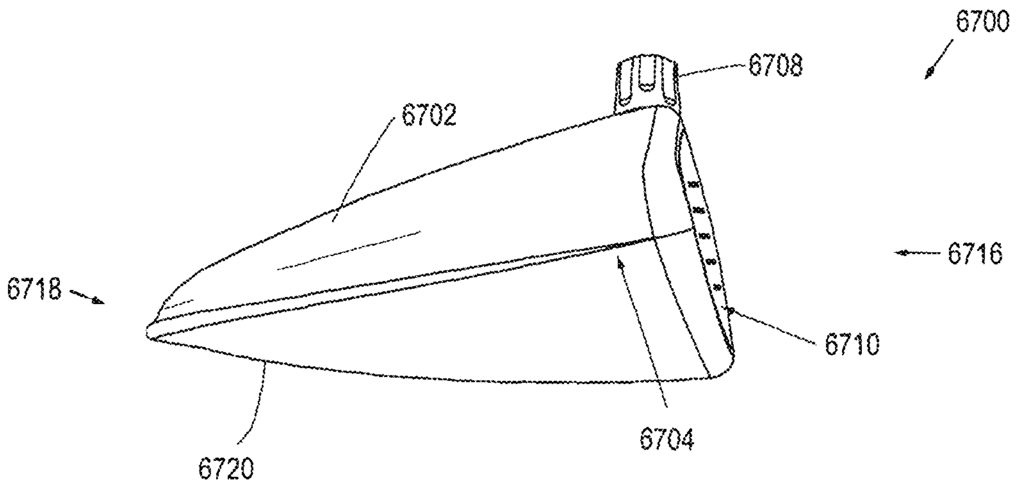
FIG. 107D is a side view of the golf club head of FIG. 107A.

FIG. 107D shows a toe-side view of the club head 6700 including the face insert 6710 and sleeve 6708.

Figure 107E:
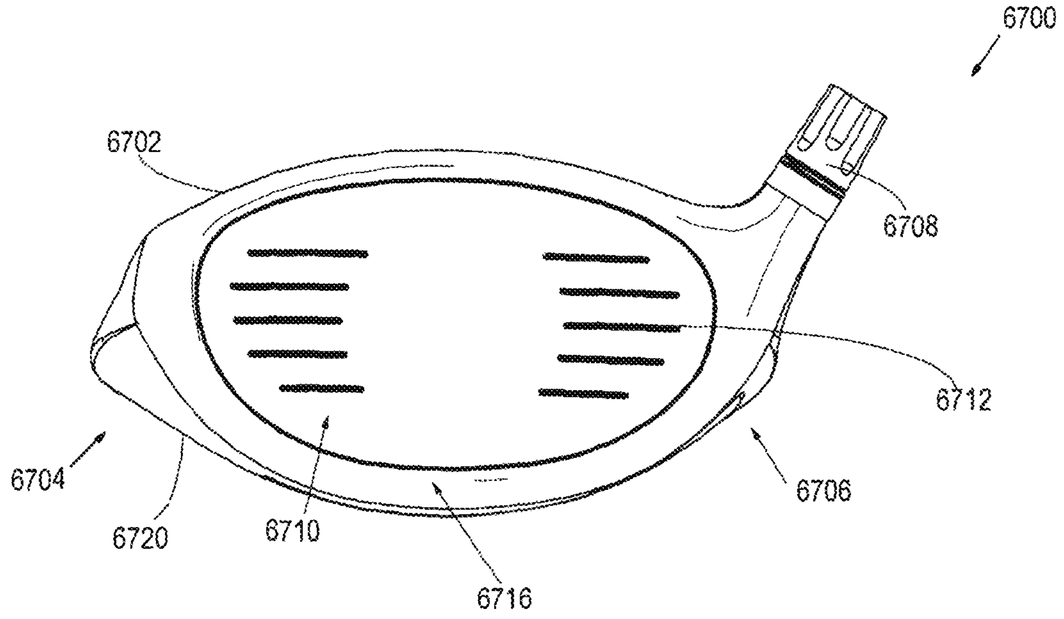
FIG. 107E is a front view of the golf club head of FIG. 107A.

FIG. 107E illustrates a front side view of the club head 6700 face insert 6710 and sleeve 6708.

Figure 107F:
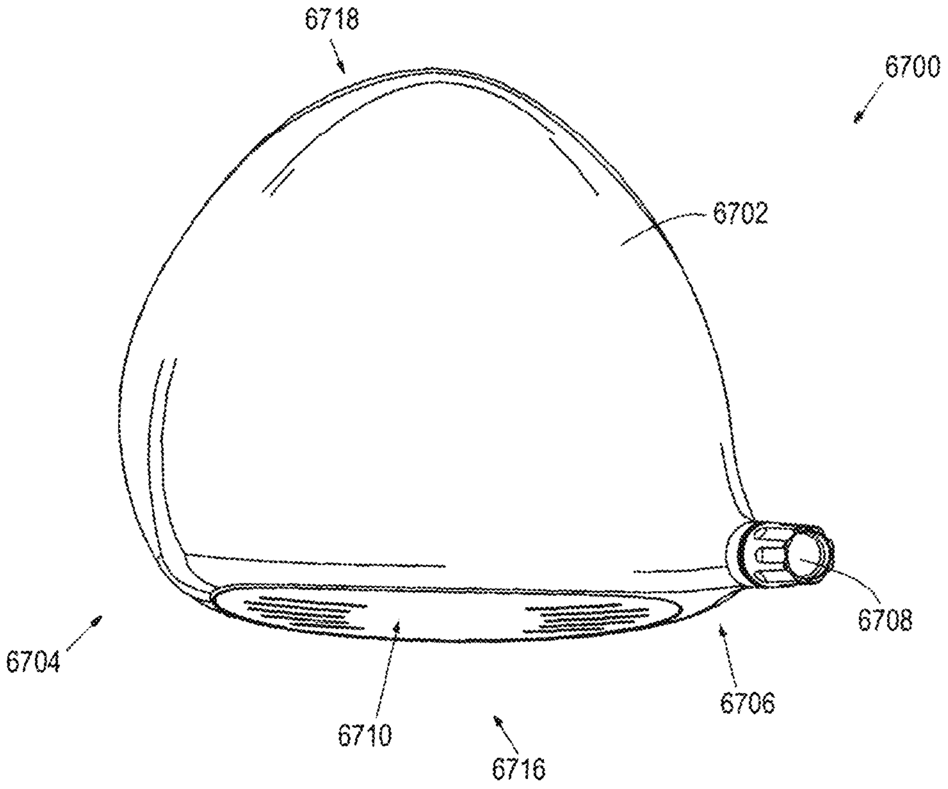
FIG. 107F is a top view of the golf club head of FIG. 107A.

FIG. 107F illustrates a top side view of the club head 6700 having the face insert 6710 and sleeve 6708 as described above.

Figure 107G:
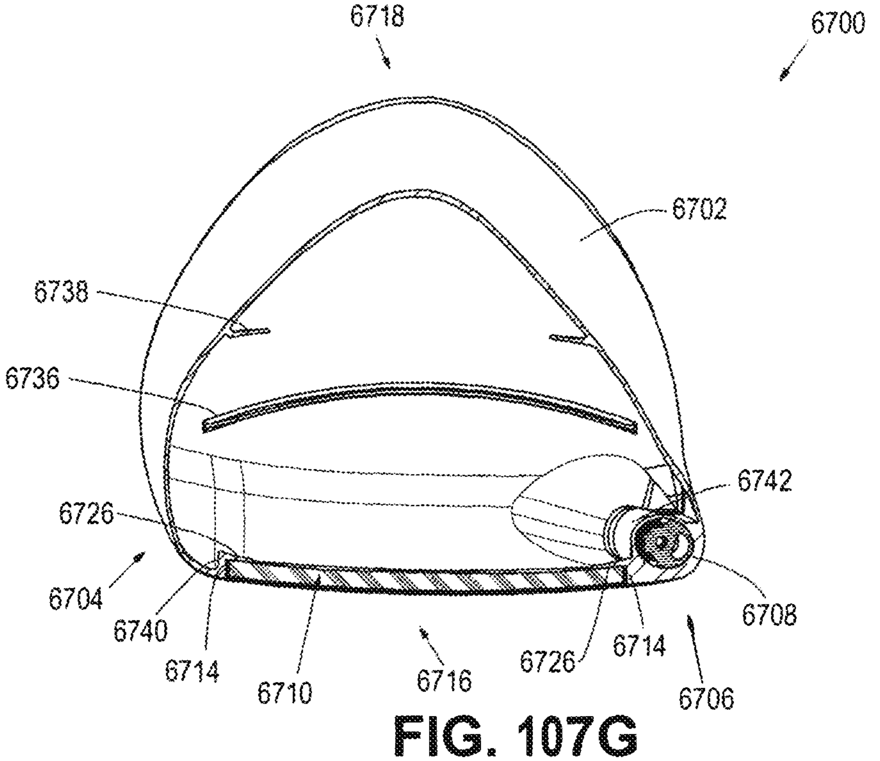
FIG. 107G is a cross-sectional top view of the golf club head of FIG. 107A.

FIG. 107G illustrates a cross-sectional view through a portion of the crown 6702 and face insert 6710. The front opening inner wall 6714 located near the toe region 6704 of the club head 6700 includes a front opening outer wall 6740 that defines a substantially constant thickness between the front opening inner wall 6714 and the front opening outer wall 6740. The front opening outer wall 6740 extends around a majority of the front opening circumference. However, in a portion of the heel region 6706 of the club head 6700, the front opening outer wall 6740 is not present.

FIG. 107G shows the front opening inner wall 6714 and a portion of the insert ledge 6726 being integral with a hosel opening interior wall 6742. The hosel opening interior wall 6742 extends from an interior sole portion to a hosel region near the heel region 6706. In one embodiment, the insert ledge 6726 extends from the hosel opening interior wall 6742 within an interior cavity of the club head 6700. Furthermore, a sole plate rib 6736 reinforces the interior of the sole 6720. In one embodiment, the sole plate rib 6736 extends in a heel to toe direction and is primarily parallel with the face insert 6710. A similar crown interior surface rib 6738 extends in a heel to toe direction along the interior surface of the crown 6702.

Figure 108:
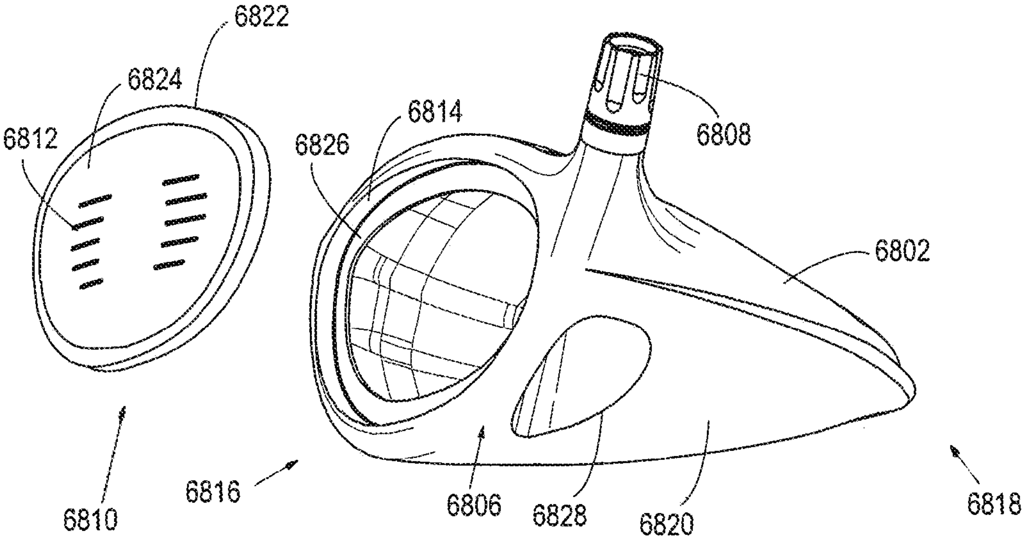
FIG. 108 is an isometric view of a golf club head.
Figure 109:
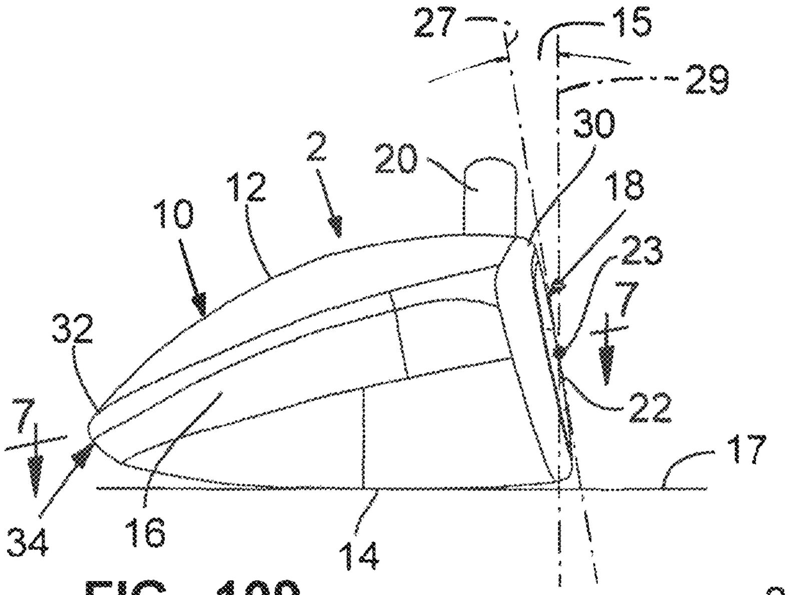
FIG. 109 is a side elevation view of a golf club head.
Figure 110:
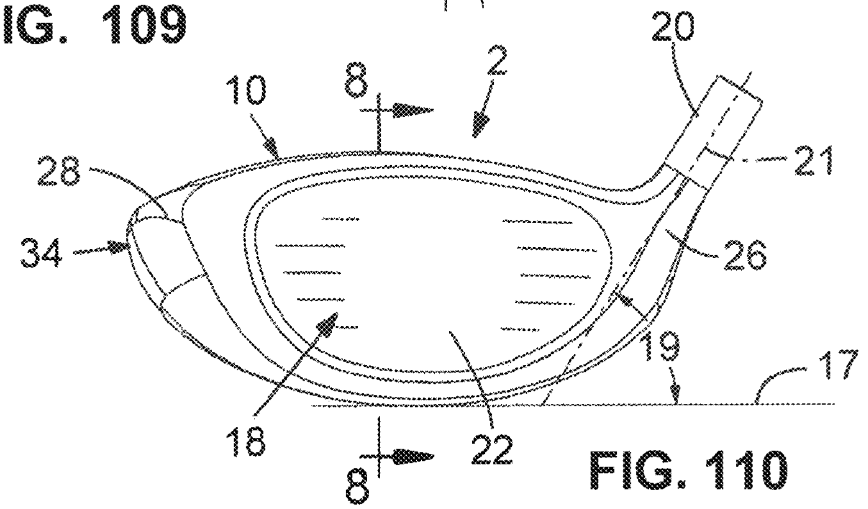
Figure 111:
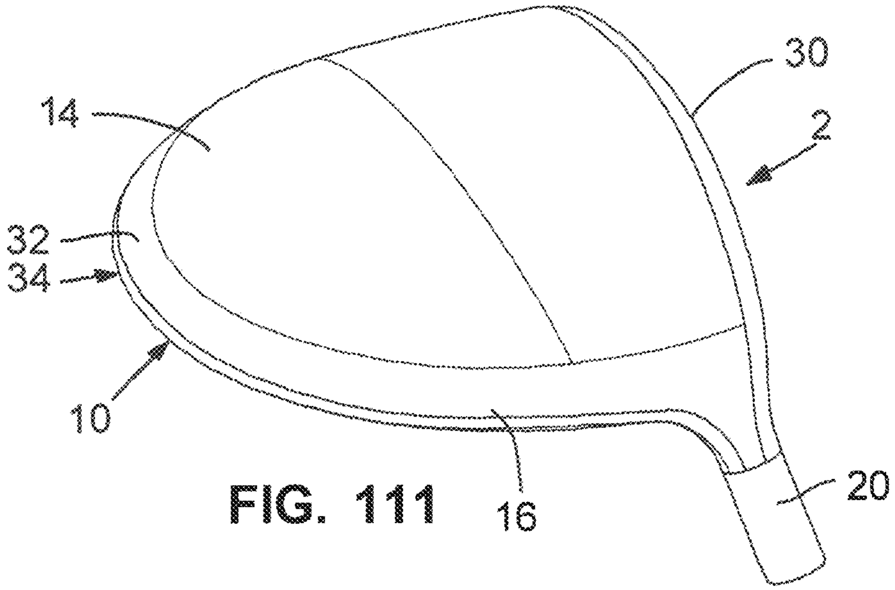

FIG. 108 shows an alternative embodiment having a sleeve 6808, a heel region 6806, a front region 6816, a rear region 6818, a hosel opening 6828, a front opening inner wall 6814, and an insert ledge 6826 as fully described above. However, FIG. 108 shows a face insert 6810 including a composite face insert 6822 with a front cover 6824. In one embodiment, the front cover 6824 is a polymer material. The face insert 6810 can include score lines located on the polymer cover 6824 or the composite face insert 6822.

The club head of the embodiments described in FIGS. 107A-G and FIG. 108 can have a mass of about 200 g to about 210 g or about 190 g to about 200 g. In certain embodiments, the mass of the club head is less than about 205 g. In one embodiment, the mass is at least about 190 g. Additional mass added by the hosel opening and the insert ledge in certain embodiments will have an effect on moment of inertia and center of gravity values as shown in Tables 10 and 11.

TABLE 10

| $I_{xx}$ ($kg \cdot mm^2$) | $I_{yy}$ ($kg \cdot mm^2$) | $I_{zz}$ ($kg \cdot mm^2$) |
|---|---|---|
| 330 to 340 | 340 to 350 | 520 to 530 |
| 320 to 350 | 330 to 360 | 510 to 540 |
| 310 to 360 | 320 to 370 | 500 to 550 |

TABLE 11

| CG origin x-axis coordinate (mm) | CG Y origin y-axis coordinate (mm) | CG Z origin z-axis coordinate (mm) |
|---|---|---|
| 5 to 7 | 32 to 34 | −5 to −6 |
| 4 to 8 | 31 to 36 | −4 to −7 |
| 3 to 9 | 30 to 37 | −3 to −8 |

A golf club having an adjustable loft and lie angle with a composite face insert can achieve the moment of inertia and CG locations listed in Table 10 and 11. In certain embodiments, the golf club head can include movable weights in addition to the adjustable sleeve system and composite face. In embodiments where movable weights are implemented, similar moment of inertia and CG values already described herein can be achieved.

The golf club head embodiments described herein provide a solution to the additional weight added by a movable weight system and an adjustable loft, lie, and face angle system. Any undesirable weight added to the golf club head makes it difficult to achieve a desired head size, moment of inertia, and nominal center of gravity location.

In certain embodiments, the combination of ultra thin wall casting technology, high strength variable face thickness, strategically placed compact and lightweight movable weight ports, and a lightweight adjustable loft, lie, and face angle system make it possible to achieve high performing moment of inertia, center of gravity, and head size values.

Furthermore, an advantage of the discrete positions of the sleeve embodiments described herein allow for an increased amount of durability and more user friendly system.

Whereas the invention has been described in connection with representative embodiments, it will be understood that the invention is not limited to those embodiments. On the contrary, the invention is intended to encompass all modifications, alternatives, and equivalents as may fall within the spirit and scope of the invention, as defined by the appended claims.

Numerous alterations, modifications, and variations of the preferred embodiments disclosed herein will be apparent to those skilled in the art and they are all anticipated and contemplated to be within the spirit and scope of the instant club head. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present club head are described herein, it is to be understood that the practice of such additional modifications and variations and the equivalents thereof, are within the spirit and scope of the club head as defined in the following claims. The corresponding structures, materials, acts, and equivalents of all means or step plus function elements in the claims below are intended to include any structure, material, or acts for performing the functions in combination with other claimed elements as specifically claimed.

We claim:

1. An aerodynamic golf club head comprising:

A) a body having a club head volume of at least 400 cc, a face, a sole section, a crown section, a front, a back, a heel, a toe, and a front-to-back dimension of 111.8-130.0 mm, wherein the body has a bore having a center that defines a shaft axis and shaft axis plane, where the shaft axis intersects a ground plane to define a ground origin point;

B) the face having a top edge and a lower edge, wherein a top edge height is an elevation of the top edge above the ground plane, a lower edge height is an elevation of the lower edge above the ground plane, and a difference between the top edge height and the lower edge height is no more than 65 mm;

C) the crown section having a crown apex located an apex height above the ground plane of 48-72 mm, and an apex plane passes through the crown apex and is parallel to the ground plane, wherein:

i) a portion of the crown is composed of nonmetallic material;

ii) the crown apex is located a crown apex x-dimension distance from the ground origin point, with the crown apex x-dimension distance measured parallel to the shaft axis plane;

iii) the crown section has a 12 degree pitched up orientation crown apex and defining a 12 degree pitched up/8 mm drop contour area (CA), wherein;

(a) the 12 degree pitched up orientation crown apex is located at a peak height of the crown section when the body is positioned in a 12 degree pitched up orientation that includes an absolute lie angle of 55 degrees, a face angle of 0 degrees, and a pitch angle of 12 degrees up;

(b) the 12 degree/8 mm drop contour area (CA) is defined as a cross-sectional area of an intersection of the crown section with an offset plane located at an elevation that is 8 mm below the 12 degree pitched up orientation crown apex and parallel to the ground plane when the body is positioned in the 12 degree pitched up orientation; and (c) wherein the body has a projected area of the face ($A_f$), and wherein the 12 degree pitched up/8 mm drop contour area (CA) is greater than a linear expression:

$$CA=-1.5395*A_f+19.127$$

D) a head-shaft connection assembly including a shaft sleeve configured to be received in the bore and the shaft sleeve is secured by a fastening member in a locked position, the head-shaft connection assembly configured to allow the golf club head to be adjustably attachable to a golf club shaft in a plurality of different positions resulting in an adjustability range of different combinations of loft angle, face angle, or lie angle;

E) wherein the golf club head has a head origin defined as a position on a face plane at a geometric center of the face, the head origin including an x-axis tangential to the face and generally parallel to the ground when the head is in an address position where a positive x-axis extends towards a heel portion and a negative x-axis extends towards a toe portion, a y-axis extending perpendicular to the x-axis and generally parallel to the ground plane when the head is in the address position where a positive y-axis extends from the face and through a rearward portion of the body, and a z-axis extending perpendicular to the ground plane, the x-axis, and the y-axis when the head is in the address position where a positive z-axis extends from the head origin and generally upward, wherein the golf club head has a center of gravity with a x-axis coordinate, a y-axis coordinate of 15-50 mm, and a z-axis coordinate; and F) wherein the golf club head has a total head mass of 190-210 grams, a moment of inertia about the center of gravity x-axis, Ixx, of 200-500 kg·mm$^2$, a moment of inertia about the center of gravity y-axis, Iyy, and a moment of inertia about the center of gravity z-axis, Izz, of 350-600 kg·mm$^2$.

2. The aerodynamic golf club head of claim 1, wherein a portion of the top edge height is at least 50.8 mm, a difference between the top edge height and the lower edge height is at least 45 mm, and the center of gravity z-axis coordinate is less than about 0 mm.

3. The aerodynamic golf club head of claim 2, further including a rear weight attached to the body proximate the back, and having a rear weight mass.

4. The aerodynamic golf club head of claim 3, wherein the rear weight mass is at least 15 grams, the center of gravity y-axis coordinate is at least 31 mm, and Ixx is at least 250 kg·mm$^2$.

5. The aerodynamic golf club head of claim 3, wherein the club head volume is at least 440 cc, and the front-to-back dimension is at least 116.84 mm.

6. The aerodynamic golf club head of claim 5, further including a forward weight attached to the body in a forward half of the head and having a forward weight mass less than the rear weight mass.

7. The aerodynamic golf club head of claim 6, wherein the rear weight is attached to a rear port in the head proximate the back, and the forward weight is attached to forward port in the forward half of the head, wherein a separation distance between the rear port and the forward port is at least 40 mm, the center of gravity y-axis coordinate is at least 33 mm, Ixx is at least 300 kg·mm$^2$, and Izz is at least 500 kg·mm$^2$.

8. The aerodynamic golf club head of claim 5, wherein the front-to-back dimension is at least 120.65 mm, the Ixx is at least 330 kg·mm$^2$, and the Izz is at least 520 kg·mm$^2$.

9. The aerodynamic golf club head of claim 3, wherein the body comprises aluminum alloy.

10. The aerodynamic golf club head of claim 9, wherein a portion of the face comprises a nonmetallic material.

11. The aerodynamic golf club head of claim 1, further including a heel weight attached to the body in a forward half of the head, and a toe weight attached to the body in the forward half of the head, and the center of gravity z-axis coordinate is less than about 0 mm.

12. The aerodynamic golf club head of claim 11, wherein a portion of the face comprises a nonmetallic material, and a portion of the top edge height is at least 50.8 mm.

13. The aerodynamic golf club head of claim 11, wherein the club head volume is at least 440 cc, a difference between the top edge height and the lower edge height is at least 45 mm, the body comprises aluminum alloy, and Ixx is at least 250 kg·mm$^2$.

14. The aerodynamic golf club head of claim 13, further including a rear weight attached to the body proximate the back, wherein the center of gravity z-axis coordinate is no more than-3.0 mm, a portion of the face comprises a nonmetallic material, a portion of the top edge height is at least 50.8 mm, the front-to-back dimension is at least 116.84 mm, an apex ratio of the apex height to the greatest top edge height is at least 1.13, and the 12 degree pitched up/8 mm drop contour area (CA) is greater than the following linear expression: CA=−1.5395*$A_f$+19.627.

15. The aerodynamic golf club head of claim 12, wherein a portion of the face comprises a thermoplastic material.

16. The aerodynamic golf club head of claim 12, wherein a portion of the face comprises an injection molded carbon fiber composite.

17. The aerodynamic golf club head of claim 1, wherein the crown transitions downward at a rearwardmost SCTR point located a rearwardmost SCTR point elevation above the ground plane with the rearwardmost SCTR point elevation greater than the center of gravity z-axis coordinate, and the center of gravity z-axis coordinate is less than about 0 mm.

18. The aerodynamic golf club head of claim 1, wherein an apex ratio of the apex height to the greatest top edge height is at least 1.13, and the crown apex is located behind a forwardmost point on the face a distance that is a crown apex setback dimension measured in the direction of the y-axis toward the back, the crown apex setback dimension is at least 10% of the front-to-back dimension and less than 44.4 mm, and the crown apex setback dimension is less than a distance from a vertical projection of the center of gravity on the ground plane to a second vertical projection of the forwardmost point on the face on the ground plane.

19. An aerodynamic golf club head comprising:

A) a body having a club head volume of at least 400 cc, a face, a sole section, a crown section, a front, a back, a heel, a toe, and a front-to-back dimension of 111.8-130.0 mm, wherein the body has a bore having a center that defines a shaft axis and shaft axis plane, where the shaft axis intersects a ground plane to define a ground origin point, and wherein a portion of the body comprises aluminum alloy;

B) the face having a top edge and a lower edge, wherein a top edge height is an elevation of the top edge above the ground plane, a lower edge height is an elevation of the lower edge above the ground plane, and a difference between the top edge height and the lower edge height is no more than 65 mm;

C) the crown section having a crown apex located an apex height above the ground plane of 48-72 mm, and an apex plane passes through the crown apex and is parallel to the ground plane, wherein:

i) a portion of the crown is composed of nonmetallic material;

ii) the crown apex is located a crown apex x-dimension distance from the ground origin point, with the crown apex x-dimension distance measured parallel to the shaft axis plane;

iii) the crown section has a 12 degree pitched up orientation crown apex and defining a 12 degree pitched up/8 mm drop contour area (CA), wherein;

(a) the 12 degree pitched up orientation crown apex is located at a peak height of the crown section when the body is positioned in a 12 degree pitched up orientation that includes an absolute lie angle of 55 degrees, a face angle of 0 degrees, and a pitch angle of 12 degrees up;

(b) the 12 degree/8 mm drop contour area (CA) is defined as a cross-sectional area of an intersection of the crown section with an offset plane located at an elevation that is 8 mm below the 12 degree pitched up orientation crown apex and parallel to the ground plane when the body is positioned in the 12 degree pitched up orientation; and (c) wherein the body has a projected area of the face ($A_f$), and wherein the 12 degree pitched up/8 mm drop contour area (CA) is greater than a linear expression:

$$CA=-1.5395*A_f+19.127$$

D) a head-shaft connection assembly including a shaft sleeve configured to be received in the bore and the shaft sleeve is secured by a fastening member in a locked position, the head-shaft connection assembly configured to allow the golf club head to be adjustably attachable to a golf club shaft in a plurality of different positions resulting in an adjustability range of different combinations of loft angle, face angle, or lie angle;

E) a forward weight attached to the body in a forward half of the head and having a forward weight mass;

F) wherein the golf club head has a head origin defined as a position on a face plane at a geometric center of the face, the head origin including an x-axis tangential to the face and generally parallel to the ground when the head is in an address position where a positive x-axis extends towards a heel portion and a negative x-axis extends towards a toe portion, a y-axis extending perpendicular to the x-axis and generally parallel to the ground plane when the head is in the address position where a positive y-axis extends from the face and through a rearward portion of the body, and a z-axis extending perpendicular to the ground plane, the x-axis, and the y-axis when the head is in the address position where a positive z-axis extends from the head origin and generally upward, wherein the golf club head has a center of gravity with a x-axis coordinate, a y-axis coordinate of 15-50 mm, and a z-axis coordinate; and G) wherein the golf club head has a total head mass of 190-210 grams, a moment of inertia about the center of gravity x-axis, Ixx, of 200-500 kg·mm$^2$, a moment of inertia about the center of gravity y-axis, Iyy, and a moment of inertia about the center of gravity z-axis, Izz, of 350-600 kg·mm$^2$.

20. An aerodynamic golf club head comprising:

A) a body having a club head volume of at least 400 cc, a face, a sole section, a crown section, a front, a back, a heel, a toe, and a front-to-back dimension of 111.8-130.0 mm, wherein the body has a bore having a center that defines a shaft axis and shaft axis plane, where the shaft axis intersects a ground plane to define a ground origin point;

B) the face having a top edge and a lower edge, wherein a top edge height is an elevation of the top edge above the ground plane, a lower edge height is an elevation of the lower edge above the ground plane, and a difference between the top edge height and the lower edge height is no more than 65 mm, a difference between the top edge height and the lower edge height is at least 45 mm, and wherein a portion of the face comprises a nonmetallic material;

C) the crown section having a crown apex located an apex height above the ground plane of 48-72 mm, and an apex plane passes through the crown apex and is parallel to the ground plane, wherein:

i) a portion of the crown is composed of nonmetallic material;

ii) the crown apex is located a crown apex x-dimension distance from the ground origin point, with the crown apex x-dimension distance measured parallel to the shaft axis plane;

iii) the crown section has a 12 degree pitched up orientation crown apex and defining a 12 degree pitched up/8 mm drop contour area (CA), wherein;

(a) the 12 degree pitched up orientation crown apex is located at a peak height of the crown section when the body is positioned in a 12 degree pitched up orientation that includes an absolute lie angle of 55 degrees, a face angle of 0 degrees, and a pitch angle of 12 degrees up;

(b) the 12 degree/8 mm drop contour area (CA) is defined as a cross-sectional area of an intersection of the crown section with an offset plane located at an elevation that is 8 mm below the 12 degree pitched up orientation crown apex and parallel to the ground plane when the body is positioned in the 12 degree pitched up orientation; and (c) wherein the body has a projected area of the face (Ar), and wherein the 12 degree pitched up/8 mm drop contour area (CA) is greater than a linear expression:

$$CA=-1.5395*A_f+19.127$$

D) a head-shaft connection assembly including a shaft sleeve configured to be received in the bore and the shaft sleeve is secured by a fastening member in a locked position, the head-shaft connection assembly configured to allow the golf club head to be adjustably attachable to a golf club shaft in a plurality of different positions resulting in an adjustability range of different combinations of loft angle, face angle, or lie angle;

E) wherein the golf club head has a head origin defined as a position on a face plane at a geometric center of the face, the head origin including an x-axis tangential to the face and generally parallel to the ground when the head is in an address position where a positive x-axis extends towards a heel portion and a negative x-axis extends towards a toe portion, a y-axis extending perpendicular to the x-axis and generally parallel to the ground plane when the head is in the address position where a positive y-axis extends from the face and through a rearward portion of the body, and a z-axis extending perpendicular to the ground plane, the x-axis, and the y-axis when the head is in the address position where a positive z-axis extends from the head origin and generally upward, wherein the golf club head has a center of gravity with a x-axis coordinate, a y-axis coordinate of 15-50 mm, and a z-axis coordinate; and F) wherein the golf club head has a total head mass of 190-210 grams, a moment of inertia about the center of gravity x-axis, Ixx, of 200-500 kg·mm$^2$, a moment of inertia about the center of gravity y-axis, Iyy, and a moment of inertia about the center of gravity z-axis, Izz, of 350-600 kg·mm$^2$.

* * * * *